US 11,901,943 B2

(12) United States Patent
Ashrafi

(10) Patent No.: US 11,901,943 B2
(45) Date of Patent: *Feb. 13, 2024

(54) SYSTEM AND METHOD FOR POWERING RE-GENERATION AND RE-TRANSMISSION OF MILLIMETER WAVES FOR BUILDING PENETRATION

(71) Applicant: NxGen Partners IP, LLC, Dallas, TX (US)

(72) Inventor: Solyman Ashrafi, Plano, TX (US)

(73) Assignee: NxGen Partners IP, LLC, Dallas, TX (US)

( * ) Notice: Subject to any disclaimer, the term of this patent is extended or adjusted under 35 U.S.C. 154(b) by 51 days.

This patent is subject to a terminal disclaimer.

(21) Appl. No.: 17/686,625

(22) Filed: Mar. 4, 2022

(65) Prior Publication Data

US 2022/0190917 A1 Jun. 16, 2022

Related U.S. Application Data

(63) Continuation of application No. 17/028,832, filed on Sep. 22, 2020, now Pat. No. 11,283,522, which is a
(Continued)

(51) Int. Cl.
*H04B 7/24* (2006.01)
*H04B 10/2575* (2013.01)
(Continued)

(52) U.S. Cl.
CPC ......... *H04B 10/2575* (2013.01); *H04B 10/11* (2013.01); *H04B 10/2581* (2013.01);
(Continued)

(58) Field of Classification Search
CPC .... H04B 5/0031; H04B 5/0093; H04B 10/11; H04B 10/40; H04B 10/50; H04B 10/532;
(Continued)

(56) References Cited

U.S. PATENT DOCUMENTS 3,459,466 A  8/1969 Giordmaine
3,614,722 A  10/1971 Jones
(Continued)

FOREIGN PATENT DOCUMENTS

CN  101296017 A  10/2008
IN  105406611 A  3/2016
(Continued)

OTHER PUBLICATIONS

Tianyang Bai and Robert W. Heath Jr.; "Asymptotic SINR for Millimeter Wave Massive MIMO Cellular Networks" Wireless Networking and Communication Group; The University of Texas at Austin; Austin, TX; 2015 IEEE 16th International Workshop on Signal Processing Advances in Wireless Communications (SPAWC); 5 pgs.
(Continued)

*Primary Examiner* — Tuan Pham

(57) ABSTRACT

A system for providing a residential IP network includes a plurality of transceiver circuitries, each associated with a building, for transmitting signals to/from the associated building. An optical network unit transmits and receives signals at a first frequency with an optical network. A remote unit integrated with the optical network unit converts the received signals at the first frequency into a first format that overcome losses caused by penetrating into the interior of the building over a wireless communications link and transmits the signals in the first format using beam forming and beam steering to provide the wireless signals to at least one of the plurality of transceiver circuitries. Each of the plurality of transceiver circuitries further includes first circuitry, located on an exterior of the building, for transmitting and receiving the signals in the first format. A first antenna associated with the first circuitry for transmits the signals in the first format into the interior of the building via a wireless communications link and receives signals from the interior
(Continued)

of the building in the first format via the wireless communications link. Second circuitry, located on the interior of the building and communicatively linked with the first circuitry via the wireless communications link, receives and transmits the converted received signals in the first format that counteracts the losses caused by penetrating into the interior of the building from/to the first circuitry. A second antenna associated with the second circuitry transmits the signals in the first format to the exterior of the building via the wireless communications link and receives signals from the exterior of the building in the first format via the wireless communications link.

20 Claims, 84 Drawing Sheets

Related U.S. Application Data continuation of application No. 16/808,990, filed on Mar. 4, 2020, now Pat. No. 10,784,962, which is a continuation of application No. 16/530,528, filed on Aug. 2, 2019, now Pat. No. 10,778,332, which is a continuation of application No. 15/926,087, filed on Mar. 20, 2018, now Pat. No. 10,374,710, which is a continuation-in-part of application No. 15/636,142, filed on Jun. 28, 2017, now Pat. No. 10,027,434, and a continuation-in-part of application No. 15/466,320, filed on Mar. 22, 2017, now Pat. No. 10,014,948, said application No. 15/636,142 is a continuation of application No. 15/457,444, filed on Mar. 13, 2017, now Pat. No. 9,793,615, said application No. 15/466,320 is a continuation-in-part of application No. 15/357,808, filed on Nov. 21, 2016, now Pat. No. 9,712,238, said application No. 15/457,444 is a continuation of application No. 15/187,315, filed on Jun. 20, 2016, now Pat. No. 9,595,766, said application No. 15/357,808 is a continuation of application No. 15/144,297, filed on May 2, 2016, now Pat. No. 9,503,258, which is a continuation of application No. 14/323,082, filed on Jul. 3, 2014, now Pat. No. 9,331,875.

(60) Provisional application No. 62/638,555, filed on Mar. 5, 2018, provisional application No. 62/598,268, filed on Dec. 13, 2017, provisional application No. 62/559,286, filed on Sep. 15, 2017, provisional application No. 62/550,219, filed on Aug. 25, 2017, provisional application No. 62/549,314, filed on Aug. 23, 2017, provisional application No. 62/474,937, filed on Mar. 22, 2017, provisional application No. 62/425,432, filed on Nov. 22, 2016, provisional application No. 62/369,393, filed on Aug. 1, 2016, provisional application No. 62/368,417, filed on Jul. 29, 2016, provisional application No. 62/321,245, filed on Apr. 12, 2016, provisional application No. 62/317,829, filed on Apr. 4, 2016, provisional application No. 62/311,633, filed on Mar. 22, 2016, provisional application No. 62/242,056, filed on Oct. 15, 2015, provisional application No. 62/233,838, filed on Sep. 28, 2015, provisional application No. 62/182,227, filed on Jun. 19, 2015, provisional application No. 61/975,142, filed on Apr. 4, 2014.

(51) Int. Cl.
| | |
|---|---|
| H04L 27/36 | (2006.01) |
| H04L 25/03 | (2006.01) |
| H04B 10/516 | (2013.01) |
| H04J 14/00 | (2006.01) |
| H04B 10/54 | (2013.01) |
| H04B 10/532 | (2013.01) |
| H04B 10/2581 | (2013.01) |
| H04L 9/40 | (2022.01) |
| H04L 9/30 | (2006.01) |
| H04L 9/08 | (2006.01) |
| H04B 10/11 | (2013.01) |
| H04L 27/34 | (2006.01) |
| H04B 10/50 | (2013.01) |
| H04W 12/04 | (2021.01) |
| H04L 25/00 | (2006.01) |

(52) U.S. Cl.
CPC ......... *H04B 10/50* (2013.01); *H04B 10/5161* (2013.01); *H04B 10/532* (2013.01); *H04B 10/541* (2013.01); *H04J 14/00* (2013.01); *H04L 9/0858* (2013.01); *H04L 9/3093* (2013.01); *H04L 25/03006* (2013.01); *H04L 25/03343* (2013.01); *H04L 27/3405* (2013.01); *H04L 27/362* (2013.01); *H04L 27/366* (2013.01); *H04L 63/06* (2013.01); *H04L 25/00* (2013.01); *H04L 2025/0335* (2013.01); *H04L 2025/0342* (2013.01); *H04W 12/04* (2013.01)

(58) Field of Classification Search
CPC ........... H04B 10/2575; H04B 10/2581; H04W 12/04; H04J 14/00; H04L 14/00; H04L 9/0858; H04L 9/3093; H04L 25/03006; H04L 25/03343; H04L 27/3405; H04L 27/366
See application file for complete search history.

(56) References Cited

U.S. PATENT DOCUMENTS

| | | |
|---|---|---|
| 4,379,409 A | 4/1983 | Primbsch et al. |
| 4,503,336 A | 3/1985 | Hutchin et al. |
| 4,736,463 A | 4/1988 | Chavez |
| 4,792,814 A | 12/1988 | Ebisui |
| 4,862,115 A | 8/1989 | Lee et al. |
| 5,051,754 A | 9/1991 | Newberg |
| 5,220,163 A | 6/1993 | Toughlian et al. |
| 5,222,071 A | 6/1993 | Pezeshki et al. |
| 5,272,484 A | 12/1993 | Labaar |
| 5,543,805 A | 8/1996 | Thaniyavarn |
| 5,555,530 A | 9/1996 | Meehan |
| 6,337,659 B1 | 1/2002 | Kim |
| 6,992,829 B1 | 1/2006 | Jennings et al. |
| 7,577,165 B1 | 8/2009 | Barrett |
| 7,729,572 B1 | 6/2010 | Pepper et al. |
| 7,792,431 B2 | 9/2010 | Jennings et al. |
| 8,184,972 B2 | 5/2012 | Parker et al. |
| 8,432,884 B1 | 4/2013 | Ashrafi |
| 8,503,546 B1 | 8/2013 | Ashrafi |
| 8,559,823 B2 | 10/2013 | Izadpanah et al. |
| 8,811,366 B2 | 8/2014 | Ashrafi |
| 8,994,593 B2 | 3/2015 | Fakharzadeh et al. |
| 9,077,577 B1 | 7/2015 | Ashrafi et al. |
| 9,294,259 B2 | 3/2016 | Jalloul et al. |
| 9,391,375 B1 | 7/2016 | Bales et al. |
| 9,575,001 B2 | 2/2017 | Ashrafi et al. |
| 9,998,187 B2 | 6/2018 | Ashrafi et al. |
| 10,014,948 B2 * | 7/2018 | Ashrafi ................... H04L 27/36 |
| 10,153,845 B2 * | 12/2018 | Ashrafi ................... H04L 63/06 |
| 10,187,156 B2 * | 1/2019 | Ashrafi ................. H04L 9/3093 |
| 10,374,710 B2 * | 8/2019 | Ashrafi ................... H04L 63/06 |
| 10,491,303 B2 * | 11/2019 | Ashrafi ............. H01Q 21/0025 |
| 10,547,386 B2 * | 1/2020 | Ashrafi ................... H04L 27/38 |
| 10,735,838 B2 * | 8/2020 | Cumana Morales ........................ H04Q 11/0067 |
| 10,778,332 B2 * | 9/2020 | Ashrafi .................. H04B 10/50 |

(56) References Cited

U.S. PATENT DOCUMENTS

| | | | |
|---|---|---|---|
| 10,784,962 B2* | 9/2020 | Ashrafi | H04L 27/362 |
| 11,088,755 B2* | 8/2021 | Ashrafi | H04B 7/15507 |
| 11,283,522 B2* | 3/2022 | Ashrafi | H04B 10/541 |
| 2003/0104781 A1 | 6/2003 | Son | |
| 2004/0203528 A1 | 10/2004 | Ammar et al. | |
| 2005/0030228 A1 | 2/2005 | Judd | |
| 2005/0141716 A1 | 6/2005 | Kumar et al. | |
| 2005/0254826 A1 | 11/2005 | Jennings et al. | |
| 2005/0259914 A1 | 11/2005 | Padgett et al. | |
| 2005/0260983 A1 | 11/2005 | DiPiazza | |
| 2006/0025072 A1 | 2/2006 | Pan | |
| 2006/0062515 A1 | 3/2006 | Mahbobi | |
| 2007/0230688 A1 | 10/2007 | Tajima et al. | |
| 2008/0267112 A1 | 10/2008 | Lucidarme | |
| 2009/0028579 A1 | 1/2009 | Deng | |
| 2009/0272424 A1 | 11/2009 | Ortabasi | |
| 2010/0013696 A1 | 1/2010 | Schmitt et al. | |
| 2010/0227547 A1* | 9/2010 | DiPiazza | H04B 7/2606 |
| | | | 455/7 |
| 2011/0158150 A1 | 6/2011 | Kawamura et al. | |
| 2011/0176581 A1 | 7/2011 | Thomas et al. | |
| 2011/0287716 A1 | 11/2011 | Lortz | |
| 2012/0071091 A1 | 3/2012 | Azancot et al. | |
| 2012/0207470 A1 | 8/2012 | Djordjevic et al. | |
| 2013/0027240 A1 | 1/2013 | Chowdhury | |
| 2013/0027774 A1 | 1/2013 | Bovino et al. | |
| 2013/0071120 A1 | 3/2013 | Marlcevic et al. | |
| 2013/0089204 A1 | 4/2013 | Kumar et al. | |
| 2013/0121330 A1 | 5/2013 | Ashrafi | |
| 2013/0148963 A1 | 6/2013 | Cvijetic et al. | |
| 2013/0235744 A1 | 9/2013 | Chen et al. | |
| 2013/0235885 A1 | 9/2013 | Chen et al. | |
| 2014/0064335 A1 | 3/2014 | Breun et al. | |
| 2014/0140189 A1 | 5/2014 | Shattil | |
| 2014/0296732 A1 | 10/2014 | Lanning et al. | |
| 2014/0339913 A1 | 11/2014 | Tsuji et al. | |
| 2014/0355624 A1 | 12/2014 | Li et al. | |
| 2015/0098697 A1 | 4/2015 | Marom et al. | |
| 2015/0117435 A1* | 4/2015 | Baldemair | H04B 7/06 |
| | | | 375/326 |
| 2015/0245139 A1 | 8/2015 | Park | |
| 2015/0249537 A1 | 9/2015 | Wabnig et al. | |
| 2015/0333865 A1 | 11/2015 | Yu et al. | |
| 2015/0043910 A1 | 12/2015 | Koebele et al. | |
| 2015/0349910 A1 | 12/2015 | Huang et al. | |
| 2016/0134356 A1 | 5/2016 | Rappaport et al. | |
| 2016/0204896 A1 | 7/2016 | Yu et al. | |
| 2016/0294441 A1* | 10/2016 | Fazlollahi | H04L 5/0023 |
| 2017/0093228 A1 | 3/2017 | Fisher et al. | |
| 2017/0195054 A1 | 7/2017 | Ashrafi | |
| 2018/0019798 A1 | 1/2018 | Khan et al. | |
| 2018/0062773 A1 | 3/2018 | Kusunoki et al. | |
| 2018/0227144 A1 | 8/2018 | Khan | |
| 2018/0262272 A1 | 9/2018 | Ashrafi | |
| 2018/0262363 A1 | 9/2018 | Chamberlain et al. | |
| 2018/0278334 A1 | 9/2018 | Ashrafi | |
| 2018/0331763 A1 | 11/2018 | Ashrafi | |
| 2019/0372671 A1 | 12/2019 | Ashrafi | |
| 2020/0259551 A1 | 8/2020 | Deitz | |
| 2020/0382198 A1 | 12/2020 | Ashrafi | |

FOREIGN PATENT DOCUMENTS

| | | |
|---|---|---|
| JP | 2002152107 A | 5/2002 |
| JP | 2004056457 A | 2/2004 |
| JP | 2004080595 A | 3/2004 |
| JP | 2015522221 A | 8/2015 |
| JP | 2016111792 A | 6/2016 |
| KR | 20140004455 U | 7/2014 |
| WO | 2005069249 A1 | 7/2005 |
| WO | 2010093574 A1 | 8/2010 |

OTHER PUBLICATIONS

Tianyang Bai and Robert W. Heath, Jr.; "Coverage and Rate Analysis for Millimeter-Wave Cellular Networks" IEE Transactions on Wireless Communications; vol. 14, No. 2; 1536-1276; 2014 IEEE; Feb. 2015; 15 pgs.

Tianyang Bai et al.; "Uplink Massive MIMO SIR Analysis: How do Antennas Scale with Users?" The University of Texas at Austin; Austin, Texas; Dec. 2015; 6 pgs.

Tianyang Bai et al; "Analysis of Blockage Effects on Urban Cellular Networks" IEEE Transactions on Wireless Communications; vol. 13, No. 9; Sep. 2014; 14 pgs.

Tianyang Bai, Ahmed Alkhateeb and Robert W. Heath, Jr.; "Coverage and Capacity of Millimeter-Wave Cellular Networks" Millimeter-Wave Communications for 5G; 0163-6804-14; 2104 IEEE; IEEE Communications Magazine; Sep. 2014; 8 pgs.

Vasnetsov, M. V., Pasko, V.A. & Soskin, M.S.; Analysis of orbital angular momentum of a misaligned optical beam; New Journal of Physics 7, 46 (2005).

Vutha Va and Robert W. Heath Jr.; "Basic Relationship between Channel Coherence Time and Beamwidth in Vehicular Channels"; Wireless Networking and Communications Group, The University of Texas at Austin; 978-1-4799-8091-8-15; 2015 IEEE; 5 pgs.

Vutha Va et al.; "Beam Design for Beam Switching Based Milimeter Wave Vehicle-to-Infrastructure Communications" Wireless Networking and Communications Group; The University of Texas at Austin; Austin, Tx; Toyota Info Technology Center, U.S.A., Inc.; Mountain View, CA; IEE ICC 2016—Wireless Communications Symposium; 6 pgs.

Vutha Va et al.; "The Impact of Beamwidth on Temporal Channel Variation in Vehicular Channels and Its Implications" IEEE Transactions on Vehicular Technology, vol. 66, No. 6, Jun. 2017; 16 pgs.

Vutha Va et al; "Beam Switching for Millimeter Wave Communication to Support High Speed Trains" Wireless Networking and Communications Group, The University of Texas at Austin; Austin, TX; Qualcomm Inc.; San Diego, CA; 978-1-4799-8091-8/15; 2015 IEEE; 5 pgs.

Wang, Jian, et al.; Terabit free-space data transmission employing orbital angular momentum multiplexing. Nature Photonics; 6, 488-496 (2012).

Weiser, Mark; "The Computer for the 21st Century"; Scientific American Ubicomp Paper after Sci Am editing; SCI AMER WEISER; Sep. 1991; 8 pgs.

WirelessHD Product Listing; Website: http://www.wirelesshd.org/consumers/product-listing/; Accessed Oct. 4, 2017; 4 pgs.

WLANPARTS; "Mikrotic RBDYNADISHG-5HAC DynaDish 5 802.11ac outdoor 25dBi antenna"; on the Internet at http://www.wlanparts.com/mikrotik/mikrotik-rbdynadishg-5hac-dynadish-5-802-11ac-outdoor-25dbi-antenna/; retrieved on Sep. 22, 2017; 2 pgs.

Wonbin Hong et al.; Study and Prototyping of Practically Large-Scale mmWave Antenna Systems for 5G Cellular Devices; Millimeter-Wave Communications for 5G; IEEE Communications Magazine; Sep. 2014; 0163-6804/14; 7 pgs.

Wonil Roh et al.; "Millimeter-Wave Beamforming as an Enabling Technology for 5G Cellular Communications: Theoretical Feasibility and Prototype Results" Samsung Electronics Co., Ltd.; Samsung Research America; IEEE Communications Magazine; Feb. 2014; 8 pgs.

Xia et al.; "Robust Analog Precoding Designs for Millimeter Wave MIMO Transceivers" Key Lab of Embedded System and Service Computing, Tongji University, Shanghai China; The University of Texas at Austin, Austin, Texas; University of Vigo; Vigo, Spain; ISBN 978-3-8007-4177-9; WSA 2016; Mar. 9-11, 2016, Munich, Germany, 8 pgs.

Xingqin Lin and Jeffrey G. Andrews; "Connectivity of Millimeter Wave Networks With Multi-Hop Relaying" IEEE Wireless Communications Letter, vol. 4, No. 2, Apr. 2015; 4 pgs.

Yongxiong Ren et al.; Experimental Demonstration of 16 Gbit/s millimeter-wave Communications using MIMO Processing of 2 OAM Modes on Each of Two Transmitter/Receiver Antenna Apertures; 1992; 6pgs.

Yongxiong Ren et al.; Experimental Investigation of Data Transmission Over a Graded-index Multimode Fiber Using the Basis of Orbital Angular Momentum Modes; Dec. 2016; 2 pgs.

(56) References Cited

OTHER PUBLICATIONS

Yoshihisa Kishiyama et al; "Future Steps of LTE-A: Evolution Toward Integration of Local Area and Wide Area Systems"; Multicell Cooperation; NTT DOCOMO, Inc.; DOCOMO Innovations, Inc.: 1536-1284/13; 2013 IEEE; IEEE Wireless Communications; Feb. 2013; 7 pgs.
Zhouyue Pi and Farooq Khan, Samsung Electronics "An Introduction to Millimeter-Wave Mobile Broadband Systems"; Topics in Radio Communications; IEEE Communications Magazine; Jun. 2011; 7 pgs.
Zhouyue Pi et al.; "Millimeter-Wave Gigabit Broadband Evolution toward 5H: Fixed Access and Backhaul" IEEE Communication Magazine; 0163-6804/16; Apr. 2016; 7 pgs.
Federico Boccardi et al.; "Five Disruptive Technology Directions for 5G" 5G Wireless Communication Systems: Prospects and Challenges; 0163-6804/14; IEEE Communications Magazine; Feb. 2014; 7 pgs.
Foad Sohrabi and Wei Yu; "Hybrid Digital and Analog Beamforming Design for Large-Scale MIMO Systems"; Department of Electrical and Computer Engineering; University of Toronto; Toronto, Ontario; 978-1-4673-6997-8/15; 2015 IEEE; ICASSP 2015; 5 pgs.
Future Cars: The word from GM at IDC's Smart Technology World conference; Jerry Apr. 30, 2012 19:45; Accessed on Oct. 10, 2017. https://m.blog.naver.com/PostView.nhn?blogId=windpusan&logNo=150137554930&proxyReferer=https%3A%2F%2Fwww.google.com%2F; 1 pg.
Gabriel M. Rebeiz et al.; "Millimeter-Wave Large-Scale Phased-Arrays for 5G Systems" University of California San Diego; La Jolla, California; 978-1-4799-8275-2/15; 2015 IEEE; 3 pgs.
Gibson, G. et al., Free-space information transfer using light beans carrying orbital angular momentum; Optical Express 12, 5448-5456 (2004).
H. Yao et al.; Patch Antenna Array for the Generation of Millimeter-wave Hermite-Gaussian Beams, IEEE Antennas and Wireless Propagation Letters; 2016.
Hamamatsu; "Si PIN photodiodes: S1223 series—For visible to near IR, precision photometry"; Hamamatsu Photonics K.K., Solid State Division; Cat. No. KPIN1050E02 Feb. 2013; 3 pgs.
Handlink: Your HotSpot Service Partner, "PoE-2440 24-Port PoE L2 Managed Gigabit Ethernet Switch: Enterprise-Grade PoE Gigabit Switch with 4 Combo SFP slots to Expanding Your Network Flexibly & Offering Superior Performance and Capability"; Taiwan, R.O.C.; May 2016 EN V.100 ID; 2 pgs.
Huang, Hao et. al.; Crosstalk mitigation in a free-space orbital angular momentum multiplexed communication link using 4×4 MIMO equalization; Optics Letters, vol. 39, No. 15; 4360-4363; (2014).
Hur, Sooyoung et at.; Millimeter Wave Beamforming for Wireless Backhaul and Access in Small Cell Networks. IEEE Transactions on Communications, vol. 61, 4391-4402 (2013).
Ignacio Rodriguez et al., "Radio Propagation into Modern Buildings: Attenuation Measurements in the Range from 800 MHz to 18 GHZ," 2014 IEEE 80th Vehicular Technology Conference (VTC2014-Fall), IEEE, Sep. 14, 2014, pp. 1-5.
Intellectual Property India: Examination Report for IN Application No. 201927040442 (related application); Feb. 1, 2022; Lakshmi Narayana Chinta; 6 pages.
Iskander, Magdy F.; Propagation Prediction Models for Wireless Communication Systems; IEEE Transactions on Microwave Theory and Techniques, vol. 50., No. 3, 662-673 (2002).
Jeffrey G. Andrews; "Seven Ways that HetNets Are a Cellular Paradigm Shift" Topics in Radio Communication; University of Texas at Austin; IEEE Communications Magazine; 0163-6804/13; Mar. 2013; 9 pgs.
Jens Zander et al.; "Riding the Data Tsunami in the Cloud: Myths and Challenges in Future Wireless Access"; The Royal Institute of Technology; RWTH Aachen University; Topics in Radio Communications; IEEE Communications Magazine; Mar. 2013; 0163-6804/13; 7 pgs.

Jerry Baulier et al.; "Making Meaningful Predictions in the Fast Lane: The Role of Event Stream Processing in Connected Vehicles" Research Brief; International Institute for Analytics; SAS; Connected Vehicle Trade Association; IA Faculty; Oct. 2014; 14 pgs.
Jianhua Mo and Robert W. Heath Jr.; "Capacity Analysis of One-Bit Quantized MIMO Systems With Transmitter Channel State Information" IEEE Transactions on Signal Processing; vol. 63, No. 20; Oct. 15, 2015; 15 pgs.
Jianhua Mo and Robert W. Heath, Jr.; "Limited Feedback in Multiple-Antenna Systems with One-Bit Quantization"; Wireless Networking and Communications Group; The University of Texas at Austin; Austin, Texas; 978-1-4673-8576-3/15 @2015 IEEE; Mar. 2015; 5 pgs.
Jianhua Mo et al.; "Channel Estimation in Millimeter Wave MIMO Systems with One-Bit Quantization" Department of ECE, The University of Texas at Austin; Austin, TX; Department of ECE, The Ohio State University; Columbus, OH; Department of Signal Theory and Communications, Universidade de Vigo; Vigo, Spain; 978-1-4799-8297-4/14; 2014 IEEE; Asilomar 2014; 5 pgs.
Jianhua Mo, Ahmed et al.; "Achievable Rates of Hybrid Architectures with Few-Bit ADC Receivers" Department of ECE, The University of Texas at Austin, Austin, TX; Samsung Research America—Dallas, Richardson, TX; VDE VERLAG GMBH; ISBN 978-3-8007-4177-9; Munich, Germany; Mar. 9-11, 2016; 8 pgs.
JP: Office Action of JP 2018-552137 (related application); dated Feb. 24, 2021; 10 pages.
Junil Choi and Robert W. Heath Jr.; "Near Maximum-Likelihood Detector and Channel Estimator for Uplink Multiuser Massive MIMO Systems With One-Bit ADCs" IEEE Transactions on Communications, vol. 64, No. 5, May 2016; 0090-6778; 14 pgs.
Junil Choi et al.;"Millimeter Wave Vehicular Communication to Support Massive Automotive Sensing" arXiv: 1602.06456v2 [cs.IT]; May 18, 2016; 7 pgs.
Katayama, Y., et al.; Wireless Data Center Networking with Steered-Beam mmWave Links; IEEE Wireless Communication Network Conference; 2011, 2179-2184 (2011).
Kiran Venugopal and Robert W. Heath, Jr.; "Millimeter Wave Networked Wearables in Dense Indoor Environments" The University of Texas, Austin; Special Section on Body Area Networks for Interdisciplinary Research; vol. 4, Apr. 6, 2016; 17 pgs.
Kiran Venugopal et al; "Analysis of Millimeter Wave Networked Wearables in Crowded Environments" IEEE; Asilomar 2015; 5 pgs.
Kiran Venugopal, Matthew C. Valenti and Robert W. Heath Jr.; "Device-to-Device Millimeter Wave Communications: Interference, Coverage, Rate, and Finite Topologies"; IEEE Transactions on Wireless Communcations; vol. 15, No. 9; Sep. 2016; 1536-1276 2016 IEEE; 14 pgs.
Kiran Venugopal, Matthew C. Valenti and Robert W. Heath, Jr.; "Interference in Finite-Sized Highly Dense Millimeter Wave Networks"; The University of Texas; Austin, TX; West Virginia University; Morgantown, WV; Feb. 2015; 6 pgs.
Korean Patent Application No. 10-2018-7031922; Korean Office Action dated Jan. 13, 2021; 42 pages.
Li, X. et al.; Investigation of interference in multiple-input multiple-output wireless transmission at W band for an optical wireless integration system. Optics Letters 38, 742-744 (2013).
Mahmouli, F.E. & Walker, D. 4-Gbps Uncompressed Video Transmission over a 60-GHz Orbital Angular Momentum Wireless Channel. IEEE Wireless Communications Letters, vol. 2, No. 2, 223-226 (Apr. 2013).
Mario Giovanni Luigi Frecassetti et al.; "E-Band and V-Band—Survey on status of worldwide regulation" First edition—Jun. 2015; ISBN No. 979-10-92620-06-1; ETSI; Cedex, France; 40 pgs.
Mark Cudak et al.; "Experimental mmWave 5G Cellular System"; Nokia Networks; Arlington Heights, Illinois; NTT Docomo, Inc., Kanagawa-ken, Japan; Globecom 2014 Workshop—Mobile Communications in Higher Frequency Bands; 978-1-4799-7470-2-14; 2014 IEEE; 5 pgs.
Maxim Integrated Products; "5GHZ, 4-Channel MIMO Transmitter" MAX 2850; 19-5009, Rev 1; Sunnyvale, CA; Mar. 2010; 33 pgs.
Maxim Integrated Products; "5GHZ, 5-Channel MIMO Receiver" MAX2851; 19-5121; Rev 1; Sunnyvale, CA; Mar. 2010; 37 pgs.

(56) References Cited

OTHER PUBLICATIONS

Maxim Integrated: Max2828/Max2829 Single-/Dual-Band 802.11a/b/g World-Band Transceiver ICs; 19-3455; Rev 0; San Jose, CA; Oct. 2004; 39 pgs.
Microwave Dynamics; "Low Noise Microwave/Millimeter Wave Amplifiers" Pamphlet: http://www.microwave-dynamics.com; Jul. 2017; 2 pgs.
Microwave Dynamics; "Medium Power Millimeter Wave Amplifiers" Pamphlet: http://www.microwave-dynamics.com; May 2016; 2 pgs.
Mohammed E. Eltayeb et al.; "Opportunistic Beam Training with Hybrid Analog/Digital Codebooks for mmWave Systems" The University of Texas at Austin; King Abdulla University of Science and Technology; GlobalSIP 2015; Symposium on Massive MIMO and Full-Dimension Mimo (FD-MIMO) Communications; 978-1-4799-7591-4/15; 2105 IEEE; 5 pgs.
Molina-Terriza, G., et al.; Management of the Angular Momentum of Light: Preparation of Photons in Multidimensional Vector States of Angular Momentum; Physical Review Letters; vol. 88, No. 1; 77, 013601/1-4 (2002).
Mustafa Riza Akdeniz et al.; "Millimeter Wave Channel Modeling and Cellular Capacity Evaluation" IEEE Journal on Selected Areas in Communications, vol. 32, No. 6, Jun. 2014: 16 pgs.
National Intellectual Property Administration, PCR: the First Office Action for CN Application No. 201880020333.7 (related application); Nov. 2, 2021; Ni Dajian; 31 pages.
National Intellectual Property Administration, PRC; The First Office Action of CN Application No. 201580028235.4; (related application); YANG, Zhizhong; Jul. 1, 2019; 40 pages.
National Intellectual Property Administration, PRC; The Second Office Action of CN Application No. 201580028235.4; (related application); Yang, Zhizhong; Mar. 6, 2020; 10 pages.
National Science Foundation Award Search: Award #1514275-CIF: Medium Fundamental Properties of Millimeter Wave Networks: Signal, Interference, and Connectivity; Accessed on Oct. 4, 2017; 2 pgs.
Negin Golrezael et al.; "Femtocaching and Device-to-Device Collaboration: A New Architecture for Wireless Video Distribution" Accepted from Open Call; 0163-6804/13; 2013 IEEE; IEEE Communications Magazine; Apr. 2013; 8 pgs.
Ahmed Alkhateeb, Geert Leus and Robert W. Heath Jr.; "Compressed Sensing Based Multi-User Millimeter Wave Systems: How Many Measurements are Needed?" The University of Texas at Austin; Texas, USA; Delft University of Technology, The Netherlands; 978-1-4673-6997-8-15; 2015 IEEE; ICASSP 2015; 5 pgs.
Ahmed Alkhateeb, Geert Leus and Robert W. Heath, Jr.; "Limited Feedback Hybrid Precoding for Multi-User Millimeter Wave Systems"; IEEE Transactions on Wireless Communications, vol. 14, No. 11, Nov. 2015; 14 pgs.
Alexander Pyattaev et al.; "Communication Challenges in High-Density Deployments of Wearable Wireless Devices" 1536-1284-15; 2015 IEEE; IEEE Wireless Communications; Feb. 2015; 7 pgs.
Allen, L., Beijersbergen, M., Spreeuw, R.J.C., and Woerdman, J.P.; Orbital Angular Momentum of Light and the Transformation of Laguerre-Gaussian Laser Modes; Physical Review A, vol. 45, No. 11; 8185-8189 (1992).
amazon.com; Competition Solar 7-Watt Amorphous Solar Power Battery Charger; Sep. 22, 2017; 7 pgs.
amazon.com; ECEEN Portable Solar Charger, 7W Solar Panel 22% High Efficiency with USB Port Power Charger for IOS for Apple iPhone 6/6 Plus, S6/S6 Edge iPad & Samsung any more USB devices; Sep. 22, 2017; 7 pgs.
Amin Abdel Khalek, Robert W. Heath, Jr., et al.; "Cross-polarization RF Precoding to Mitigate Mobile Misorientation and Polarization Leakage"; Wireless Networking and Communications Group, The University of Texas at Austin; Austin, Texas; Samsung Research America—Dallas; Samsung Electronics; Richardson, Texas; The 11th Annual IEEE CCNC-Wireless Communications Track; 978-1-4799-2355-7/14; 2014 IEEE; 6 pgs.
Anderson, Jorgen Bach; Rappaport, Theodore S.; Yoshida, Susumu; Propagation Measurements and Models for Wireless Communications Channels; 33 42-49 (1995).
Andreas Mai; "The Internet of Cars: A Catalyst to Unlock Societal Benefits of Transportation" CISCO; Mar. 2013; 42 pgs.
Andrew Thornburg and Robert W. Heath, Jr.; "Ergodic Capacity in mmWave Ad Hoc Network with Imperfect Beam Alignment"; Wireless Communication and Networking Group, The University of Texas at Austin; Austin, Texas; 978-1-5090-0073-9/15; 2015 IEEE; Milcom 2015 Track 1—Waveforms and Signal Processing; 6 pgs.
Andrew Thornburg and Tianyang Bai; Performance Analysis of Outdoor mmWave Ad Hoc Networks; IEEE Transactions on Signal Processing, vol. 64, No. 15, Aug. 1, 2016; 15 pgs.
Andrew Thornburg, Tianyang Bai and Robert W. Heath, Jr.; "MmWave Ad Hoc Network Coverage and Capacity" IEEE ICC 2015 SAC—Millimeter-Wave Communications; Wireless Communication and Networking Group; The University of Texas at Austin; Austin, TX; 978-1-4673-6432-4/15; 6 pgs.
Andrew Thornburg, Tianyang Bai and Robert W. Heath, Jr.; "Interference Statistics in a Random mmWave ad hoc Network"; Wireless Communication and Networking Group; The University of Texas at Austin; Austin, TX; 978-1-4673-6997-8/15; 2015 IEEE; ICASSP 2015; 5 pgs.
Angel Lozano, Robert W. Heath, Jr. and Jeffrey G. Andrews; "Fundamental Limits of Cooperation" IEEE Transactions of Information Theory, vol. 59, No. 9, Sep. 2013; 0018-9448; 2013 IEEE; 14 pgs.
Atheros Communications; "AR9280 Single-chip 2.4/5 GHz 802.11n WLAN solution for PCI-Express" XSPAN Atheros; 2010; AR9280-6-16-10; 2 pgs.
Atheros Communications; "AR9280 Single-chip 2.4/5 GHz draft 802.11n WLAN solution for PCI-Express" XSPAN Atheros; 2010; AR9280-11-5-07; 2 pgs.
Atheros Communications; "AR9281 Single-chip 2.4 GHz 802.11n WLAN solution for PCI-Express" XSPAN Atheros; 2010; AR9280-6-16-10; 2 pgs.
Atheros Communications; "AR9382 Single-chip, 2.4/5GHZ, 2-stream 802.11a/b/g/n solution with SST Technology" Atheros Inc.; AR9382; Nov. 16, 2010; 2 pgs.
Byun, S.H., Haji, G.A. & Young, L.E.; Development and application of GPS signal multipath simulator; Radio Science, vol. 37, No. 6, 1098 (2002).
Cardinal IG; Technical Service Bulletin (Bulletin #IG05-02/16); Performance Data and Comparisons; 2016 Cardinal IG Company; 5 pgs.
Chan Dai Truyen Thai et al.; "Multi-Flow Scheduling for Coordinated Direct and Relayed Users in Cellular Systems" IEEE Transactions on Communications, vol. 61, No. 2, Feb. 2013; 0090-6778/13; 10 pgs.
Christopher Mollen et al.; "One-Bit ADCS in Wideband Massive MIMO Systems with OFDM Transmission"; Linkoping University, Dept. of Electrical Engineering; University of Texas at Austin, Dept. of Electrical and Computer Engineering, Austin, TX; 978-1-4799-9988-0/16; 2016 IEEE; ICASSP 2016; 5 pgs.
Christopher Mollen et al.; "Performance of Linear Receivers for Wideband Massive MIMO with One-Bit ADCs"; Linkoping University, Dept. of Electrical Engineering; University of Texas at Austin, Dept. of Electrical and Computer Engineering; Austin, Texas; ISBN 978-3-8007-1477-9; Munich, Germany; Mar. 9-11, 2016; 7 pgs.
Christopher Mollen et al.; "Uplink Performance of Wideband Massive MIMO With One-Bit ADCs" IEEE Transactions on Wireless Communications, vol. 16, No. 1, Jan. 2017; 14 pgs.
CN: Office Action of 2015800282354 (related application); dated Jul. 1, 2019; 18 pages.
CN: Office Action of 2017800346853 (related application); dated May 19, 2021; 12 pages.
Cristian Rusu et al.; "Adaptive One-bit Compressive Sensing with Application to Low-Precision Receivers at mmWave" Universidade de Vigo; Vigo, Spain; The University of Texas at Austin; Austin, TX; 2015 IEEE; 6 pgs.

(56) References Cited

OTHER PUBLICATIONS

Cristian Rusu et al.; "Low Complexity Hybrid Precoding Strategies for Millimeter Wave Communication Systems" IEEE Transactions on Wireless Communications, vol. 15, No. 12, Dec. 2016; 14 pgs.
Cristian Rusu et al.; "The Use of Unit Norm Tight Measurement Matrices for One-Bit Compressed Sensing" University of Vigo; The University of Texas at Austin; 978-1-4799-9988-0/16; 2016 IEEE; ICASSP 2016; 5 pgs.
Dalin Ahu, Junil Choi and Robert W. Heath Jr.; "Auxiliary Beam Pair Design in MMWAVE Cellular Systems with Hybrid Precoding and Limited Feedback" Department of Electrical and Computer Engineering; The University of Texas at Austin; 978-1-499-9988-0/16; 2016 IEEE; ICASSP 2016; 5 pgs.
David J. Goodman et al.; "Infostations: A New System Model for Data and Messaging Services"; Wireless Information Network Laboratory (WINLAB), Rutgers University, Piscataway, NJ; O-7803-3659-3/97; 1997 IEEE; 5 pgs.
Duy H. N. Nguyen et al.; "Hybrid MMSE Precoding and Combining Designs for mmWave Multiuser Systems"; DOI 10.1109/ACCESS/2017.2754979 IEEE Access; 2169-3536; 2017 IEEE; 14 pgs.
EP: Communication Pursuant to Article 70(2) and 70a(2) EPC of EP Application 18771470.4 (related application); dated Apr. 12, 2021; 1page.
EP: Communication Pursuant to Rule 164(1) EPC, Partial European Search Report for 17779655.4 (related application); dated Nov. 25, 2019; 13 pages.
EP: Communication Pursuant to Rules 161(2) and 162 EPC for 18771470.4 (related application); dated Oct. 29, 2019; 3 pages.
European Patent Office: Communication pursuant to Rule 164(1) EPC and Supplementary partial European Search Report for EP 18771470 (related application); Peter Bohnhoff; Munich; dated Dec. 21, 2020; 15 pages.
European Patent Office: Extended European Search Report for Application No. EP 18771470 (related application); Peter Bohnhoff; Munich; dated Mar. 22, 2021; 11 pages.
Farshid Aryanfar et al.; "Millimeter-Wave Base Station for Mobile Broadband Communication"; Samsung Research America; Richardson, Texas; 978-1-4799-8275-2/15 @2015 IEEE; Feb. 2015; 3 pgs.
Nuria Gonzalez-Prelcic et al.; Radar Aided Beam Alignment in MmWave V21 Communications Supporting Antenna Diversity; Universidade de Vigo; Vigo, Spain; The University of Texas at Austin; Austin, Texas; Jan. 2016; 7 pgs.
Omar El Ayach et al.; "Spatially Sparse Precoding in Millimeter Wave MIMO Systems" IEEE Transactions on Wireless Communications, vol. 13, No. 3, Mar. 2014; 1536-1276/14; 15 pgs.
P. Baracca et al.; "A Dynamic Clustering and Resource Allocation Algorithm for Downlink COMP Systems with Multiple Antenna UEs" arXiv:1311.5114v1 [cs.IT] Nov. 20, 2013; 27 pgs.
Padgett, Miles J. et al., Divergence of an orbital-angular-momentum-carrying beam upon propagation. New Journal of Physics 17, 023011 (2015).
PCT: International Preliminary Report on Patentability of PCT/US2018/061923 (related application); Agnes Wittmann-Regis; dated Apr. 22, 2020; 11 pages.
PCT: International Preliminary Report on Patentability of PCT/US2018/023605 (related application); dated Oct. 3, 2019; 14 pages.
PCT: International Preliminary Report on Patentability of PCT/US16/38390 (related application); dated Dec. 28, 2017; 7 pgs.
PCT: International Search Report and Written Opinion of PCT/US17/25934 (related application), dated Aug. 23, 2017; 15 pgs.
PCT: International Search Report and Written Opinion of PCT/US18/23605 (related application), dated Jun. 11, 2018, 14 pgs.
PCT: International Search Report and Written Opinion of PCT/US2018/061923 (related application); dated Feb. 11, 2019; 12 pgs.
Penfei Xia and Robert W. Heath, Jr.; "Robust Analog Precoding Designs for Millimeter Wave MIMO Transceivers With Frequency and Time Division Duplexing" IEEE Transactions on Communications, vol. 64, No. 11, Nov. 2016; 13 pgs.
premiertek.net—Networking; "Outdoor 5GHz 30dBi Directional High-Gain N-Type Female Aluminum Die Cast Grid Parabolic Antenna"; Accessed on Sep. 22, 2017; 3 pgs.
premiertek.net—Networking; "Outdoor 5GHz 30dBi Directional High-Gain N-Type Female Aluminum Die Cast Grid Parabolic Antenna"; Accessed on Sep. 22, 2017; http://http://www.premiertek.net/products/networking/ANT-5158-30DBI.html; 3 pgs.
premiertek.net—Networking; 2.4GHZ/5GHz 802.11ac/a/b/g/n Dual Band MIMO 11dBi/13dBi Panel Antenna 2x N Female; Accessed on Sep. 22, 2017; http://www.premiertek.net/products/networking/ANT-D245813-MIMO.html; 4 pgs.
premiertek.net—Networking; 2.4GHz/5GHz 802.11ac/a/b/g/n Dual Band MIMO 11dBi/13dBi Panel Antenna 2x N Female; Accessed on Sep. 22, 2017; http://www.premiertek.net/products/networking/ANT-D245813-MIMO.html; 5 pgs.
premiertek.net—Networking; Outdoor 5.8GHz 12dBi OMNI-Directional High-Gain N-Type Female Antenna for WiFi WLAN 802.11a Application; Accessed on Sep. 22, 2017; http://www.premiertek.net/products/networking/ANT-OMNI-5812.html; 3 pgs.
Pretti Kumari, Nuria Gonzalez-Prelcic and Robert W. Heath, Jr.; "Investigating the IEEE 802.11ad Standard for Millimeter Wave Automotive Radar"; Wireless Net. and Comm. Group, Department of ECE, The University of Texas at Austin; Austin, TX; Department of Signal Theory and Communications, Universidade de Vigo; Vigo, Spain; 978-1-4799-8091-8/15; 2015 IEEE; 5 pgs.
Qualcomm; "AR9382 Single-chip, 2.4/5GHZ, 2-stream 802.11a/b/g/n solution with SST Technology" Qualcomm Atheros Inc.; AR9382; Nov. 4, 2013; 2 pgs.
Rapport, T.S.; Millimeter Wave Mobile Communications for 5G Cellular: It Will Work!; IEEE Access, 1, 335-349 (2013).
Ren, Y. et al.; Experimental Demonstration of 16 Gbit/s millimeter-wave Communications using MIMO Processing of 2 OAM Modes on Each of Two Transmitter/Receiver Antenna Apertures. In Proc. IEEE GLobal TElecom. Conf. 3821-3826 (2014).
Research in China; "Global and China Low-E Glass Industry" Report, 2010-2011; Oct. 2011, Beijing, China; 10 pgs.
Robert W. Heath Jr. et al.; "An Overview of Signal Processing Techniques for Millimeter Wave MIMO Systems" IEEE Journal of Selected Topics in Signal Processing; vol. 10, No. 3, Apr. 2016; 18 pgs.
Robert W. Heath Jr.; "Millimeter Wave MIMO: Opportunities and Challenges" The University of Texas at Austin; Wireless Networking and Communications Group; Department of Electrical and Computer Engineering; PowerPoint presentation; www.profheath.org; 2015; 45 pgs.
Robert W. Heath Jr.; "What is the Role of MIMO in Future Cellular Networks: Massive? Coordinated? mmWave?" The University of Texas at Austin; Wireless Networking and Communications Group; Cockrell School of Engineering; PowerPoint presentation; www.profheath.org; 2013; 34 pgs.
Roi Mendez-Rial and Nuria Gonzalez-Prelcic (Spain), Robert W. Heath Jr. (The University of Texas at Austin) "Adaptive Hybrid Precoding and Combining in MmWave Multiuser MIMO Systems based on Compressed Covariance Estimation" 2015 IEEE 6th International Workshop on Computational Advances in Multi-Sensor Adaptive Processing (CAMSAP); 4 pgs.
Roi Mendez-Rial et al.; "Channel Estimation and Hybrid Combining for mmWave: Phase Shifters or Switches?" Universidade de Vigo; Vigo, Spain; The University of Texas at Austin; Austin, TX; Feb. 2015; 8 pgs.
Roi Mendez-Rial et al.; "Hybrid MIMO Architectures for Millimeter Wave Communications: Phase Shifters or Switches?" IEEE Access; vol. 4, 2016; The University of Texas at Austin; Austin, Texas; 21 pgs.
Roi Mendez-Rial et al; "Dictionary-free Hybrid Precoders and Combiners for mmWave MIMO Systems"; Universidade de Vigo; Vigo, Spain; The University of Texas at Austin; Austin, Texas; 2015 IEEE 16th International Workshop on Signal Processing Advances in Wireless Communications (SPAWC); 978-1-4799-1931-4/15; 2015 IEEE; 5 pgs.

(56) References Cited

OTHER PUBLICATIONS

Sarabjot Singh et al.; "Tractable Model for Rate in Self-Backhauled Millimeter Wave Cellular Networks" IEEE Journal on Selected Areas in Communication, vol. 33, No. 10, Oct. 2015; 0733-8716; 16 pgs.

Shu Sun et al.; MIMO for Millimeter-Wave Wireless Communications: Beamforming, Spatial Multiplexing, or Both? IEEE Communications Magazine; Radio Communications; 0163-6804/14; Dec. 2014; 12 pgs.

Solyman Ashrafi, 32 Gbit/s 60 GHz Millimeter-Wave Wireless Communications using Orbital-Angular-Momentum and Polarization Mulitplexing, IEEE International Communication Conference (ICC) 2016, paper 1570226040, Kuala Lumpur, Malaysia, May 2016 (IEEE, Piscataway, NJ, 2016).

Solyman Ashrafi, 4 Gbit/s Underwater Transmission Using OAM Multiplexing and Directly Modulated Green Laser, APS/IEEE/OSA Conference on Lasers and Electro-Optics (CLEO), paper 2477374, San Jose, CA, Jun. 2016 (OSA, Wash., D.C., 2016).

Solyman Ashrafi, 400-Gbit/s Free Space Optical Communications Link Over 120-meter using Multiplexing of 4 Collocated Orbital-Angular-Momentum Beams, IEEE/OSA Conference on Optical Fiber Communications (OFC) and National Fiber Optics Engineers Conference (NFOEC), paper M2F.1, Los Angeles, CA, Mar. 2015 (Optical Society of America, Washington, D.C., 2015).

Solyman Ashrafi, A Dual-Channel 60 GHz Communications Link Using Patch Antenna Arrays to Generate Data-Carrying Orbital-Angular-Momentum Beams, IEEE International Communication Conference (ICC) 2016, paper 1570224643, Kuala Lumpur, Malaysia, May 2016 (IEEE, Piscataway, NJ, 2016).

Solyman Ashrafi, Acoustically induced stresses in elastic cylinders and their visualization, The Journal of the Acoustical Society of America 82(4):1378-1385, Sep. 1987.

Solyman Ashrafi, An Information Theoretic Framework to Increase Spectral Efficiency, IEEE Transactions on Information Theory, vol. XX, No. Y, Oct. 2014, Dallas, Texas.

Solyman Ashrafi, Channeling Radiation of Electrons in Crystal Lattices, Essays on Classical and Quantum Dynamics, Gordon and Breach Science Publishers, 1991.

Solyman Ashrafi, CMA Equalization for a 2 GB/s Orbital Angular Momentum Multiplexed Optical Underwater Link through Thermally Induced Refractive Index Inhomogeneity, APS/IEEE/OSA Conference on Lasers and Electro-Optics (CLEO), paper 2479987, San Jose, CA, Jun. 2016 (OSA, Wash., D.C., 2016).

Solyman Ashrafi, Combining Schatten's Solar Activity Prediction Model with a Chaotic Prediction Model, National Aeronautics and Space Administration, Nov. 1991.

Solyman Ashrafi, Demonstration of an Obstruction-Tolerant Millimeter-Wave Free-Space Communications Link of Two 1-Gbaud 16-QAM Channels using Bessel Beams Containing Orbital Angular Momentum, Third International Conference on Optical Angular Momentum (ICOAM), Aug. 4-7, 2015, New York USA.

Solyman Ashrafi, Demonstration of Distance Emulation for an Orbital-Angular-Momentum Beam. OSA Technical Digest (online), paper STh1F.6. The Optical Society, 2015.

Solyman Ashrafi, Demonstration of OAM-based MIMO FSO link using spatial diversity and MIMO equalization for turbulence mitigation, IEEE/OSA Conference on Optical Fiber Communications (OFC), paper Th1H.2, Anaheim, CA, Mar. 2016 (Optical Society of America, Washington, D.C., 2016).

Solyman Ashrafi, Demonstration of using Passive Integrated Phase Masks to Generate Orbital-Angular-Momentum Beams in a Communications Link, APS/IEEE/OSA Conference on Lasers and Electro-Optics (CLEO), paper 2480002, San Jose, CA, Jun. 2016 (OSA, Wash., D.C., 2016).

Solyman Ashrafi, Detecting and Disentangling Nonlinear Structure from Solar Flux Time Series, 43rd Congress of the International Astronautical Federation, Aug. 1992.

Solyman Ashrafi, Dividing and Multiplying the Mode Order for Orbital-Angular-Momentum Beams, European Conference on Optical Communications (ECOC), paper Th.4.5.1, Valencia, Spain, Sep. 2015.

Solyman Ashrafi, Enhanced Spectral Efficiency of 2.36 bits/s/Hz Using Multiple Layer Overlay Modulation for QPSK over a 14-km Single Mode Fiber Link. OSA Technical Digest (online), paper SW1M.6. The Optical Society, 2015.

Solyman Ashrafi, Evidence of Chaotic Pattern in Solar Flux Through a Reproducible Sequence of Period-Doubling-Type Bifurcations; Computer Sciences Corporation (CSC); Flight Mechanics/Estimation Theory Symposium; NASA Goddard Space Flight Center, Greenbelt, Maryland; May 21-23, 1991.

Solyman Ashrafi, Experimental Characterization of a 400 Gbit/s Orbital Angular Momentum Multiplexed Free-space Optical Link over 120-meters, Optics Letters, vol. 41, No. 3, pp. 622-625, 2016.

Solyman Ashrafi, Experimental Demonstration of 16-Gbit/s Millimeter-Wave Communications Link using Thin Metamaterial Plates to Generate Data-Carrying Orbital-Angular-Momentum Beams, ICC 2015, London, UK, 2014.

Solyman Ashrafi, Experimental Demonstration of a 400-Gbit/s Free Space Optical Link Using Multiple Orbital-Angular-Momentum Beams with Higher Order Radial Indices. OSA Technical Digest (online), paper SW4M.5. The Optical Society, 2015.

Solyman Ashrafi, Experimental demonstration of enhanced spectral efficiency of 1.18 symbols/s/Hz using multiple-layer-overlay modulation for QPSK over a 14-km fiber link. OSA Technical Digest (online), paper JTh2A.63. The Optical Society, 2014.

Solyman Ashrafi, Experimental Demonstration of Two-Mode 16-Gbit/s Free-Space mm-Wave Communications Link Using Thin Metamaterial Plates to Generate Orbital Angular Momentum Beams, Optica, vol. 1, No. 6, Dec. 2014.

Solyman Ashrafi, Experimental Demonstration of Using Multi-Layer-Overlay Technique for Increasing Spectral Efficiency to 1.18 bits/s/Hz in a 3 Gbit/s Signal over 4-km Multimode Fiber. OSA Technical Digest (online), paper JTh2A.63. The Optical Society, 2015.

Solyman Ashrafi, Experimental Measurements of Multipath-Induced Intra- and Inter-Channel Crosstalk Effects in a Millimeter-wave Communications Link using Orbital-Angular-Momentum Multiplexing, IEEE International Communication Conference(ICC) 2015, paper1570038347, London, UK, Jun. 2015(IEEE, Piscataway, NJ, 2015).

Solyman Ashrafi, Exploiting the Unique Intensity Gradient of an Orbital-Angular-Momentum Beam for Accurate Receiver Alignment Monitoring in a Free-Space Communication Link, European Conference on Optical Communications (ECOC), paper We.3.6.2, Valencia, Spain, Sep. 2015.

Solyman Ashrafi, Free-Space Optical Communications Using Orbital-Angular-Momentum Multiplexing Combined with MIMO-Based Spatial Multiplexing. Optics Letters, vol. 40, No. 18, Sep. 4, 2015.

Solyman Ashrafi, Future Mission Studies: Forecasting Solar Flux Directly From Its Chaotic Time Series, Computer Sciences Corp., Dec. 1991.

Solyman Ashrafi, Link Analysis of Using Hermite-Gaussian Modes for Transmitting Multiple Channels in a Free-Space Optical Communication System, The Optical Society, vol. 2, No. 4, Apr. 2015.

Solyman Ashrafi, Nonlinear Techniques for Forecasting Solar Activity Directly From its Time Series, Proceedings of Flight Mechanics/Estimation Theory Symposium, National Aeronautics and Space Administration, May 1992.

Solyman Ashrafi, Optical Communications Using Orbital Angular Momentum Beams, Adv. Opt. Photon. 7, 66-106, Advances in Optics and Photonic, 2015.

Solyman Ashrafi, Orbital-Angular-Momentum-Multiplexed Free-Space Optical Communication Link Using Transmitter Lenses, Applied Optics, vol. 55, No. 8, pp. 2098-2103, 2016.

Solyman Ashrafi, PCS system design issues in the presence of microwave OFS, Electromagnetic Wave Interactions, Series on Stability, Vibration and Control of Systems, World Scientific, Jan. 1996.

Solyman Ashrafi, Performance Enhancement of an Orbital-Angular-Momentum based Free-space Optical Communications Link Through

(56) References Cited

OTHER PUBLICATIONS

Beam Divergence Controlling, IEEE/OSA Conference on Optical Fiber Communications (OFC) and National Fiber Optics Engineers Conference (NFOEC), paper M2F.6, Los Angeles, CA, Mar. 2015 (Optical Society of America, Washington, D.C., 2015).
Solyman Ashrafi, Performance Metrics and Design Considerations for a Free-Space Optical Orbital-Angular-Momentum Multiplexed Communication Link, The Optical Society, vol. 2, No. 4, Apr. 2015.
Solyman Ashrafi, Performance Metrics and Design Parameters for an FSO Communications Link Based on Multiplexing of Multiple Orbital-Angular-Momentum Beams, IEEE Globecom 2014, paper 1570005079, Austin, TX, Dec. 2014(IEEE, Piscataway, NJ, 2014).
Solyman Ashrafi, Performance Metrics for a Free-Space Communication Link Based on Multiplexing of Multiple Orbital Angular Momentum Beams with Higher Order Radial Indice. OSA Technical Digest (online), paper JTh2A.62. The Optical Society, 2015.
Solyman Ashrafi, Physical Phaseplate for the Generation of a Millimeter-Wave Hermite-Gaussian Beam, IEEE Antennas and Wireless Propagation Letters, RWS 2016; pp. 234-237.
Solyman Ashrafi, Solar Flux Forecasting Using Mutual Information with an Optimal Delay, Advances in the Astronautical Sciences, American Astronautical Society, vol. 84 Part II, 1993.
Solyman Ashrafi, Splitting and contrary motion of coherent bremsstrahlung peaks in strained-layer superlattices, Journal of Applied Physics 70:4190-4193, Dec. 1990.
Solyman Ashrafi, Splitting of channeling-radiation peaks in strained-layer superlattices, Journal of the Optical Society of America B 8(12), Nov. 1991.
Solyman Ashrafi, Spurious Resonances and Modelling of Composite Resonators, 37th Annual Symposium on Frequency Control, 1983.
Solyman Ashrafi, Tunable Generation and Angular Steering of a Millimeter-Wave Orbital-Angular-Momentum Beam using Differential Time Delays in a Circular Antenna Array, IEEE International Communication Conference (ICC) 2016, paper 1570225424, Kuala Lumpur, Malaysia, May 2016 (IEEE, Piscataway, NJ, 2016).
Solyman Ashrafi; Future Mission Studies: Preliminary Comparisons of Solar Flux Models; NASA Goddard Space Flight Center Flight Dynamics Division; Flight Dynamics Division Code 550; Greenbelt, Maryland; Dec. 1991.
Sundeep Rangan, Theodore S. Rappaport and Elza Erkip; "Millimeter-Wave Cellular Wireless Networks: Potentials and Challenges" Proceedings of the IEEE; vol. 102, No. 3, Mar. 2014; 20 pgs.
Sungwoo and Robert W. Heath Jr.; "Frequency Selective Hybrid Precoding in Millimeter Wave OFDMA Systems"; Wireless Networking and Communications Group; Dept. of Electrical and Computer Engineering, The University of Texas at Austin; Austin, TX; 978-4799-5952-5/15; 2015 IEEE; 6 pgs.
Tamburini, Fabrizio; Encoding many channels on the same frequency through radio vorticity: first experimental test; New Journal of Physics 14, 033001 (2012).
Texas Instruments; "Dual-Band IQ/IF Transceiver With Dual VCO Synthesizers" TRF2432; SWLS177A; Apr. 2005; Revised Dec. 2005; 23 pgs.
Texas Instruments; "High-Power Dual-Band (2.4-GHz to 2.5-GHz and 4.9-GHz to 5.9-GHz) RF Front-End" TRF2436; SWLS176; Apr. 2005; 11 pgs.
Texas Instruments; "Integrated IQ Demodulator" TRF371135; SLWS220A; Feb. 2010; Revised Mar. 2010; 58 pgs.
Texas Instruments; "TRF2436EVM" User's Guide; SLWU038; Aug. 2006; 11 pgs.
Texas Instruments; "TRF370419 50-MHz to 6-GHz Quadrature Modulator" TRF370417; SLWS213A; Jan. 2010; Revised Nov. 2015; 34 pgs.
Texas Instruments; "TRF370x Quadrature Modulator Evaluation Module" User's Guide; Literature No. SLWU062; Mar. 2010; 20 pgs.
Texas Instruments; "TRF3711xxEVM" User's Guide; SLWU069B; Feb. 2010; Revised Nov. 2010; 13 pgs.
Texas Instruments; "TRG2432EVM" User's Guide; SLWU036A; Jun. 2006; Revised Oct. 2006; 19 pgs.
Texas Instruments; "TSW1265 Dual-Wideband RF-to-Digital Receiver"; Matt Guibord; TI Designs High Speed: Verified Design; TIDU126; Sep. 2013; 15 pgs.
Texas Instruments; "TSW1265EVM Evaluation Module" User's Guide; SLAU429; Mar. 2012; 18 pgs.
Texas Instruments; "TSW1266 Wideband RF-to-Digital Complex Receiver-Feedback Signal Chain" TI Designs High Speed: Verified Design; Matt Guibord; TIDU127; Sep. 2013; 14 pgs.
Texas Instruments; "TSW1266EVM Evaluation Module" User's Guide; SLAU484; Jan. 2013; 21 pgs.
Texas Instruments; "TSW308x Evaluation Module" User's Guide; SLAU374B; Dec. 2011; Revised May 2016; 36 pgs.
Texas Instruments; "TSW308x Wideband Digital to RF Transmit Solution" TI Designs High Speed: CerTIfied Design; Kang Hsia; TIDU128; Sep. 2013; 31 pgs.
Texas Instruments; Reference Design; TSW1266; Oct. 29, 2012; 9 pgs.
Theodore S. Rappaport et al.; "Millimeter Wave Mobile Communications for 5G Cellular: It Will Work!" NYU Wireless, Polytechnic Institute of New York University; New York, NY; vol. 1, 2013; 2169-3536; 2013 IEEE Access; 15 pgs.
Thomas L. Marzetta; "Noncooperative Cellular Wireless with Unlimited Nos. of Base Station Antennas"; IEEE Transactions on Wireless Communications, vol. 9, No. 11, Nov. 2010; 1536-1276/10; 2010 IEEE; 11 pgs.
Tianyang Bai and Robert W. Heath Jr. "Asympotic Coverage and Rate in Massive MIMO Networks" Wireless Networking and Communication Group; The University of Texas at Austin; Austin, TX; GlobalSIP 2014: Massive MIMO Communications; 5 pgs.
Tianyang Bai and Robert W. Heath Jr.; "Analysis of Self-body Blocking Effects in Millimeter Wave Cellular Networks" Wireless Networking and Communication Group, The University of Texas at Austin; IEEE; Asilomar 2014; 5 pgs.
Korean Intellectual Property Office: Notice of Grounds for Rejection of Korean Application No. 10-2019-7030714 (related application); dated Apr. 18, 2022; 5 pages.
Yan, Y. et al.; High-capacity millimetre-wave communications with orbital angular momentum multiplexing; Nature Communications; 5, 4876 (2014).
3rd Generation Partnership Project; "Technical Specification Group Services and System Aspects; Study on architecture enhancements to support Proximity-based Services (ProSe) (Release 12)" 3GPP TR 23.703; v12.0.0; Feb. 2014; 324 pgs.
3rd Generation Partnership Project; "Technical Specification Group Services and System Aspects; Study on architecture enhancements to support Proximity-based Services (ProSe) (Release 12)" 3GPP TR 23.703; v12.0.0; Feb. 2014; 26 pgs.
3rd Generation Partnership Project; Technical Specification Group Services and System Aspects; Study on architecture enhancements to support Proximity Services (ProSe) (Release 12) 3GPP TR 23.703 V0.3.0 (Apr. 2013); Release 12 ; 26 pgs.
3rd Generation Partnership Project; Technical Specification Group Services and System Aspects; Study on architecture enhancements to support Proximity Services (ProSe) (Release 12) 3GPP TR23.703 V0.3.0 (Apr. 2013); Release 12; 26 pgs. (Second One Found).
Abhishek K. Gupta et al.; "On the Feasibility of Sharing Spectrum Licenses in mmWave Cellular Systems"; IEEE Transactions on Communications, vol. 64, No. 9.; Sep. 2016; 15 pgs.
Afif Osseiran et al.; "Scenarios for 5G Mobile and Wireless Communications: The Vision of the METIS Project" 5G Wireless Communications Systems: Prospects and Challenges; IEEE Communications Magazine; 0163-6804/14; May 2014; 10 pgs.
Ahmed Alkhateeb and Robert W. Heath Jr. "Gram Schmidt Based Greedy Hybrid Precoding For Frequency Selective Millimeter Wave MIMO Systems"; The University of Texas at Austin; Austin, TX; 978-1-4799-9988-0/16; 2016 IEEE; ICASSP 2016; 5 pgs.
Ahmed Alkhateeb and Robert W. Heath, Jr.; "Frequency Selective Hybrid Precoding for Limited Feedback Millimeter Wave Systems"; IEEE Transactions on Communications, vol. 64, No. 5, May 2016; 0090-6778; 2016 IEEE; 18 pgs.

(56) References Cited

OTHER PUBLICATIONS

Ahmed Alkhateeb et al.; "Channel Estimation and Hybrid Precoding for Millimeter Wave Cellular Systems" IEEE Journal of Selected Topics in Signal Processing; vol. 8, No. 5, Oct. 2014; 1932-4553; 2014 IEEE; 16 pgs.

Ahmed Alkhateeb et al.; "MIMO Precoding and Combining Solutions for Millimeter-Wave Systems" IEEE Communications Magazine; 0163-6804/14; Dec. 2014; 10 pgs.

* cited by examiner

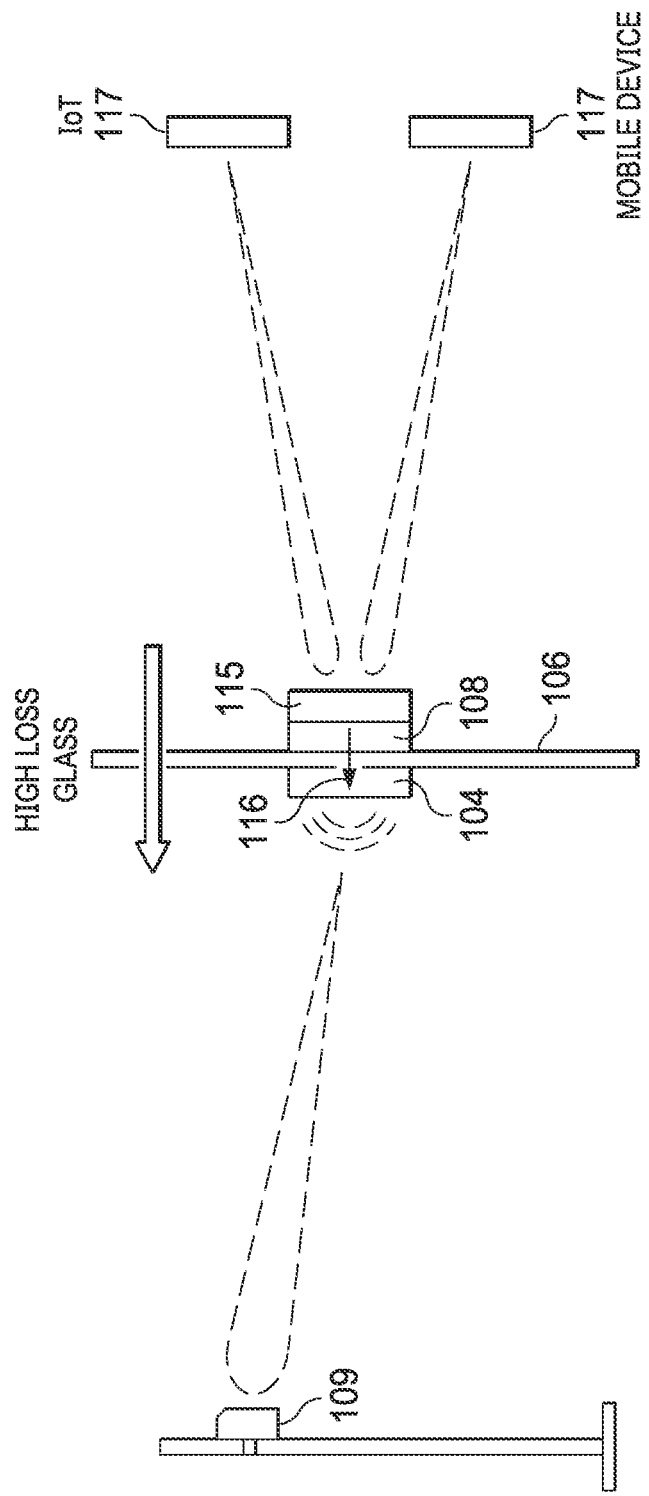

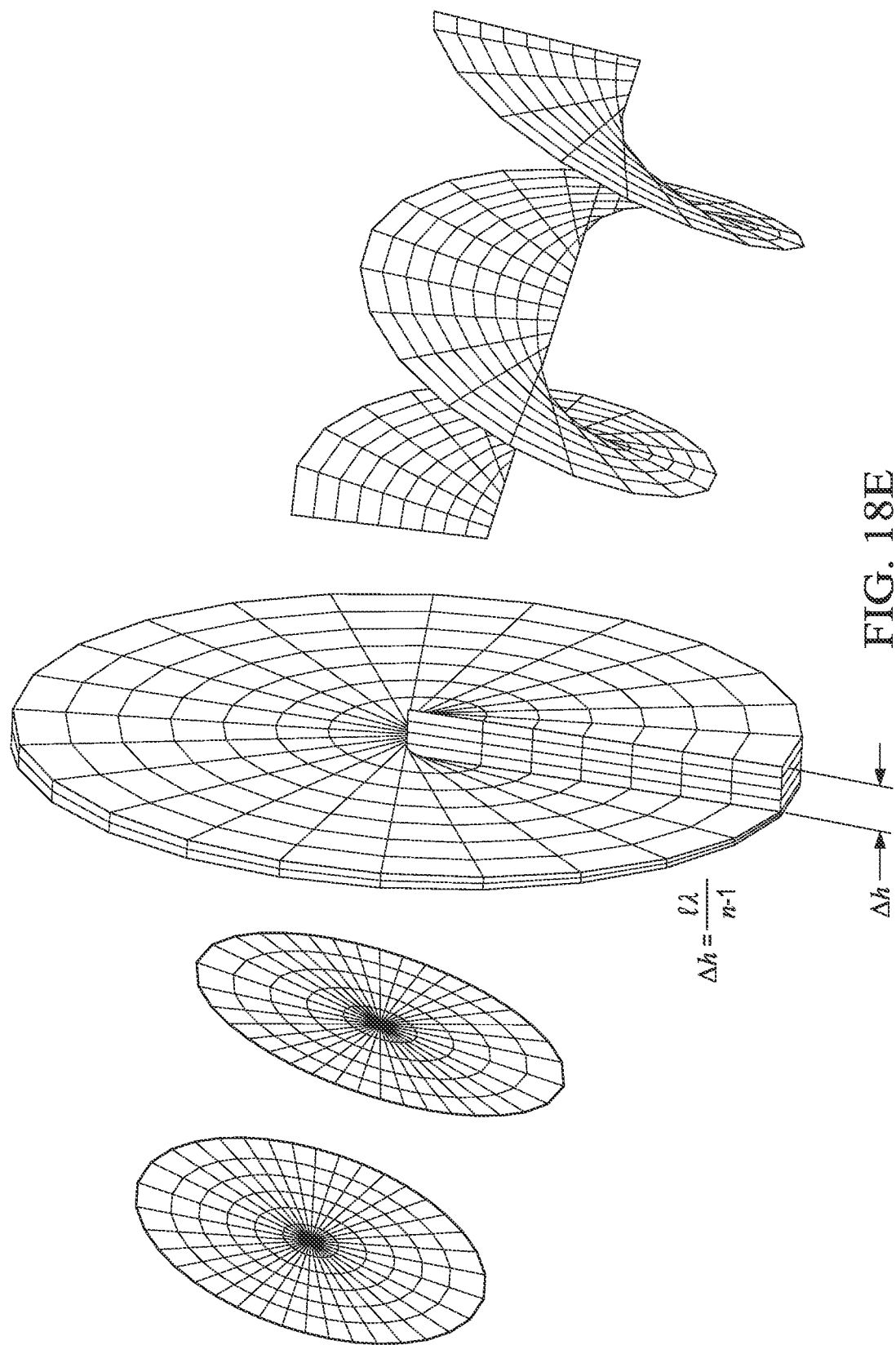

| f (FREQUENCY) | a (COIL RADIUS) | n (#TURNS) | EFFICIENCY | h (COIL HEIGHT) |
|---|---|---|---|---|
| 6.78 GHz | 22 cm | 4 | 99.5% | 2.25 cm |
| 6.78 GHz | 8.4 cm | 4 | 95% | 2.25 cm |
| 6.78 GHz | 3.5 cm | 48 | 95% | 27 cm |
| 6.78 GHz | 6.5 cm | 8 | 95% | 4.5 cm |
| 6.78 GHz | 7 cm | 7 | 95% | 3.9 cm |
| 6.78 GHz | 6.6 cm | 4 | 90% | 2.25 cm |
| 6.78 GHz | 5.1 cm | 8 | 90% | 4.5 cm |
| 6.78 GHz | 3.5 cm | 24 | 90% | 13.5 cm |
| 6.78 GHz | 7 cm | 3 | 90% | 1.7 cm |
| 6.78 GHz | 5 cm | 4 | 80% | 2.25 cm |
| 6.78 GHz | 3.9 cm | 8 | 80% | 4.5 cm |
| 6.78 GHz | 3.5 cm | 11 | 80% | 6 cm |
| 6.78 GHz | 7 cm | 2 | 85% | 1.12 cm |
| 6.78 GHz | 4.5 cm | 4 | 75% | 2.25 cm |
| 6.78 GHz | 3.6 cm | 8 | 75% | 4.5 cm |
| 6.78 GHz | 3.5 cm | 9 | 75% | 5 cm |
| 6.78 GHz | 7 cm | 1 | 72% | 0.3 cm |

FIG. 105

| FREQUENCY | $\epsilon_r$ | $n$ | $k$ | ABSORBED POWER | ABSORPTION LOSS |
|---|---|---|---|---|---|
| 6.78 MHz | -1.77e+05 + 1.44e+11i | 2.68e+05 | 2.685e+05 | 1-0.9988 | 0.005 dB |
| 28 GHz | -1.77e+05 + 3.49e+07i | 4.17e+03 | 4.19e+03i | 1-0.9289 | 0.32 dB |
| 60 GHz | -1.77e+05 + 1.44e+11i | 2.68e+05 | 2.68e+05i | 1-0.897 | 0.47 dB |
| (900 nm) 333 THz | -0.477 + 0.807i | 0.0584 | 6.907 | 1-0.2357 | 6.27 dB |

FIG. 106

| FREQUENCY | $\epsilon_r$ | $n$ | $k$ | ABSORBED POWER | ABSORPTION LOSS | REFLECTIVITY(R) |
|---|---|---|---|---|---|---|
| 28 GHz | -1.77e+05 + 3.49e+07i | 4.17e+03 | 4.19e+03 | 1-0.9289 | 0.32dB | 0.99952 |

FIG. 107

| DOUBLE SILVER LAYER GLASS, 15nm (28GHz) | ABSORPTION LOSS | REFLECTION LOSS | TOTAL LOSS |
|---|---|---|---|
| $n, k$ [1] | 0.32 dB | 30.2 dB | 30.52 dB |
| OHMIC LOSS: [2] $A = 545.8 \sqrt{\sigma f_{GHz}}$ dB/m SILVER CONDUCTIVITY: 62.1 X $10^6$ S/m | 22.75 dB/um, 0.34 dB | | |
| LOSS THROUGH COATED GLASS WINDOW (IRR GLASS) [3] $0.3 \times f_{GHz} + 23$ dB | | | 31.4 dB |

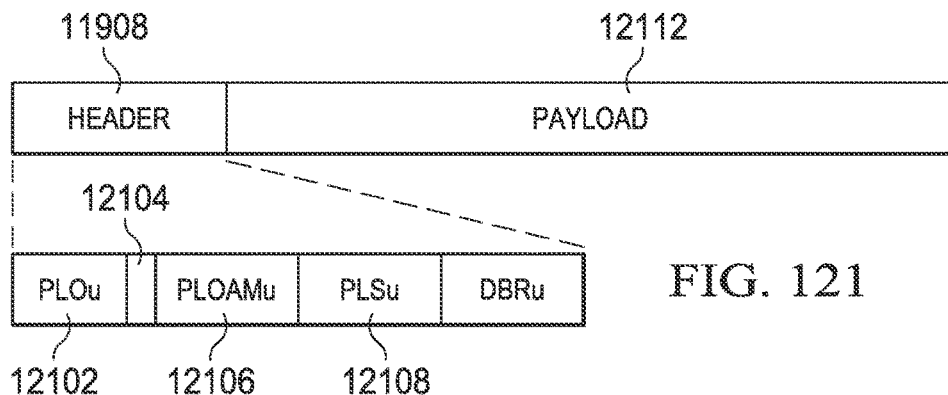
FIG. 121
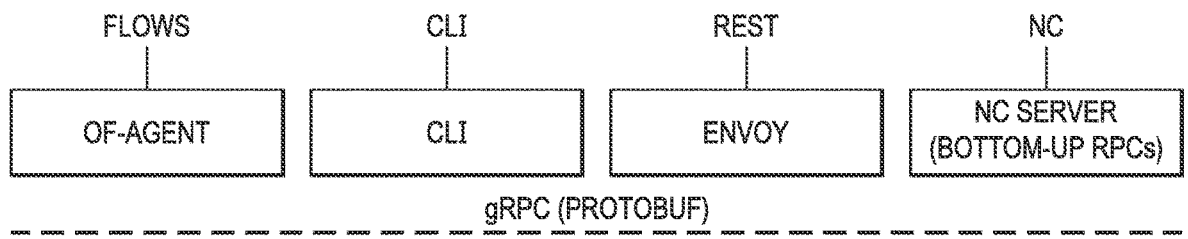
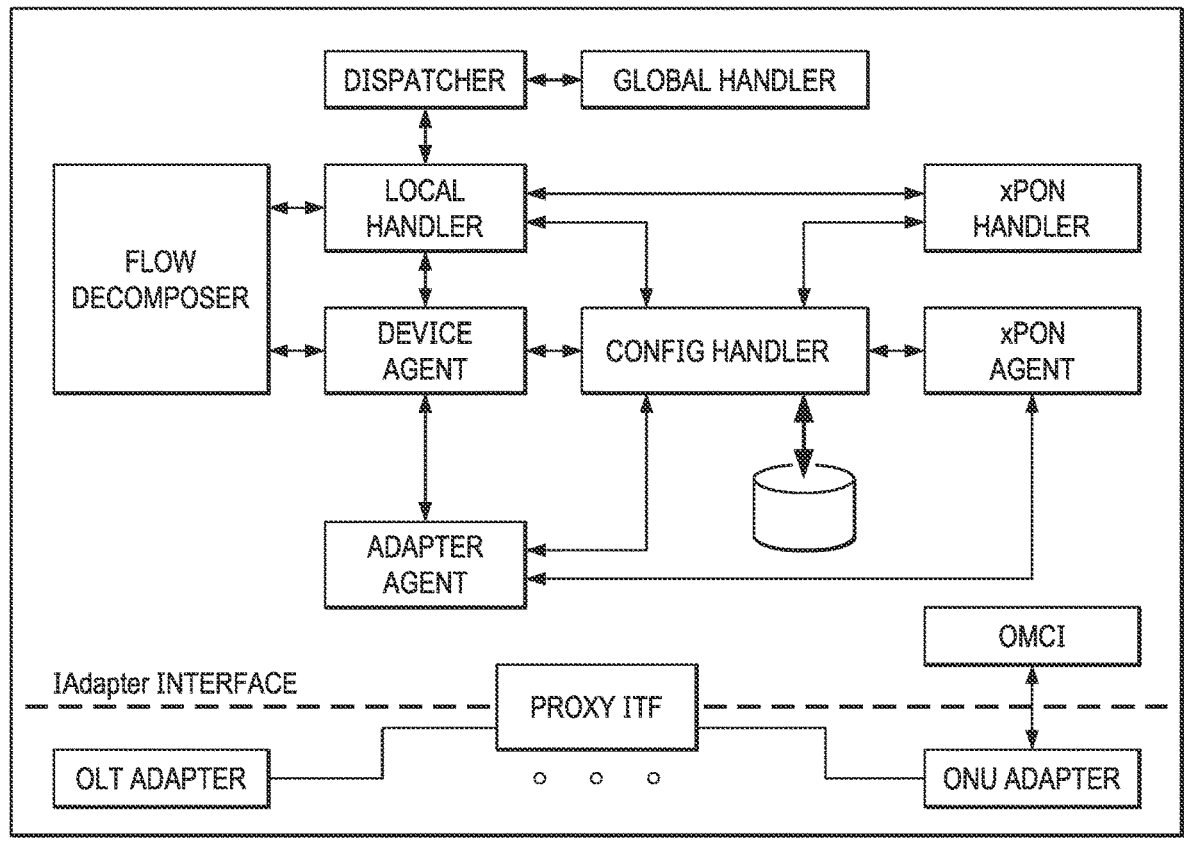
FIG. 122

SYSTEM AND METHOD FOR POWERING RE-GENERATION AND RE-TRANSMISSION OF MILLIMETER WAVES FOR BUILDING PENETRATION

CROSS-REFERENCE TO RELATED APPLICATIONS

This application is a continuation of U.S. patent application Ser. No. 17/028,832, filed Sep. 22, 2020, entitled SYSTEM AND METHOD FOR POWERING RE-GENERATION AND RE-TRANSMISSION OF MILLIMETER WAVES FOR BUILDING PENETRATION, which is a continuation of U.S. patent application Ser. No. 16/808,990, filed Mar. 4, 2020, entitled SYSTEM FOR MILLIMETER WAVE BUILDING PENETRATION USING BEAM FORMING AND BEAM STEERING, issued as U.S. Pat. No. 10,784,962, issued on Sep. 22, 2020, which is continuation of U.S. patent application Ser. No. 16/530,528, filed Aug. 2, 2019, entitled PATCH ANTENNA FOR WAVE AGILITY, issued as U.S. Pat. No. 10,778,332, issued on Sep. 15, 2020, which is a continuation of U.S. patent application Ser. No. 15/926,087, filed Mar. 20, 2018, entitled RE-GENERATION AND RE-TRANSMISSION OF MILLIMETER WAVES FOR BUILDING PENETRATION, issued as U.S. Pat. No. 10,374,710 on Aug. 6, 2019. U.S. patent application Ser. No. 15/926,087 claims benefit of U.S. Provisional Application No. 62/474,937, filed Mar. 22, 2017, entitled PATCH ANTENNA FOR WAVE AGILITY, and claims benefit of U.S. Provisional Application No. 62/549,314, filed Aug. 23, 2017, entitled 60 GHZ PRODUCT TO ENABLE MM-WAVE ACCESS INSIDE BUILDINGS, and claims benefit of U.S. Provisional Application No. 62/550,219, filed Aug. 25, 2017, entitled WAVE AGILITY SYSTEM, and claims benefit of U.S. Provisional Application No. 62/559,286, filed Sep. 15, 2017, entitled MILLIMETER WAVE BUILDING PENETRATION SYSTEM FOR USE WITH COMBINED INTERNET, TV AND PHONE SERVICE, and claims benefit of U.S. Provisional Application No. 62/598,268, filed Dec. 13, 2017, entitled MAGNETIC RESONANCE POWER TRANSFER, and U.S. Provisional Application No. 62/638,555, filed Mar. 5, 2018, entitled PON-FWA SYSTEM TO UTILIZE 5G CORE AND ACCESS WITH MILLIMETER WAVE PENETRATION SYSTEM OVER VLOTHA, each of which is incorporated herein by reference in its entirety.

U.S. patent application Ser. No. 15/926,087 is also a Continuation-In-Part of U.S. patent application Ser. No. 15/466,320, filed Mar. 22, 2017, entitled RE-GENERATION AND RE-TRANSMISSION OF MILLIMETER WAVES FOR BUILDING PENETRATION, which published as US 2017-0195054 on Jul. 6, 2017, issued as U.S. Pat. No. 10,014,948 on Jul. 3, 2018. U.S. patent application Ser. No. 15/466,320 claims benefit of U.S. Provisional Application No. 62/317,829, filed Apr. 4, 2016, entitled RE-GENERATION AND RE-TRANSMISSION OF MILLIMETER WAVES FOR BUILDING PENETRATION, and claims benefit of U.S. Provisional Application No. 62/321, 245, filed Apr. 12, 2016, entitled RE-GENERATION AND RE-TRANSMISSION OF MILLIMETER WAVES FOR BUILDING PENETRATION, and claims benefit of U.S. Provisional Application No. 62/368,417, filed Jul. 29, 2016, entitled REGENERATION, RETRANSMISSION OF MILLIMETER WAVES FOR INDOOR PENETRATION, and claims benefit of U.S. Provisional Application No. 62/369, 393, filed Aug. 1, 2016, entitled REGENERATION, RETRANSMISSION OF MILLIMETER WAVES FOR INDOOR PENETRATION, and claims benefit of U.S. Provisional Application No. 62/425,432, filed Nov. 22, 2016, entitled REGENERATION, RETRANSMISSION OF MILLIMETER WAVES FOR BUILDING PENETRATION USING HORN ANTENNAS. U.S. patent application Ser. No. 15/466,320 is also a Continuation-In-Part of U.S. patent application Ser. No. 15/357,808, filed Nov. 21, 2016, entitled SYSTEM AND METHOD FOR COMMUNICATION USING ORBITAL ANGULAR MOMENTUM WITH MULTIPLE LAYER OVERLAY MODULATION, issued as U.S. Pat. No. 9,712,238 on Jul. 18, 2017, which is a Continuation of U.S. patent application Ser. No. 15/144,297, filed May 2, 2016, entitled SYSTEM AND METHOD FOR COMMUNICATION USING ORBITAL ANGULAR MOMENTUM WITH MULTIPLE LAYER OVERLAY MODULATION, issued as U.S. Pat. No. 9,503,258 on Nov. 22, 2016, which is a Continuation of U.S. patent application Ser. No. 14/323,082, filed Jul. 3, 2014, entitled SYSTEM AND METHOD FOR COMMUNICATION USING ORBITAL ANGULAR MOMENTUM WITH MULTIPLE LAYER OVERLAY MODULATION, issued as U.S. Pat. No. 9,331,875 on May 3, 2016, which claims benefit of U.S. Provisional Application No. 61/975,142, filed Apr. 4, 2014, entitled SYSTEM AND METHOD FOR COMMUNICATION USING ORBITAL ANGULAR MOMENTUM WITH MODULATION. U.S. application Ser. Nos. 16/808, 990, 16/530,528, 15/926,087, 15/466,320; 62/317,829; 62/321,245; 62/368,417; 62/369,393; 62/425,432; 15/357, 808; 15/144,297; 14/323,082; 61/975,142; U.S. Patent Publication No. 2017-0195054; and U.S. Pat. Nos. 10,014,948, 9,712,238; 9,503,258; and 9,331,875 are each incorporated herein by reference in their entireties.

U.S. patent application Ser. No. 15/926,087 is also a Continuation-In-Part of U.S. patent application Ser. No. 15/636,142, filed Jun. 28, 2017, entitled PATCH ANTENNA ARRAY FOR TRANSMISSION OF HERMITE-GAUSSIAN AND LAGUERRE GAUSSIAN BEAMS, issued as U.S. Pat. No. 10,027,434 on Jul. 17, 2018, which is a Continuation of U.S. patent application Ser. No. 15/457,444, filed Mar. 13, 2017, entitled PATCH ANTENNA ARRAY FOR TRANSMISSION OF HERMITE-GAUSSIAN AND LAGUERRE GAUSSIAN BEAMS, issued as U.S. Pat. No. 9,793,615 on Oct. 17, 2017, which is a Continuation of U.S. patent application Ser. No. 15/187,315, filed Jun. 20, 2016, entitled PATCH ANTENNA ARRAY FOR TRANSMISSION OF HERMITE-GAUSSIAN AND LAGUERRE GAUSSIAN BEAMS, issued as U.S. Pat. No. 9,595,766 on Mar. 14, 2017. U.S. patent application Ser. No. 15/187,315 claims benefit of U.S. Provisional Application No. 62/182, 227, filed Jun. 19, 2015, entitled PATCH ANTENNAS FOR TRANSMISSION OF HERMITE-GAUSSIAN AND LAGUARRE GAUSSIAN BEAMS, and claims benefit of U.S. Provisional Application No. 62/233,838, filed Sep. 28, 2015, entitled PATCH ANTENNAS FOR TRANSMISSION OF HERMITE-GAUSSIAN AND LAGUERRE GAUSSIAN BEAMS, and claims benefit of U.S. Provisional Application No. 62/242,056, filed Oct. 15, 2015, entitled METHOD FOR MANUFACTURING A PATCH ANTENNA, and claims benefit of U.S. Provisional Application No. 62/311,633, filed Mar. 22, 2016, entitled HYBRID PATCH ANTENNA WITH PARABOLIC REFLECTOR. U.S. application Ser. Nos. 15/926,087, 15/636,142; 15/457,444; 15/187,315; 62/182,227; 62/233, 838; 62/242,056; 62/311,633 and U.S. Pat. Nos. 10,027,434, 9,793,615 and 9,595,766 are each incorporated herein by reference in their entireties.

TECHNICAL FIELD

The present invention relates to millimeter wave transmissions, and more particularly, to a manner for improving building penetration for millimeter wave transmissions using beam forming and beam steering.

BACKGROUND

Millimeter wave transmissions were developed as a bandwidth plan for making 1300 MHz of the local multipoint distribution service (LMDS) spectrum available within the United States. The millimeter wave transmissions meet the needs for increased bandwidth availability due to the increasing bandwidth and application requirements for wireless mobile devices. However, while increasing bandwidth capabilities, millimeter wave transmissions have the problem of having very poor building penetration capabilities. Signals are drastically degraded when attempting to penetrate most building structures. This provides a serious problem since the vast majority of wireless signaling traffic is originated from within buildings and the inability to utilize millimeter wave bandwidths would drastically limit its implementation in the modern marketplace. Thus, there is a need for some manner for improving building penetration characteristics of millimeter wave transmissions.

SUMMARY

The present invention, as disclosed and described herein, in one aspect thereof comprises a system for providing a residential IP network includes a plurality of transceiver circuitries, each associated with a building, for transmitting signals to/from the associated building. An optical network unit transmits and receives signals at a first frequency with an optical network. A remote unit integrated with the optical network unit converts the received signals at the first frequency into a first format that overcome losses caused by penetrating into the interior of the building over a wireless communications link and transmits the signals in the first format using beam forming and beam steering to provide the wireless signals to at least one of the plurality of transceiver circuitries. Each of the plurality of transceiver circuitries further includes first circuitry, located on an exterior of the building, for transmitting and receiving the signals in the first format. A first antenna associated with the first circuitry for transmits the signals in the first format into the interior of the building via a wireless communications link and receives signals from the interior of the building in the first format via the wireless communications link. Second circuitry, located on the interior of the building and communicatively linked with the first circuitry via the wireless communications link, receives and transmits the converted received signals in the first format that counteracts the losses caused by penetrating into the interior of the building from/to the first circuitry. A second antenna associated with the second circuitry transmits the signals in the first format to the exterior of the building via the wireless communications link and receives signals from the exterior of the building in the first format via the wireless communications link.

BRIEF DESCRIPTION OF THE DRAWINGS

For a more complete understanding, reference is now made to the following description taken in conjunction with the accompanying Drawings in which:

FIG. 1C illustrates the bi-directional nature of the building penetration system for transmissions from the inside;

FIG. 18E illustrates a spiral phase plate;

FIG. 105 illustrates a table of various parameters associated with transmission of signals through window glass;

FIG. 106 illustrates another table of various parameters associated with transmission of signals through window glass;

FIG. 107 illustrates a further table of various parameters associated with transmission of signals through window glass;

FIG. 108 illustrates the manner in which a millimeter wave system may be combined with a residential IP network for providing broadband data transmission;

FIG. 109 illustrates a functional block diagram of a combined IP residential network system;

FIG. 110 is a functional block diagram of a residential IP network system;

FIG. 111 illustrates the manner in which a mmwave system may be utilized to transmit information to a residential IP network system;

FIG. 112 illustrates a first embodiment for wireless transmission of broadband data to a residential IP network system;

FIG. 113 illustrates a second embodiment for wireless transmission of broadband data to a residential IP network system;

FIG. 114 illustrates a third embodiment for wireless transmission of broadband data to a residential IP network system;

FIG. 115 illustrates a combined optical data transfer system and RF data transfer system for providing broadband data to a residential gateway;

FIG. 116 illustrates the manner in which load-balancing techniques may be used to control network configuration between an optical network data transfer system and an RF network data transfer system;

FIG. 117 illustrates various optical connections between a central office and a customer premises;

FIG. 118 illustrates a GPON architecture;

FIG. 119 illustrates upstream and downstream GTC frames;

Figure 120:
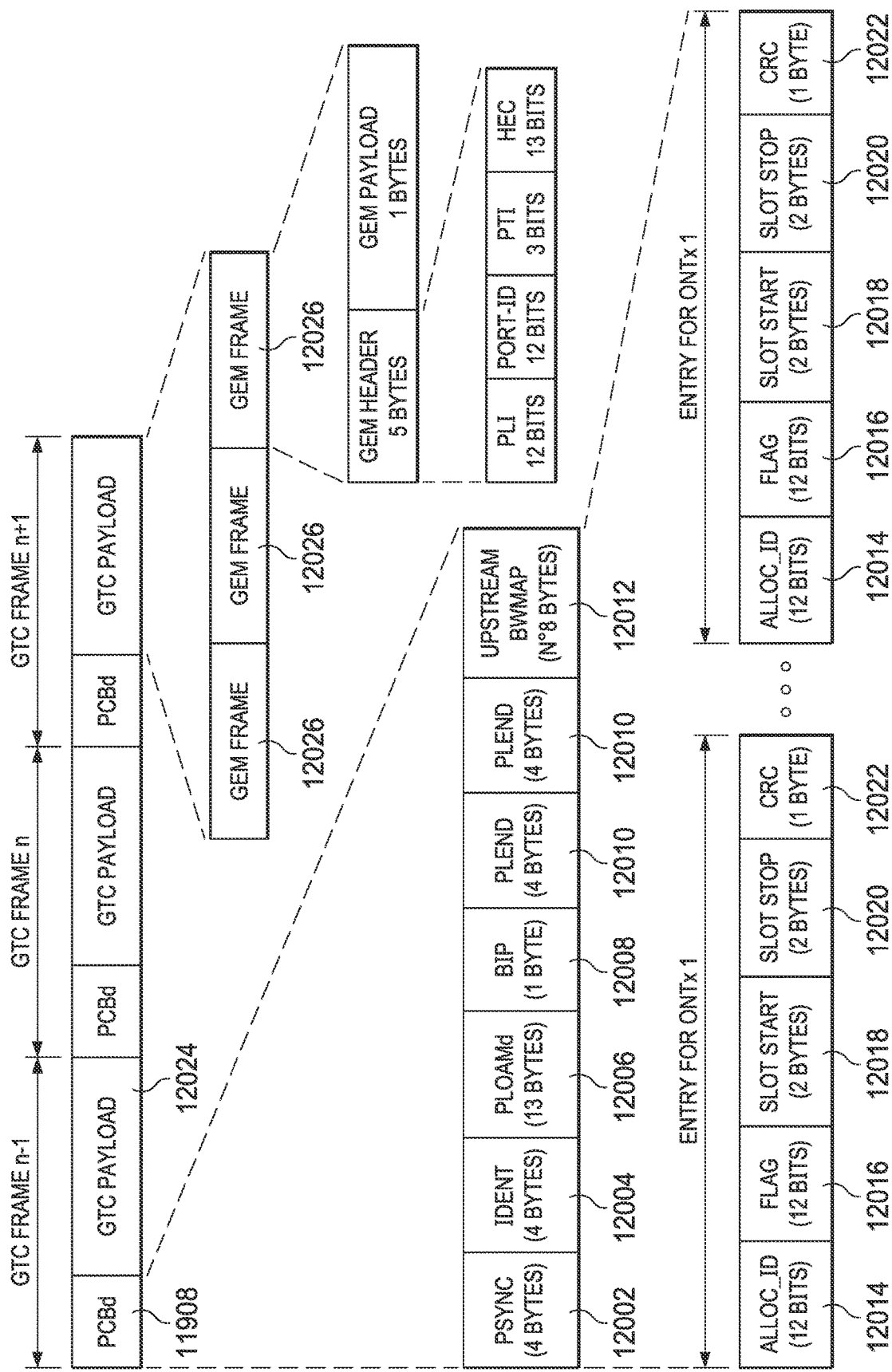
Figure 123:
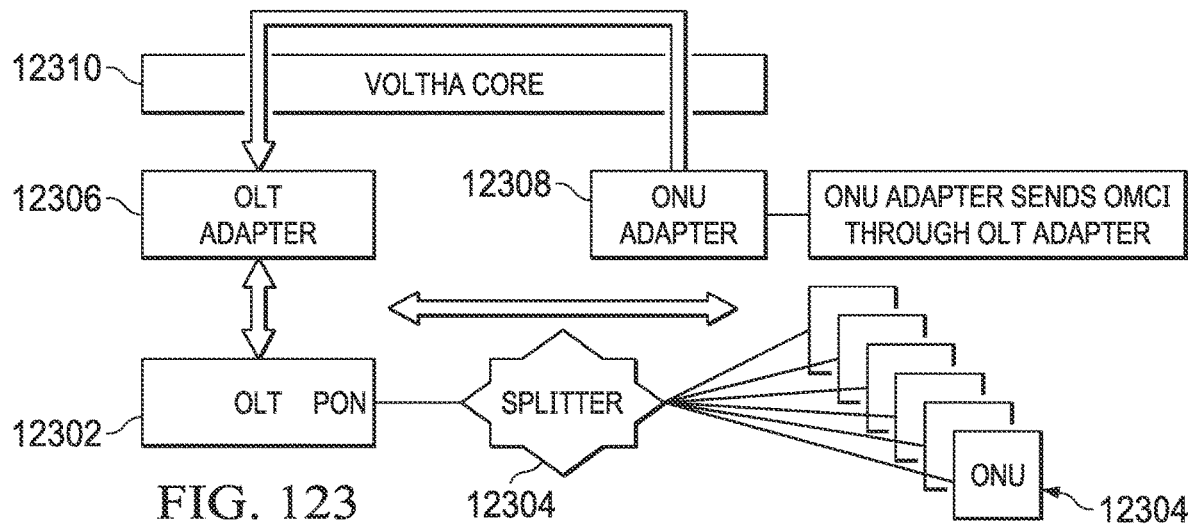
Figure 124:
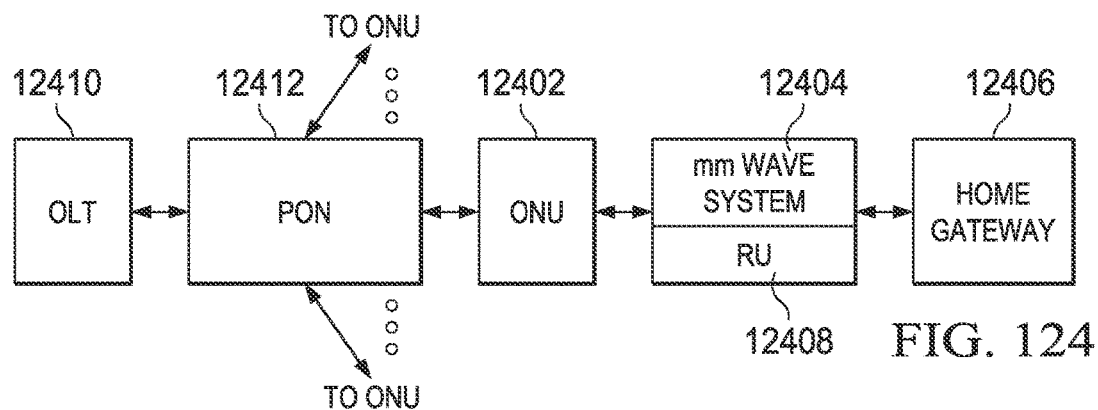
Figure 125:
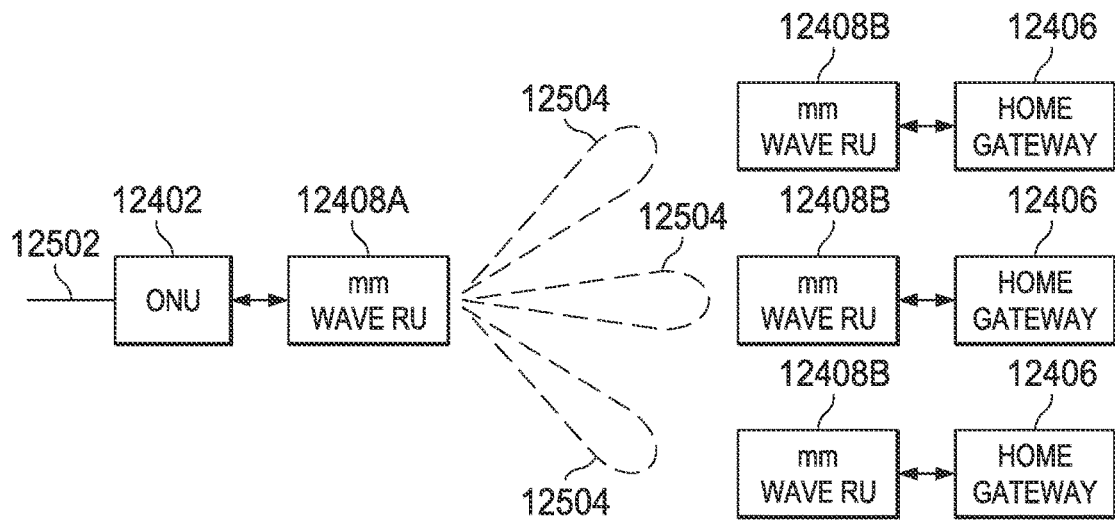
Figure 126:
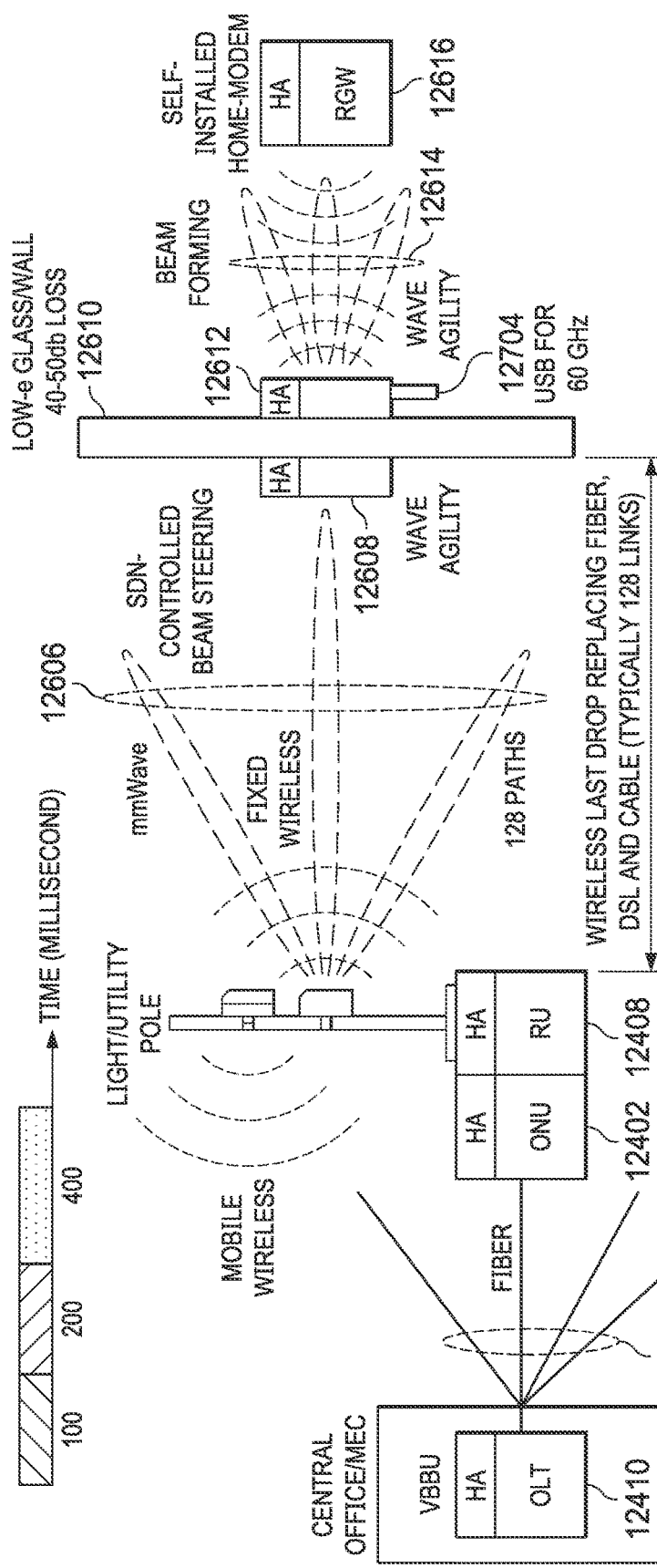
Figure 127:
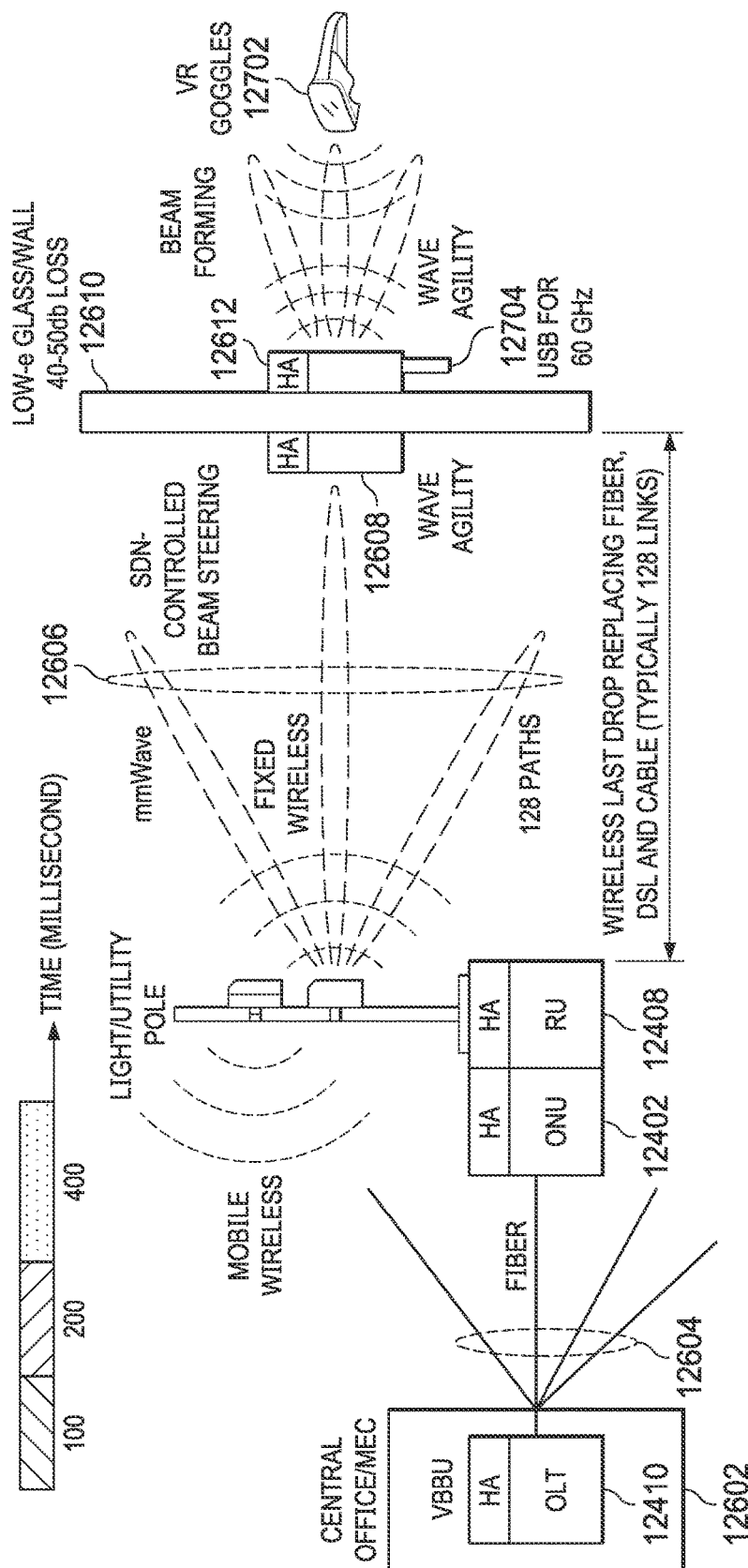
Figure 128:
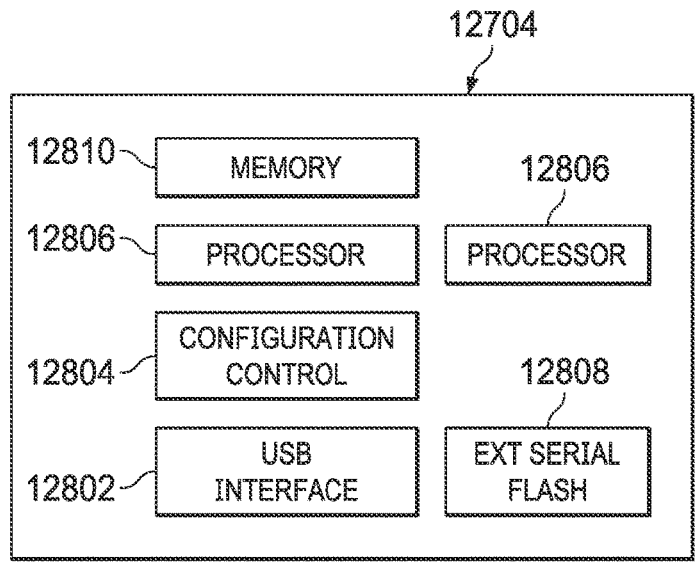
Figure 129:
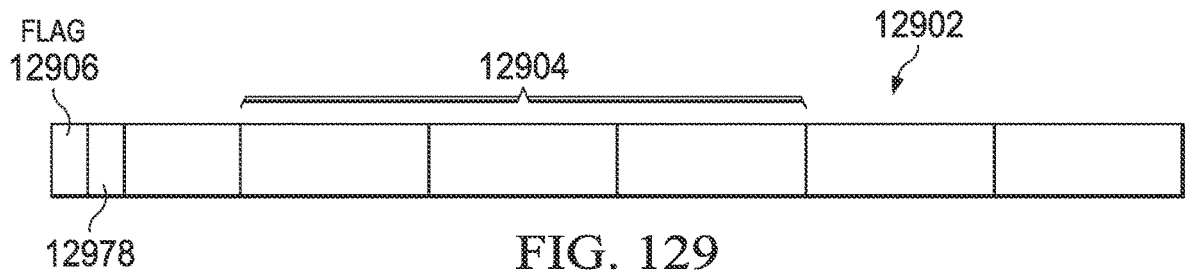
Figure 130:
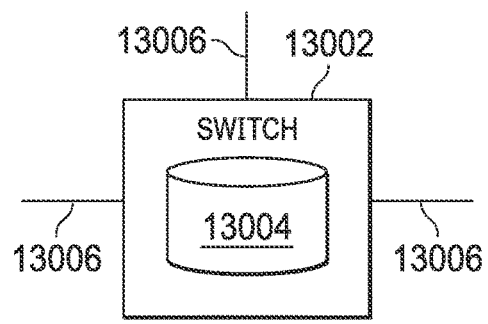

FIG. 120 illustrates a downstream GTC frame format;

FIG. 121 illustrates an upstream GTC frame format;

FIG. 122 illustrates a virtual optical line termination hardware abstraction (vOLTHA) layer;

FIG. 123 illustrates an implementation of vOLTHA on an OLT and ONU link;

FIG. 124 illustrates a broadband link between an OLT and home gateway;

FIG. 125 illustrates the interface between and ONU and the plurality of home gateways;

FIG. 126 illustrates a first embodiment of a broadband data communications link between an OLT and home gateway;

FIG. 127 illustrates a second embodiment of a broadband data communications link between an OLT and virtual reality goggles;

FIG. 128 is a functional block diagram of a 60 GHz transceiver dongle;

FIG. 129 illustrates a six byte MAC address for an ethernet interface within one of the above broadband communication links; and FIG. 130 illustrates a switch within the PON network described hereinabove.

DETAILED DESCRIPTION

Referring now to the drawings, wherein like reference numbers are used herein to designate like elements throughout, the various views and embodiments of regeneration and retransmission of millimeter waves for building penetration and various embodiments associated therewith are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

One issue with wireless telecommunications is the inability of high frequency RF waves to penetrate through windows and walls of homes and business offices. If a window includes any infrared (IR) shielding in order to save energy within the house or office building, the losses in signals transmitted through the shielding are typically up to 40 or 50 dB. Thus, the millimeter wave system described herein provides the ability to provide tunneling of such optical and high frequency radio waves without requiring the need to drill through the glass, window or building to provide a physical portal therethrough would provide great benefits to wireless communication technologies. This may be done at any frequency that has problems penetrating through the glass or building. Glass is one of the most popular and versatile due to its constantly improving solar and thermal performance. One manner for achieving this performance is through the use of passive and solar control low emissivity coatings. These low emissivity glass materials produce a huge loss for millimeter wave spectrum transmissions and create a huge problem for transmission of millimeter waves through such glass. The system described herein below provides for the ability to allow frequencies having a problem penetrating through a glass or building to be processed in such a manner to enable the signals to be transmitted into or out of a home or building.

Millimeter wave signaling was developed when the FCC devised a band plan making 1300 MHz of the local multipoint distribution service (LMDS) spectrum available within each basic trading area across the United States. The plan allocated two LMDS licenses per BTA (basic trading area), an "A Block" and a "B Block" in each. The A Block license comprised 1150 MHz of total bandwidth, and the B Block license consisted of 150 MHz of total bandwidth. A license holder Teligent developed a system for fixed wireless point to multipoint technology that could send high speed broadband from rooftops to surrounding small and medium-size businesses. However, the system, as well as others provided by Winstar and NextLink, did not succeed and many of the LMDS licenses fell back into the hands of the FCC. These licenses and related spectrum are seen as useful for 5G trials and services.

Figure 1A:
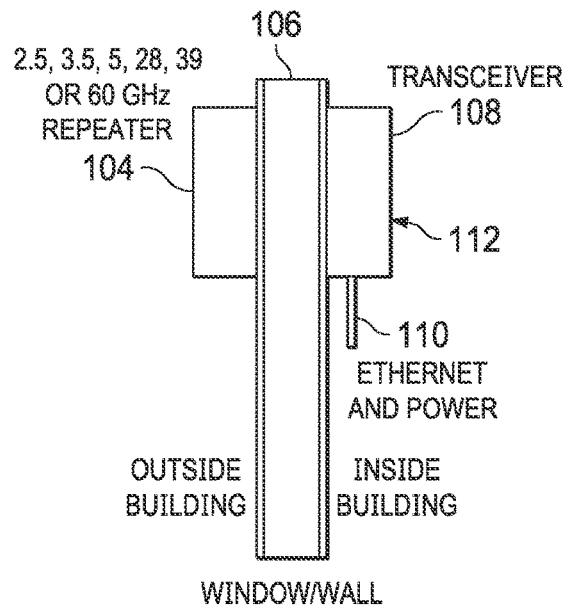
FIG. 1A is a block diagram of a building penetration system.

Referring now to FIG. 1A, there is illustrated a general block diagram of the building penetration transmission system 102. The building penetration transmission system 102 uses 5G fixed millimeter wave deployments to overcome high building penetration losses due to RF and optical obstructions such as windows, brick and concrete walls. The building penetration transmission system 102 greatly increases the number of enterprise and residential buildings where 5G millimeter wave signals can be used to deliver gigabyte ethernet services. The system provides an optical or RF tunnel through the window or wall 106 without requiring the drilling of any holes or the creation of some type of signal permeable portal within the window or wall. The generation of direction radio waves using the describe system enables the generation of directional beams to tunnel through low-e glass or walls. The system enables link budgets between the interior and exterior transceivers be satisfied. The system greatly increases the number of building that may use millimeter wave signals to deliver Gigabit Ethernet using consumer installed devices.

The building penetration transmission system 102 generally includes an exterior repeater transmitter 104 located on the exterior of the window or wall 106. The repeater transmitter 104 transmits and receives a number of frequencies including 2.5 GHz band, 3.5 GHz band, 5 GHz band, 24 GHz band, 28 GHz band (A1, A2, B1 and B2), 39 GHz band, 60 GHz band, 71 GHz band and 81 GHz band. The 3.5 GHz band is CBRS (Citizens Band Radio Service), the 60 GHz band is V-band and the 71 GHz and 81 GHz are E-band. The repeater transmitter 104 is powered using magnetic resonance or inductive coupling such that the outside unit requires no external power source. The repeater 104 transmits received signals through the window or wall 106 to a transceiver 108 located on the interior of the building. The transceiver 108 includes an antenna 110 for providing ethernet and/or power connections. The building penetration transmission system 102 may provide one gigabit per second throughput traffic tunneling through a building structure such as a window or wall. The transceiver 108 may include a port 112 providing femto cell connectivity, but in general transmits Wi-Fi indoors using the antenna 110. Alternatively, the ethernet or power connections can be hardwired to the transceiver 108. The building penetration transmission system 102 may be located at any point on a wall or window of a structure. The building penetration transmission system 102 is designed to work with different types of walls and windows in order to enable millimeter wave signals to penetrate different types of structures. The repeater 104 and transceiver 108 are constructed of a metal/plastic design to withstand the harshest environments including precipitation, hot/cold weather and high/low humidity.

The transceiver 108 includes gigabyte ethernet ports, a power output, at least one USB 2.0 port and dual flash image support. The building penetration transmission system 102 provides a range of up to 200 feet (60 m). The system requires a 24 V/M passive gigabyte PoE and has a 20 W maximum power consumption that may be powered using magnetic resonance wireless charging in one embodiment. The system provides 2 GHz of channel bandwidth 60 GHz.

Figure 1B:
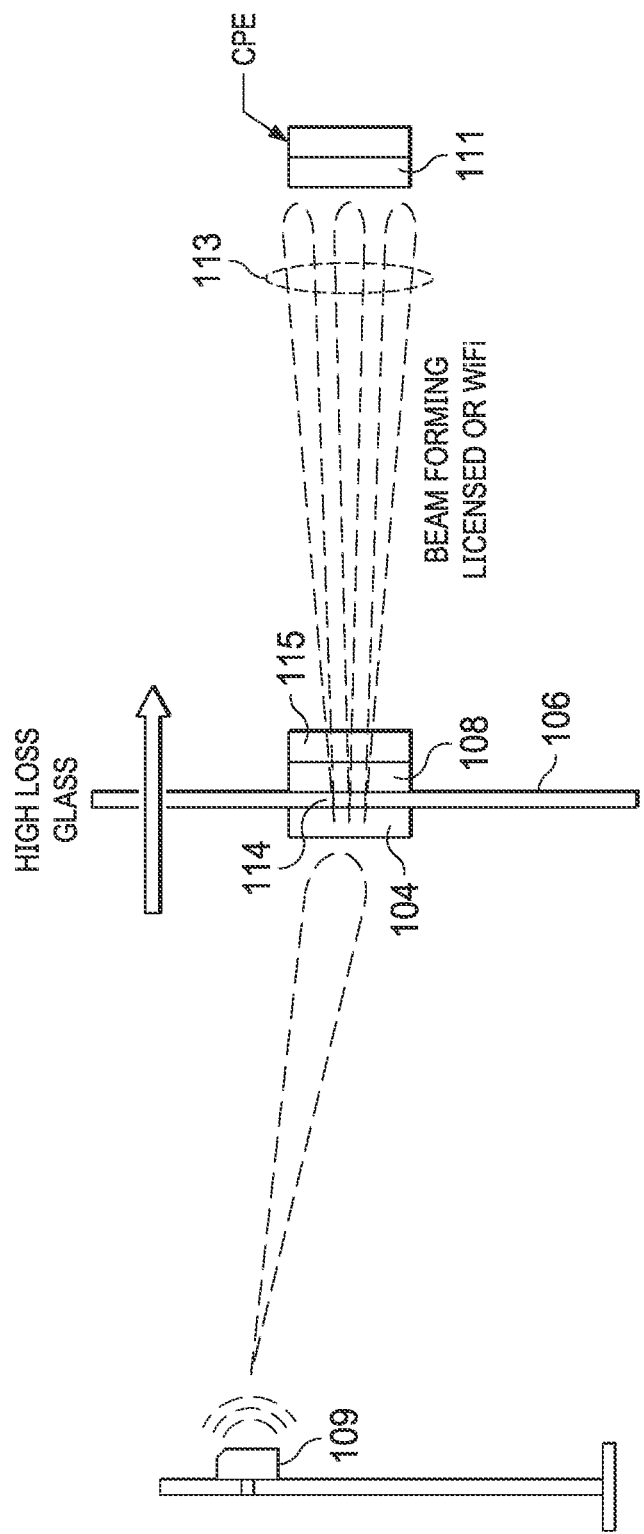
FIG. 1B illustrates the bi-directional nature of the building penetration system for transmissions from the outside.

FIGS. 1B and 1C illustrates the bidirectional communication between transceiver 104 located on the exterior side of the window or wall 106 and transceiver 108 located on the interior side of the window or wall 106. A remote base station transmitter 109 transmits wireless signals to an external transceiver 104. Communication transmissions from the exterior transceiver 104 to the interior transceiver 108 occur over a communications link 114. The signals transmitted to the interior may then be transmitted to consumer premises equipment (CPE) 111 using beam forming or WiFi 113 from an internal router 115. As shown in FIG. 1C, internal devices 117 (such as mobile devices or Internet-of-Things devices) transmit signals to the internal router 115. The internal router 115 provides the signals to the internal transceiver 108. Transmissions from the interior of the window or wall 106 to the exterior are from transceiver 108 to transceiver 104 are on communications link 116. The external transceiver 104 then transmits the signals to the external base station 109. Thus, the system enables bidirectional communications that may utilize RF, optical or other types of communication technologies as more fully described hereinbelow.

Figure 1D:
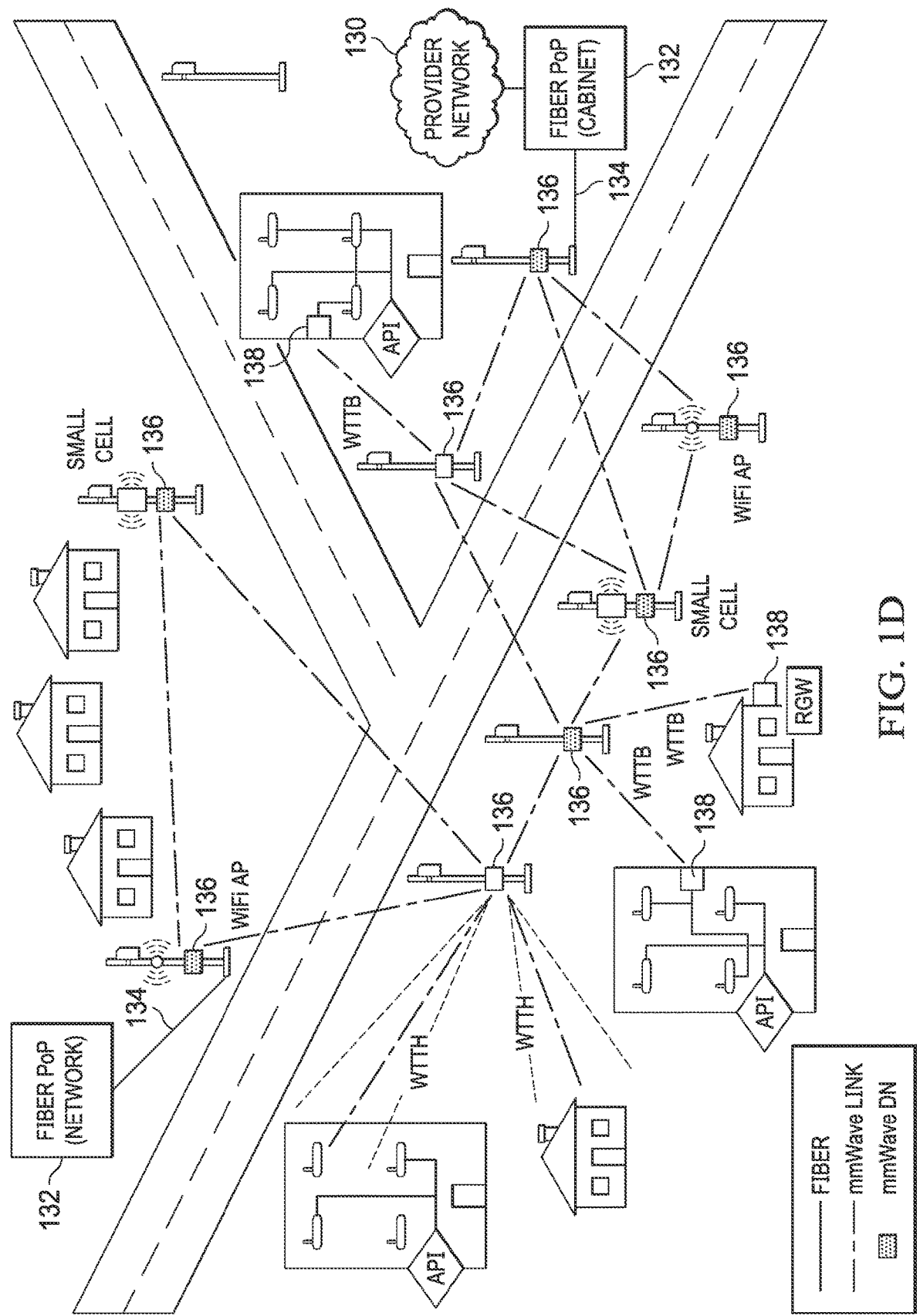
FIG. 1D illustrates a network deployment of the building penetration system of FIG. 1A.

Referring now to FIG. 1D, there is illustrated a network deployment of the building penetration system discussed with respect to FIGS. 1A-1C. A provider network 130 interfaces with the local network through fiber PoP (point of presence) cabinets 132. The cabinets 132 have a fiber link 134 to an access point 136. Each of the access points 136 wirelessly communicates with a network of other access points 136 that are located for example on light poles within a local area over wireless communication links using any number of communication frequencies as will be described herein. The access points 136 communicate with transceiver systems 138 that comprise the building penetration system described herein where in signals are wirelessly transmitted to an external transceiver and then transmitted to the interior of the business or home such that information may be bi-directionally transmitted from the provider network 130 to/from devices located within the interior of various structures. In this manner, data may be provided between the network provider 130 and devices of all types located within the structures using wireless communications that normally would not penetrate to the interior of the structures due to losses occurring by penetration of the signals into the interior of the structures.

Figure 2:
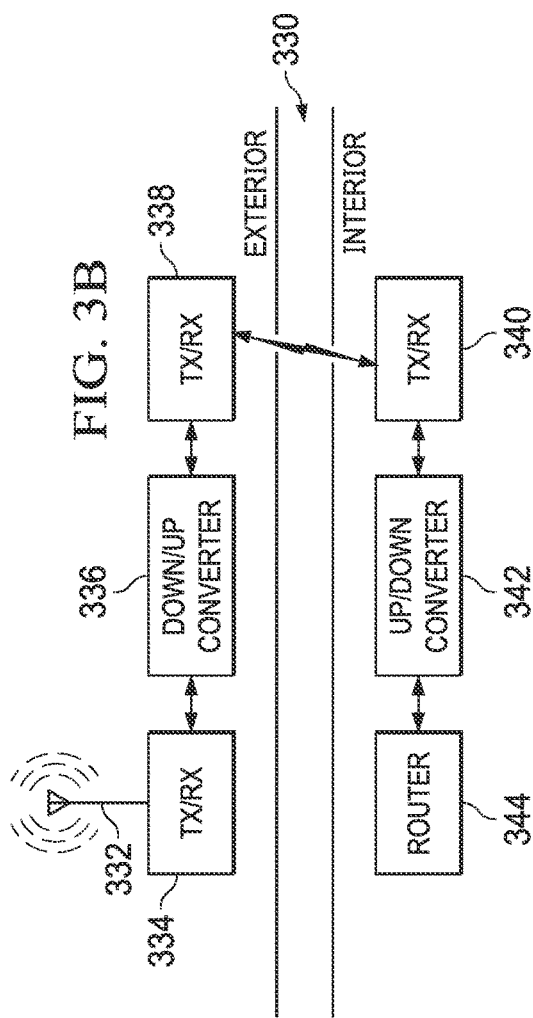
FIG. 2 illustrates millimeter wave transmissions between a base station and receivers located both inside and outside of a building structure.

Referring now to FIG. 2, there is illustrated the use of a millimeter wave transmission system 202 for communications. The base station 204 generates the millimeter wave transmissions 206, 208 for transmissions to various receivers 210, 212. Millimeter wave transmissions 206 that traveled directly from the base station 204 to a receiver 210 are able to be easily received without much ambient interference. Millimeter wave transmissions 208 from a base station 204 to a receiver 212 located inside of the building 214 will have significant interference issues. Millimeter wave transmissions 208 do not easily penetrate a building 204. When passing through transparent windows or building walls significant signal losses are experienced. The 28 GHz and above frequencies do not penetrate building walls and glass of the windows yet 85% of communications traffic is generated from within buildings.

In view of millimeter wave spectrum transmissions not propagating very far and lacking the ability to penetrate indoors, these frequencies will be used for very short range applications of about a mile. By way of perspective, at 2.4 GHz, a low-power Wi-Fi can cover most of a house that's under 3000 sq. ft., but a 5 GHz Wi-Fi signal would only cover approximately 60% of a two-story house because the signal does not travel as far at the higher frequency range. For 5G applications, the power is higher, but still higher frequencies have higher losses and propagation through space and other media.

The losses occurring as the millimeter wave signals penetrate a building drive data rates down to almost nothing. For example, when transmitting on a downlink from a base station to the inside of a home or building through clear glass, the maximum data rate is 9.93 Gb per second. When transmitting through tinted glass the data rate is 2.2 Mb per second. When transmitting through brick the data rate is 14 Mb per second, and when transmitting through concrete, the data rate drops all the way to 0.018 bps. Similarly, when transmitting on an uplink from the inside of the building towards a base station, the maximum data rate through clear glass is 1.57 Gb per second and through tinted glass is 0.37 Mb per second. The signal being transmitted on the uplink has a data rate of 5.5 Mb per second when transmitted through brick and 0.0075 bits per second when transmitted through concrete. Differences are also provided on the downlink and uplink when transmitting to/from older or newer buildings. Older buildings are defined as buildings using a composite model that comprises 30% standard glass and 70% concrete wall. Newer buildings are defined as composite models comprising 70% infrared reflective glass (IRR glass) and 30% concrete wall. Base station transmissions on the downlink to the inside of the building are 32 Mb per second for older buildings and 0.32 Mb per second for newer buildings. Similarly, the uplink transmissions from inside the home/building to the base station are 2.56 Mb per second for older buildings in 25.6 kb per second for newer buildings.

Despite the shortcomings, in order to meet the increased demands for bandwidth, RF service providers will increasingly move to carrier frequencies of higher frequency rates. In particular, 28 GHz is an emerging frequency band for providing local multipoint distribution service (LMDS). The 28 GHz and 39 GHz frequency bands are being contemplated by the FCC for small cell deployments to support 5G networks to subscriber premises using beam forming and beam steering. These higher frequency bandwidths have a number of advantages in addition to the disadvantages caused by the huge penetration losses when passing through building materials or windows. These advantages include a higher frequency rate, capability of more precise beamforming and more effective beam steering in the smaller footprint of the components providing the millimeter wave frequencies.

Figure 3A:
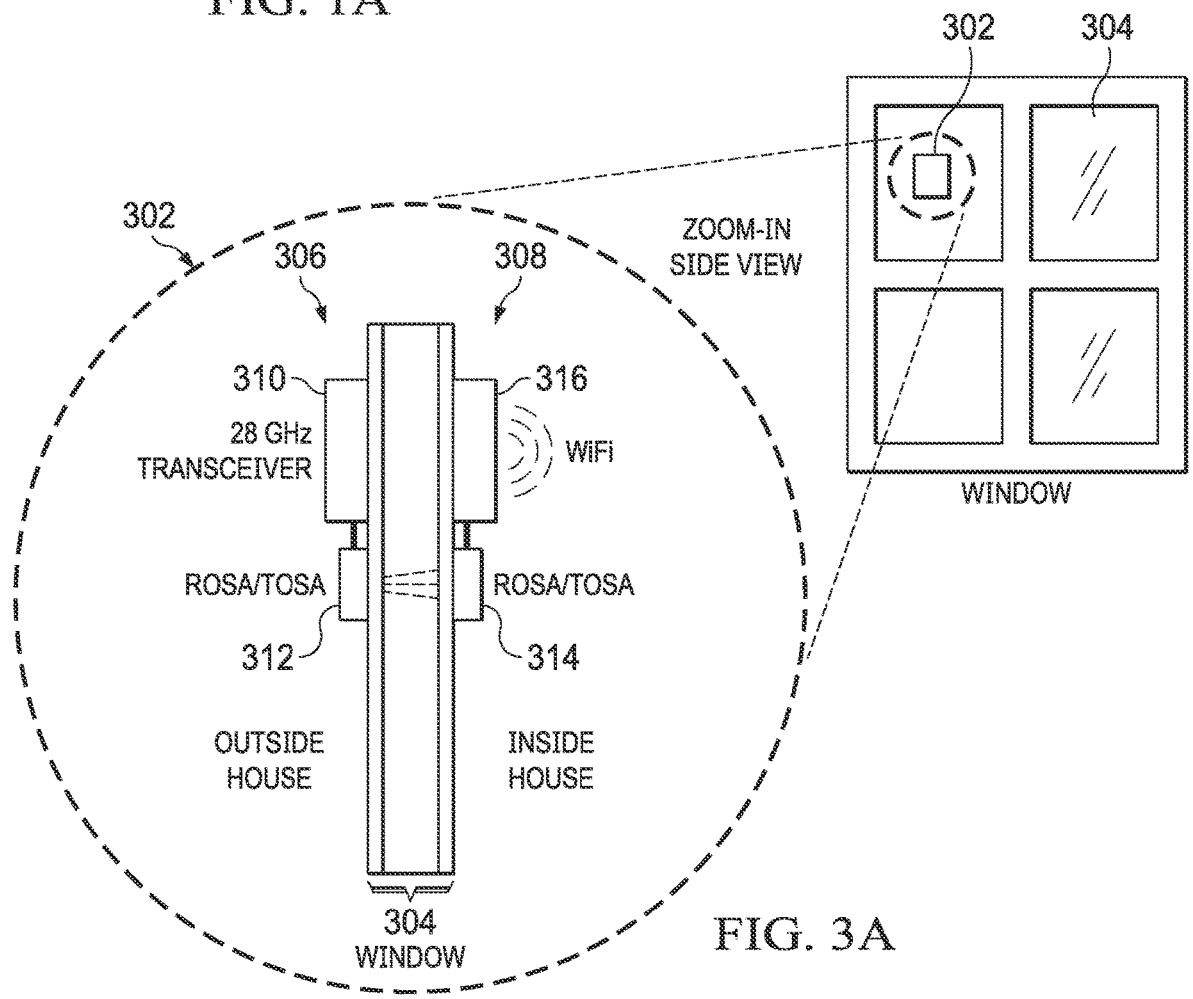
FIG. 3A illustrates a block diagram of an optical bridge for transmitting millimeter wave transmissions through a window.

FIG. 3A illustrates one manner for transmitting millimeter wave signals inside of a building using an optical bridge 302 mounted to a window 304. The optical bridge 302 includes a first portion 306 included on an outside of the window 304 and a second portion 308 included on the inside of the window 304. The first portion 306 includes a 28 GHz transceiver 310 that is mounted on the outside of the window 304. The 28 GHz transceiver 310 receives the millimeter wave transmissions that are being transmitted from, for example, a base station 104 such as that described with respect to FIG. 1. The received/transmitted signals are transmitted to and from the transceiver 310 using a receiver optical subassembly (ROSA)/transmission optical subassembly (TOSA) 312. A receiver optical subassembly is a component used for receiving optical signals in a fiber optic system. Similarly, a transceiver optical subassembly is a component used for transmitting optical signals in a fiber optic system. ROSA/TOSA component 312 transmits or receives the optical signals through the window 304 to a ROSA/TOSA component 314 located on the inside of the window 304. The signals are forwarded from the ROSA/TOSA 314 to a Wi-Fi transmitter 316 for transmissions within the building.

Figure 3B:
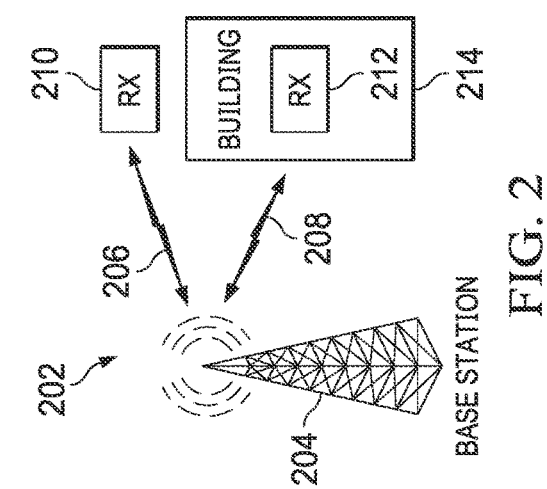
FIG. 3B illustrates a block diagram of an embodiment wherein received signals are down converted to a level that more easily transmits through a window or wall.

FIG. 3B illustrates a further embodiment wherein a received frequency that does not easily penetrate a tinted window or wall 330 down converts a received signal in order to facilitate transmission between the window or wall 330. On the exterior of the building, a signal is received at an antenna 332 of a transceiver 334 at a frequency that does not easily penetrate a window or wall. The transceiver 334 forwards the signals to a down/up converter 336 for down converting the signals to a frequency band that will more easily penetrate the window/wall 330. Another transceiver 338 takes the frequency down converted signal from the converter 336 and transmits it through the wall or window 330. The transmitted signal is received by a transceiver 340 located on the interior of the building at the down converted frequency. The received signal is passed to an up/down converter 342 to convert the signal to a level for transmission in the interior of the building. In many cases this may be the Wi-Fi band. The up converted signal is forwarded to a router 344 for transmission within the building. Outgoing signal received from devices located within the building are processed and transmitted in a reverse manner to transmit the signal outside of the building from transceiver 334.

Figure 4:
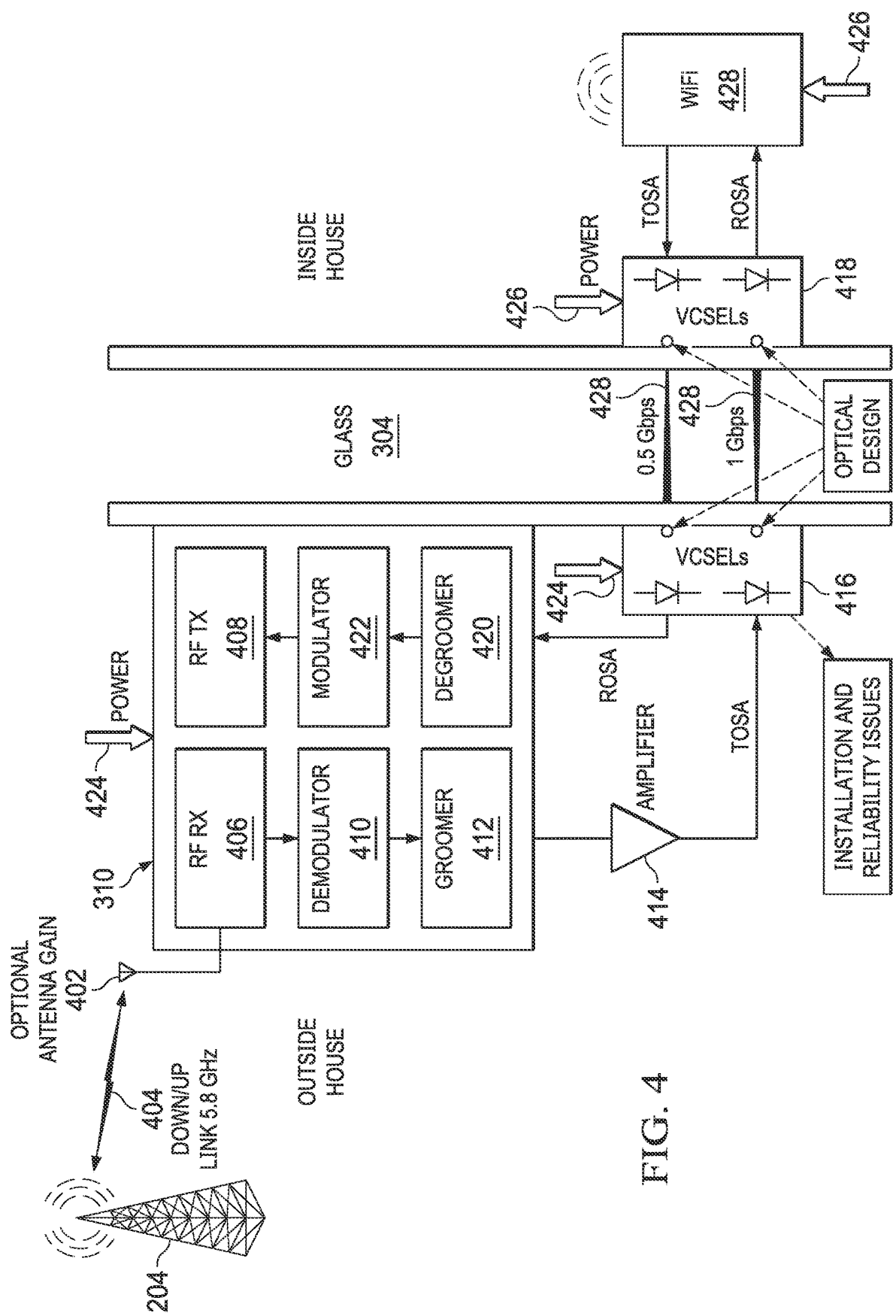
FIG. 4 is a more detailed block diagram of the millimeter wave regeneration and retransmission circuitry.

Referring now to FIG. 4, there is illustrated a more detailed illustration of the components for transmitting millimeter wave transmissions through a window or wall of a building. The transceiver 210 includes an optional antenna gain element 402 for receiving the millimeter wave transmissions transmitted on a down/up link 404 from a base station 204. The down/uplink 404 comprises a 28 GHz beam transmission. However other frequency transmissions may also be utilized. An RF receiver 406 is used for receiving information from the base station 204 over the down/up link 404. Similarly, the RF transmitter 408 is used for transmitting information on the down/up link 404 to a base station 204. Receive signals are provided to a demodulator 410 for demodulation of any received signals. The demodulated signals are provided to a groomer 412 which places the signals in the appropriate configuration for transmission by the optical transmission components. When translating different modulations (say from a high order QAM to OOK (On-Off Keying)), there are signaling conversions that require some grooming (or signal conditioning) to ensure all bits translate properly and still provide a low BER. The present system translates from RF at a high QAM rate to raw bit rates of OOK to enable transmissions using the VCSELs to go through the glass of the window. VCSELs only work with OOK and therefore a translation using the groomer 412 is needed. If a received signal were just down-convert from 28 GHz directly to 5.8 GHz (because 5.8 GHz does pass through the wall and glass), then we do not need to worry about complications of translating to low order modulation. The problem is that down-converting signal from 28 GHz to 5.8 GHz requires expensive components. The groomer 412 completes the translation of the received 28 GHz signal to a frequency for transmission through a glass or wall without the more expensive components.

The signals to be transmitted are passed through an amplifier 414 to amplify the signal for transmission. The amplified signal is provided to VCSELs 416 for optically transmitting the signal. The VCSEL 416 is a vertical cavity surface emitting laser that is a type of semiconductor laser diode with laser beam omissions perpendicular from the top surface. In a preferred embodiment, the VCSEL 416 comprises a Finisar VCSEL having a wavelength of approximately 780 nm, a modulation rate of 4 Gb per second and an optical output power of 2.2 mW (3.4 to dBm). In alternative embodiments the components for transmitting the optical signals across the window 404 may comprise an LED (light emitting diode) or EEL (edge emitting lasers). The different lasers enable different optical re-transmissions at different frequencies based on different characteristics of a window such as tint.

The VCSEL 416 includes a transmission optical subassembly (TOSA) for generating the optical signals for transmission from VCSEL 416 to VCSEL 418 located on the opposite side of the window 404. The VCSELs 416 and 418 comprise a laser source for generating the optical signals for transmission across the window 404. In one embodiment, the VCSEL comprises a Finisar VCSEL that provides a 780 nm optical signal having a maximum modulation rate of 4 Gb per second when running at 1 Gb per second and an optical output power of 3 mW (5 dBm). The TOSA includes a laser device or LED device for converting electrical signals from the amplifier 414 into light signal transmissions. Transmissions from the outside VCSEL 416 to the inside VCSEL 418 and an associated receiver optical subassembly (ROSA).

The optical signals are transmitted through the window 404 using optical focusing circuitry 417. The optical focusing circuitry 417 will be more fully described on the transmitter and receiver sides with respect to FIG. 7. The optical link 428 between VCSEL 416 and VCSEL 418 has an optical link budget associated therewith that defines the losses that may be accepted while still transmitting the information between the VCSELs 416, 418. The VCSEL has an output power of approximately 5 dBm. The detector at the receiver within the VCSEL can detect a signal at approximately −12 dBm. The glass losses associated with the optical signal passing through the glass at a wavelength of 780 nm is 7.21 dB. The coupling loss and lens gain associated with the transmission is approximately 0.1 dB. The maximum displacement loss caused by a lens displacement of 3.5 mm is 6.8 dB. Thus, the total link margin equals 2.88 dB based upon a subtraction of the detector sensitivity, glass losses, coupling loss and lens gain and maximum displacement loss from the VCSEL output power. The 2.88 dB link margin is provided for unexpected an extra losses such as len's losses and unexpected output variances.

Figure 5:
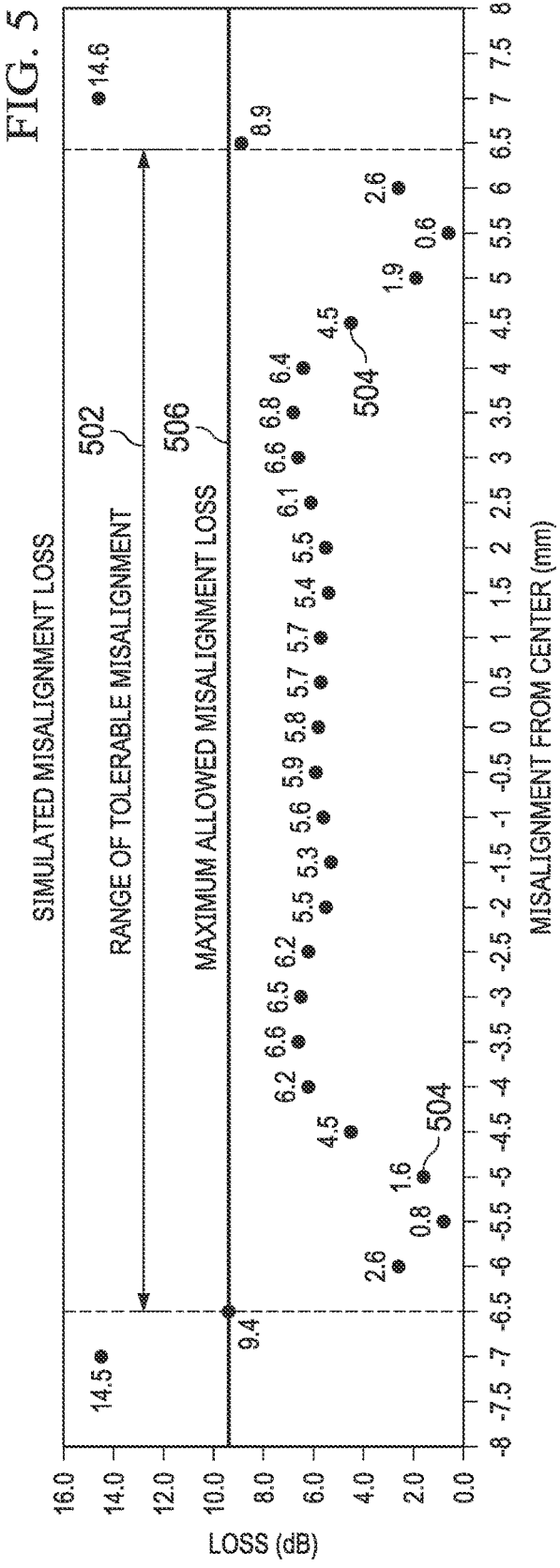
FIG. 5 illustrates the misalignment losses associated with the millimeter wave regeneration and retransmission circuitry.

Lens displacement or misalignment can account for a significant portion of the link loss within the system. As illustrated in FIG. 5, the range of tolerable misalignment 402 ranges from approximately −6.5 mm to +6.5 mm from the center of the power spectrum received by the detector. The alignment losses 404 range in an area from 0.6 dB to 6.8 dB as the misalignment moves between ±6.5 mm. The maximum allowed misalignment loss is 9.4 dB as illustrated at 406.

The VCSEL 418 on the inside of the window 204 uses a TOSA to transmit an optical signal at a data rate of 0.5 Gbps through the window 204 to a ROSA within the VCSEL 416 located on the outside of the window. The received optical signal is provided to a de-groomer component 32 for processing the signals from raw bit rates of OOK to RF at high QAM rate to enable RF transmissions after receipt of the signals by the VCSELs. The de-groomed signal is modulated within a modulator 422. The modulated signal is transmitted over the uplink 404 using an RF transmitter 408. The transceiver 310 is powered by a power input 424 the components inside the window are similarly powered by a power input 426. Signals are provided within the building using a Wi-Fi transmitter 428 that is connected to receive optical signals received by the VCSEL 418 and provide signals to the VCSEL 418 for transmission through the window 304. The Wi-Fi transmitter uses the 802.11 transmission protocol.

Figure 6:
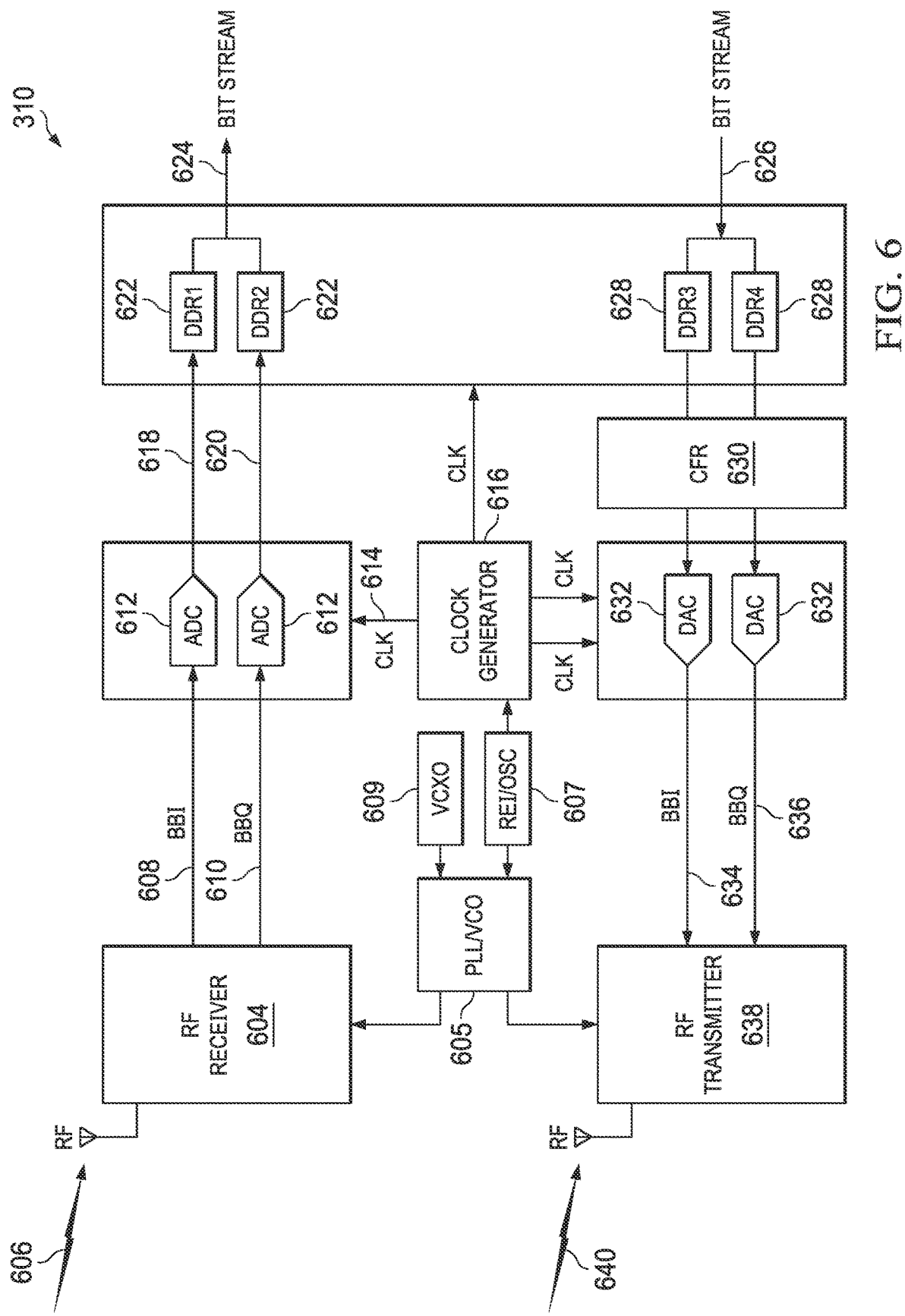
FIG. 6 illustrates the RF transceiver circuitry of the millimeter wave regeneration and retransmission circuitry.

Referring now to FIG. 6 there is illustrated a more detailed block diagram of the transceiver 310. The receiver portion 602 includes an RF receiver 604 for receiving the RF signals transmitted from the base station on the downlink 606. The receiver 604 generates output signals having a real portion BBI 608 and an imaginary portion BBQ 610. The RF receiver 604 generates the real signal 608 and imaginary signal 610 responsive to the receive signal and inputs from a phase locked loop/voltage control oscillator 605. The phase locked loop/voltage control oscillator 605 provides inputs to the RF receiver 604 responsive to a reference oscillator signal provided from reference oscillator 607 and a voltage controlled oscillator signal provided from oscillator 609. The real signal 608 and the imaginary signal 610 are provided to analog-to-digital converters 612 for conversion to a digital signal. The analog-to-digital converters 612 are clocked by an associated clock input 614 provided from clock generation circuit 616. The clock generation circuit 616 also receives an input from the reference oscillator 607.

The real and imaginary digital signals 618 and 620 are input to a digital down converter 622. The digital signals are down converted to a lower frequency and output as a bit stream 624 to the optical transmission circuitry (VCSEL) for transmitting across the window glass.

The transmitter portion 624 receives a digital bitstream 626 from the optical circuitry and provides this bitstream to the real and imaginary portions of digital up converters 628 to convert the digital data to a higher frequency for transmission. The real and imaginary portions of the up-converted digital signal are provided to a crest factor reduction processor 630. Some signals (especially OFDM-based systems) have high peak-to-average power ratio (PAR) that negatively impacts the efficiency of power amplifiers (PAs). Crest factor reduction (CFR) schemes implemented by the processor help reduce PAR and have been used for many networks (CDMA & OFDM). However, CFR schemes developed primarily for CDMA signals have a poor performance when used in in OFDM (given the tight error vector magnitude (EVM) requirements). With a well-designed CFR algorithm on FPGAs, one can achieve low-latency, high-performance that can significantly reduce the PAR of the output signal which improves PA efficiency and reduced cost.

The real and imaginary signals are provided from the crest factor reduction processor 630 to a digital to analog converter 632. The digital to analog converter 632 converts the real and imaginary digital signals into real and imaginary analog signals BBI 634 and BBQ 636. The real and imaginary analog signals are inputs to the RF transmitter 638. The RF transmitter 638 processes the real signal 634 and imaginary signal 636 responsive to input from the phase locked loop/voltage control oscillator 604 to generate RF signals for transmission on the uplink 640 to generate the millimeter wave and transmissions.

Figure 7:
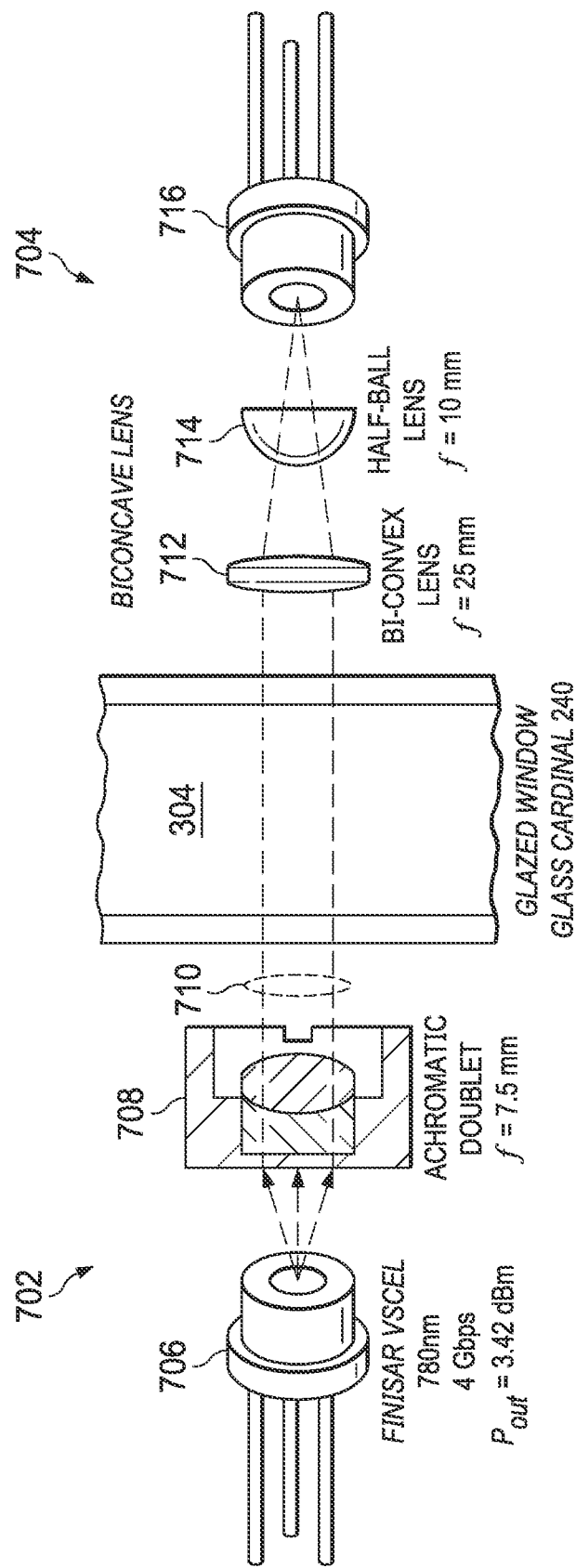
FIG. 7 illustrates the optical focusing circuitry of the millimeter wave regeneration and retransmission circuitry.

Referring now to FIG. 7, there is illustrated the optical focusing circuitry 317 associated with the optical transmission interface across the window 304. The optical focusing circuitry 417 is included with the VCSEL located on each side of the window 204 and includes a transmission portion 602 and a receiver portion 604. The transmission portion 602 and receiver portion 604 would be included on each side of the window 304 as the system provides bidirectional communications across the window. The transmission portion 602 includes in one embodiment a VCSEL 606 provided by Finisar that transmits a 780 nm optical signal at 4 Gb per second and has a power output of 3.42 dBm. The optical signal generated by the VCSEL 606 is provided to an achromatic doublet 608 having a focal length of 7.5 mm that collimates the optical signal generated by the VCSEL 606 into a small aperture. A collimated beam 610 is transmitted across the window 304. The collimated beam exits the window 304 and on the receiver portion 604 first passes through a bi-convex lens 612 having a focal length of 25 mm. The bi-convex lens 612 focuses the beam column 610 onto a half ball lens 614 that focuses the optical signal onto a semiconductor aperture of a photo detector 616. In one embodiment, the detector 616 has an aperture diameter of 10 mm and a detector sensitivity of 12 dBm.

The transmissions between the VCSELs 606 and to and from the RF transceiver to 10 may in one particular embodiment utilize orthogonal function signal transmission techniques such as those described in U.S. application Ser. No. 15/357,808, entitled SYSTEM AND METHOD FOR COMMUNICATION USING ORBITAL ANGULAR MOMENTUM WITH MULTIPLE LAYER OVERLAY MODULATION, filed on Nov. 21, 2016, which is incorporated herein by reference in its entirety. However, it should be realized that a variety of other data transmission techniques may also be used.

FIG. 7 illustrates two manners for increasing spectral efficiency of a communications system. In general, there are basically two ways to increase spectral efficiency 702 of a communications system. The increase may be brought about by signal processing techniques 704 in the modulation scheme or using multiple access technique. Additionally, the spectral efficiency can be increase by creating new Eigen channels 706 within the electromagnetic propagation. These two techniques are completely independent of one another and innovations from one class can be added to innovations from the second class. Therefore, the combination of this technique introduced a further innovation.

Spectral efficiency 702 is the key driver of the business model of a communications system. The spectral efficiency is defined in units of bit/sec/hz and the higher the spectral efficiency, the better the business model. This is because spectral efficiency can translate to a greater number of users, higher throughput, higher quality or some of each within a communications system.

Regarding techniques using signal processing techniques or multiple access techniques. These techniques include innovations such as TDMA, FDMA, CDMA, EVDO, GSM, WCDMA, HSPA and the most recent OFDM techniques used in 4G WIMAX and LTE. Almost all of these techniques use decades-old modulation techniques based on sinusoidal Eigen functions called QAM modulation. Within the second class of techniques involving the creation of new Eigen channels 706, the innovations include diversity techniques including space and polarization diversity as well as multiple input/multiple output (MIMO) where uncorrelated radio paths create independent Eigen channels and propagation of electromagnetic waves.

Figure 8:
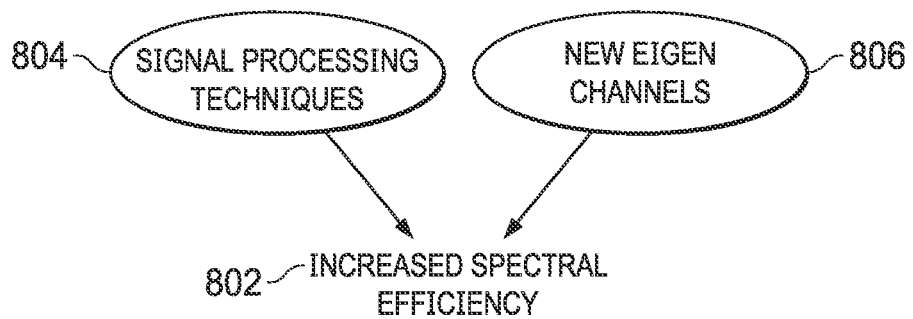
FIG. 8 illustrates various techniques for increasing spectral efficiency within a transmitted signal.
Figure 9:
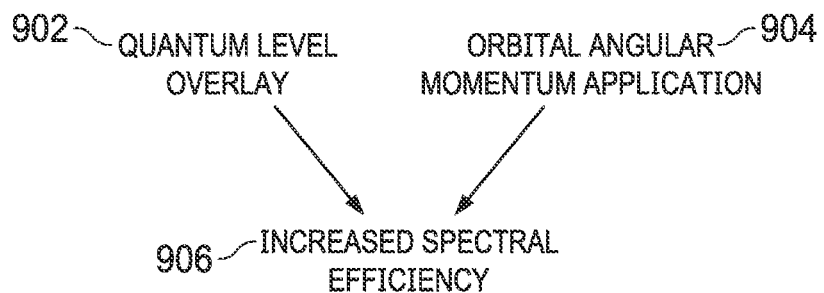
FIG. 9 illustrates a particular technique for increasing spectral efficiency within a transmitted signal.

Referring now to FIG. 8, the communication system configuration introduces two techniques, one from the signal processing techniques 804 category and one from the creation of new eigen channels 806 category that are entirely independent from each other. Their combination provides a unique manner to disrupt the access part of an end to end communications system from twisted pair and cable to fiber optics, to free space optics, to RF used in cellular, backhaul and satellite. The first technique involves the use of a new signal processing technique using new orthogonal signals to upgrade QAM modulation using non sinusoidal functions. This particular embodiment is referred to as quantum level overlay (QLO) 902 as shown in FIG. 9. The second embodiment involves the application of new electromagnetic wavefronts using a property of electromagnetic waves or photon, called orbital angular momentum (QAM) 904. Application of each of the quantum level overlay techniques 902 and orbital angular momentum application 904 uniquely offers orders of magnitude higher spectral efficiency 906 within communication systems in their combination.

With respect to the quantum level overlay technique 902, new eigen functions are introduced that when overlapped (on top of one another within a symbol) significantly increases the spectral efficiency of the system. The quantum level overlay technique 302 borrows from quantum mechanics, special orthogonal signals that reduce the time bandwidth product and thereby increase the spectral efficiency of the channel. Each orthogonal signal is overlaid within the symbol acts as an independent channel. These independent channels differentiate the technique from existing modulation techniques.

With respect to the application of orbital angular momentum 904, this embodiment introduces twisted electromagnetic waves, or light beams, having helical wave fronts that carry orbital angular momentum (OAM). Different OAM carrying waves/beams can be mutually orthogonal to each other within the spatial domain, allowing the waves/beams to be efficiently multiplexed and demultiplexed within a communications link. OAM beams are interesting in communications due to their potential ability in special multiplexing multiple independent data carrying channels.

With respect to the combination of quantum level overlay techniques 902 and orbital angular momentum application 904, the combination is unique as the OAM multiplexing technique is compatible with other electromagnetic techniques such as wave length and polarization division multiplexing. This suggests the possibility of further increasing system performance. The application of these techniques together in high capacity data transmission disrupts the access part of an end to end communications system from twisted pair and cable to fiber optics, to free space optics, to RF used in cellular/backhaul and satellites.

Each of these techniques can be applied independent of one another, but the combination provides a unique opportunity to not only increase spectral efficiency, but to increase spectral efficiency without sacrificing distance or signal to noise ratios.

Using the Shannon Capacity Equation, a determination may be made if spectral efficiency is increased. This can be mathematically translated to more bandwidth. Since bandwidth has a value, one can easily convert spectral efficiency gains to financial gains for the business impact of using higher spectral efficiency. Also, when sophisticated forward error correction (FEC) techniques are used, the net impact is higher quality but with the sacrifice of some bandwidth. However, if one can achieve higher spectral efficiency (or more virtual bandwidth), one can sacrifice some of the gained bandwidth for FEC and therefore higher spectral efficiency can also translate to higher quality.

Telecom operators and vendors are interested in increasing spectral efficiency. However, the issue with respect to this increase is the cost. Each technique at different layers of the protocol has a different price tag associated therewith. Techniques that are implemented at a physical layer have the most impact as other techniques can be superimposed on top of the lower layer techniques and thus increase the spectral efficiency further. The price tag for some of the techniques can be drastic when one considers other associated costs. For example, the multiple input multiple output (MIMO) technique uses additional antennas to create additional paths where each RF path can be treated as an independent channel and thus increase the aggregate spectral efficiency. In the MIMO scenario, the operator has other associated soft costs dealing with structural issues such as antenna installations, etc. These techniques not only have tremendous cost, but they have huge timing issues as the structural activities take time and the achieving of higher spectral efficiency comes with significant delays which can also be translated to financial losses.

The quantum level overlay technique 902 has an advantage that the independent channels are created within the symbols without needing new antennas. This will have a tremendous cost and time benefit compared to other techniques. Also, the quantum layer overlay technique 902 is a physical layer technique, which means there are other techniques at higher layers of the protocol that can all ride on top of the QLO techniques 902 and thus increase the spectral efficiency even further. QLO technique 902 uses standard QAM modulation used in OFDM based multiple access technologies such as WIMAX or LTE. QLO technique 902 basically enhances the QAM modulation at the transceiver by injecting new signals to the I & Q components of the baseband and overlaying them before QAM modulation as will be more fully described herein below. At the receiver, the reverse procedure is used to separate the overlaid signal and the net effect is a pulse shaping that allows better localization of the spectrum compared to standard QAM or even the root raised cosine. The impact of this technique is a significantly higher spectral efficiency.

Figure 10:
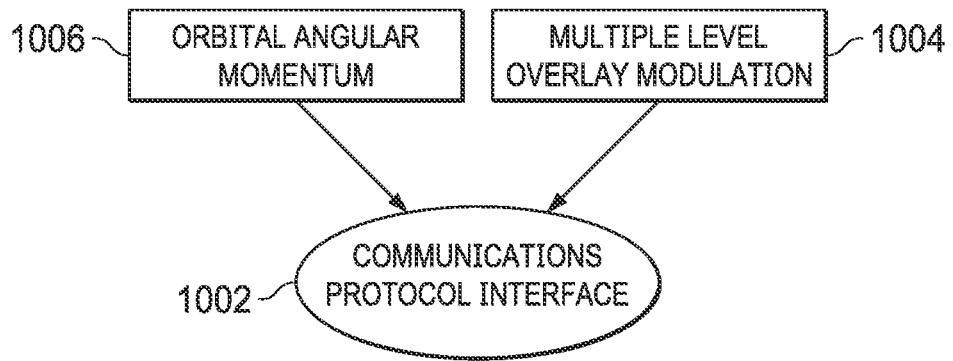
FIG. 10 illustrates a general overview of the manner for providing communication bandwidth between various communication protocol interfaces.

Referring now more particularly to FIG. 10, there is illustrated a general overview of the manner for providing improved communication bandwidth within various communication protocol interfaces 1002, using a combination of multiple level overlay modulation 1004 and the application of orbital angular momentum 1006 to increase the number of communications channels. The following discussions of orbital angular momentum processing and multiple level overlay modulation illustrate two techniques that may or may not be implemented in RF transmissions in the below described systems and embodiments. RF transmissions may be configured to implement one, both or neither of the techniques in the described embodiments.

The various communication protocol interfaces 1002 may comprise a variety of communication links, such as RF communication, wireline communication such as cable or twisted pair connections, or optical communications making use of light wavelengths such as fiber-optic communications or free-space optics. Various types of RF communications may include a combination of RF microwave or RF satellite communication, as well as multiplexing between RF and free-space optics in real time.

By combining a multiple layer overlay modulation technique 1004 with orbital angular momentum (OAM) technique 1006, a higher throughput over various types of communication links 1002 may be achieved. The use of multiple level overlay modulation alone without OAM increases the spectral efficiency of communication links 1002, whether wired, optical, or wireless. However, with OAM, the increase in spectral efficiency is even more significant.

Multiple overlay modulation techniques 1004 provide a new degree of freedom beyond the conventional 2 degrees of freedom, with time T and frequency F being independent variables in a two-dimensional notational space defining orthogonal axes in an information diagram. This comprises a more general approach rather than modeling signals as fixed in either the frequency or time domain. Previous modeling methods using fixed time or fixed frequency are considered to be more limiting cases of the general approach of using multiple level overlay modulation 1004. Within the multiple level overlay modulation technique 1004, signals may be differentiated in two-dimensional space rather than along a single axis. Thus, the information-carrying capacity of a communications channel may be determined by a number of signals which occupy different time and frequency coordinates and may be differentiated in a notational two-dimensional space.

Within the notational two-dimensional space, minimization of the time bandwidth product, i.e., the area occupied by a signal in that space, enables denser packing, and thus, the use of more signals, with higher resulting information-carrying capacity, within an allocated channel. Given the frequency channel delta ($\Delta f$), a given signal transmitted through it in minimum time $\Delta t$ will have an envelope described by certain time-bandwidth minimizing signals. The time-bandwidth products for these signals take the form;

$$\Delta t \, \Delta f = \frac{1}{2}(2n+1)$$

where n is an integer ranging from 0 to infinity, denoting the order of the signal.

These signals form an orthogonal set of infinite elements, where each has a finite amount of energy. They are finite in both the time domain and the frequency domain, and can be detected from a mix of other signals and noise through correlation, for example, by match filtering. Unlike other wavelets, these orthogonal signals have similar time and frequency forms.

The orbital angular momentum process 1006 provides a twist to wave fronts of the electromagnetic fields carrying the data stream that may enable the transmission of multiple data streams on the same frequency, wavelength, or other signal-supporting mechanism. This will increase the bandwidth over a communications link by allowing a single frequency or wavelength to support multiple eigen channels, each of the individual channels having a different orthogonal and independent orbital angular momentum associated therewith.

Figure 11:
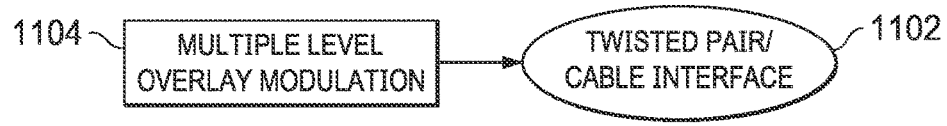
FIG. 11 illustrates the manner for utilizing multiple level overlay modulation with twisted pair/cable interfaces.

Referring now to FIG. 11, there is illustrated a further communication implementation technique using the above described techniques as twisted pairs or cables carry electrons (not photons). Rather than using each of the multiple level overlay modulation 1004 and orbital angular momentum techniques 1006, only the multiple level overlay modulation 1004 can be used in conjunction with a single wireline interface and, more particularly, a twisted pair communication link or a cable communication link 1102. The operation of the multiple level overlay modulation 1104, is similar to that discussed previously with respect to FIG. 10, but is used by itself without the use of orbital angular momentum techniques 1006, and is used with either a twisted pair communication link or cable interface communication link 1102.

Figure 12:
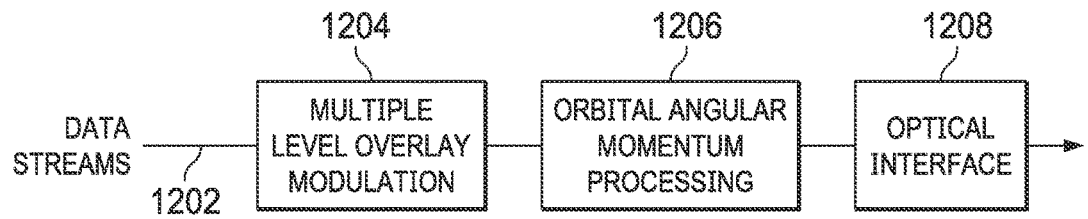
FIG. 12 illustrates a general block diagram for processing a plurality of data streams within an optical communication system.

Referring now to FIG. 12, there is illustrated a general block diagram for processing a plurality of data streams 1202 for transmission in an optical communication system. The multiple data streams 1202 are provided to the multi-layer overlay modulation circuitry 1204 wherein the signals are modulated using the multi-layer overlay modulation technique. The modulated signals are provided to orbital angular momentum processing circuitry 1206 which applies a twist to each of the wave fronts being transmitted on the wavelengths of the optical communication channel. The twisted waves are transmitted through the optical interface 1208 over an optical communications link such as an optical fiber or free space optics communication system. FIG. 12 may also illustrate an RF mechanism wherein the interface 1208 would comprise and RF interface rather than an optical interface.

Figure 13:
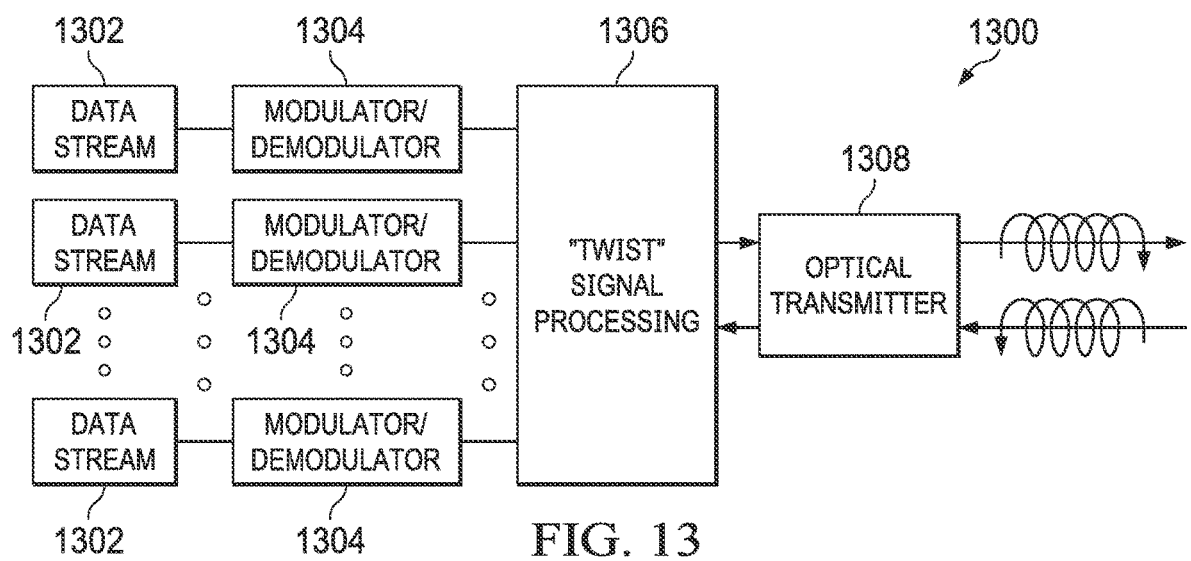
FIG. 13 is a functional block diagram of a system for generating orbital angular momentum within a communication system.

Referring now more particularly to FIG. 13, there is illustrated a functional block diagram of a system for generating the orbital angular momentum "twist" within a communication system, such as that illustrated with respect to FIG. 10, to provide a data stream that may be combined with multiple other data streams for transmission upon a same wavelength or frequency. Multiple data streams 1302 are provided to the transmission processing circuitry 1300. Each of the data streams 1302 comprises, for example, an end to end link connection carrying a voice call or a packet connection transmitting non-circuit switch packed data over a data connection. The multiple data streams 1302 are processed by modulator/demodulator circuitry 1304. The modulator/demodulator circuitry 1304 modulates the received data stream 1302 onto a wavelength or frequency channel using a multiple level overlay modulation technique, as will be more fully described herein below. The communications link may comprise an optical fiber link, free-space optics link, RF microwave link, RF satellite link, wired link (without the twist), etc.

The modulated data stream is provided to the orbital angular momentum (OAM) signal processing block 1306. Each of the modulated data streams from the modulator/demodulator 1304 are provided a different orbital angular momentum by the orbital angular momentum electromagnetic block 1306 such that each of the modulated data streams have a unique and different orbital angular momentum associated therewith. Each of the modulated signals having an associated orbital angular momentum are provided to an optical transmitter 1308 that transmits each of the modulated data streams having a unique orbital angular momentum on a same wavelength. Each wavelength has a selected number of bandwidth slots B and may have its data transmission capability increase by a factor of the number of degrees of orbital angular momentum $\ell$ that are provided from the OAM electromagnetic block 1306. The optical transmitter 1308 transmitting signals at a single wavelength could transmit B groups of information. The optical transmitter 1308 and OAM electromagnetic block 1306 may transmit $\ell \times B$ groups of information according to the configuration described herein.

In a receiving mode, the optical transmitter 1308 will have a wavelength including multiple signals transmitted therein having different orbital angular momentum signals embedded therein. The optical transmitter 1308 forwards these signals to the OAM signal processing block 1306, which separates each of the signals having different orbital angular momentum and provides the separated signals to the demodulator circuitry 1304. The demodulation process extracts the data streams 1302 from the modulated signals and provides it at the receiving end using the multiple layer overlay demodulation technique.

Figure 14:
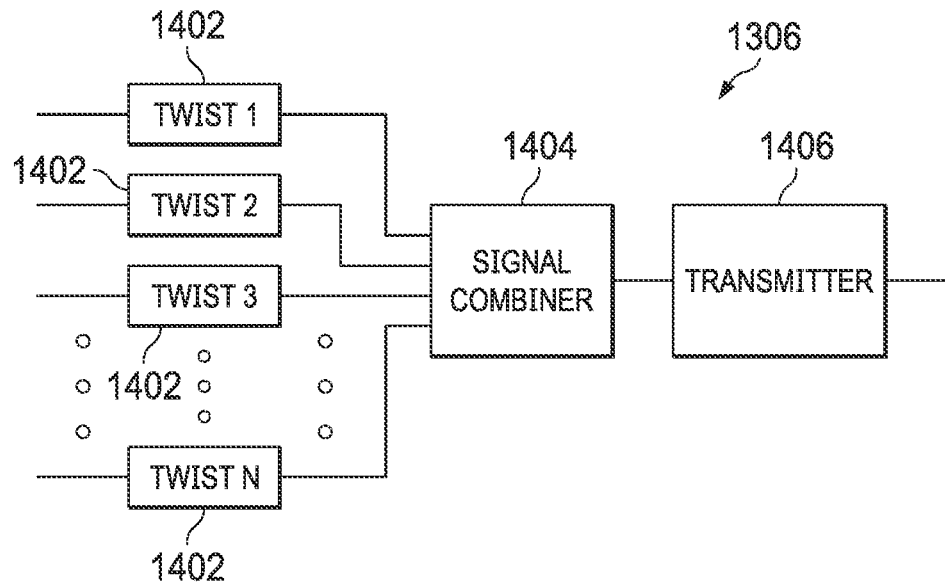
FIG. 14 is a functional block diagram of the orbital angular momentum signal processing block of FIG. 7.

Referring now to FIG. 14, there is provided a more detailed functional description of the OAM signal processing block 1406. Each of the input data streams are provided to OAM circuitry 1402. Each of the OAM circuitry 1402 provides a different orbital angular momentum to the received data stream. The different orbital angular momentums are achieved by applying different currents for the generation of the signals that are being transmitted to create a particular orbital angular momentum associated therewith. The orbital angular momentum provided by each of the OAM circuitries 1402 are unique to the data stream that is provided thereto. An infinite number of orbital angular momentums may be applied to different input data streams using many different currents. Each of the separately generated data streams are provided to a signal combiner 1404, which combines the signals onto a wavelength for transmission from the transmitter 1406.

Figure 15:
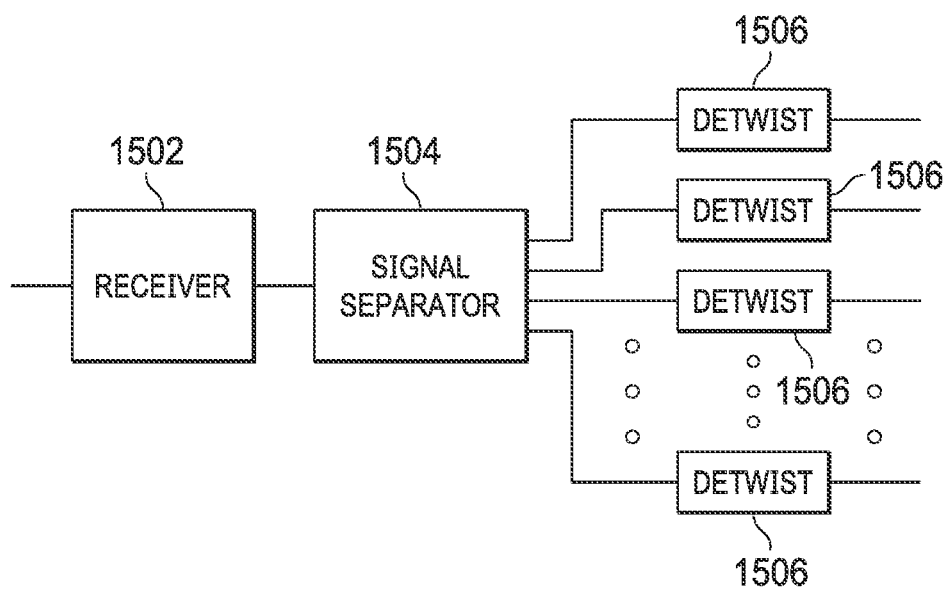
FIG. 15 is a functional block diagram illustrating the manner for removing orbital angular momentum from a received signal including a plurality of data streams.

Referring now to FIG. 15, there is illustrated the manner in which the OAM processing circuitry 1306 may separate a received signal into multiple data streams. The receiver 1502 receives the combined OAM signals on a single wavelength and provides this information to a signal separator 1504. The signal separator 1504 separates each of the signals having different orbital angular momentums from the received wavelength and provides the separated signals to OAM de-twisting circuitry 1506. The OAM de-twisting circuitry 1506 removes the associated OAM twist from each of the associated signals and provides the received modulated data stream for further processing. The signal separator 1504 separates each of the received signals that have had the orbital angular momentum removed therefrom into individual received signals. The individually received signals are provided to the receiver 1502 for demodulation using, for example, multiple level overlay demodulation as will be more fully described herein below.

Figure 16:
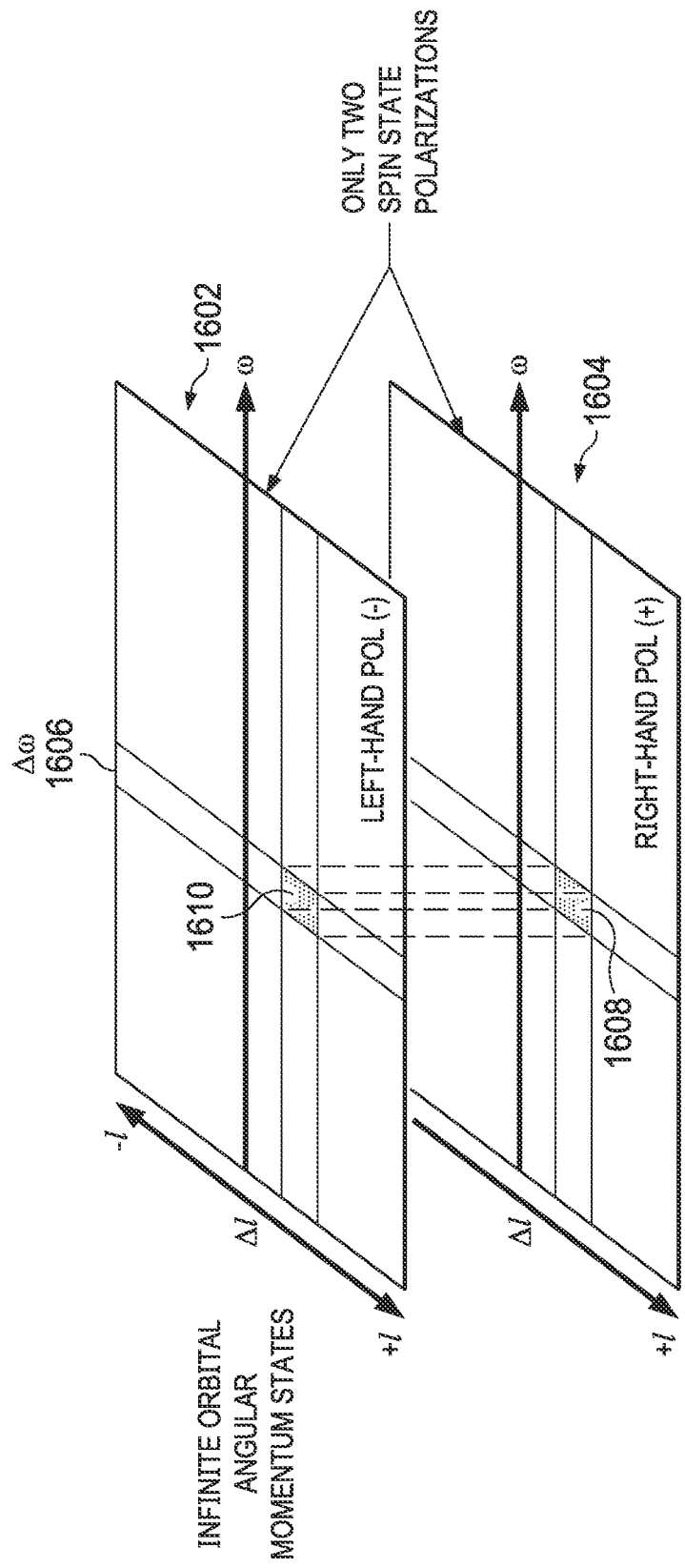
FIG. 16 illustrates a single wavelength having two quanti-spin polarizations providing an infinite number of signals having various orbital angular momentums associated therewith.

FIG. 16 illustrates in a manner in which a single wavelength or frequency, having two quanti-spin polarizations may provide an infinite number of twists having various orbital angular momentums associated therewith. The l axis represents the various quantized orbital angular momentum states which may be applied to a particular signal at a selected frequency or wavelength. The symbol omega (ω) represents the various frequencies to which the signals of differing orbital angular momentum may be applied. The top grid 1602 represents the potentially available signals for a left handed signal polarization, while the bottom grid 1604 is for potentially available signals having right handed polarization.

By applying different orbital angular momentum states to a signal at a particular frequency or wavelength, a potentially infinite number of states may be provided at the frequency or wavelength. Thus, the state at the frequency Δω or wavelength 1606 in both the left handed polarization plane 1602 and the right handed polarization plane 1604 can provide an infinite number of signals at different orbital angular momentum states Δl. Blocks 1608 and 1610 represent a particular signal having an orbital angular momentum Δl at a frequency Δω or wavelength in both the right handed polarization plane 1604 and left handed polarization plane 1610, respectively. By changing to a different orbital angular momentum within the same frequency Δω or wavelength 1606, different signals may also be transmitted. Each angular momentum state corresponds to a different determined current level for transmission from the optical transmitter. By estimating the equivalent current for generating a particular orbital angular momentum within the optical domain and applying this current for transmission of the signals, the transmission of the signal may be achieved at a desired orbital angular momentum state.

Thus, the illustration of FIG. 16, illustrates two possible angular momentums, the spin angular momentum, and the orbital angular momentum. The spin version is manifested within the polarizations of macroscopic electromagnetism, and has only left and right hand polarizations due to up and down spin directions. However, the orbital angular momentum indicates an infinite number of states that are quantized. The paths are more than two and can theoretically be infinite through the quantized orbital angular momentum levels.

Using the orbital angular momentum state of the transmitted energy signals, physical information can be embedded within the radiation transmitted by the signals. The Maxwell-Heaviside equations can be represented as:

$$\nabla \cdot E = \frac{\rho}{\varepsilon_0}$$

$$\nabla \times E = -\frac{\partial B}{\partial t}$$

$$\nabla \cdot B = 0$$

$$\nabla \times B = \varepsilon_0 \mu_0 \frac{\partial E}{\partial t} + \mu_0 j(t, x)$$

where ∇ is the del operator, E is the electric field intensity and B is the magnetic flux density. Using these equations, one can derive 23 symmetries/conserved quantities from Maxwell's original equations. However, there are only ten well-known conserved quantities and only a few of these are commercially used. Historically if Maxwell's equations where kept in their original quaternion forms, it would have been easier to see the symmetries/conserved quantities, but when they were modified to their present vectorial form by Heaviside, it became more difficult to see such inherent symmetries in Maxwell's equations.

Maxwell's linear theory is of U(1) symmetry with Abelian commutation relations. They can be extended to higher symmetry group SU(2) form with non-Abelian commutation relations that address global (non-local in space) properties. The Wu-Yang and Harmuth interpretation of Maxwell's theory implicates the existence of magnetic monopoles and magnetic charges. As far as the classical fields are concerned, these theoretical constructs are pseudo-particle, or instanton. The interpretation of Maxwell's work actually departs in a significant ways from Maxwell's original intention. In Maxwell's original formulation, Faraday's electrotonic states (the Aμ field) was central making them compatible with Yang-Mills theory (prior to Heaviside). The mathematical dynamic entities called solitons can be either classical or quantum, linear or non-linear and describe EM waves. However, solitons are of SU(2) symmetry forms. In order for conventional interpreted classical Maxwell's theory of U(1) symmetry to describe such entities, the theory must be extended to SU(2) forms.

Besides the half dozen physical phenomena (that cannot be explained with conventional Maxwell's theory), the recently formulated Harmuth Ansatz also address the incompleteness of Maxwell's theory. Harmuth amended Maxwell's equations can be used to calculate EM signal velocities provided that a magnetic current density and magnetic charge are added which is consistent to Yang-Mills filed equations. Therefore, with the correct geometry and topology, the Aμ potentials always have physical meaning The conserved quantities and the electromagnetic field can be represented according to the conservation of system energy and the conservation of system linear momentum. Time symmetry, i.e. the conservation of system energy can be represented using Poynting's theorem according to the equations:

$$H = \sum_i m_i \gamma_i c^2 + \frac{\varepsilon_0}{2} \int d^3 x (|E|^2 + c^2 |B|^2)$$

Hamiltonian (total energy)

$$\frac{dU^{mech}}{dt} + \frac{dU^{em}}{dt} + \oint_{S'} d^2 x' \hat{n}' \cdot S = 0$$

conservation of energy

The space symmetry, i.e., the conservation of system linear momentum representing the electromagnetic Doppler shift can be represented by the equations:

$$p = \sum_i m_i \gamma_i v_i + \varepsilon_0 \int d^3 x (E \times B) \text{ linear momentum}$$

$$\frac{dp^{mech}}{dt} + \frac{dp^{em}}{dt} + \oint_{S'} d^2 x' \hat{n}' \cdot T = 0$$

conservation of linear momentum

The conservation of system center of energy is represented by the equation:

$$R = \frac{1}{H}\sum_i (x_i - x_0)m_i\gamma_i c^2 + \frac{\varepsilon_0}{2H}\int d^3x(x-x_0)(|E^2|+c^2|B^2|)$$

Similarly, the conservation of system angular momentum, which gives rise to the azimuthal Doppler shift is represented by the equation:

$$\frac{dJ^{mech}}{dt} + \frac{dJ^{em}}{dt} + \oint_{s'} d^2x'\hat{n}' \cdot M = 0$$

conservation of angular momentum

For radiation beams in free space, the EM field angular momentum $J^{em}$ can be separated into two parts:

$$J^{em} = \varepsilon_0 \int_{V'} d^3x'(E \times A) + \varepsilon_0 \int_{V'} d^3x' E_i[(x'-x_0)\times \nabla] A_i$$

For each singular Fourier mode in real valued representation:

$$J^{em} = -i\frac{\varepsilon_0}{2\omega}\int_{V'} d^3x'(E^* \times E) - i\frac{\varepsilon_0}{2\omega}\int_{V'} d^3x' E_i[(x'-x_0)\times \nabla] E_i$$

The first part is the EM spin angular momentum $S^{em}$, its classical manifestation is wave polarization. And the second part is the EM orbital angular momentum $L^{em}$ its classical manifestation is wave helicity. In general, both EM linear momentum $P^{em}$, and EM angular momentum $J^{em}=L^{em}+S^{em}$ are radiated all the way to the far field.

By using Poynting theorem, the optical vorticity of the signals may be determined according to the optical velocity equation:

$$\frac{\partial U}{\partial t} + \nabla \cdot S = 0, \text{ continuity equation}$$

where S is the Poynting vector $$S = \tfrac{1}{4}(E\times H^* + E^*\times H),$$

and U is the energy density $$U = \tfrac{1}{4}(\varepsilon|E|^2 + \mu_0|H|^2),$$

with E and H comprising the electric field and the magnetic field, respectively, and $\varepsilon$ and $\mu_0$ being the permittivity and the permeability of the medium, respectively. The optical vorticity V may then be determined by the curl of the optical velocity according to the equation:

$$V = \nabla \times v_{opt} = \nabla \times \left(\frac{E\times H^* + E^*\times H}{\varepsilon|E|^2 + \mu_0|H|^2}\right)$$

Figure 17A:
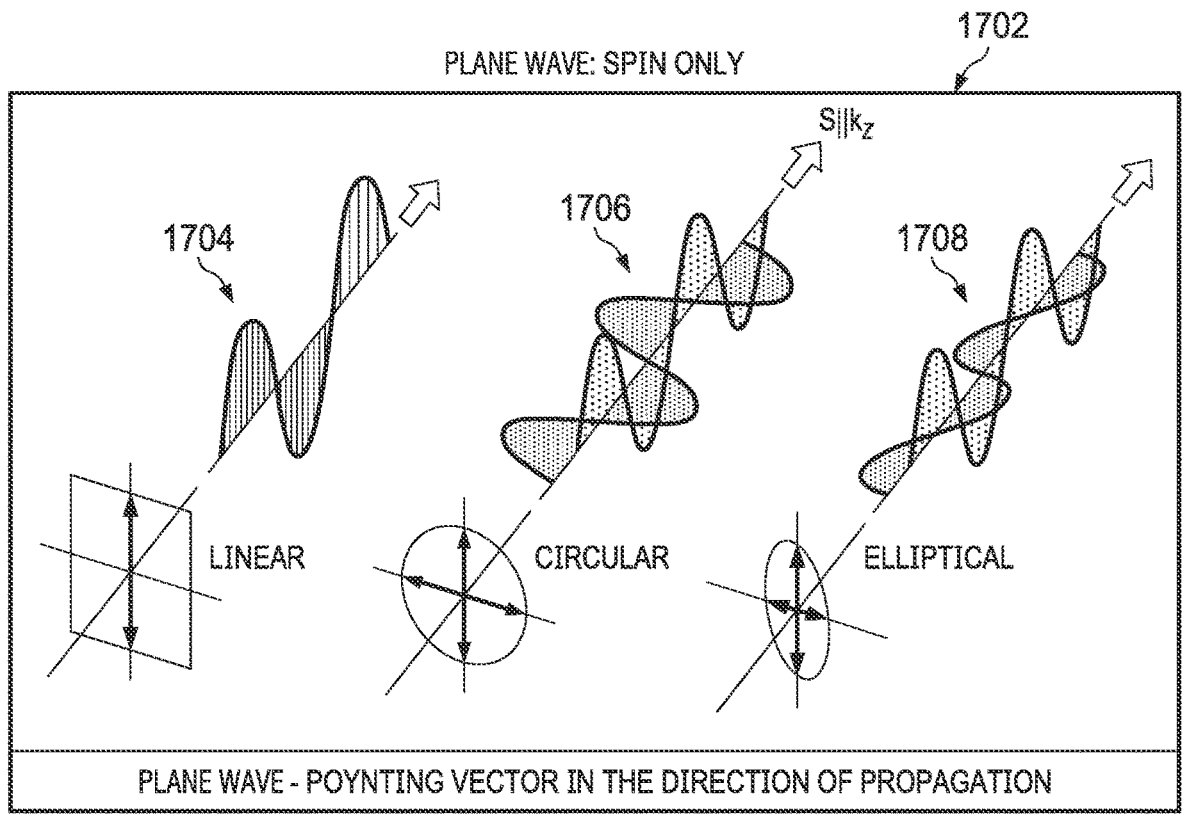
FIG. 17A illustrates a plane wave having only variations in the spin angular momentum.
Figure 17B:
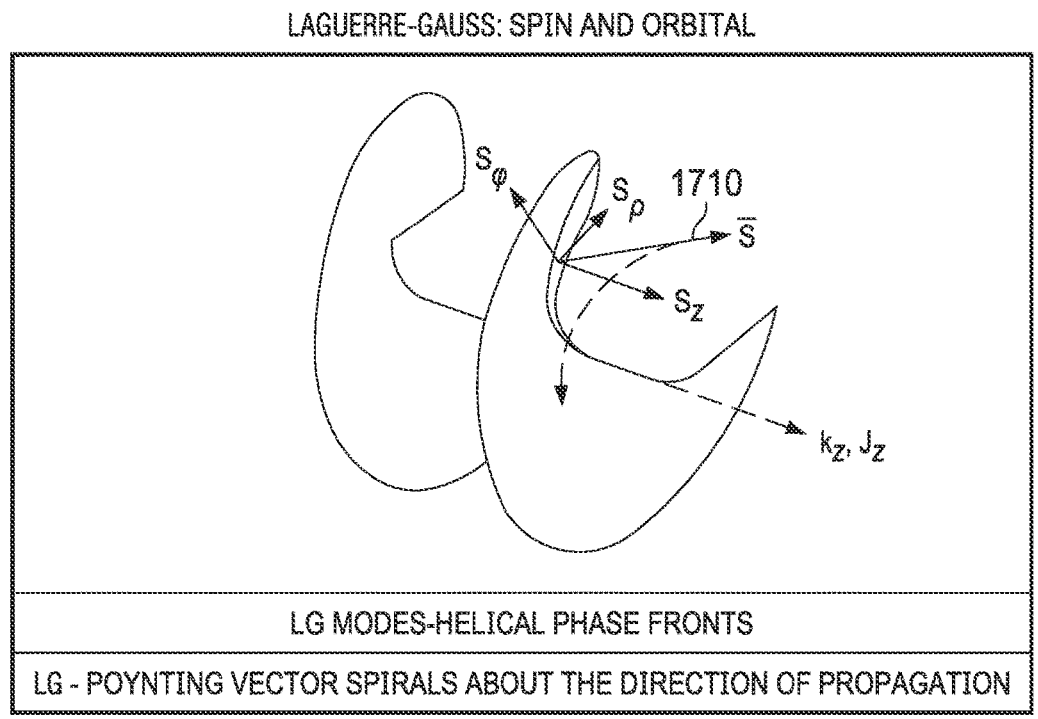
FIG. 17B illustrates a signal having both spin and orbital angular momentum applied thereto.

Referring now to FIGS. 17A and 17B, there is illustrated the manner in which a signal and its associated Poynting vector in a plane wave situation. In the plane wave situation illustrated generally at 1702, the transmitted signal may take one of three configurations. When the electric field vectors are in the same direction, a linear signal is provided, as illustrated generally at 1704. Within a circular polarization 1706, the electric field vectors rotate with the same magnitude. Within the elliptical polarization 1708, the electric field vectors rotate but have differing magnitudes. The Poynting vector remains in a constant direction for the signal configuration to FIG. 17A and always perpendicular to the electric and magnetic fields. Referring now to FIG. 17B, when a unique orbital angular momentum is applied to a signal as described here and above, the Poynting vector S 1710 will spiral about the direction of propagation of the signal. This spiral may be varied in order to enable signals to be transmitted on the same frequency as described herein.

Figure 18A:
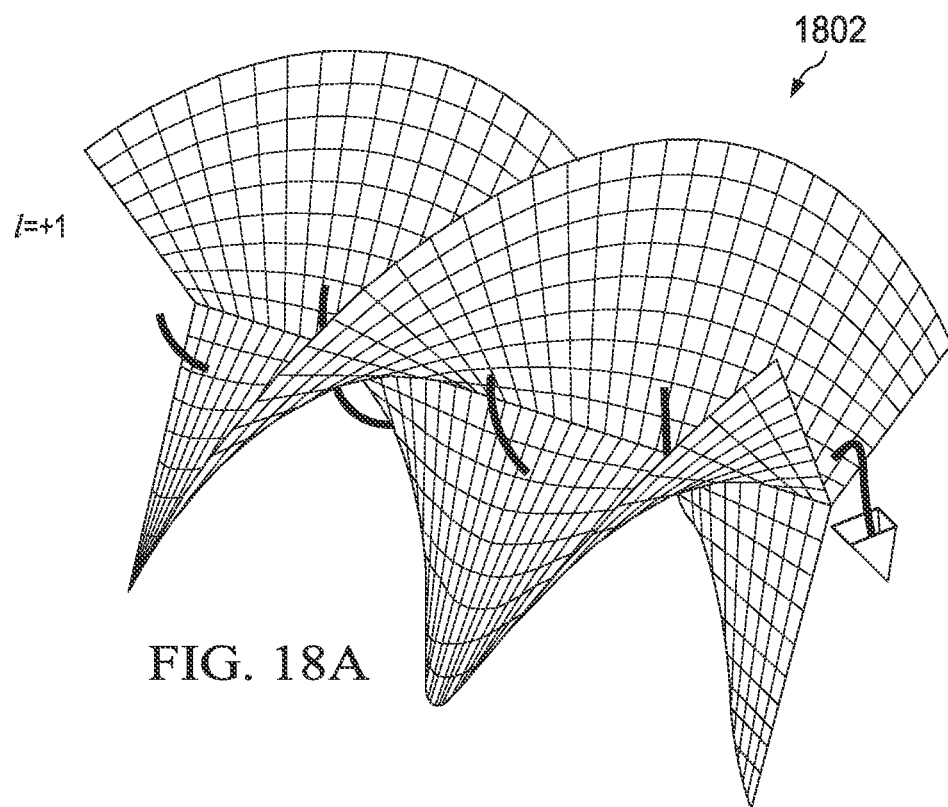
FIGS. 18A-18C illustrate various signals having different orbital angular momentum applied thereto.
Figure 18B:
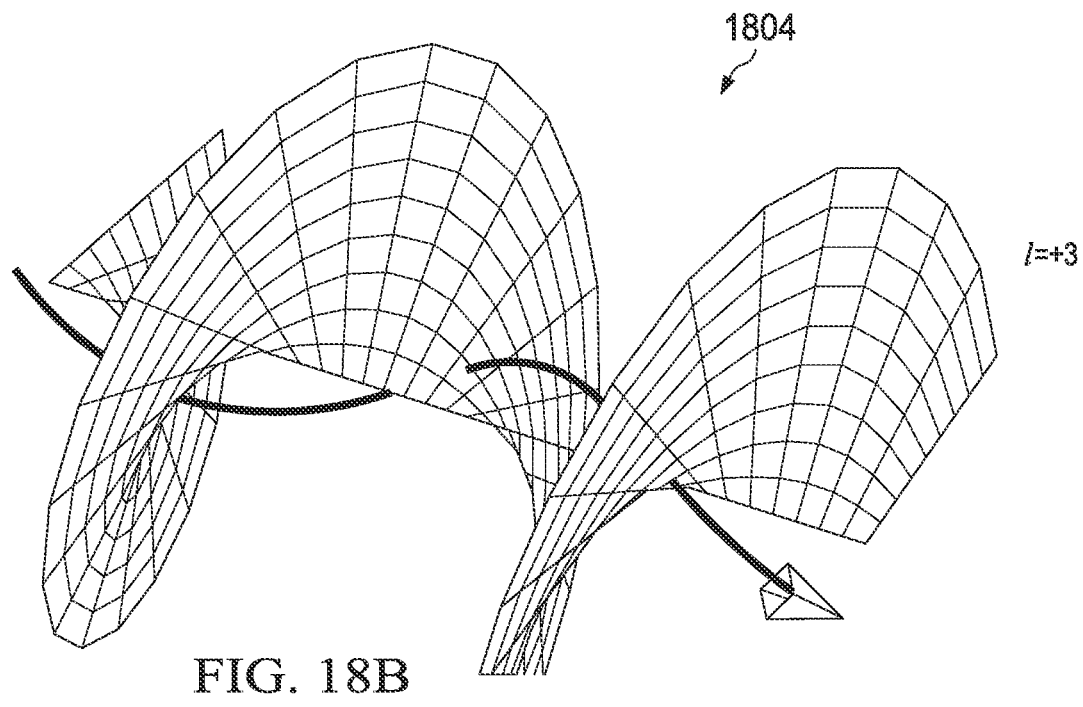
Figure 18C:
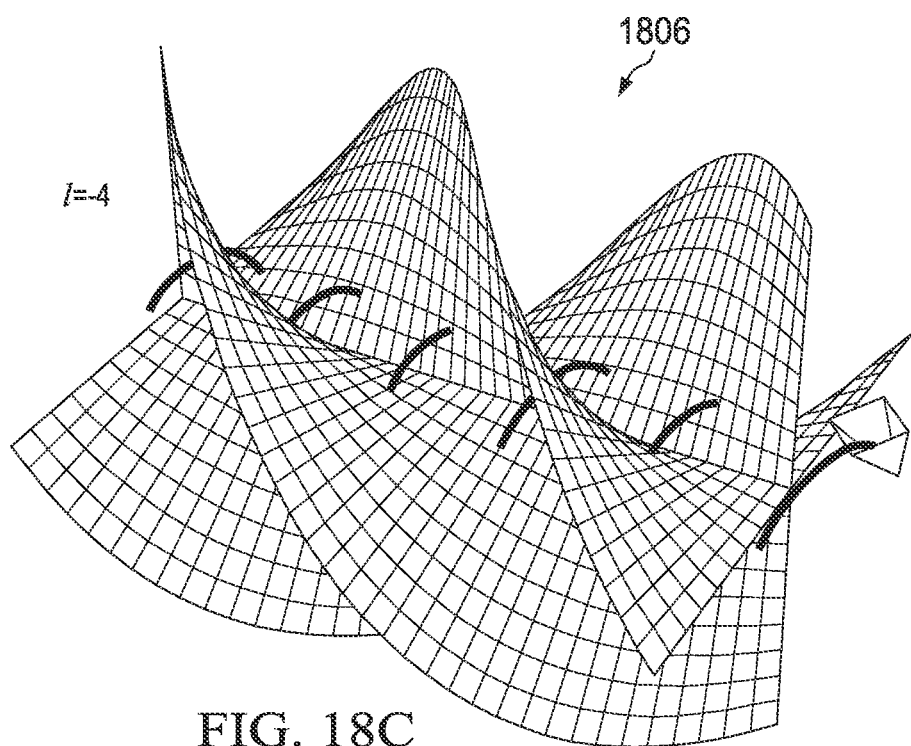

FIGS. 18A through 18C illustrate the differences in signals having different helicity (i.e., orbital angular momentums). Each of the spiraling Poynting vectors associated with the signals 1802, 1804, and 1806 provide a different shaped signal. Signal 1802 has an orbital angular momentum of +1, signal 1804 has an orbital angular momentum of +3, and signal 1806 has an orbital angular momentum of −4. Each signal has a distinct angular momentum and associated Poynting vector enabling the signal to be distinguished from other signals within a same frequency. This allows differing type of information to be transmitted on the same frequency, since these signals are separately detectable and do not interfere with each other (Eigen channels).

Figure 18D:
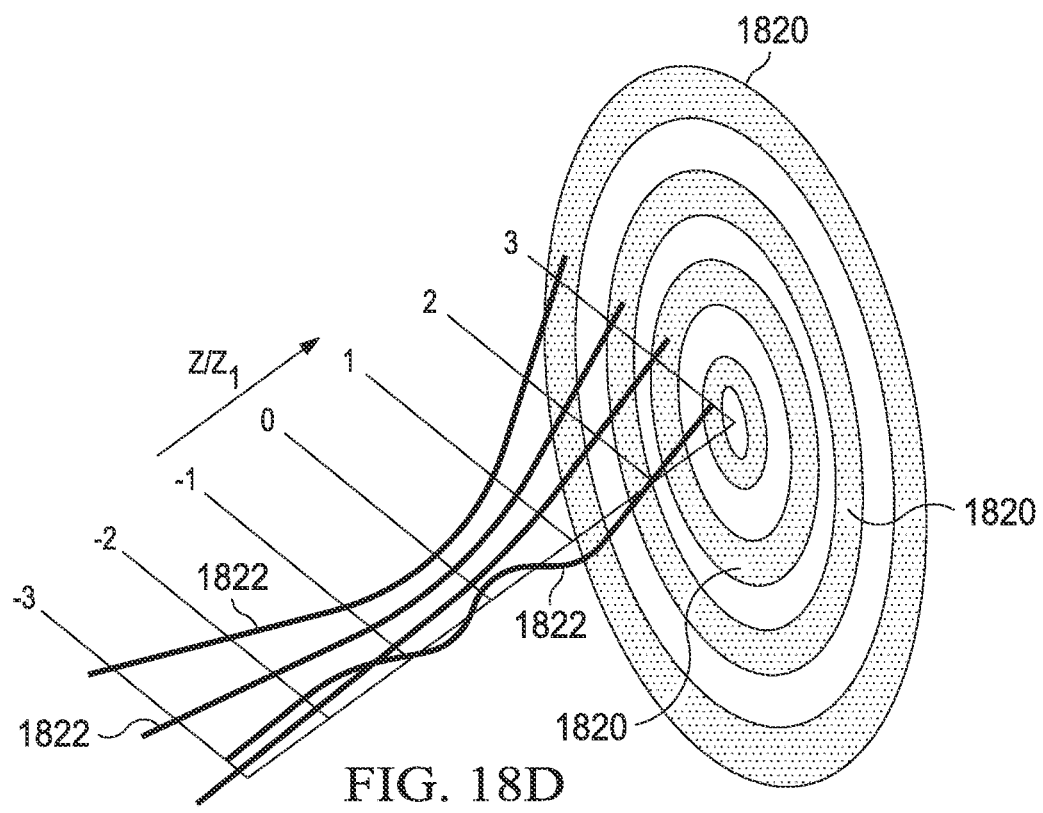
FIG. 18D illustrates a propagation of Poynting vectors for various Eigen modes.

FIG. 18D illustrates the propagation of Poynting vectors for various Eigen modes. Each of the rings 1820 represents a different Eigen mode or twist representing a different orbital angular momentum within the same frequency. Each of these rings 1820 represents a different orthogonal channel. Each of the Eigen modes has a Poynting vector 1822 associated therewith.

Topological charge may be multiplexed to the frequency for either linear or circular polarization. In case of linear polarizations, topological charge would be multiplexed on vertical and horizontal polarization. In case of circular polarization, topological charge would multiplex on left hand and right hand circular polarizations. The topological charge is another name for the helicity index "I" or the amount of twist or OAM applied to the signal. The helicity index may be positive or negative. In RF, different topological charges can be created and muxed together and de-muxed to separate the topological charges.

The topological charges $\ell$ s can be created using Spiral Phase Plates (SPPs) as shown in FIG. 18E using a proper material with specific index of refraction and ability to machine shop or phase mask, holograms created of new materials or a new technique to create an RF version of Spatial Light Modulator (SLM) that does the twist of the RF waves (as opposed to optical beams) by adjusting voltages on the device resulting in twisting of the RF waves with a specific topological charge. Spiral Phase plates can transform a RF plane wave ($\ell$ =0) to a twisted RF wave of a specific helicity (i.e. $\ell$ =+1).

Cross talk and multipath interference can be corrected using RF Multiple-Input-Multiple-Output (MIMO). Most of the channel impairments can be detected using a control or pilot channel and be corrected using algorithmic techniques (closed loop control system).

As described previously with respect to FIG. 13, each of the multiple data streams applied within the processing circuitry has a multiple layer overlay modulation scheme applied thereto.

Figure 19:
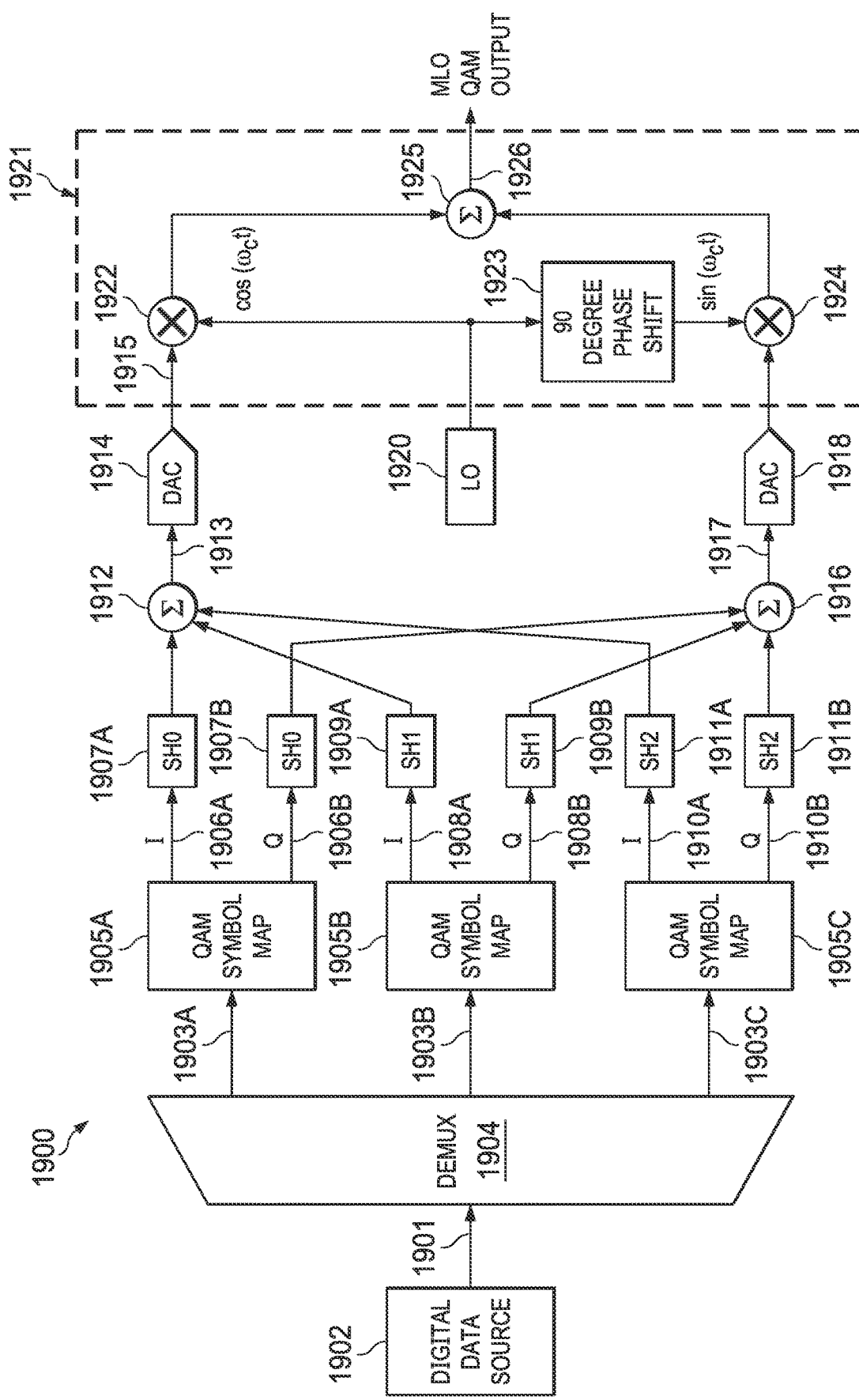
FIG. 19 illustrates a multiple level overlay modulation system.

Referring now to FIG. 19, the reference number 1900 generally indicates an embodiment of a multiple level overlay (MLO) modulation system, although it should be understood that the term MLO and the illustrated system 1900 are examples of embodiments. The MLO system may comprise one such as that disclosed in U.S. Pat. No. 8,503,546 entitled Multiple Layer Overlay Modulation which is incorporated herein by reference. In one example, the modulation system 1900 would be implemented within the multiple level overlay modulation box 1204 of FIG. 12. System 1900 takes as input an input data stream 1901 from a digital source 1902, which is separated into three parallel, separate data streams, 1903A-1903C, of logical 1 s and 0 s by input stage demultiplexer (DEMUX) 1904. Data stream 1901 may represent a data file to be transferred, or an audio or video data stream. It should be understood that a greater or lesser number of separated data streams may be used. In some of the embodiments, each of the separated data streams 1903A-1903C has a data rate of 1/N of the original rate, where N is the number of parallel data streams. In the embodiment illustrated in FIG. 19, N is 3.

Each of the separated data streams 1903A-1903C is mapped to a quadrature amplitude modulation (QAM) symbol in an M-QAM constellation, for example, 16 QAM or 64 QAM, by one of the QAM symbol mappers 1905A-C. The QAM symbol mappers 1905A-C are coupled to respective outputs of DEMUX 1904, and produced parallel in phase (I) 1906A, 1908A, and 1910A and quadrature phase (Q) 1906B, 1908B, and 1910B data streams at discrete levels. For example, in 64 QAM, each I and Q channel uses 8 discrete levels to transmit 3 bits per symbol. Each of the three I and Q pairs, 1906A-1906B, 1908A-1908B, and 1910A-1910B, is used to weight the output of the corresponding pair of function generators 1907A-1907B, 1909A-1909B, and 1911A-1911B, which in some embodiments generate signals such as the modified Hermite polynomials described above and weights them based on the amplitude value of the input symbols. This provides 2 N weighted or modulated signals, each carrying a portion of the data originally from income data stream 1901, and is in place of modulating each symbol in the I and Q pairs, 1906A-1906B, 1908A-1908B, and 1910A-1910B with a raised cosine filter, as would be done for a prior art QAM system. In the illustrated embodiment, three signals are used, SH0, SH1, and SH2, which correspond to modifications of H0, H1, and H2, respectively, although it should be understood that different signals may be used in other embodiments.

The weighted signals are not subcarriers, but rather are sublayers of a modulated carrier, and are combined, superimposed in both frequency and time, using summers 1912 and 1916, without mutual interference in each of the I and Q dimensions, due to the signal orthogonality. Summers 1912 and 1916 act as signal combiners to produce composite signals 1913 and 1917. The weighted orthogonal signals are used for both I and Q channels, which have been processed equivalently by system 1900, and are summed before the QAM signal is transmitted. Therefore, although new orthogonal functions are used, some embodiments additionally use QAM for transmission. Because of the tapering of the signals in the time domain, as will be shown in FIGS. 23A through 23K, the time domain waveform of the weighted signals will be confined to the duration of the symbols. Further, because of the tapering of the special signals and frequency domain, the signal will also be confined to frequency domain, minimizing interface with signals and adjacent channels.

The composite signals 1913 and 1917 are converted to analogue signals 1915 and 1919 using digital to analogue converters 1914 and 1918, and are then used to modulate a carrier signal at the frequency of local oscillator (LO) 1920, using modulator 1921. Modulator 1921 comprises mixers 1922 and 1924 coupled to DACs 1914 and 1918, respectively. Ninety degree phase shifter 1923 converts the signals from LO 1920 into a Q component of the carrier signal. The output of mixers 1922 and 1924 are summed in summer 1925 to produce output signals 1926.

MLO can be used with a variety of transport mediums, such as wire, optical, and wireless, and may be used in conjunction with QAM. This is because MLO uses spectral overlay of various signals, rather than spectral overlap. Bandwidth utilization efficiency may be increased by an order of magnitude, through extensions of available spectral resources into multiple layers. The number of orthogonal signals is increased from 2, cosine and sine, in the prior art, to a number limited by the accuracy and jitter limits of generators used to produce the orthogonal polynomials. In this manner, MLO extends each of the I and Q dimensions of QAM to any multiple access techniques such as GSM, code division multiple access (CDMA), wide band CDMA (WCDMA), high speed downlink packet access (HSPDA), evolution-data optimized (EV-DO), orthogonal frequency division multiplexing (OFDM), world-wide interoperability for microwave access (WIMAX), and long term evolution (LTE) systems. MLO may be further used in conjunction with other multiple access (MA) schemes such as frequency division duplexing (FDD), time division duplexing (TDD), frequency division multiple access (FDMA), and time division multiple access (TDMA). Overlaying individual orthogonal signals over the same frequency band allows creation of a virtual bandwidth wider than the physical bandwidth, thus adding a new dimension to signal processing. This modulation is applicable to twisted pair, cable, fiber optic, satellite, broadcast, free-space optics, and all types of wireless access. The method and system are compatible with many current and future multiple access systems, including EV-DO, UMB, WIMAX, WCDMA (with or without), multimedia broadcast multicast service (MBMS)/ multiple input multiple output (MIMO), HSPA evolution, and LTE.

Figure 20:
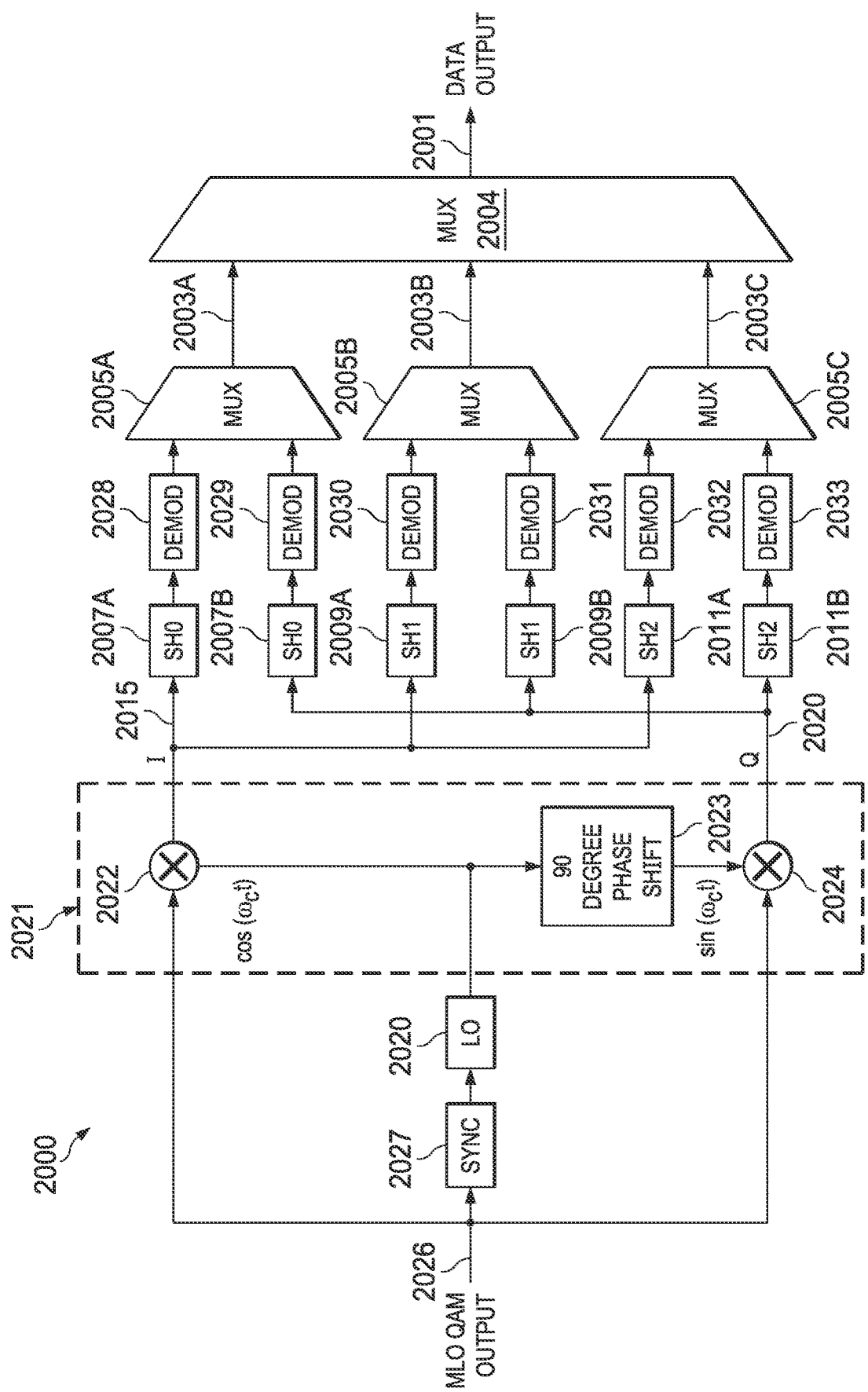
FIG. 20 illustrates a multiple level overlay demodulator.

Referring now to FIG. 20, an MLO demodulator 2000 is illustrated, although it should be understood that the term MLO and the illustrated system 2000 are examples of embodiments. The demodulator 2000 takes as input an MLO signal 2026 which may be similar to output signal 1926 from system 1900. Synchronizer 2027 extracts phase information, which is input to local oscillator 2020 to maintain coherence so that the modulator 2021 can produce base band to analogue I signal 2015 and Q signal 2019. The modulator 2021 comprises mixers 2022 and 2024, which, coupled to LO 2020 through 90 degree phase shifter 2023. I signal 2015 is input to each of signal filters 2007A, 2009A, and 2011A, and Q signal 2019 is input to each of signal filters 2007B, 2009B, and 2011B. Since the orthogonal functions are known, they can be separated using correlation or other techniques to recover the modulated data. Information in each of the I and Q signals 2015 and 2019 can be extracted from the overlapped functions which have been summed within each of the symbols because the functions are orthogonal in a correlative sense.

In some embodiments, signal filters 2007A-2007B, 2009A-2009B, and 2011A-2011B use locally generated replicas of the polynomials as known signals in match filters. The outputs of the match filters are the recovered data bits, for example, equivalence of the QAM symbols 1906A-1906B, 1908A-1908B, and 1910A-1910B of system 1900. Signal filters 2007A-2007B, 2009A-2009B, and 2011A-2011B produce 2n streams of n, I, and Q signal pairs, which are input into demodulators 2028-2033. Demodulators 2028-2033 integrate the energy in their respective input signals to determine the value of the QAM symbol, and hence the logical 1 s and 0 s data bit stream segment represented by the determined symbol. The outputs of the demodulators 2028-2033 are then input into multiplexers (MUXs) 2005A-2005C to generate data streams 2003A-2003C. If system 2000 is demodulating a signal from system 1900, data streams 2003A-2003C correspond to data streams 1903A-1903C. Data streams 2003A-2003C are multiplexed by MUX 2004 to generate data output stream 2001. In summary, MLO signals are overlayed (stacked) on top of one another on transmitter and separated on receiver.

MLO may be differentiated from CDMA or OFDM by the manner in which orthogonality among signals is achieved. MLO signals are mutually orthogonal in both time and frequency domains, and can be overlaid in the same symbol time bandwidth product. Orthogonality is attained by the correlation properties, for example, by least sum of squares, of the overlaid signals. In comparison, CDMA uses orthogonal interleaving or displacement of signals in the time domain, whereas OFDM uses orthogonal displacement of signals in the frequency domain.

Bandwidth efficiency may be increased for a channel by assigning the same channel to multiple users. This is feasible if individual user information is mapped to special orthogonal functions. CDMA systems overlap multiple user information and views time intersymbol orthogonal code sequences to distinguish individual users, and OFDM assigns unique signals to each user, but which are not overlaid, are only orthogonal in the frequency domain. Neither CDMA nor OFDM increases bandwidth efficiency. CDMA uses more bandwidth than is necessary to transmit data when the signal has a low signal to noise ratio (SNR). OFDM spreads data over many subcarriers to achieve superior performance in multipath radiofrequency environments. OFDM uses a cyclic prefix OFDM to mitigate multipath effects and a guard time to minimize intersymbol interference (ISI), and each channel is mechanistically made to behave as if the transmitted waveform is orthogonal. (Sync function for each subcarrier in frequency domain.)

In contrast, MLO uses a set of functions which effectively form an alphabet that provides more usable channels in the same bandwidth, thereby enabling high bandwidth efficiency. Some embodiments of MLO do not require the use of cyclic prefixes or guard times, and therefore, outperforms OFDM in spectral efficiency, peak to average power ratio, power consumption, and requires fewer operations per bit. In addition, embodiments of MLO are more tolerant of amplifier nonlinearities than are CDMA and OFDM systems.

Figure 21:
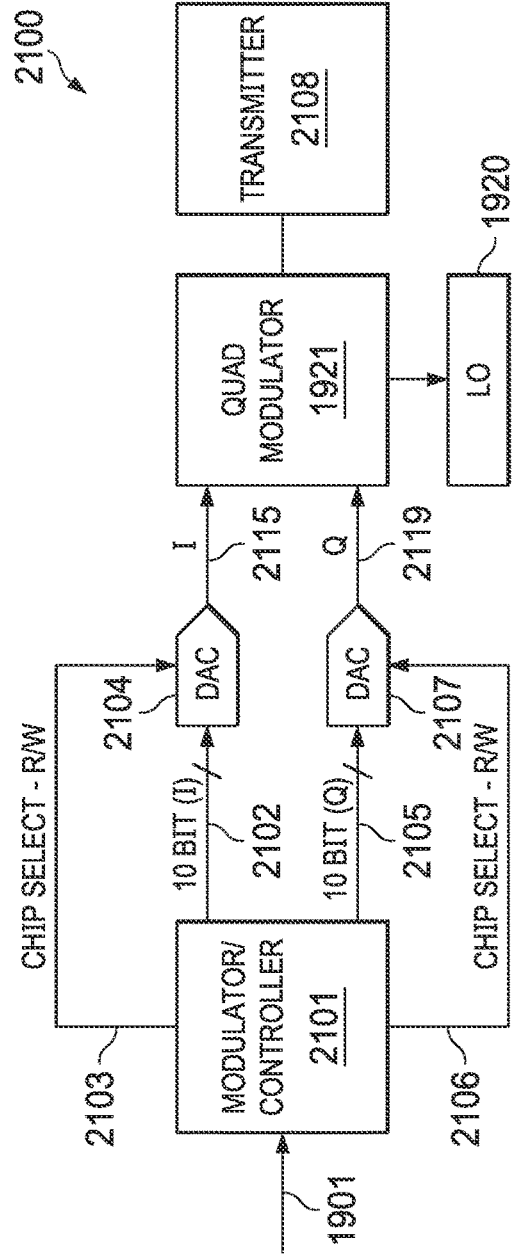
FIG. 21 illustrates a multiple level overlay transmitter system.

FIG. 21 illustrates an embodiment of an MLO transmitter system 2100, which receives input data stream 1901. System 2100 represents a modulator/controller 2101, which incorporates equivalent functionality of DEMUX 1904, QAM symbol mappers 1905A-C, function generators 1907A-1907B, 1909A-1909B, and 1911A-1911B, and summers 1912 and 1916 of system 1900, shown in FIG. 19. However, it should be understood that modulator/controller 2101 may use a greater or lesser quantity of signals than the three illustrated in system 1900. Modulator/controller 2101 may comprise an application specific integrated circuit (ASIC), a field programmable gate array (FPGA), and/or other components, whether discrete circuit elements or integrated into a single integrated circuit (IC) chip.

Modulator/controller 2101 is coupled to DACs 2104 and 2107, communicating a 10 bit I signal 2102 and a 10 bit Q signal 2105, respectively. In some embodiments, I signal 2102 and Q signal 2105 correspond to composite signals 1913 and 1917 of system 1900. It should be understood, however, that the 10 bit capacity of I signal 2102 and Q signal 2105 is merely representative of an embodiment. As illustrated, modulator/controller 2101 also controls DACs 2104 and 2107 using control signals 2103 and 2106, respectively. In some embodiments, DACs 2104 and 2107 each comprise an AD5433, complementary metal oxide semiconductor (CMOS) 10 bit current output DAC. In some embodiments, multiple control signals are sent to each of DACs 2104 and 2107.

DACs 2104 and 2107 output analogue signals 2115 and 2119 to quadrature modulator 1921, which is coupled to LO 1920. The output of modulator 1921 is illustrated as coupled to a transmitter 2108 to transmit data wirelessly, although in some embodiments, modulator 1921 may be coupled to a fiber-optic modem, a twisted pair, a coaxial cable, or other suitable transmission media.

Figure 22:
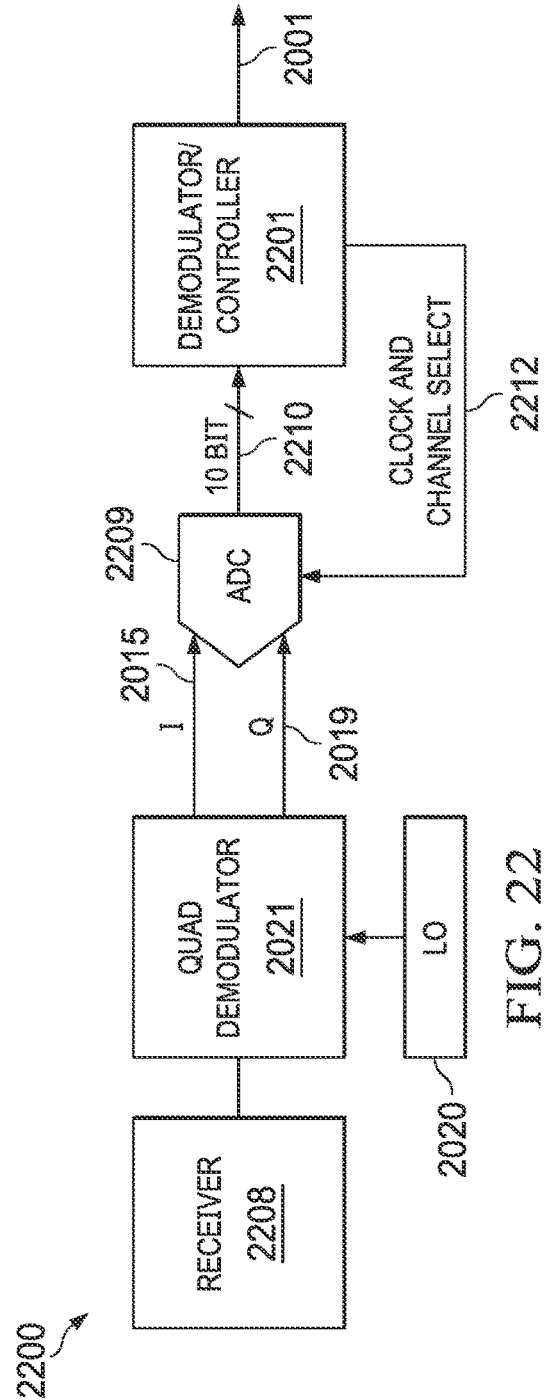
FIG. 22 illustrates a multiple level overlay receiver system.

FIG. 22 illustrates an embodiment of an MLO receiver system 2200 capable of receiving and demodulating signals from system 2100. System 2200 receives an input signal from a receiver 2208 that may comprise input medium, such as RF, wired or optical. The modulator 2021 driven by LO 2020 converts the input to baseband I signal 2015 and Q signal 2019. I signal 2015 and Q signal 2019 are input to analogue to digital converter (ADC) 2209.

ADC 2209 outputs 10 bit signal 2210 to demodulator/controller 2201 and receives a control signal 2212 from demodulator/controller 2201. Demodulator/controller 2201 may comprise an application specific integrated circuit (ASIC), a field programmable gate array (FPGA), and/or other components, whether discrete circuit elements or integrated into a single integrated circuit (IC) chip. Demodulator/controller 2201 correlates received signals with locally generated replicas of the signal set used, in order to perform demodulation and identify the symbols sent. Demodulator/controller 2201 also estimates frequency errors and recovers the data clock, which is used to read data from the ADC 2209. The clock timing is sent back to ADC 2209 using control signal 2212, enabling ADC 2209 to segment the digital I and Q signals 2015 and 2019. In some embodiments, multiple control signals are sent by demodulator/controller 2201 to ADC 2209. Demodulator/controller 2201 also outputs data signal 2001.

Hermite polynomials are a classical orthogonal polynomial sequence, which are the Eigenstates of a quantum harmonic oscillator. Signals based on Hermite polynomials possess the minimal time-bandwidth product property described above, and may be used for embodiments of MLO systems. However, it should be understood that other signals may also be used, for example orthogonal polynomials such as Jacobi polynomials, Gegenbauer polynomials, Legendre polynomials, Chebyshev polynomials, and Laguerre polynomials. Q-functions are another class of functions that can be employed as a basis for MLO signals.

In quantum mechanics, a coherent state is a state of a quantum harmonic oscillator whose dynamics most closely resemble the oscillating behavior of a classical harmonic oscillator system. A squeezed coherent state is any state of the quantum mechanical Hilbert space, such that the uncertainty principle is saturated. That is, the product of the corresponding two operators takes on its minimum value. In embodiments of an MLO system, operators correspond to time and frequency domains wherein the time-bandwidth product of the signals is minimized. The squeezing property of the signals allows scaling in time and frequency domain simultaneously, without losing mutual orthogonality among the signals in each layer. This property enables flexible implementations of MLO systems in various communications systems.

Because signals with different orders are mutually orthogonal, they can be overlaid to increase the spectral efficiency of a communication channel. For example, when n=0, the optimal baseband signal will have a time-bandwidth product of 1/2, which is the Nyquist Inter-Symbol Interference (ISI) criteria for avoiding ISI. However, signals with time-bandwidth products of 3/2, 5/2, 7/2, and higher, can be overlaid to increase spectral efficiency.

An embodiment of an MLO system uses functions based on modified Hermite polynomials, 4n, and are defined by:

$$\psi_n(t, \xi) = \frac{(\tanh\xi)^{n/2}}{2^{n/2}(n!\cosh\xi)^{1/2}} e^{\frac{1}{2}t^2[1-\tanh\xi]} H_n\left(\frac{t}{\sqrt{2\cosh\xi\sinh\xi}}\right)$$

where t is time, and $\xi$ is a bandwidth utilization parameter. Plots of $\Psi_n$ for n ranging from 0 to 9, along with their Fourier transforms (amplitude squared), are shown in FIGS. 5A-5K. The orthogonality of different orders of the functions may be verified by integrating:

$$\iint \psi_n(t,\xi)\psi_m(t,\xi)dtd\xi$$

The Hermite polynomial is defined by the contour integral:

$$H_n(z) = \frac{n!}{2\pi i} \oint e^{-t^2+2tz} t^{-n-1} dt,$$

where the contour encloses the origin and is traversed in a counterclockwise direction. Hermite polynomials are described in Mathematical Methods for Physicists, by George Arfken, for example on page 416, the disclosure of which is incorporated by reference.

Figure 23A:
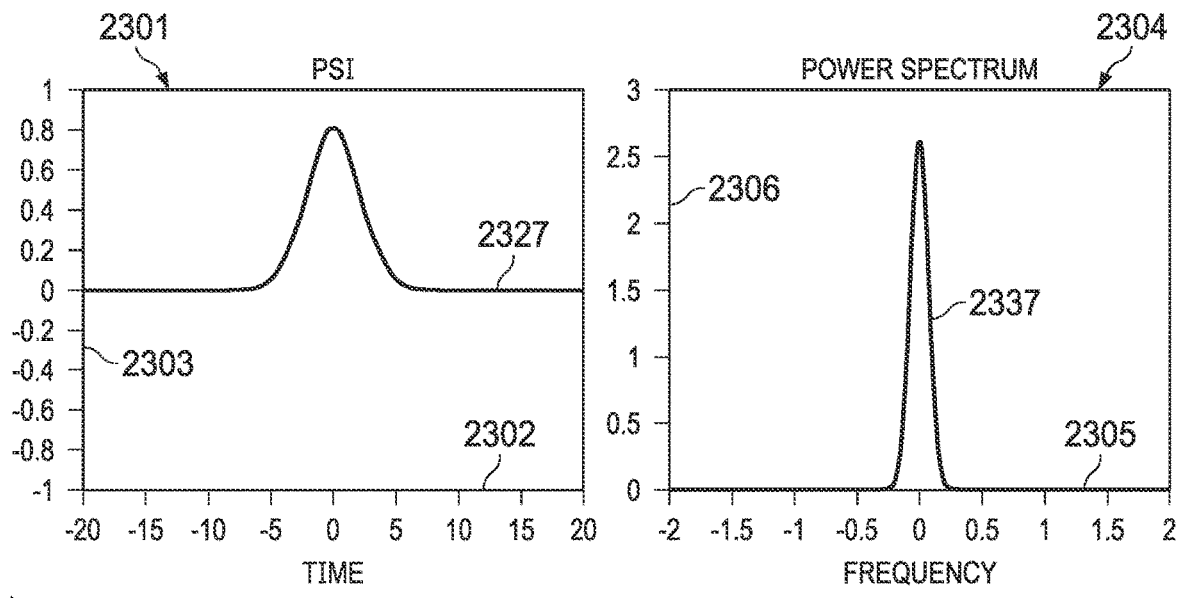
FIGS. 23A-23K illustrate representative multiple level overlay signals and their respective spectral power densities.
Figure 23B:
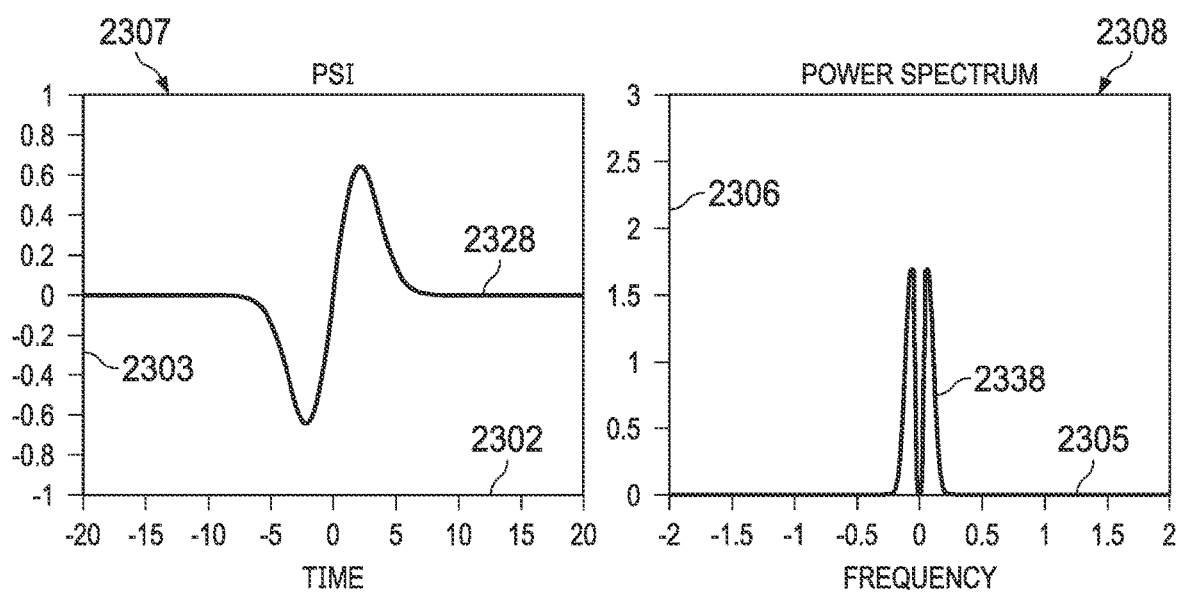
Figure 23C:
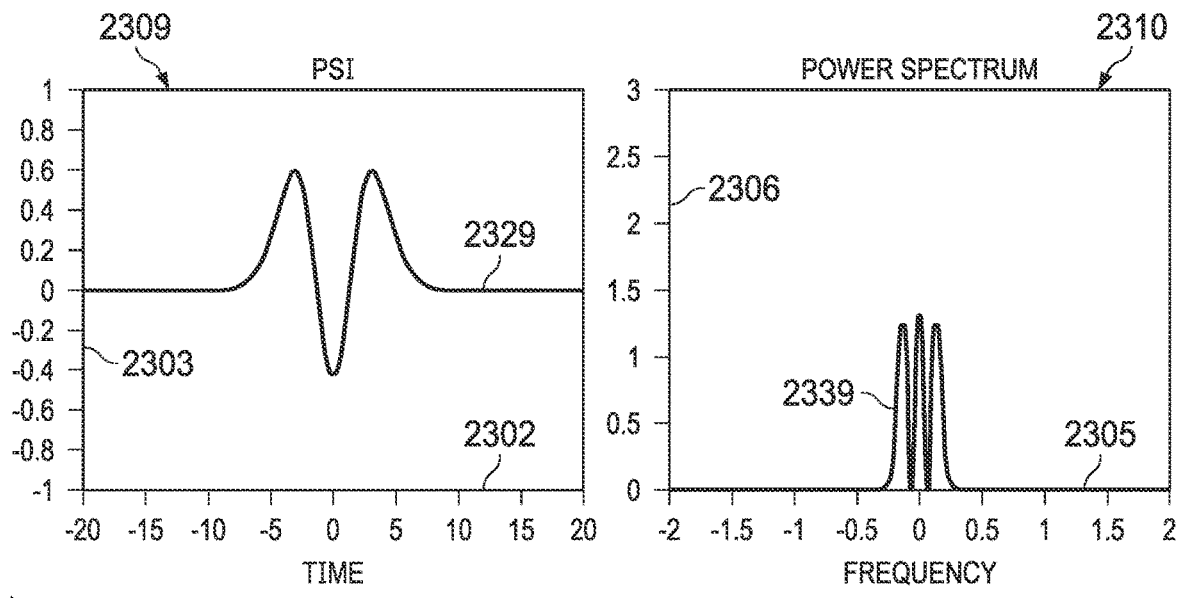
Figure 23D:
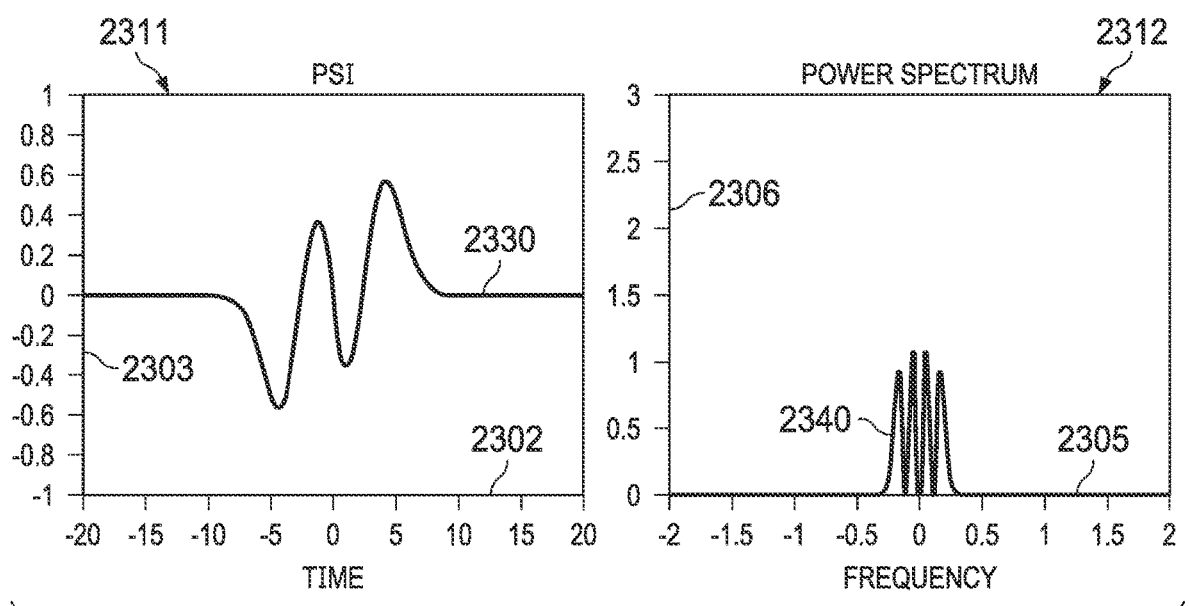
Figure 23E:
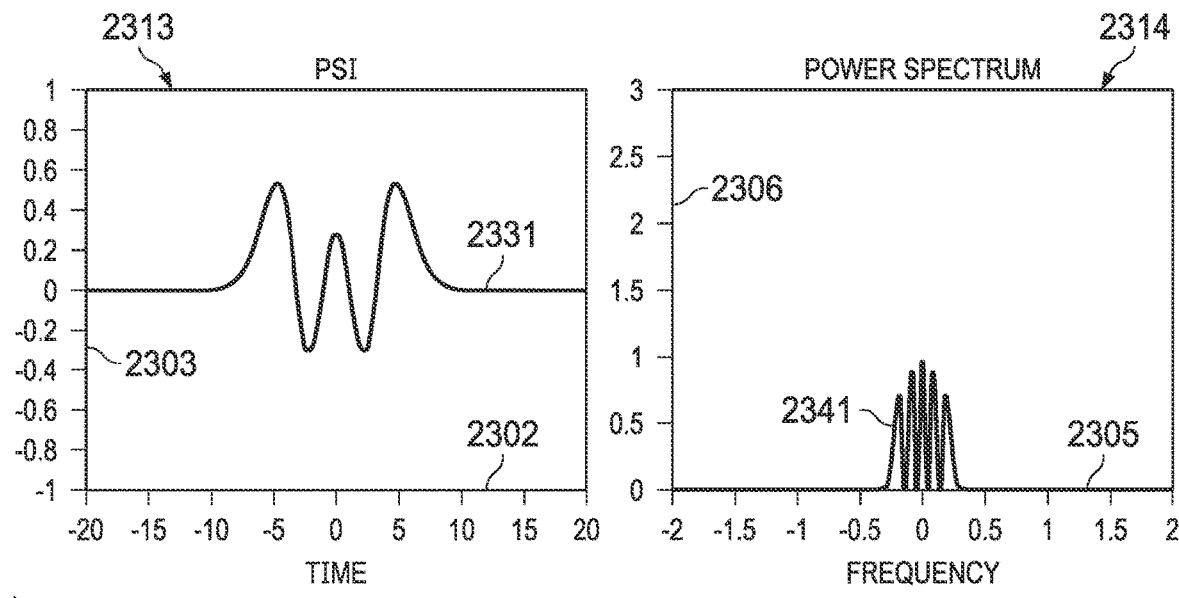
Figure 23F:
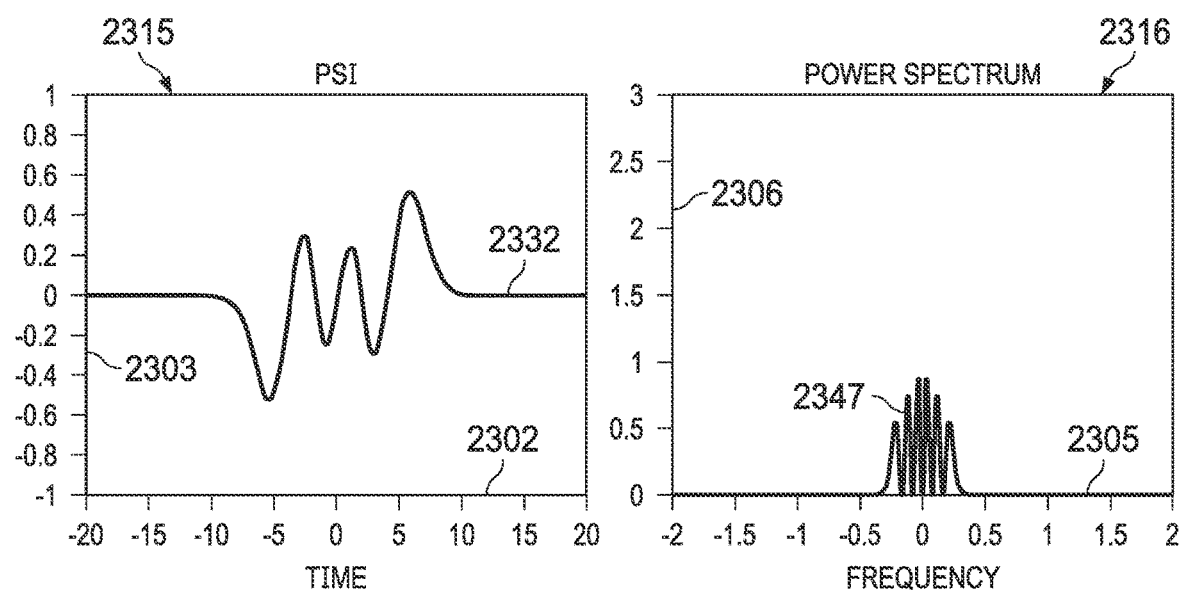
Figure 23G:
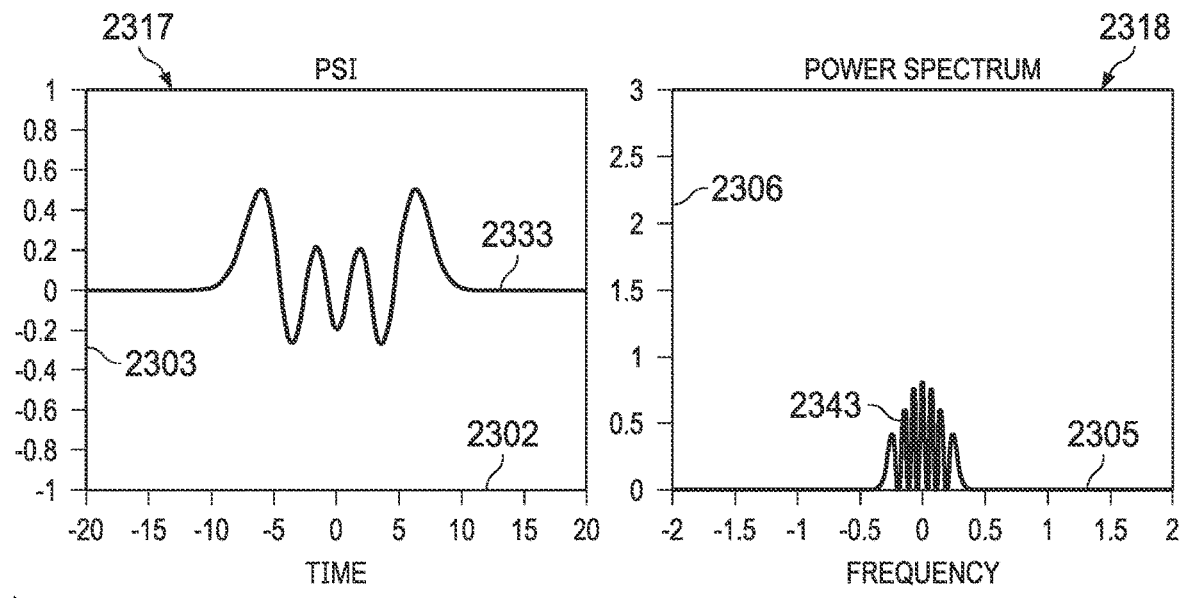
Figure 23H:
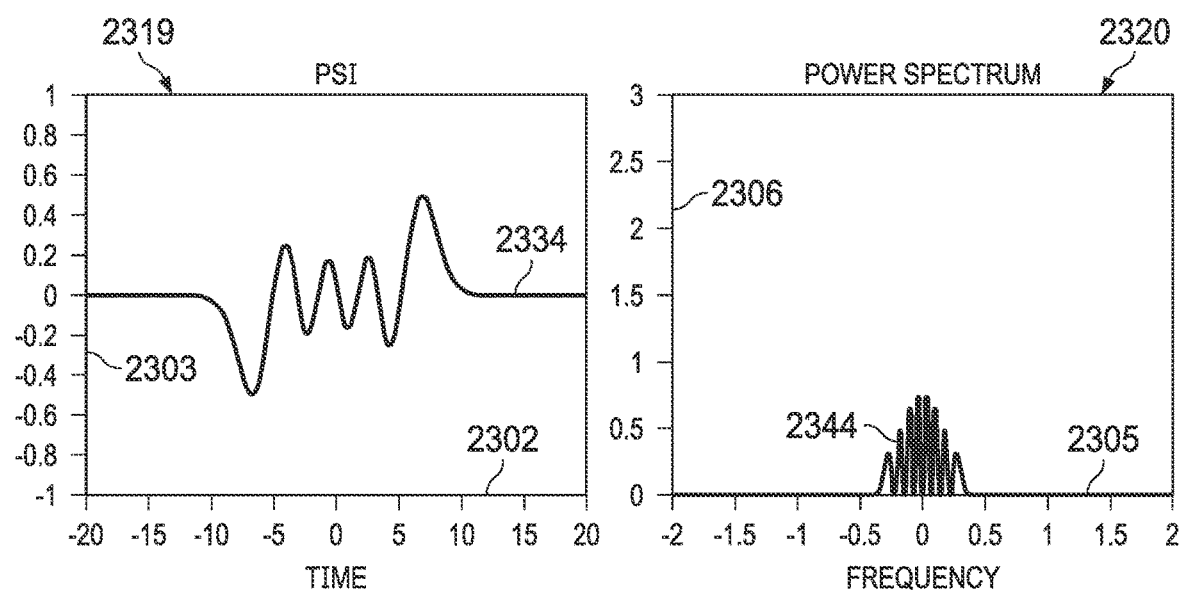
Figure 23I:
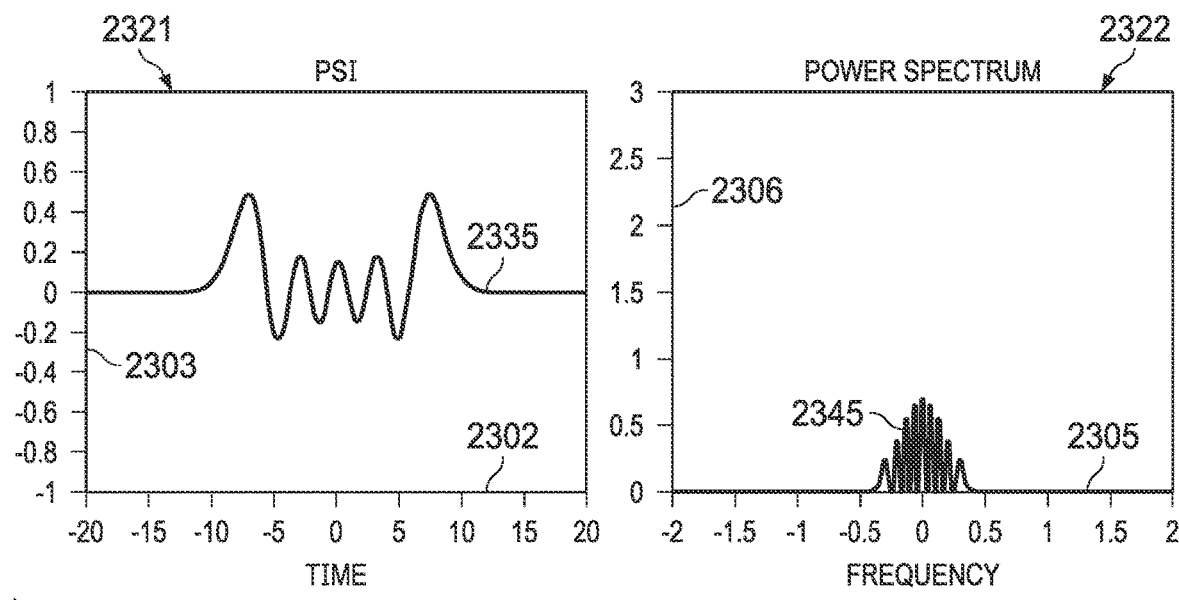
Figure 23J:
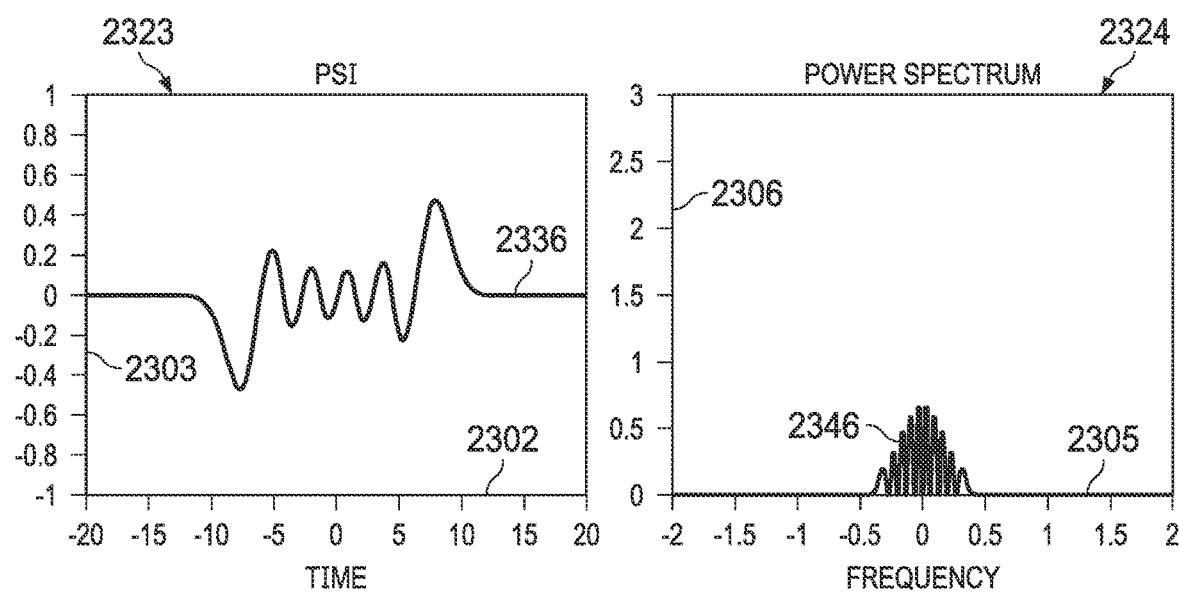

FIGS. 23A-23K illustrate representative MLO signals and their respective spectral power densities based on the modified Hermite polynomials $\Psi_n$ for n ranging from 0 to 9. FIG. 23A shows plots 2301 and 2304. Plot 2301 comprises a curve 2327 representing $\Psi_0$ plotted against a time axis 2302 and an amplitude axis 2303. As can be seen in plot 2301, curve 2327 approximates a Gaussian curve. Plot 2304 comprises a curve 2337 representing the power spectrum of $\Psi_0$ plotted against a frequency axis 2305 and a power axis 2306. As can be seen in plot 2304, curve 2337 also approximates a Gaussian curve. Frequency domain curve 2307 is generated using a Fourier transform of time domain curve 2327. The units of time and frequency on axis 2302 and 2305 are normalized for baseband analysis, although it should be understood that since the time and frequency units are related by the Fourier transform, a desired time or frequency span in one domain dictates the units of the corresponding curve in the other domain. For example, various embodiments of MLO systems may communicate using symbol rates in the megahertz (MHz) or gigahertz (GHz) ranges and the non-0 duration of a symbol represented by curve 2327, i.e., the time period at which curve 2327 is above 0 would be compressed to the appropriate length calculated using the inverse of the desired symbol rate. For an available bandwidth in the megahertz range, the non-0 duration of a time domain signal will be in the microsecond range.

FIGS. 23B-23J show plots 2307-2324, with time domain curves 2328-2336 representing $\Psi_1$ through $\Psi_9$, respectively, and their corresponding frequency domain curves 2338-2346. As can be seen in FIGS. 23A-23J, the number of peaks in the time domain plots, whether positive or negative, corresponds to the number of peaks in the corresponding frequency domain plot. For example, in plot 2323 of FIG. 23J, time domain curve 2336 has five positive and five negative peaks. In corresponding plot 2324 therefore, frequency domain curve 2346 has ten peaks.

Figure 23K:
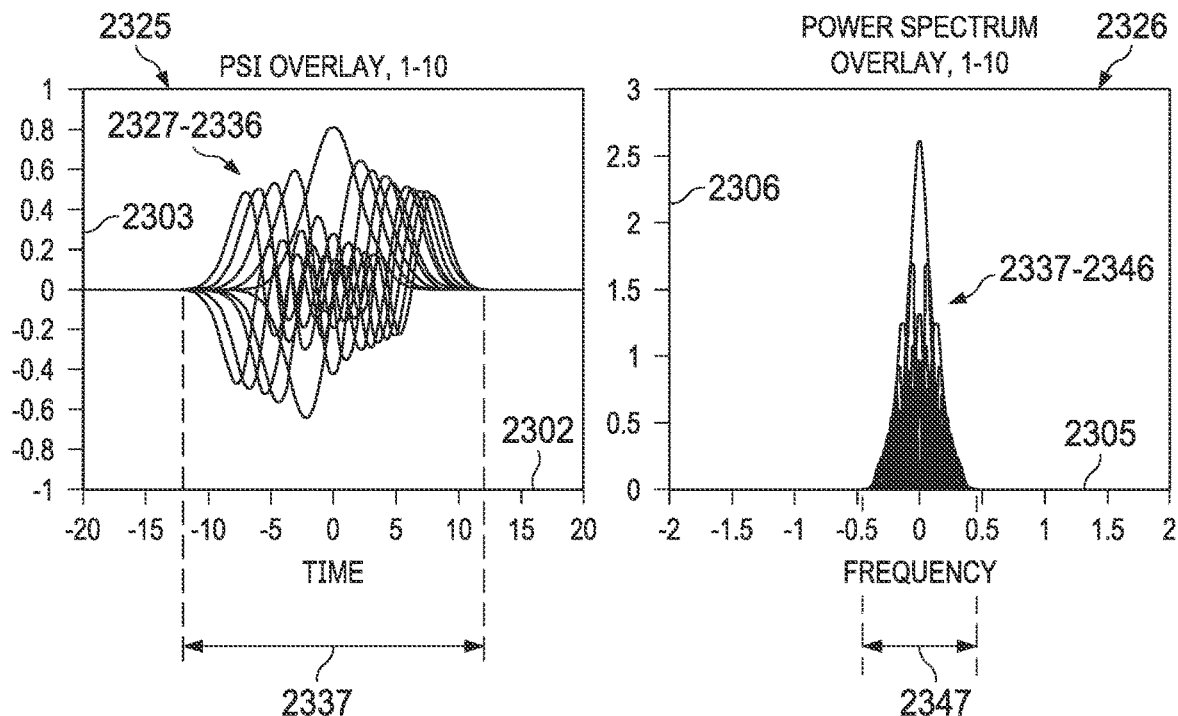

FIG. 23K shows overlay plots 2325 and 2326, which overlay curves 2327-2336 and 2337-2346, respectively. As indicated in plot 2325, the various time domain curves have different durations. However, in some embodiments, the non-zero durations of the time domain curves are of similar lengths. For an MLO system, the number of signals used represents the number of overlays and the improvement in spectral efficiency. It should be understood that, while ten signals are disclosed in FIGS. 23A-23K, a greater or lesser quantity of signals may be used, and that further, a different set of signals, rather than the $\Psi_n$ signals plotted, may be used.

MLO signals used in a modulation layer have minimum time-bandwidth products, which enable improvements in spectral efficiency, and are quadratically integrable. This is accomplished by overlaying multiple demultiplexed parallel data streams, transmitting them simultaneously within the same bandwidth. The key to successful separation of the overlaid data streams at the receiver is that the signals used within each symbols period are mutually orthogonal. MLO overlays orthogonal signals within a single symbol period. This orthogonality prevents ISI and inter-carrier interference (ICI).

Because MLO works in the baseband layer of signal processing, and some embodiments use QAM architecture, conventional wireless techniques for optimizing air interface, or wireless segments, to other layers of the protocol stack will also work with MLO. Techniques such as channel diversity, equalization, error correction coding, spread spectrum, interleaving and space-time encoding are applicable to MLO. For example, time diversity using a multipath-mitigating rake receiver can also be used with MLO. MLO provides an alternative for higher order QAM, when channel conditions are only suitable for low order QAM, such as in fading channels. MLO can also be used with CDMA to extend the number of orthogonal channels by overcoming the Walsh code limitation of CDMA. MLO can also be applied to each tone in an OFDM signal to increase the spectral efficiency of the OFDM systems.

Embodiments of MLO systems amplitude modulate a symbol envelope to create sub-envelopes, rather than sub-carriers. For data encoding, each sub-envelope is independently modulated according to N-QAM, resulting in each sub-envelope independently carrying information, unlike OFDM. Rather than spreading information over many sub-carriers, as is done in OFDM, for MLO, each sub-envelope of the carrier carries separate information. This information can be recovered due to the orthogonality of the sub-envelopes defined with respect to the sum of squares over their duration and/or spectrum. Pulse train synchronization or temporal code synchronization, as needed for CDMA, is not an issue, because MLO is transparent beyond the symbol level. MLO addresses modification of the symbol, but since CDMA and TDMA are spreading techniques of multiple symbol sequences over time. MLO can be used along with CDMA and TDMA.

Figure 24:
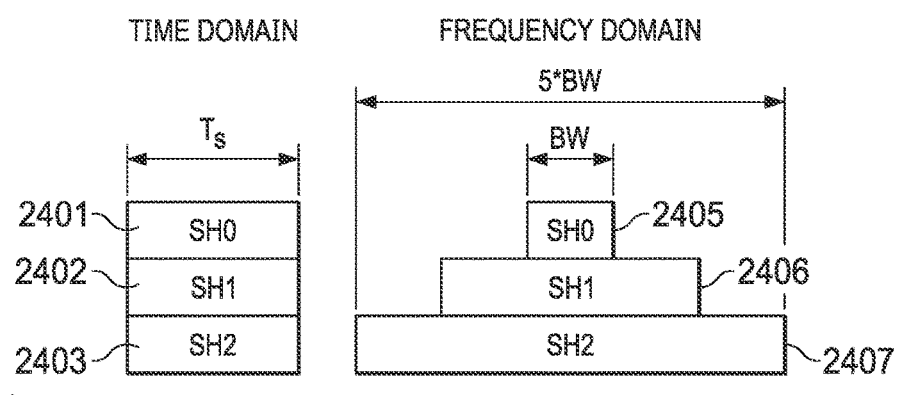
FIG. 24 illustrates comparisons of multiple level overlay signals within the time and frequency domain.

FIG. 24 illustrates a comparison of MLO signal widths in the time and frequency domains. Time domain envelope representations 2401-2403 of signals SH0-SH3 are illustrated as all having a duration $T_S$. SH0-SH3 may represent $PSI_0$-$PSI_2$, or may be other signals. The corresponding frequency domain envelope representations are 2405-2407, respectively. SH0 has a bandwidth BW, SH1 has a bandwidth three times BW, and SH2 has a bandwidth of 5 BW, which is five times as great as that of SH0. The bandwidth used by an MLO system will be determined, at least in part, by the widest bandwidth of any of the signals used. If each layer uses only a single signal type within identical time windows, the spectrum will not be fully utilized, because the lower order signals will use less of the available bandwidth than is used by the higher order signals.

Figure 25:
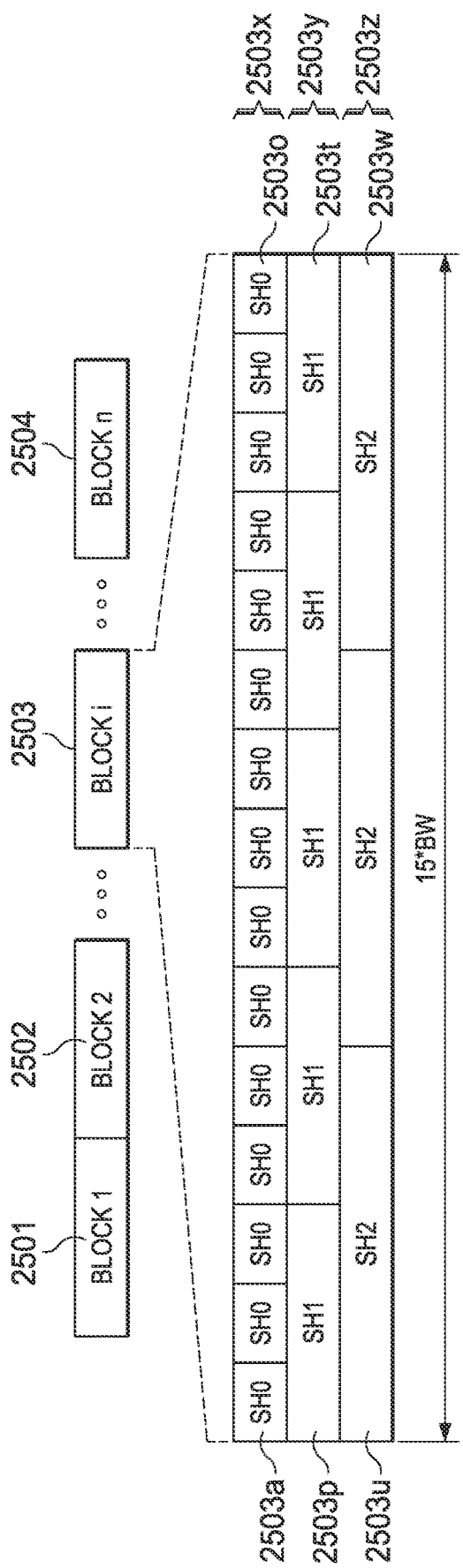
FIG. 25 illustrates a spectral alignment of multiple level overlay signals for differing bandwidths of signals.

FIG. 25 illustrates a spectral alignment of MLO signals that accounts for the differing bandwidths of the signals, and makes spectral usage more uniform, using SH0-SH3. Blocks 2501-2504 are frequency domain blocks of an OFDM signal with multiple subcarriers. Block 2503 is expanded to show further detail. Block 2503 comprises a first layer 2503x comprised of multiple SH0 envelopes 2503a-2503o. A second layer 2503y of SH1 envelopes 2503p-2503t has one third the number of envelopes as the first layer. In the illustrated example, first layer 2503x has 15 SH0 envelopes, and second layer 2503y has five SH1 envelopes. This is because, since the SH1 bandwidth envelope is three times as wide as that of SH0, 15 SH0 envelopes occupy the same spectral width as five SH1 envelopes. The third layer 2503z of block 2503 comprises three SH2 envelopes 2503u-2503w, because the SH2 envelope is five times the width of the SH0 envelope.

The total required bandwidth for such an implementation is a multiple of the least common multiple of the bandwidths of the MLO signals. In the illustrated example, the least common multiple of the bandwidth required for SH0, SH1, and SH2 is 15 BW, which is a block in the frequency domain. The OFDM-MLO signal can have multiple blocks, and the spectral efficiency of this illustrated implementation is proportional to (15+5+3)/15.

Figure 26:
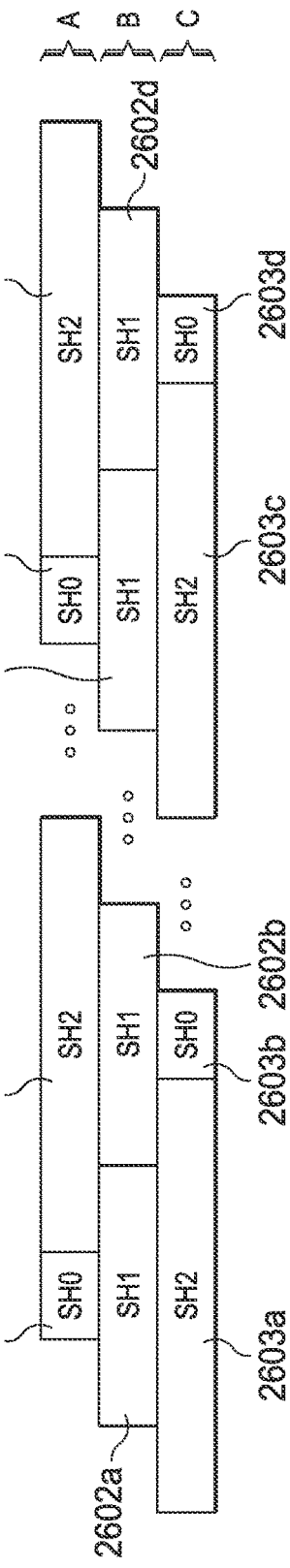
FIG. 26 illustrates an alternative spectral alignment of multiple level overlay signals.

FIG. 26 illustrates another spectral alignment of MLO signals, which may be used alternatively to alignment scheme shown in FIG. 25. In the embodiment illustrated in FIG. 26, the OFDM-MLO implementation stacks the spectrum of SH0, SH1, and SH2 in such a way that the spectrum in each layer is utilized uniformly. Layer 2600A comprises envelopes 2601A-2601D, which includes both SH0 and SH2 envelopes. Similarly, layer 2600C, comprising envelopes 2603A-2603D, includes both SH0 and SH2 envelopes. Layer 2600B, however, comprising envelopes 2602A-2602D, includes only SH1 envelopes. Using the ratio of envelope sizes described above, it can be easily seen that BW+5 BW=3 BW+3 BW. Thus, for each SH0 envelope in layer 2600A, there is one SH2 envelope also in layer 2600C and two SH1 envelopes in layer 2600B.

Three Scenarios Compared:
1) MLO with 3 Layers defined by:

$$f_0(t) = W_0 e^{-\frac{t^2}{4}}, W_0 = 0.6316$$

$$f_1(t) = W_1 t e^{-\frac{t^2}{4}}, W_1 \approx 0.6316$$

$$f_2(t) = W_2(t^2 - 1)e^{-\frac{t^2}{4}}, W_2 \approx 0.4466$$

(The current FPGA implementation uses the truncation interval of [-6, 6].)
2) Conventional scheme using rectangular pulse
3) Conventional scheme using a square-root raised cosine (SRRC) pulse with a roll-off factor of 0.5

For MLO pulses and SRRC pulse, the truncation interval is denoted by [-t1, t1] in the following figures. For simplicity, we used the MLO pulses defined above, which can be easily scaled in time to get the desired time interval (say micro-seconds or nano-seconds). For the SRRC pulse, we fix the truncation interval of [-3 T, 3 T] where T is the symbol duration for all results presented in this document.
Bandwidth Efficiency The X-dB bounded power spectral density bandwidth is defined as the smallest frequency interval outside which the power spectral density (PSD) is X dB below the maximum value of the PSD. The X-dB can be considered as the out-of-band attenuation.

The bandwidth efficiency is expressed in Symbols per second per Hertz. The bit per second per Hertz can be obtained by multiplying the symbols per second per Hertz with the number of bits per symbol (i.e., multiplying with log 2 M for M-ary QAM).

Truncation of MLO pulses introduces inter-layer interferences (ILI). However, the truncation interval of [-6, 6] yields negligible ILI while [-4, 4] causes slight tolerable ILI.

The bandwidth efficiency of MLO may be enhanced by allowing inter-symbol interference (ISI). To realize this enhancement, designing transmitter side parameters as well as developing receiver side detection algorithms and error performance evaluation can be performed.

Figure 27:
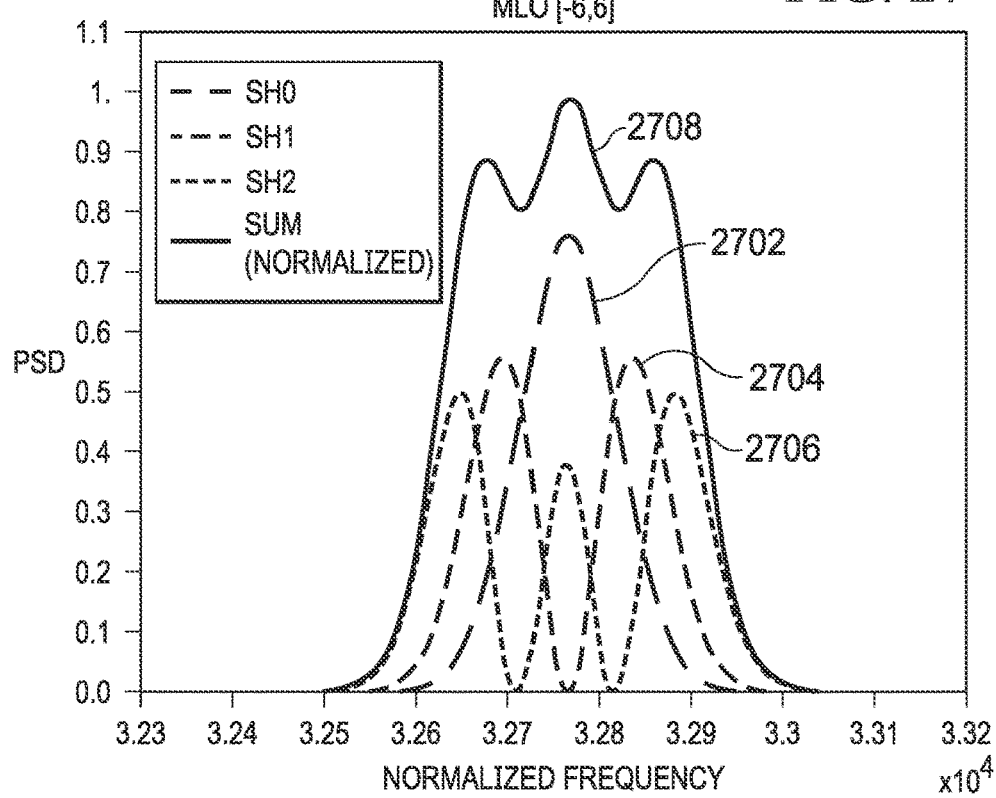
FIG. 27 illustrates power spectral density for various signal layers using a combined three layer multiple level overlay technique.

Referring now to FIG. 27, there is illustrated the power spectral density of each layer SH0-SH2 within MLO and also for the combined three layer MLO. 2702 illustrates the power spectral density of the SH0 layer; 2704 illustrates the power spectral density of the SH1 layer; 2706 illustrates the power spectral density of the SH2 layer, and 2708 illustrates the combined power spectral density of each layer.

Figure 28:
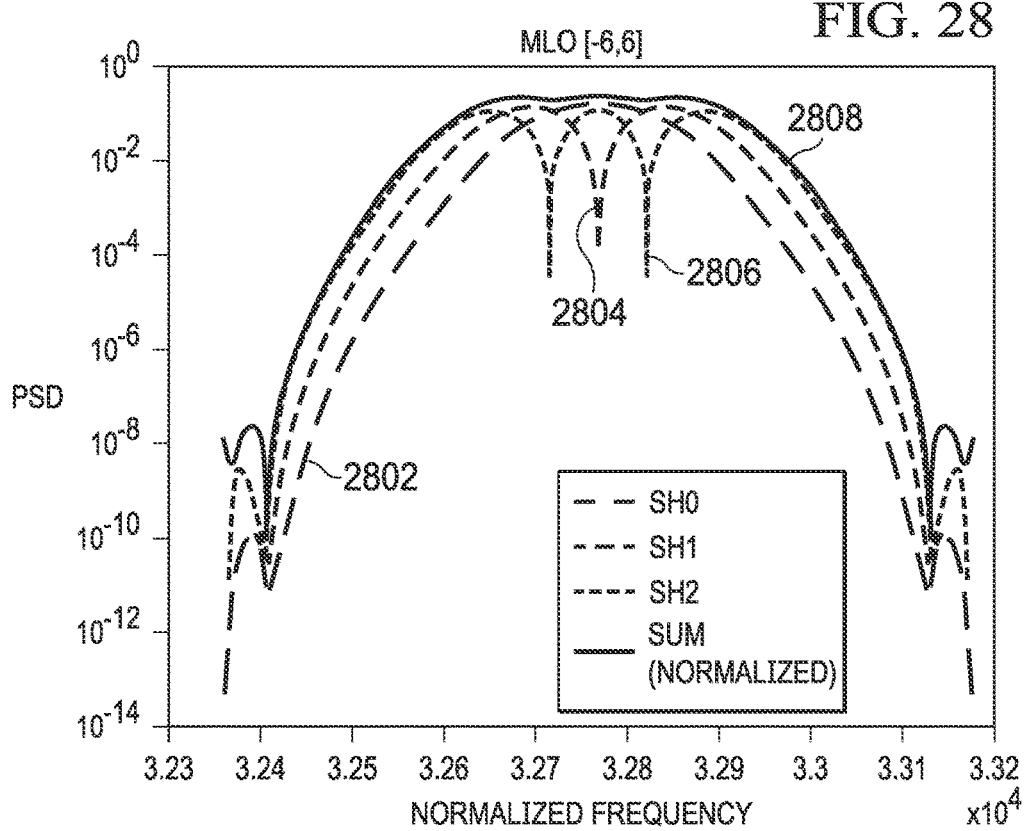
FIG. 28 illustrates power spectral density on a log scale for layers using a combined three layer multiple level overlay modulation.

Referring now to FIG. 28, there is illustrated the power spectral density of each layer as well as the power spectral density of the combined three layer in a log scale. 2802 represents the SH0 layer. 2804 represents the SH1 layer. 2806 represents the SH2 layer. 2808 represents the combined layers.

Figure 29:
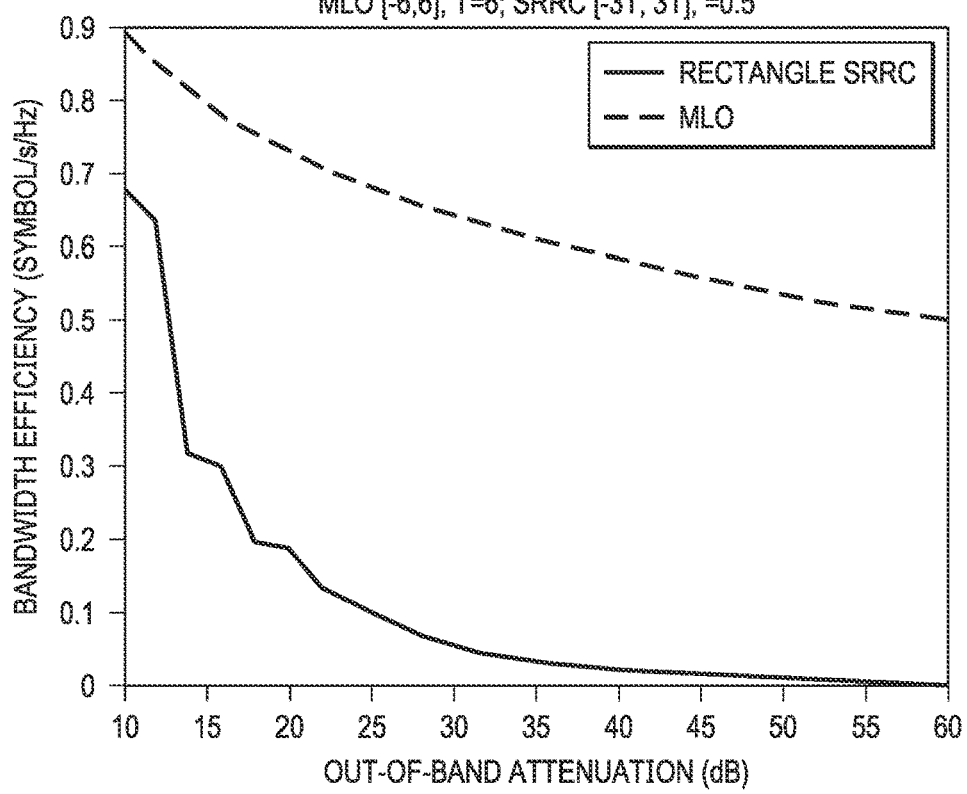
FIG. 29 illustrates a bandwidth efficiency comparison for square root raised cosine versus multiple layer overlay for a symbol rate of 1/6.
Figure 30:
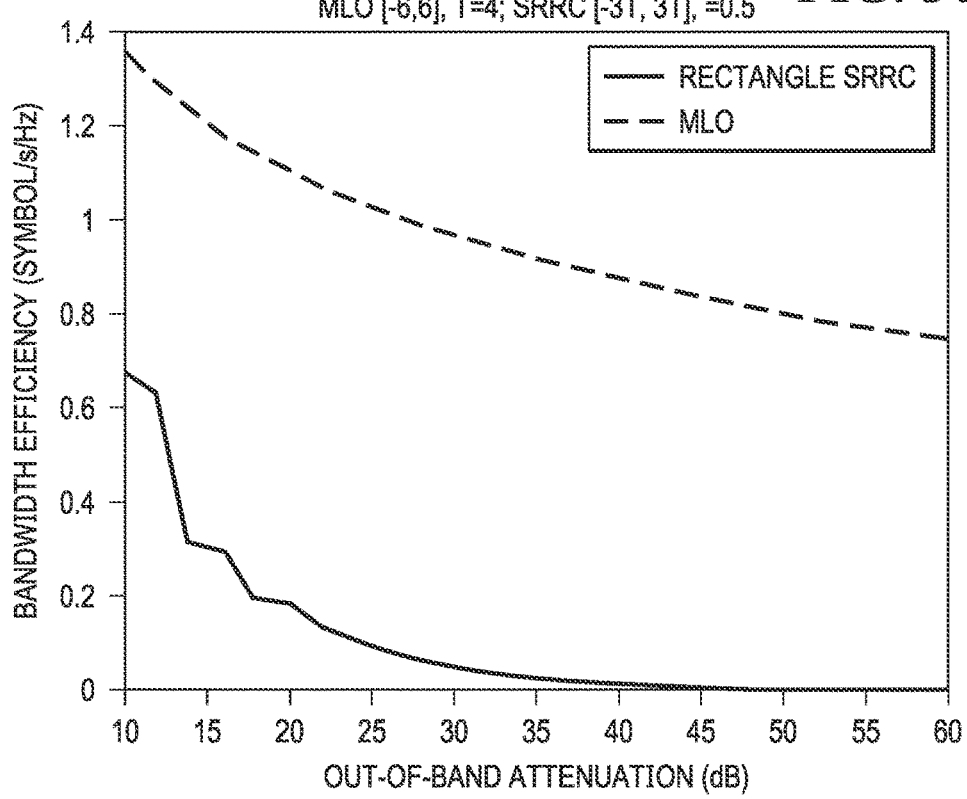
FIG. 30 illustrates a bandwidth efficiency comparison between square root raised cosine and multiple layer overlay for a symbol rate of 1/4.

Referring now to FIG. 29, there is a bandwidth efficiency comparison versus out of band attenuation (X-dB) where quantum level overlay pulse truncation interval is [-6,6] and the symbol rate is 1/6. Referring also to FIG. 30, there is illustrated the bandwidth efficiency comparison versus out of band attenuation (X-dB) where quantum level overlay pulse truncation interval is [-6,6] and the symbol rate is 1/4.

The QLO signals are generated from the Physicist's special Hermite functions:

$$f_n(t, \alpha) = \sqrt{\frac{\alpha}{\sqrt{\pi} n! 2^n}} H_n(\alpha t) e^{-\frac{\alpha^2 t^2}{2}}, \alpha > 0$$

Note that the initial hardware implementation is using $$\alpha = \frac{1}{\sqrt{2}}$$

and for consistency with his part, $$\alpha = \frac{1}{\sqrt{2}}$$

is used in all figures related to the spectral efficiency.

Let the low-pass-equivalent power spectral density (PSD) of the combined QLO signals be X(f) and its bandwidth be B. Here the bandwidth is defined by one of the following criteria.

ACLR1 (First Adjacent Channel Leakage Ratio) in dBc equals:

$$ACLR1 = \frac{\int_{B/2}^{3B/2} X(f) df}{\int_{-\infty}^{\infty} X(f) df}$$

ACLR2 (Second Adjacent Channel Leakage Ratio) in dBc equals:

$$ACLR2 = \frac{\int_{3B/2}^{5B/2} X(f) df}{\int_{-\infty}^{\infty} X(f) df}$$

Out-of-Band Power to Total Power Ratio is:

$$\frac{2\int_{B/2}^{\infty} X(f) df}{\int_{-\infty}^{\infty} X(f) df}$$

The Band-Edge PSD in dBc/100 kHz equals:

$$\frac{\int_{B/2}^{\frac{B}{2}+10^5} X(f) df}{\int_{-\infty}^{\infty} X(f) df}$$

Figure 31:
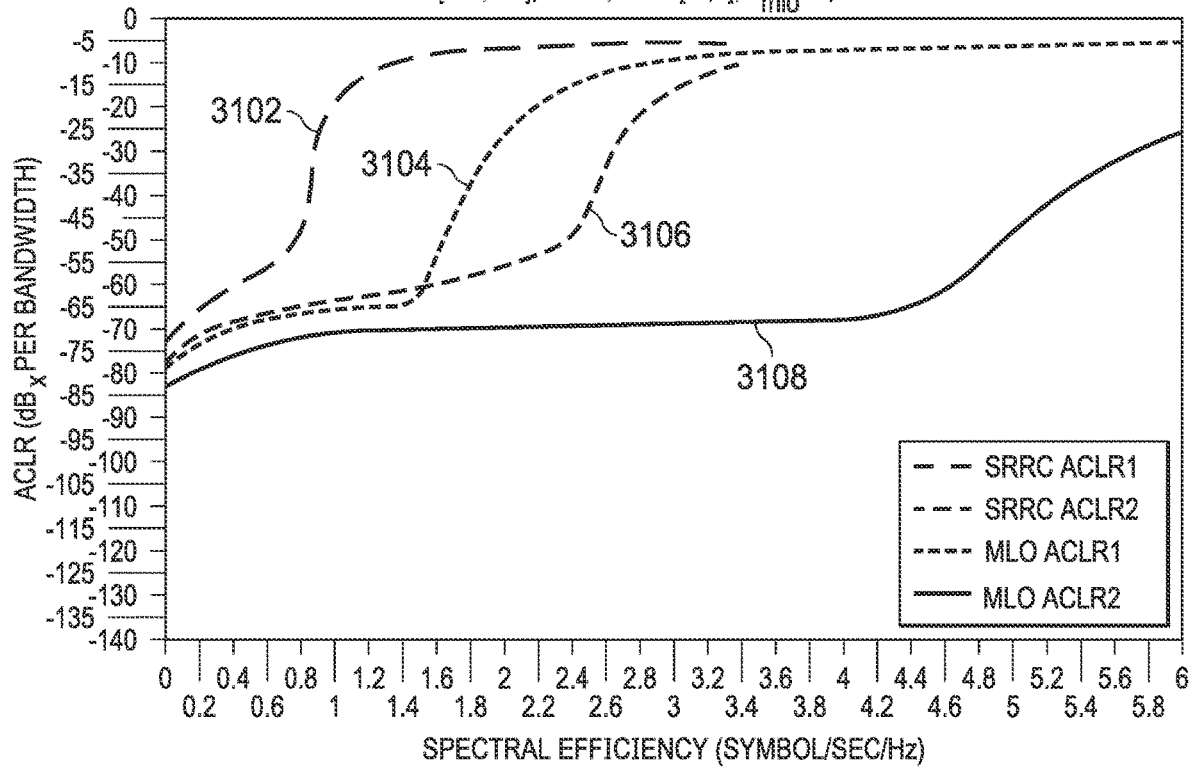
FIG. 31 illustrates a performance comparison between square root raised cosine and multiple level overlay using ACLR.

Referring now to FIG. 31 there is illustrated a performance comparison using ACLR1 and ACLR2 for both a square root raised cosine scheme and a multiple layer overlay scheme. Line 3102 illustrates the performance of a square root raised cosine 3102 using ACLR1 versus an MLO 3104 using ACLR1. Additionally, a comparison between a square root raised cosine 3106 using ACLR2 versus MLO 3108 using ACLR2 is illustrated. Table A illustrates the performance comparison using ACLR.

TABLE A

| Critieria: ACLR1 ≤ −30 dBc per bandwidth ACLR2 ≤ −43 dBc per bandwidth | | | Special Efficiency (Symbol/sec/Hz) | Gain |
|---|---|---|---|---|
| SRRC [−8T, 8T] β = 0.22 | | | 0.8765 | 1.0 |
| QLO [−8, 8] | N Layers | Symbol Duration (Tmol) | | |
| | N = 3 | Tmol = 4 | 1.133 | 1.2926 |
| | N = 4 | Tmol = 5 | 1.094 | 1.2481 |
| | | Tmol = 4 | 1.367 | 1.5596 |
| | N = 10 | Tmol = 8 | 1.185 | 1.3520 |
| | | Tmol = 7 | 1.355 | 1.5459 |
| | | Tmol = 6 | 1.580 | 1.8026 |
| | | Tmol = 5 | 1.896 | 2.1631 |
| | | Tmol = 4 | 2.371 | 2.7051 |

Figure 32:
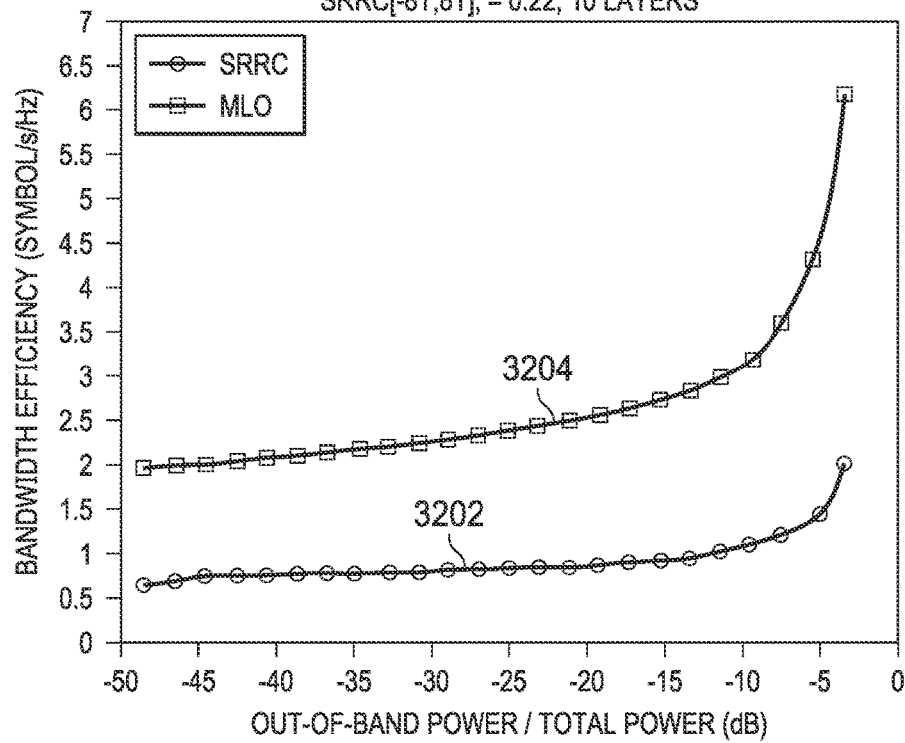
FIG. 32 illustrates a performance comparison between square root raised cosine and multiple lever overlay using out of band power.

Referring now to FIG. 32, there is illustrated a performance comparison between a square root raised cosine 3202 and a MLO 3204 using out-of-band power. Referring now also to Table B, there is illustrated a more detailed comparison of the performance using out-of-band power.

TABLE B

| Table 3: Performance Comparison Using Out-of- Band Power | | | | |
|---|---|---|---|---|
| Critieria: Out-of-band Power: Total Power ≤ −30 dB | | | Special Efficiency (Symbol/sec/Hz) | Gain |
| SRRC [−8T, 8T] β = 0.22 | | | 0.861 | 1.0 |
| QLO [−8, 8] | N Layers | Symbol Duration (Tmol) | | |
| | N = 3 | Tmol = 4 | 1.080 | 1.2544 |
| | N = 4 | Tmol = 5 | 1.049 | 1.2184 |
| | | Tmol = 4 | 1.311 | 1.5226 |
| | N = 10 | Tmol = 8 | 1.152 | 1.3380 |
| | | Tmol = 7 | 1.317 | 1.5296 |
| | | Tmol = 6 | 1.536 | 1.7840 |
| | | Tmol = 5 | 1.844 | 2.1417 |
| | | Tmol = 4 | 2.305 | 2.6771 |

Figure 33:
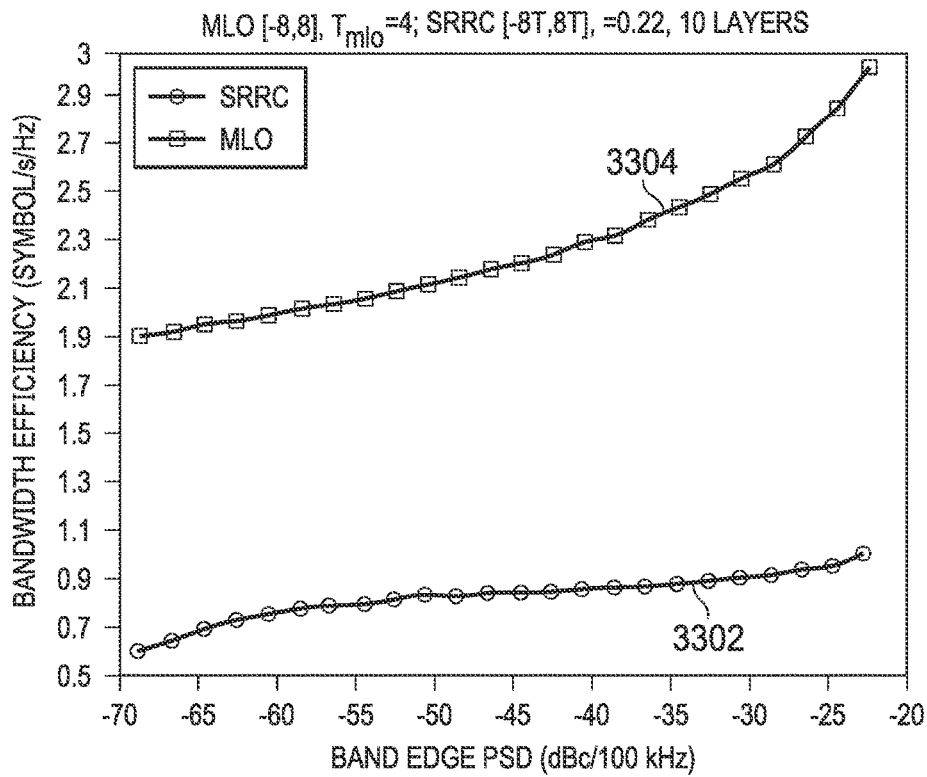
FIG. 33 illustrates a performance comparison between square root raised cosine and multiple lever overlay using band edge PSD.

Referring now to FIG. 33, there is further provided a performance comparison between a square root raised cosine 3302 and a MLO 3304 using band-edge PSD. A more detailed illustration of the performance comparison is provided in Table C.

TABLE C

| Table 3: Performance Comparison Using Band-Edge PSD | | | | |
|---|---|---|---|---|
| Critieria: Band-Edge PSD = −50 dBc/100 kHz | | | Special Efficiency (Symbol/sec/Hz) | Gain |
| SRRC [−8T, 8T] β = 0.22 | | | 0.810 | 1.0 |
| QLO [−8, 8] | N Layers | Symbol Duration (Tmol) | | |
| | N = 3 | Tmol = 4 | 0.925 | 1.1420 |
| | N = 4 | Tmol = 5 | 0.912 | 1.1259 |
| | | Tmol = 4 | 1.14 | 1.4074 |
| | N = 10 | Tmol = 8 | 1.049 | 1.2951 |
| | | Tmol = 7 | 1.198 | 1.4790 |
| | | Tmol = 6 | 1.398 | 1.7259 |
| | | Tmol = 5 | 1.678 | 2.0716 |
| | | Tmol = 4 | 2.097 | 2.5889 |

Figure 34:
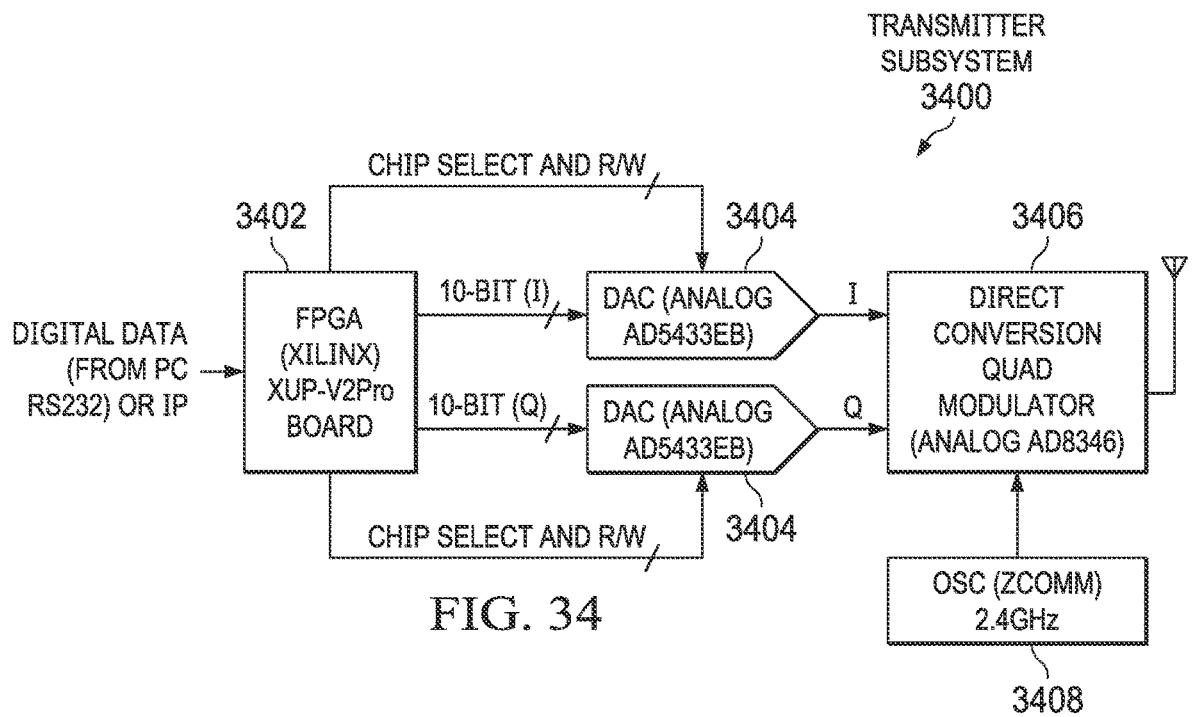
FIG. 34 is a block diagram of a transmitter subsystem for use with multiple level overlay.
Figure 35:
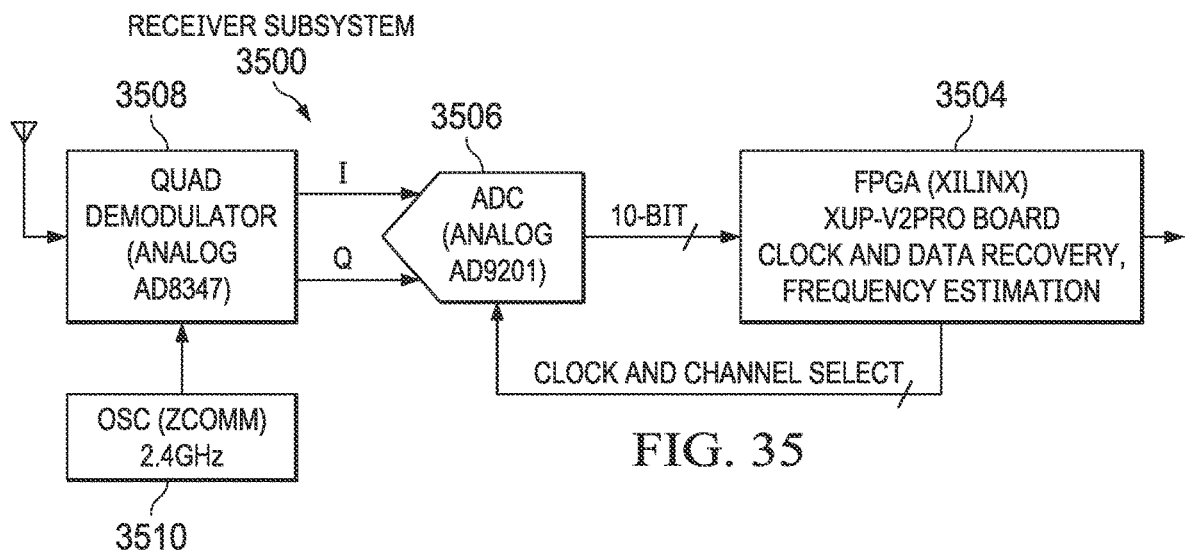
FIG. 35 is a block diagram of a receiver subsystem using multiple level overlay.

Referring now to FIGS. 34 and 35, there are more particularly illustrated the transmit subsystem (FIG. 34) and the receiver subsystem (FIG. 35). The transceiver is realized using basic building blocks available as Commercially Off The Shelf products. Modulation, demodulation and Special Hermite correlation and de-correlation are implemented on a FPGA board. The FPGA board 3402 at the receiver 3400 estimated the frequency error and recovers the data clock (as well as data), which is used to read data from the analog-to-digital (ADC) board 3406. The FGBA board 3400 also segments the digital I and Q channels.

On the transmitter side 3400, the FPGA board 3402 realizes the special hermite correlated QAM signal as well as the necessary control signals to control the digital-to-analog (DAC) boards 3404 to produce analog I&Q baseband channels for the subsequent up conversion within the direct conversion quad modulator 3406. The direct conversion quad modulator 3406 receives an oscillator signal from oscillator 3408.

The ADC 3506 receives the I&Q signals from the quad demodulator 3508 that receives an oscillator signal from 3510.

Neither power amplifier in the transmitter nor an LNA in the receiver is used since the communication will take place over a short distance. The frequency band of 2.4-2.5 GHz (ISM band) is selected, but any frequency band of interest may be utilized.

MIMO uses diversity to achieve some incremental spectral efficiency. Each of the signals from the antennas acts as an independent orthogonal channel. With QLO, the gain in spectral efficiency comes from within the symbol and each QLO signal acts as independent channels as they are all orthogonal to one another in any permutation. However, since QLO is implemented at the bottom of the protocol stack (physical layer), any technologies at higher levels of the protocol (i.e. Transport) will work with QLO. Therefore one can use all the conventional techniques with QLO. This includes RAKE receivers and equalizers to combat fading, cyclical prefix insertion to combat time dispersion and all other techniques using beam forming and MIMO to increase spectral efficiency even further.

When considering spectral efficiency of a practical wireless communication system, due to possibly different practical bandwidth definitions (and also not strictly bandlimited nature of actual transmit signal), the following approach would be more appropriate.

Figure 36:
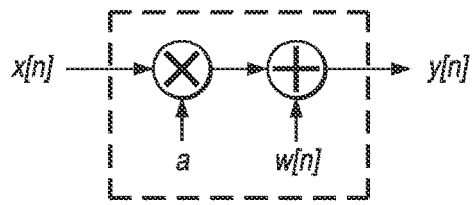
FIG. 36 illustrates an equivalent discreet time orthogonal channel of modified multiple level overlay.

Referring now to FIG. 36, consider the equivalent discrete time system, and obtain the Shannon capacity for that system (will be denoted by Cd). Regarding the discrete time system, for example, for conventional QAM systems in AWGN, the system will be:

$$y[n]=ax[n]+w[n]$$

where a is a scalar representing channel gain and amplitude scaling, x[n] is the input signal (QAM symbol) with unit average energy (scaling is embedded in a), y[n] is the demodulator (matched filter) output symbol, and index n is the discrete time index.

The corresponding Shannon capacity is:

$$C_d = \log_2(1+|a|^2/\sigma^2)$$

where σ2 is the noise variance (in complex dimension) and |a|2/σ2 is the SNR of the discrete time system.

Second, compute the bandwidth W based on the adopted bandwidth definition (e.g., bandwidth defined by −40 dBc out of band power). If the symbol duration corresponding to a sample in discrete time (or the time required to transmit $C_d$ bits) is T, then the spectral efficiency can be obtained as:

$$C/W=C_d/(TW) \text{ bps/Hz}$$

In discrete time system in AWGN channels, using Turbo or similar codes will give performance quite close to Shannon limit $C_d$. This performance in discrete time domain will be the same regardless of the pulse shape used. For example, using either SRRC (square root raised cosine) pulse or a rectangle pulse gives the same $C_d$ (or $C_d/T$). However, when we consider continuous time practical systems, the bandwidths of SRRC and the rectangle pulse will be different. For a typical practical bandwidth definition, the bandwidth for a SRRC pulse will be smaller than that for the rectangle pulse and hence SRRC will give better spectral efficiency. In other words, in discrete time system in AWGN channels, there is little room for improvement. However, in continuous time practical systems, there can be significant room for improvement in spectral efficiency.

Figure 37:
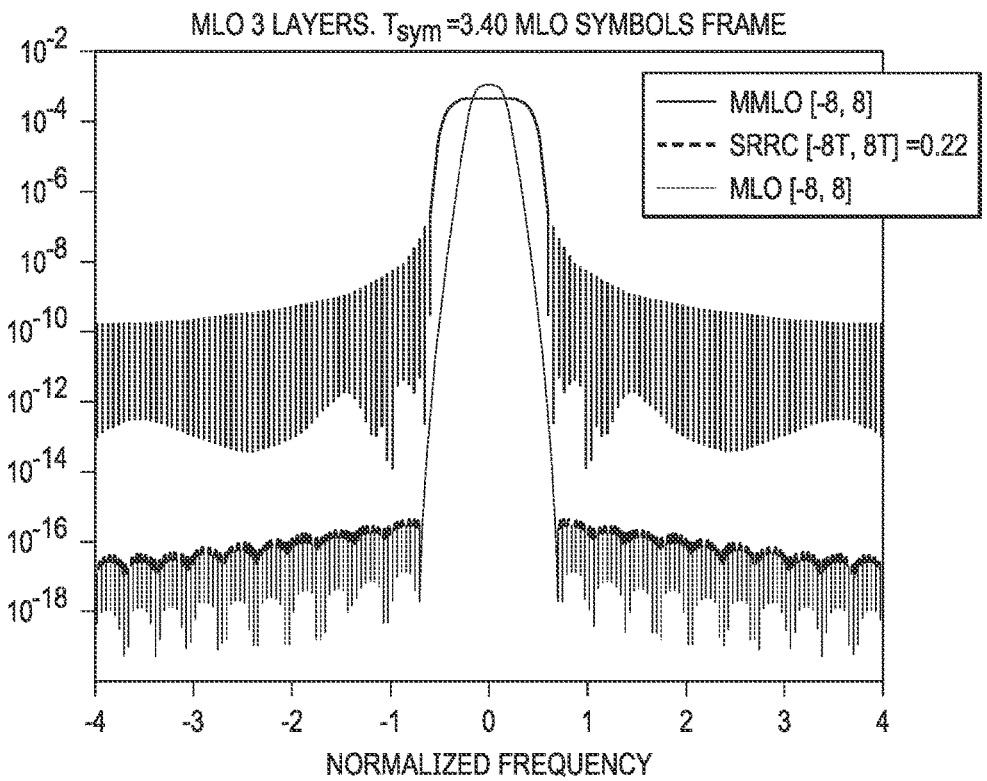
FIG. 37 illustrates the PSDs of multiple layer overlay, modified multiple layer overlay and square root raised cosine.
Figure 38:
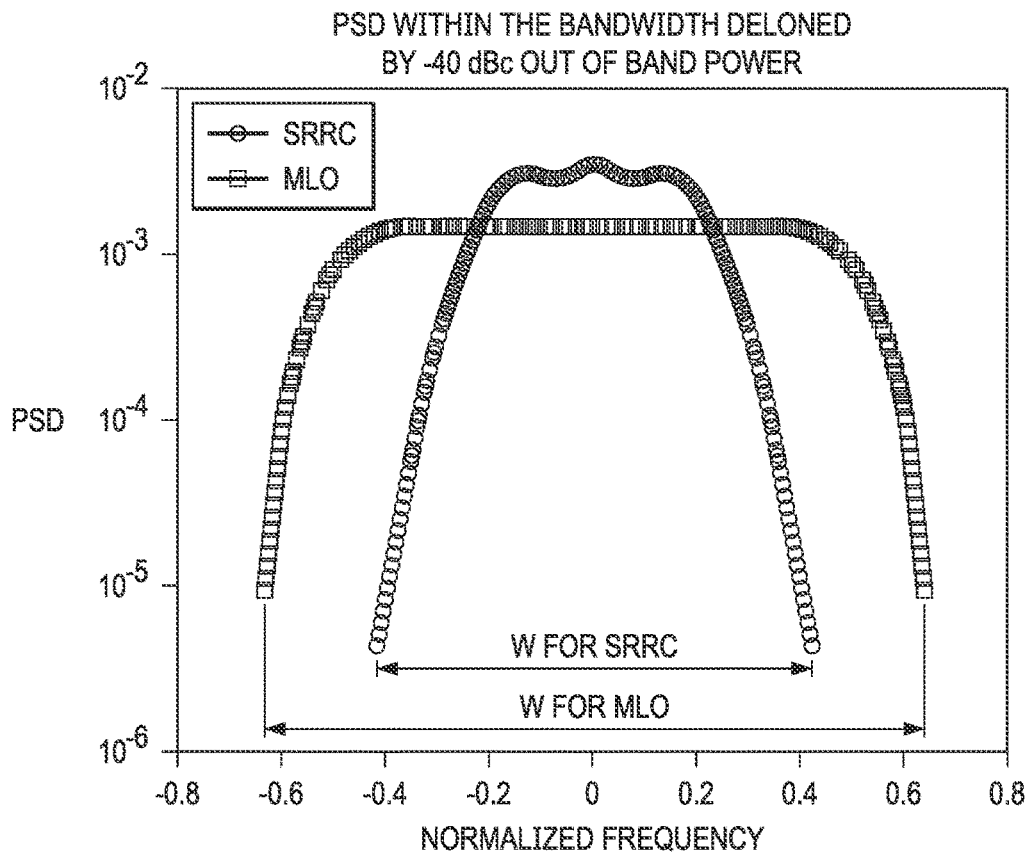
FIG. 38 illustrates a bandwidth comparison based on −40 dBc out of band power bandwidth between multiple layer overlay and square root raised cosine.

Referring now to FIG. 37, there is illustrated a PSD plot (BLANK) of MLO, modified MLO (MMLO) and square root raised cosine (SRRC). From the illustration in FIG. 37, demonstrates the better localization property of MLO. An advantage of MLO is the bandwidth. FIG. 36 also illustrates the interferences to adjacent channels will be much smaller for MLO. This will provide additional advantages in managing, allocating or packaging spectral resources of several channels and systems, and further improvement in overall spectral efficiency. If the bandwidth is defined by the −40 dBc out of band power, the within-bandwidth PSDs of MLO and SRRC are illustrated in FIG. 38. The ratio of the bandwidths is about 1.536. Thus, there is significant room for improvement in spectral efficiency.

Figure 39:
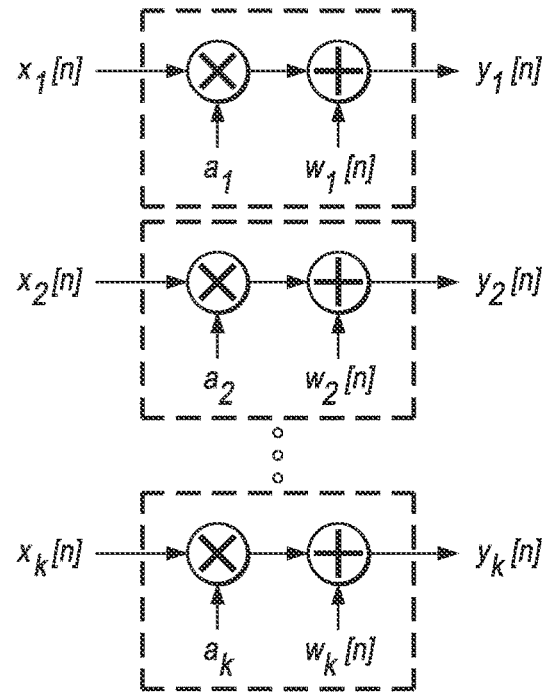
FIG. 39 illustrates equivalent discrete time parallel orthogonal channels of modified multiple layer overlay.

Modified MLO systems are based on block-processing wherein each block contains N MLO symbols and each MLO symbol has L layers. MMLO can be converted into parallel (virtual) orthogonal channels with different channel SNRs as illustrated in FIG. 39. The outputs provide equivalent discrete time parallel orthogonal channels of MMLO.

Figure 40:
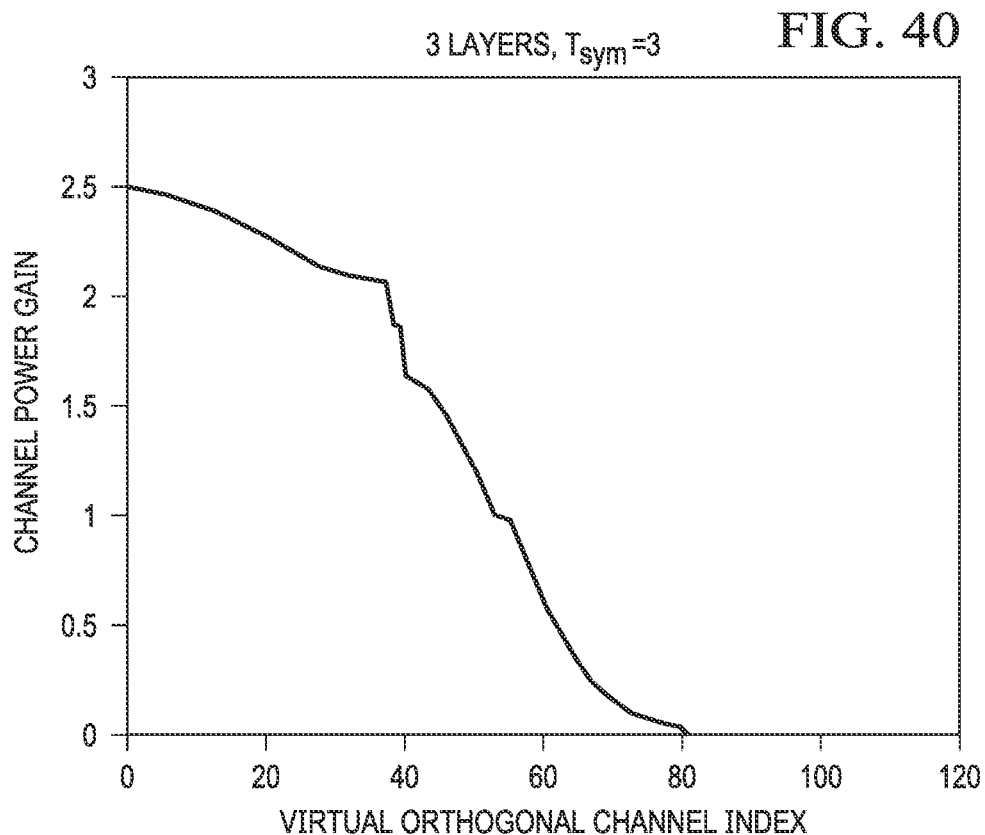
FIG. 40 illustrates the channel power gain of the parallel orthogonal channels of modified multiple layer overlay with three layers and $T_{sym}=3$.

Note that the intersymbol interference caused pulse overlapping of MLO has been addressed by the parallel orthogonal channel conversion. As an example, the power gain of a parallel orthogonal virtual channel of MMLO with three layers and 40 symbols per block is illustrated in FIG. 39. FIG. 40 illustrates the channel power gain of the parallel orthogonal channels of MMLO with three layers and $T_{sim}$=3. By applying a water filling solution, an optimal power distribution across the orthogonal channels for a fixed transmit power may be obtained. The transmit power on the $k^{th}$ orthogonal channel is denoted by $P_k$. Then the discrete time capacity of the MMLO can be given by:

$$C_d = \sum_{k=1}^{k} \log_2\left(1 + \frac{P_k|a_k|^2}{\sigma_k^2}\right) \text{ bits per block}$$

Note that K depends on the number of MLO layers, the number of MLO symbols per block, and MLO symbol duration.

For MLO pulse duration defined by $[-t_1, t_1]$, and symbol duration $T_{mlo}$, the MMLO block length is:

$$T_{block}=(N-1)T_{mlo}+2t_1$$

Suppose the bandwidth of MMLO signal based on the adopted bandwidth definition (ACLR, OBP, or other) is $W_{mmlo}$, then the practical spectral efficiency of MMLO is given by:

$$\frac{C_d}{W_{mmlo}T_{block}} = \frac{1}{W_{mmlo}\{(N-1)T_{mlo}+2t_1\}} \sum_{k=1}^{K} \log_2\left(1 + \frac{P_k|a_k|^2}{\sigma_k^2}\right) \frac{\text{bps}}{\text{Hz}}$$

Figure 41:
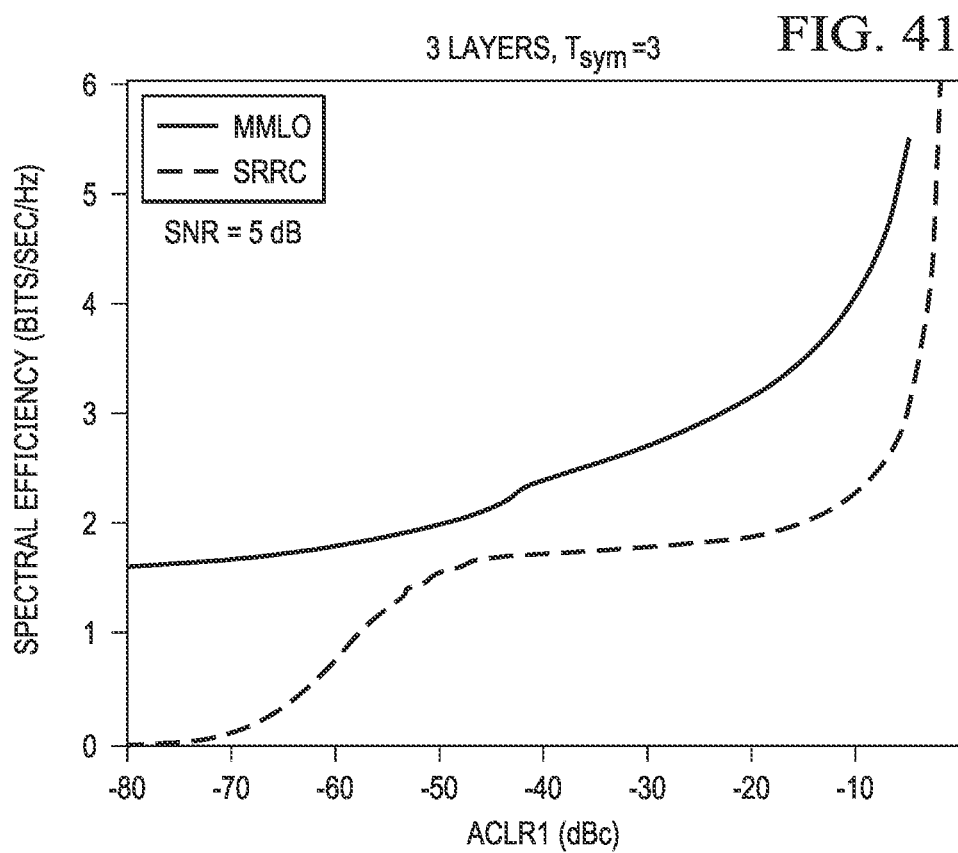
FIG. 41 illustrates a spectral efficiency comparison based on ACLR1 between modified multiple layer overlay and square root raised cosine.
Figure 42:
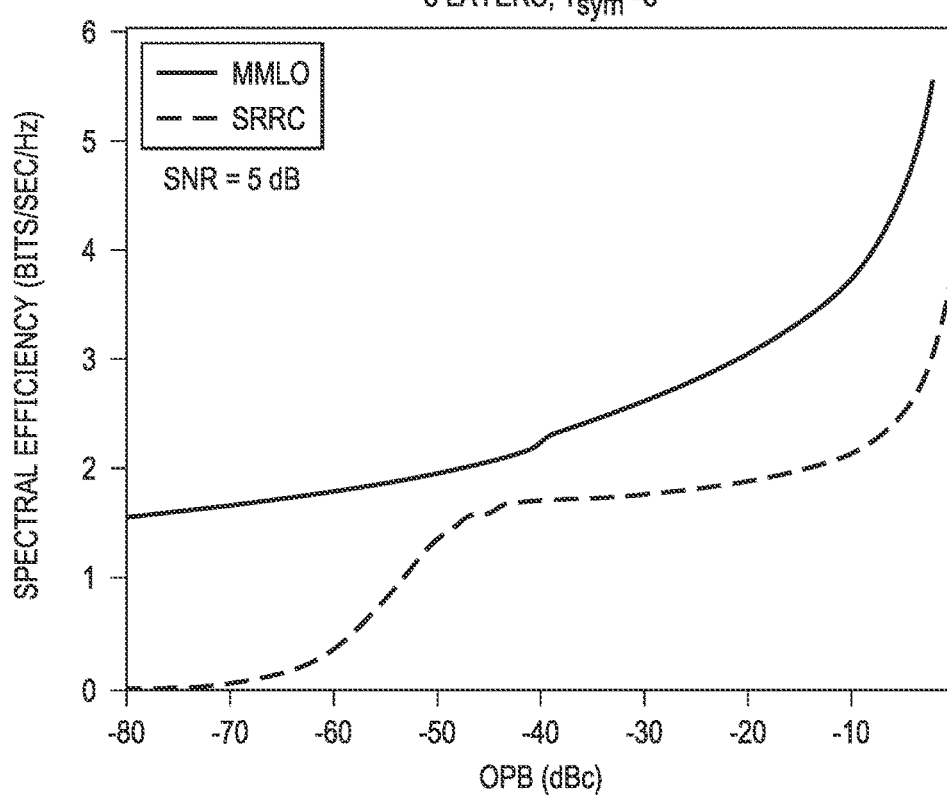
FIG. 42 illustrates a spectral efficiency comparison between modified multiple layer overlay and square root raised cosine based on OBP.

FIGS. 41-42 show the spectral efficiency comparison of MMLO with N=40 symbols per block, L=3 layers, $T_{mlo}$=3, $t_1$=8, and SRRC with duration [−8 T, 8 T], T=1, and the roll-off factor β=0.22, at SNR of 5 dB. Two bandwidth definitions based on ACLR1 (first adjacent channel leakage power ratio) and OBP (out of band power) are used.

Figure 43:
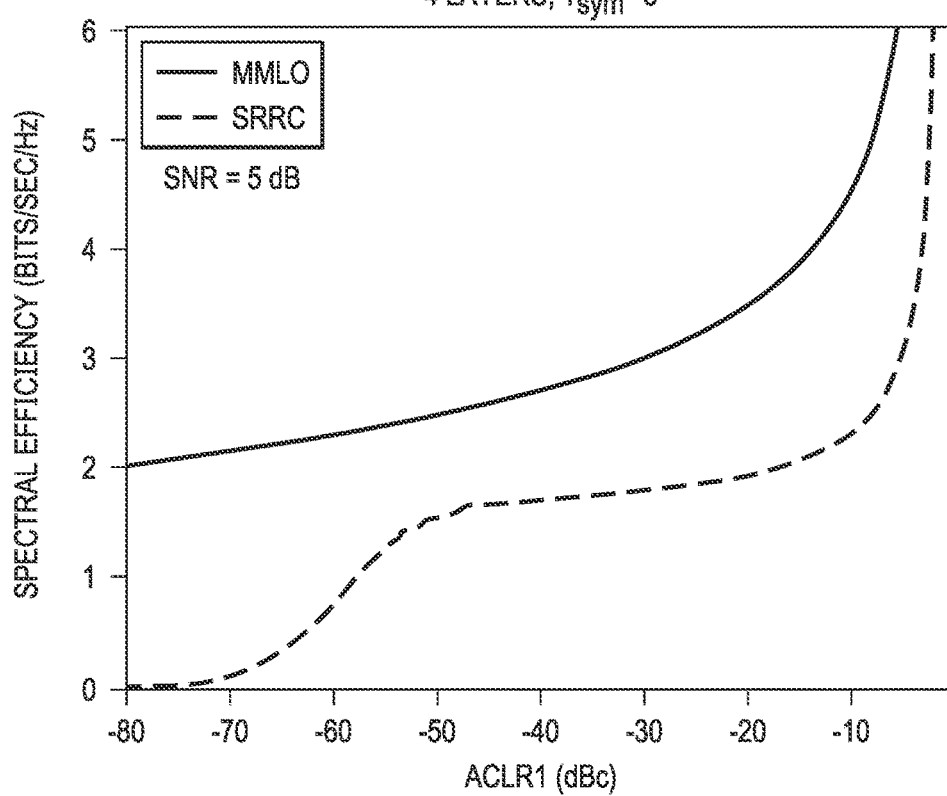
FIG. 43 illustrates a spectral efficiency comparison based on ACLR1 between modified multiple layer overlay and square root raised cosine.
Figure 44:
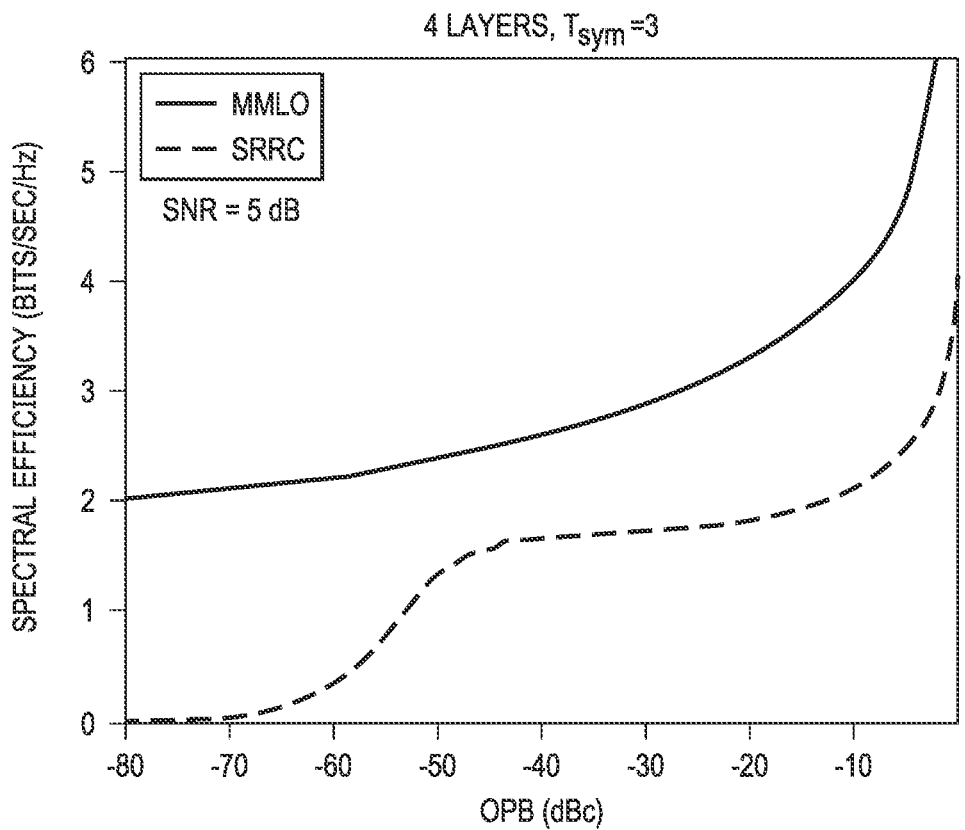
FIG. 44 illustrates a spectral efficiency comparison based on OBP between modified multiple layer overlay and square root raised cosine.

FIGS. 43-44 show the spectral efficiency comparison of MMLO with L=4 layers. The spectral efficiencies and the gains of MMLO for specific bandwidth definitions are shown in the following tables.

TABLE D

| | Spectral Efficiency (bps/Hz) based on ACLR1 ≤ 30 dBc per bandwidth | Gain with reference to SRRC |
|---|---|---|
| SRRC | 1.7859 | 1 |
| MMLO (3 layers, Tmlo = 3) | 2.7928 | 1.5638 |
| MMLO (4 layers, Tmlo = 3) | 3.0849 | 1.7274 |

TABLE E

| | Spectral Efficiency (bps/Hz) based on OBP ≤ −40 dBc | Gain with reference to SRRC |
|---|---|---|
| SRRC | 1.7046 | 1 |
| MMLO (3 layers, Tmlo = 3) | 2.3030 | 1.3510 |
| MMLO (4 layers, Tmlo = 3) | 2.6697 | 1.5662 |

Figure 45:
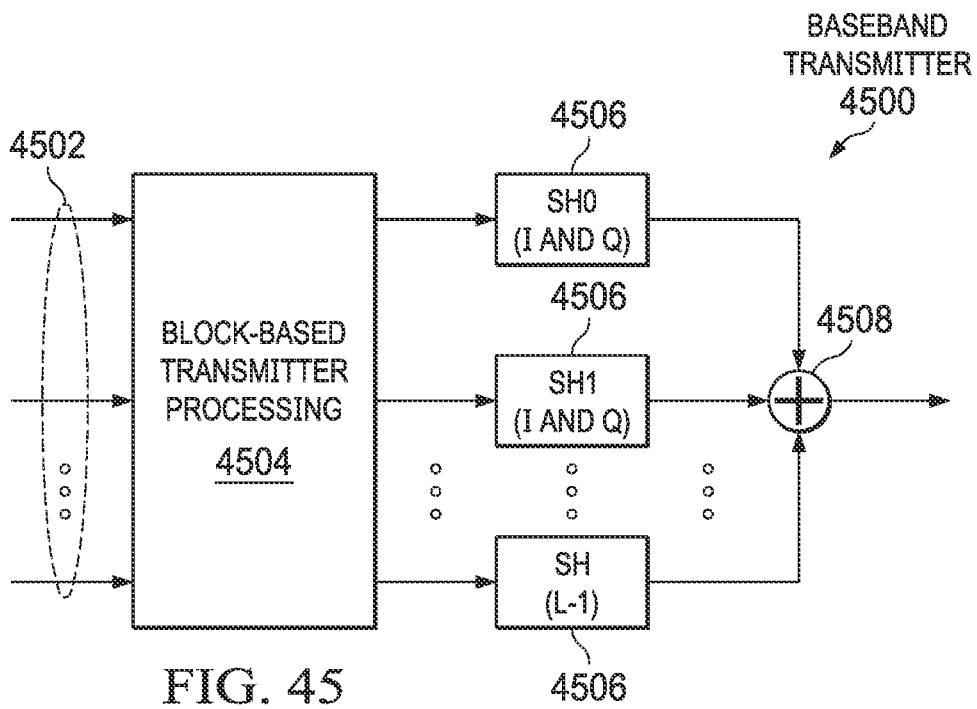
FIG. 45 illustrates a block diagram of a baseband transmitter for a low pass equivalent modified multiple layer overlay system.
Figure 46:
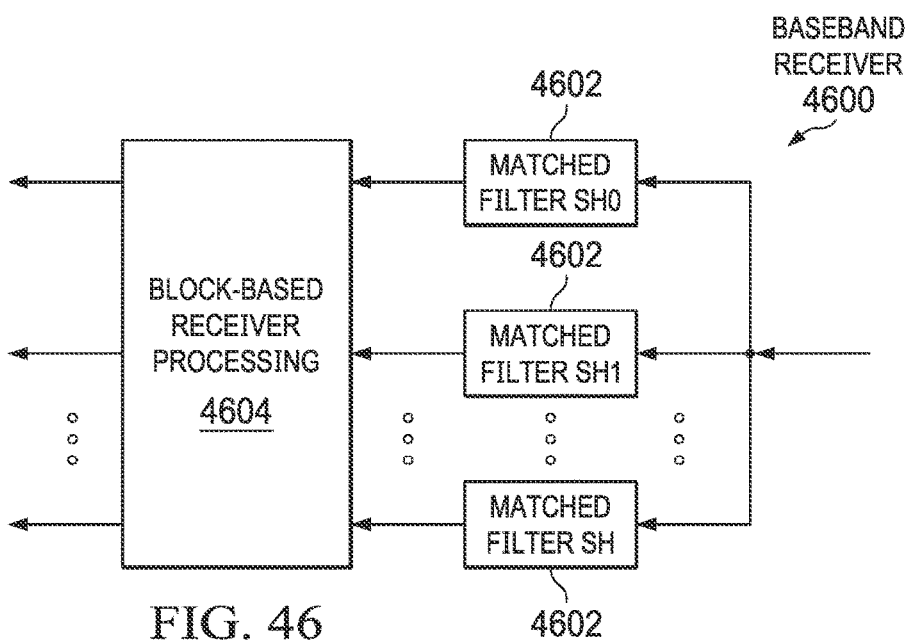
FIG. 46 illustrates a block diagram of a baseband receiver for a low pass equivalent modified multiple layer overlay system.

Referring now to FIGS. 45 and 46, there are provided basic block diagrams of low-pass-equivalent MMLO transmitters (FIG. 45) and receivers (FIG. 46). The low-pass-equivalent MMLO transmitter 4500 receives a number of input signals 4502 at a block-based transmitter processing 4504. The transmitter processing outputs signals to the SH(L-1) blocks 4506 which produce the I&Q outputs. These signals are then all combined together at a combining circuit 4508 for transmission.

Within the baseband receiver (FIG. 46) 4600, the received signal is separated and applied to a series of match filters 4602. The outputs of the match filters are then provided to the block-based receiver processing block 4604 to generate the various output streams.

Consider a block of N MLO-symbols with each MLO symbol carrying L symbols from L layers. Then there are NL symbols in a block. Define c(m, n)=symbol transmitted by the m-th MLO layer at the n-th MLO symbol. Write all NL symbols of a block as a column vector as follows: c=[c(0,0), c(1,0), ..., c(L-1, 0), c(0,1), c(1,1), ..., c(L-1, 1), ..., c(L-1, N-1)]T. Then the outputs of the receiver matched filters for that transmitted block in an AWGN channel, defined by the column vector y of length NL, can be given as y=H c+n, where H is an NL X NL matrix representing the equivalent MLO channel, and n is a correlated Gaussian noise vector.

By applying SVD to H, we have H=U D VH where D is a diagonal matrix containing singular values. Transmitter side processing using V and the receiver side processing UH, provides an equivalent system with NL parallel orthogonal channels, (i.e., y=H Vc+n and UH y=Dc+UH n). These parallel channel gains are given by diagonal elements of D. The channel SNR of these parallel channels can be computed. Note that by the transmit and receive block-based processing, we obtain parallel orthogonal channels and hence the ISI issue has be resolved.

Since the channel SNRs of these parallel channels are not the same, we can apply the optimal Water filling solution to compute the transmit power on each channel given a fixed total transmit power. Using this transmit power and corresponding channel SNR, we can compute capacity of the equivalent system as given in the previous report.

Issues of Fading, Multipath, and Multi-Cell Interference

Techniques used to counteract channel fading (e.g., diversity techniques) in conventional systems can also be applied in MMLO. For slowly-varying multi-path dispersive channels, if the channel impulse response can be fed back, it can be incorporated into the equivalent system mentioned above, by which the channel induced ISI and the intentionally introduced MMLO ISI can be addressed jointly. For fast time-varying channels or when channel feedback is impossible, channel equalization needs to be performed at the receiver. A block-based frequency-domain equalization can be applied and an oversampling would be required.

If we consider the same adjacent channel power leakage for MMLO and the conventional system, then the adjacent cells' interference power would be approximately the same for both systems. If interference cancellation techniques are necessary, they can also be developed for MMLO.

Scope and System Description

This report presents the symbol error probability (or symbol error rate) performance of MLO signals in additive white Gaussian noise channel with various inter-symbol interference levels. As a reference, the performance of the conventional QAM without ISI is also included. The same QAM size is considered for all layers of MLO and the conventional QAM.

The MLO signals are generated from the Physicist's special Hermite functions:

$$f_n(t, \alpha) = \sqrt{\frac{\alpha}{\sqrt{\pi} n! 2^n}} H_n(\alpha t) e^{-\frac{\alpha^2 t^2}{2}}$$

where Hn(αt) is the $n^{th}$ order Hermite polynomial. Note that the functions used in the lab setup correspond to $$\alpha = \frac{1}{\sqrt{2}}$$

and, for consistency, $$\alpha = \frac{1}{\sqrt{2}}$$

is used in this report.

MLO signals with 3, 4 or 10 layers corresponding to n=0~2, 0~3, or 0~9 are used and the pulse duration (the range of t) is [−8, 8] in the above function.

AWGN channel with perfect synchronization is considered.

The receiver consists of matched filters and conventional detectors without any interference cancellation, i.e., QAM slicing at the matched filter outputs.

$$\% \text{ pulse-overlapping} = \frac{T_p - T_{sym}}{T_p} \times 100\%$$

where Tp is the pulse duration (16 in the considered setup) and Tsym is the reciprocal of the symbol rate in each MLO layer. The considered cases are listed in the following table.

TABLE F

| % of Pulse Overlapping | $T_{sym}$ | $T_p$ |
|---|---|---|
| 0% | 16 | 16 |
| 12.5% | 14 | 16 |
| 18.75% | 13 | 16 |

TABLE F-continued

| % of Pulse Overlapping | $T_{sym}$ | $T_p$ |
|---|---|---|
| 25% | 12 | 16 |
| 37.5% | 10 | 16 |
| 43.75% | 9 | 16 |
| 50% | 8 | 16 |
| 56.25% | 7 | 16 |
| 62.5% | 6 | 16 |
| 75% | 4 | 16 |

Derivation of the Signals Used in Modulation

To do that, it would be convenient to express signal amplitude s(t) in a complex form close to quantum mechanical formalism. Therefore the complex signal can be represented as:

$$\psi(t) = s(t) + j\sigma(t)$$

where $s(t) \equiv$ real signal $\sigma(t) \equiv$ imaginary signal(quadrature)

$$\sigma(t) = \frac{1}{\pi}\int_{-\infty}^{\infty} s(\tau)\frac{d\tau}{\tau - t}$$

$$s(t) = -\frac{1}{\pi}\int_{-\infty}^{\infty} \sigma(t)\frac{d\tau}{\tau - t}$$

Where s(t) and σ(t) are Hilbert transforms of one another and since σ(t) is quadratures of s(t), they have similar spectral components. That is if they were the amplitudes of sound waves, the ear could not distinguish one form from the other.

Let us also define the Fourier transform pairs as follows:

$$\psi(t) = \frac{1}{\pi}\int_{-\infty}^{\infty} \varphi(f)e^{j\omega t}df$$

$$\varphi(f) = \frac{1}{\pi}\int_{-\infty}^{\infty} \psi(t)e^{-j\omega t}dt$$

$$\psi^*(t)\psi(t) = [s(t)]^2 + [\sigma(t)]^2 + \ldots \equiv \text{signal power}$$

Let's also normalize all moments to $M_0$:

$$M_0 = \int_0^\tau s(t)dt$$

$$M_0 = \int_0^\tau \varphi^*\varphi df$$

Then the moments are as follows:

$$M_0 = \int_0^\tau s(t)dt$$

$$M_1 = \int_0^\tau ts(t)dt$$

$$M_2 = \int_0^\tau t^2 s(t)dt$$

$$M_{N-1} = \int_0^\tau t^{N-1} s(t)dt$$

In general, one can consider the signal s(t) be represented by a polynomial of order N, to fit closely to s(t) and use the coefficient of the polynomial as representation of data. This is equivalent to specifying the polynomial in such a way that its first N "moments" $M_j$ shall represent the data. That is, instead of the coefficient of the polynomial, we can use the moments. Another method is to expand the signal s(t) in terms of a set of N orthogonal functions $\varphi_k(t)$, instead of powers of time. Here, we can consider the data to be the coefficients of the orthogonal expansion. One class of such orthogonal functions are sine and cosine functions (like in Fourier series).

Therefore we can now represent the above moments using the orthogonal function ψ with the following moments:

$$\bar{t} = \frac{\int \psi^*(t) t \psi(t) dt}{\int \psi^*(t)\psi(t)dt}$$

$$\overline{t^2} = \frac{\int \psi^*(t) t^2 \psi(t) dt}{\int \psi^*(t)\psi(t)dt}$$

$$\overline{t^n} = \frac{\int \psi^*(t) t^n \psi(t) dt}{\int \psi^*(t)\psi(t)dt}$$

Similarly, $$\bar{f} = \frac{\int \varphi^*(f) f \varphi(f) df}{\int \varphi^*(f)\varphi(f)df}$$

$$\overline{f^2} = \frac{\int \varphi^*(f) f^2 \varphi(f) df}{\int \varphi^*(f)\varphi(f)df}$$

$$\overline{f^n} = \frac{\int \varphi^*(f) f^n \varphi(f) df}{\int \varphi^*(f)\varphi(f)df}$$

If we did not use complex signal, then:

$\bar{f}=0$

To represent the mean values from time to frequency domains, replace:

$$\varphi(f) \to \psi(t)$$

$$f \to \frac{1}{2\pi j}\frac{d}{dt}$$

These are equivalent to somewhat mysterious rule in quantum mechanics where classical momentum becomes an operator:

$$P_x \to \frac{h}{2\pi j}\frac{\partial}{\partial x}$$

Therefore using the above substitutions, we have:

$$\bar{f} = \frac{\int \varphi^*(f) f \varphi(f) df}{\int \varphi^*(f) \varphi(f) df} = \frac{\int \psi^*(t)\left(\frac{1}{2\pi j}\right)\frac{d\psi(t)}{dt}dt}{\int \psi^*(t)\psi(t) dt} = \left(\frac{1}{2\pi j}\right)\frac{\int \psi^* \frac{d\psi}{dt} dt}{\int \psi^* \psi dt}$$

And:

$$\overline{f^2} =$$

$$\frac{\int \varphi^*(f) f^2 \varphi(f) df}{\int \varphi^*(f) \varphi(f) df} = \frac{\int \psi^* \left(\frac{1}{2\pi j}\right)^2 \frac{d^2}{dt^2}\psi dt}{\int \psi^* \psi dt} = -\left(\frac{1}{2\pi}\right)^2 \frac{\int \psi^* \frac{d^2}{dt^2} \psi dt}{\int \psi^* \psi dt}$$

$$\overline{t^2} = \frac{\int \psi^* t^2 \psi dt}{\int \psi^* \psi dt}$$

We can now define an effective duration and effective bandwidth as:

$$\Delta t = \sqrt{2\pi \overline{(t-\bar{t})^2}} = 2\pi \cdot \text{rms in time}$$

$$\Delta f = \sqrt{2\pi \overline{(f-\bar{f})^2}} = 2\pi \cdot \text{rms in frequency}$$

But we know that:

$$\overline{(t-\bar{t})^2} = \overline{t^2} - (\bar{t})^2$$

$$\overline{(f-\bar{f})^2} = \overline{f^2} - (\bar{f})^2$$

We can simplify if we make the following substitutions:

$$\tau = t - \bar{t}$$

$$\Psi(\tau) = \psi(t) e^{-j\bar{\omega}\tau}$$

$$\omega_0 = \bar{\omega} = 2\pi \bar{f} = 2\pi f_0$$

we Also Know that:

$$(\Delta t)^2 (\Delta f)^2 = (\Delta t \Delta f)^2$$

And Therefore:

$$(\Delta t \Delta f)^2 = \frac{1}{4}\left[4 \frac{\int \Psi^*(\tau)\tau^2 \Psi(\tau) d\tau \int \frac{d\Psi^*}{d\tau}\frac{d\Psi}{d\tau} d\tau}{(\int \Psi^*(\tau)\psi(\tau)d\tau)^2}\right] \geq \left(\frac{1}{4}\right)$$

$$(\Delta t \Delta f) \geq \left(\frac{1}{2}\right)$$

Now instead of $(\Delta t \, \Delta f) \geq (\frac{1}{2})$ we are interested to force the equality $(\Delta t \, \Delta f) = (\frac{1}{2})$ and see what signals satisfy the equality. Given the fixed bandwidth $\Delta f$, the most efficient transmission is one that minimizes the time-bandwidth product $(\Delta t \, \Delta f) = (\frac{1}{2})$ For a given bandwidth $\Delta f$, the signal that minimizes the transmission in minimum time will be a Gaussian envelope. However, we are often given not the effective bandwidth, but always the total bandwidth $f_2 - f_1$.

Now, what is the signal shape which can be transmitted through this channel in the shortest effective time and what is the effective duration?

$$\Delta t = = \frac{\frac{1}{(2\pi)^2} \int_{f_1}^{f_2} \frac{d\varphi^*}{df}\frac{d\varphi}{df}}{\int_{f_1}^{f_2} \varphi^* \varphi df} \to \min$$

Where $\varphi(f)$ is zero outside the range $f_2 - f_1$.

To do the minimization, we would use the calculus of variations (Lagrange's Multiplier technique). Note that the denominator is constant and therefore we only need to minimize the numerator as:

$$\Delta t \to \min \to \delta \int_{f_1}^{f_2} \left(\frac{d\varphi^*}{df}\frac{d\varphi}{df} + \Lambda \varphi^* \varphi\right) df = 0$$

First *Trem*

$$\delta \int_{f_1}^{f_2} \frac{d\varphi^*}{df}\frac{d\varphi}{df} df =$$

$$\int \left(\frac{d\varphi^*}{df}\delta\frac{d\varphi}{df} + \frac{d\varphi}{df}\delta\frac{d\varphi^*}{df}\right) df = \int \left(\frac{d\varphi^*}{df}\frac{d\delta\varphi}{df} + \frac{d\varphi}{df}\frac{d\delta\varphi^*}{df}\right) df =$$

$$\left[\frac{d\varphi^*}{df}\delta\varphi + \frac{d\varphi}{df}\delta\varphi^*\right]_{f_1}^{f_2} - \int \left(\frac{d^2\varphi^*}{df^2}\delta\varphi + \frac{d^2\varphi}{df^2}\delta\varphi^*\right) df =$$

$$\int \left(\frac{d^2\varphi^*}{df^2}\delta\varphi + \frac{d^2\varphi}{df^2}\delta\varphi^*\right) df$$

Second *Trem*

$$\delta \int_{f_1}^{f_2} (\Lambda \varphi^* \varphi) df = \Lambda \int_{f_1}^{f_2} (\varphi^* \delta\varphi + \varphi \delta\varphi^*) df$$

Both *Trems*

$$= \int \left[\left(\frac{d^2\varphi^*}{df^2} + \Lambda \varphi^*\right)\delta\varphi + \left(\frac{d^2\varphi}{df^2} + \Lambda \varphi\right)\delta\varphi^*\right] df = 0$$

This is only possible if and only if:

$$\left(\frac{d^2\varphi}{df^2} + \Lambda \varphi\right) = 0$$

The solution to this is of the form $$\varphi(f) = \sin k\pi\left(\frac{f - f_1}{f_2 - f_1}\right)$$

Now if we require that the wave vanishes at infinity, but still satisfy the minimum time-bandwidth product:

$$(\Delta t \, \Delta f) = (\tfrac{1}{2})$$

Then we have the wave equation of a Harmonic Oscillator:

$$\frac{d^2\Psi(\tau)}{d\tau^2} + (\lambda - \alpha^2\tau^2)\Psi(\tau) = 0$$

which vanishes at infinity only if:

$$\lambda = \alpha(2n+1)$$

$$\psi_n = e^{-\frac{1}{2}\omega^2\tau^2}\frac{d^n}{d\tau^n}e^{-\alpha^2\tau^2} \propto H_n(\tau)$$

Where $H_n(\tau)$ is the Hermit functions and:

$$(\Delta t\, \Delta f) = \frac{1}{2}(2n+1)$$

So Hermit functions $H_n(\tau)$ occupy information blocks of 1/2, 3/2, 5/2, ... with 1/2 as the minimum information quanta.

Squeezed States

Here we would derive the complete Eigen functions in the most generalized form using quantum mechanical approach of Dirac algebra. We start by defining the following operators:

$$b = \sqrt{\frac{m\omega'}{2\hbar}}\left(x + \frac{ip}{m\omega'}\right)$$

$$b^+ = \sqrt{\frac{m\omega'}{2\hbar}}\left(x - \frac{ip}{m\omega'}\right)$$

$$[b, b^+] = 1$$

$$a = \lambda b - \mu b^+$$

$$a^+ = \lambda b^+ - \mu b$$

Now we are ready to define $\Delta x$ and $\Delta p$ as:

$$(\Delta x)^2 = \frac{\hbar}{2m\omega}\left(\frac{\omega}{\omega'}\right) = \frac{\hbar}{2m\omega}(\lambda - \mu)^2$$

$$(\Delta p)^2 = \frac{\hbar m\omega}{2}\left(\frac{\omega'}{\omega}\right) = \frac{\hbar m\omega}{2}(\lambda + \mu)^2$$

$$(\Delta x)^2(\Delta p)^2 = \frac{\hbar^2}{4}(\lambda^2 - \mu^2)^2$$

$$\Delta x \Delta p = \frac{\hbar}{2}(\lambda^2 - \mu^2) = \frac{\hbar}{2}$$

Now let parameterize differently and instead of two variables $\lambda$ and $\mu$, we would use only one variable as follows:

$$\lambda = \sin h\xi$$

$$\mu = \cos h\xi$$

$$\lambda + \mu = e^{\xi}$$

$$\lambda - \mu = -e^{-\xi}$$

Now the Eigen states of the squeezed case are:

$$b|\beta\rangle = \beta|\beta\rangle$$

$$(\lambda a + \mu a^+)|\beta\rangle = \beta|\beta\rangle$$

$$b = UaU^+$$

$$U = e^{\xi/2(a^2 - a^{+2})}$$

$$U^+(\xi)aU(\xi) = a\cos h\xi - a^+ \sin h\xi$$

$$U^+(\xi)a^+U(\xi) = a^+ \cos h\xi - a \sin h\xi$$

We can now consider the squeezed operator:

$$|\alpha, \xi\rangle = u(\xi)D(\alpha)|0\rangle$$

$$D(\alpha) = e^{-\frac{|\alpha|^2}{2}}e^{\alpha a^+}e^{-\alpha^* a}$$

$$|\alpha\rangle = \sum_{n=0}^{\infty}\frac{\alpha^n}{\sqrt{n!}}e^{-\frac{|\alpha|^2}{2}}|n\rangle$$

$$|\alpha\rangle = e^{-\frac{|\alpha|^2}{2} + \alpha a^+}|0\rangle$$

For a distribution P(n) we would have:

$$P(n) = |\langle n||\beta, \xi\rangle|^2$$

$$\langle\alpha||\beta, \xi\rangle = \sum_{n=0}^{\infty}\frac{\alpha^n}{\sqrt{n!}}e^{-\frac{|\alpha|^2}{2}}\langle n||\beta, \xi\rangle$$

$$e^{2zt-t^2} = \sum_{n=0}^{\infty}\frac{H_n(z)t^n}{n!}$$

Therefore the final result is:

$$\langle n||\beta, \xi\rangle = \frac{(\tanh\xi)^{n/2}}{2^{n/2}(n!\cosh\xi)^2}e^{1/2(|\beta|^2 - \beta^2\tanh\xi)}H_n\left(\frac{\beta}{2\sinh\xi\cosh\xi}\right)$$

Free Space Communications

Figure 47:
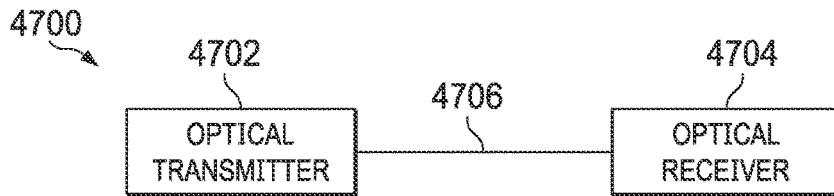
FIG. 47 illustrates a free-space communication system.

An additional configuration in which the optical angular momentum processing and multi-layer overlay modulation technique described herein above may prove useful within the optical network framework is use with free-space optics communications. Free-space optics systems provide a number of advantages over traditional UHF RF based systems from improved isolation between the systems, the size and the cost of the receivers/transmitters, lack of RF licensing laws, and by combining space, lighting, and communication into the same system. Referring now to FIG. 47, there is illustrated an example of the operation of a free-space communication system. The free-space communication system utilizes a free-space optics transmitter 4702 that transmits a light beam 4706 to a free-space optics receiver 4704. The major difference between a fiber-optic network and a free-space optic network is that the information beam is transmitted through free space rather than over a fiber-optic cable. This causes a number of link difficulties, which will be more fully discussed herein below. Free-space optics is a line of sight technology that uses the invisible beams of light to provide optical bandwidth connections that can send and receive up to 2.5 Gbps of data, voice, and video communications between a transmitter 4702 and a receiver 4704. Free-space optics uses the same concepts as fiber-optics, except without the use of a fiber-optic cable. Free-space optics systems provide the light beam 4706 within the infrared (IR) spectrum, which is at the low end of the light spectrum. Specifically, the optical signal is in the range of 300 Gigahertz to 1 Terahertz in terms of wavelength.

Presently existing free-space optics systems can provide data rates of up to 10 Gigabits per second at a distance of up to 2.5 kilometers. In outer space, the communications range of free space optical communications is currently on the order of several thousand kilometers, but has the potential to bridge interplanetary distances of millions of kilometers, using optical telescopes as beam expanders. In January of 2013, NASA used lasers to beam an image of the Mona Lisa to the Lunar Reconnaissance Orbiter roughly 240,000 miles away. To compensate for atmospheric interference, an error correction code algorithm, similar to that used within compact discs, was implemented.

The distance records for optical communications involve detection and emission of laser light by space probes. A two-way distance record for communication was established by the Mercury Laser Altimeter instrument aboard the MESSENGER spacecraft. This infrared diode neodymium laser, designed as a laser altimeter for a Mercury Orbiter mission, was able to communicate across a distance of roughly 15,000,000 miles (24,000,000 kilometers) as the craft neared Earth on a fly by in May of 2005. The previous record had been set with a one-way detection of laser light from Earth by the Galileo Probe as two ground based lasers were seen from 6,000,000 kilometers by the outbound probe in 1992. Researchers used a white LED based space lighting system for indoor local area network communications.

Figure 48:
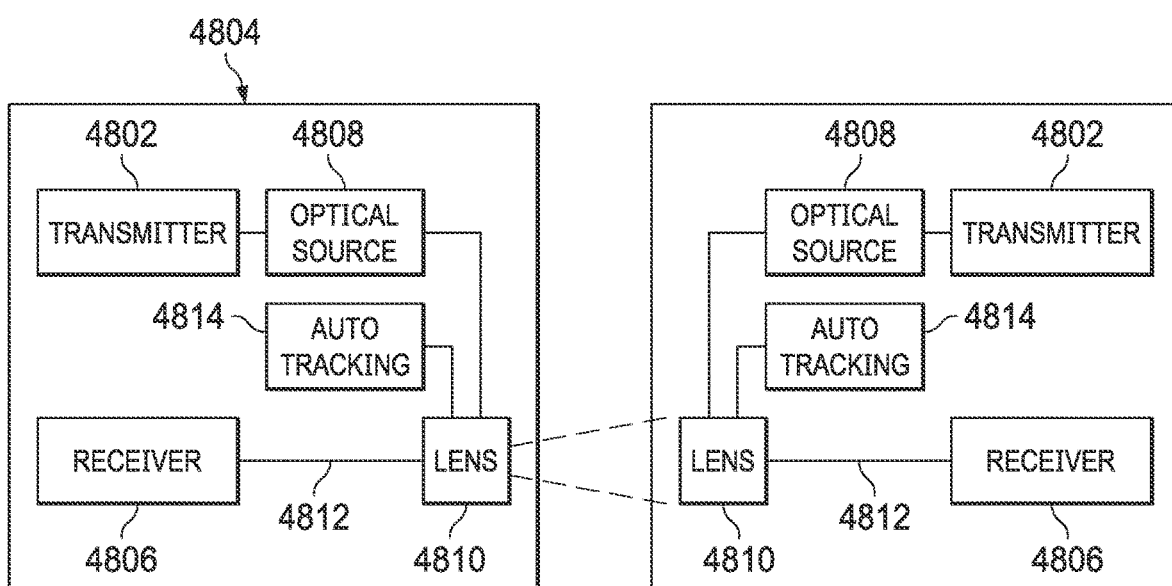
FIG. 48 illustrates a block diagram of a free-space optics system using orbital angular momentum and multi-level overlay modulation.

Referring now to FIG. 48, there is illustrated a block diagram of a free-space optics system using orbital angular momentum and multilevel overlay modulation according to the present disclosure. While the present disclosure is made with respect to a system using OAM and MLO modulation, it will be realized that a system can implement only one of or neither of these techniques. The OAM twisted signals, in addition to being transmitted over fiber, may also be transmitted using free optics. In this case, the transmission signals are generated within transmission circuitry 4802 at each of the FSO transceivers 4804. Free-space optics technology is based on the connectivity between the FSO based optical wireless units, each consisting of an optical transceiver 4804 with a transmitter 4802 and a receiver 4806 to provide full duplex open pair and bidirectional closed pairing capability. Each optical wireless transceiver unit 4804 additionally includes an optical source 4808 plus a lens or telescope 4810 for transmitting light through the atmosphere to another lens 4810 receiving the information. At this point, the receiving lens or telescope 4810 connects to a high sensitivity receiver 4806 via optical fiber 4812. The transmitting transceiver 4804*a* and the receiving transceiver 4804*b* have to have line of sight to each other. Trees, buildings, animals, and atmospheric conditions all can hinder the line of sight needed for this communications medium. Since line of sight is so critical, some systems make use of beam divergence or a diffused beam approach, which involves a large field of view that tolerates substantial line of sight interference without significant impact on overall signal quality. The system may also be equipped with auto tracking mechanism 4814 that maintains a tightly focused beam on the receiving transceiver 3404*b*, even when the transceivers are mounted on tall buildings or other structures that sway.

The modulated light source used with optical source 4808 is typically a laser or light emitting diode (LED) providing the transmitted optical signal that determines all the transmitter capabilities of the system. Only the detector sensitivity within the receiver 4806 plays an equally important role in total system performance. For telecommunications purposes, only lasers that are capable of being modulated at 20 Megabits per second to 2.5 Gigabits per second can meet current marketplace demands. Additionally, how the device is modulated and how much modulated power is produced are both important to the selection of the device. Lasers in the 780-850 nm and 1520-1600 nm spectral bands meet frequency requirements.

Commercially available FSO systems operate in the near IR wavelength range between 750 and 1600 nm, with one or two systems being developed to operate at the IR wavelength of 10,000 nm. The physics and transmissions properties of optical energy as it travels through the atmosphere are similar throughout the visible and near IR wavelength range, but several factors that influence which wavelengths are chosen for a particular system.

The atmosphere is considered to be highly transparent in the visible and near IR wavelength. However, certain wavelengths or wavelength bands can experience severe absorption. In the near IR wavelength, absorption occurs primarily in response to water particles (i.e., moisture) which are an inherent part of the atmosphere, even under clear weather conditions. There are several transmission windows that are nearly transparent (i.e., have an attenuation of less than 0.2 dB per kilometer) within the 700-10,000 nm wavelength range. These wavelengths are located around specific center wavelengths, with the majority of free-space optics systems designed to operate in the windows of 780-850 nm and 1520-1600 nm.

Wavelengths in the 780-850 nm range are suitable for free-space optics operation and higher power laser sources may operate in this range. At 780 nm, inexpensive CD lasers may be used, but the average lifespan of these lasers can be an issue. These issues may be addressed by running the lasers at a fraction of their maximum rated output power which will greatly increase their lifespan. At around 850 nm, the optical source 4808 may comprise an inexpensive, high performance transmitter and detector components that are readily available and commonly used in network transmission equipment. Highly sensitive silicon (SI) avalanche photodiodes (APD) detector technology and advanced vertical cavity emitting laser may be utilized within the optical source 4808.

VCSEL technology may be used for operation in the 780 to 850 nm range. Possible disadvantage of this technology include beam detection through the use of a night vision scope, although it is still not possible to demodulate a perceived light beam using this technique.

Wavelengths in the 1520-1600 nm range are well-suited for free-space transmission, and high quality transmitter and detector components are readily available for use within the optical source block 4808. The combination of low attenuation and high component availability within this wavelength range makes the development of wavelength division multiplexing (WDM) free-space optics systems feasible. However, components are generally more expensive and detectors are typically less sensitive and have a smaller receive surface area when compared with silicon avalanche photodiode detectors that operator at the 850 nm wavelength. These wavelengths are compatible with erbium-doped fiber amplifier technology, which is important for high power (greater than 500 milliwatt) and high data rate (greater than 2.5 Gigabytes per second) systems. Fifty to 65 times as much power can be transmitted at the 1520-1600 nm wavelength than can be transmitted at the 780-850 nm wavelength for the same eye safety classification. Disadvantages of these wavelengths include the inability to detect a beam with a night vision scope. The night vision scope is one technique that may be used for aligning the beam through the alignment circuitry 4814. Class 1 lasers are safe under reasonably foreseeable operating conditions including the use of optical instruments for intrabeam viewing. Class 1 systems can be installed at any location without restriction.

Another potential optical source 4808 comprised Class 1M lasers. Class 1M laser systems operate in the wavelength range from 302.5 to 4000 nm, which is safe under reasonably foreseeable conditions, but may be hazardous if the user employs optical instruments within some portion of the beam path. As a result, Class 1M systems should only be installed in locations where the unsafe use of optical aids can be prevented. Examples of various characteristics of both Class 1 and Class 1M lasers that may be used for the optical source 4808 are illustrated in Table G below.

TABLE G

| Laser Classification | Power (mW) | Aperture Size (mm) | Distance (m) | Power Density (mW/cm$^2$) |
|---|---|---|---|---|
| 850-nm Wavelength | | | | |
| Class 1 | 0.78 | 7 | 14 | 2.03 |
|  |  | 50 | 2000 | 0.04 |
| Class 1M | 0.78 | 7 | 100 | 2.03 |
|  | 500 | 7 | 14 | 1299.88 |
|  |  | 50 | 2000 | 25.48 |
| 1550-nm Wavelength | | | | |
| Class 1 | 10 | 7 | 14 | 26.00 |
|  |  | 25 | 2000 | 2.04 |
| Class 1M | 10 | 3.5 | 100 | 103.99 |
|  | 500 | 7 | 14 | 1299.88 |
|  |  | 25 | 2000 | 101.91 |

The 10,000 nm wavelength is relatively new to the commercial free space optic arena and is being developed because of better fog transmission capabilities. There is presently considerable debate regarding these characteristics because they are heavily dependent upon fog type and duration. Few components are available at the 10,000 nm wavelength, as it is normally not used within telecommunications equipment. Additionally, 10,000 nm energy does not penetrate glass, so it is ill-suited to behind window deployment.

Within these wavelength windows, FSO systems should have the following characteristics. The system should have the ability to operate at higher power levels, which is important for longer distance FSO system transmissions. The system should have the ability to provide high speed modulation, which is important for high speed FSO systems. The system should provide a small footprint and low power consumption, which is important for overall system design and maintenance. The system should have the ability to operate over a wide temperature range without major performance degradations such that the systems may prove useful for outdoor systems. Additionally, the mean time between failures should exceed 10 years. Presently existing FSO systems generally use VCSELS for operation in the shorter IR wavelength range, and Fabry-Pérot or distributed feedback lasers for operation in the longer IR wavelength range. Several other laser types are suitable for high performance FSO systems.

A free-space optics system using orbital angular momentum processing and multi-layer overlay modulation would provide a number of advantages. The system would be very convenient. Free-space optics provides a wireless solution to a last-mile connection, or a connection between two buildings. There is no necessity to dig or bury fiber cable. Free-space optics also requires no RF license. The system is upgradable and its open interfaces support equipment from a variety of vendors. The system can be deployed behind windows, eliminating the need for costly rooftop right. It is also immune to radiofrequency interference or saturation. The system is also fairly speedy. The system provides 2.5 Gigabits per second of data throughput. This provides ample bandwidth to transfer files between two sites. With the growth in the size of files, free-space optics provides the necessary bandwidth to transfer these files efficiently.

Free-space optics also provides a secure wireless solution. The laser beam cannot be detected with a spectral analyzer or RF meter. The beam is invisible, which makes it difficult to find. The laser beam that is used to transmit and receive the data is very narrow. This means that it is almost impossible to intercept the data being transmitted. One would have to be within the line of sight between the receiver and the transmitter in order to be able to accomplish this feat. If this occurs, this would alert the receiving site that a connection has been lost. Thus, minimal security upgrades would be required for a free-space optics system.

However, there are several weaknesses with free-space optics systems. The distance of a free-space optics system is very limited. Currently operating distances are approximately within 2 kilometers. Although this is a powerful system with great throughput, the limitation of distance is a big deterrent for full-scale implementation. Additionally, all systems require line of sight be maintained at all times during transmission. Any obstacle, be it environmental or animals can hinder the transmission. Free-space optic technology must be designed to combat changes in the atmosphere which can affect free-space optic system performance capacity.

Something that may affect a free-space optics system is fog. Dense fog is a primary challenge to the operation of free-space optics systems. Rain and snow have little effect on free-space optics technology, but fog is different. Fog is a vapor composed of water droplets which are only a few hundred microns in diameter, but can modify light characteristics or completely hinder the passage of light through a combination of absorption, scattering, and reflection. The primary answer to counter fog when deploying free-space optic based wireless products is through a network design that shortens FSO linked distances and adds network redundancies.

Absorption is another problem. Absorption occurs when suspended water molecules in the terrestrial atmosphere extinguish photons. This causes a decrease in the power density (attenuation) of the free space optics beam and directly affects the availability of the system. Absorption occurs more readily at some wavelengths than others. However, the use of appropriate power based on atmospheric conditions and the use of spatial diversity (multiple beams within an FSO based unit), helps maintain the required level of network availability.

Solar interference is also a problem. Free-space optics systems use a high sensitivity receiver in combination with a larger aperture lens. As a result, natural background light can potentially interfere with free-space optics signal reception. This is especially the case with the high levels of background radiation associated with intense sunlight. In some instances, direct sunlight may case link outages for periods of several minutes when the sun is within the receiver's field of vision. However, the times when the receiver is most susceptible to the effects of direct solar illumination can be easily predicted. When direct exposure of the equipment cannot be avoided, the narrowing of receiver field of vision and/or using narrow bandwidth light filters can improve system performance. Interference caused by sunlight reflecting off of a glass surface is also possible.

Scattering issues may also affect connection availability. Scattering is caused when the wavelength collides with the scatterer. The physical size of the scatterer determines the type of scattering. When the scatterer is smaller than the wavelength, this is known as Rayleigh scattering. When a scatterer is of comparable size to the wavelengths, this is known as Mie scattering. When the scattering is much larger than the wavelength, this is known as non-selective scattering. In scattering, unlike absorption, there is no loss of energy, only a directional redistribution of energy that may have significant reduction in beam intensity over longer distances.

Physical obstructions such as flying birds or construction cranes can also temporarily block a single beam free space optics system, but this tends to cause only short interruptions. Transmissions are easily and automatically resumed when the obstacle moves. Optical wireless products use multibeams (spatial diversity) to address temporary abstractions as well as other atmospheric conditions, to provide for greater availability.

The movement of buildings can upset receiver and transmitter alignment. Free-space optics based optical wireless offerings use divergent beams to maintain connectivity. When combined with tracking mechanisms, multiple beam FSO based systems provide even greater performance and enhanced installation simplicity.

Scintillation is caused by heated air rising from the Earth or man-made devices such as heating ducts that create temperature variations among different pockets of air. This can cause fluctuations in signal amplitude, which leads to "image dancing" at the free-space optics based receiver end. The effects of this scintillation are called "refractive turbulence." This causes primarily two effects on the optical beams. Beam wander is caused by the turbulent eddies that are no larger than the beam. Beam spreading is the spread of an optical beam as it propagates through the atmosphere.

Referring now to FIGS. 49A through 49D, in order to achieve higher data capacity within optical links, an additional degree of freedom from multiplexing multiple data channels must be exploited. Moreover, the ability to use two different orthogonal multiplexing techniques together has the potential to dramatically enhance system performance and increased bandwidth.

One multiplexing technique which may exploit the possibilities is mode division multiplexing (MDM) using orbital angular momentum (OAM). OAM mode refers to laser beams within a free-space optical system or fiber-optic system that have a phase term of $e^{il\varphi}$ in their wave fronts, in which $\varphi$ is the azimuth angle and l determines the OAM value (topological charge). In general, OAM modes have a "donut-like" ring shaped intensity distribution. Multiple spatial collocated laser beams, which carry different OAM values, are orthogonal to each other and can be used to transmit multiple independent data channels on the same wavelength. Consequently, the system capacity and spectral efficiency in terms of bits/S/Hz can be dramatically increased. Free-space communications links using OAM may support 100 Tbits/capacity. Various techniques for implementing this as illustrated in FIGS. 49A through 49D include a combination of multiple beams 4902 having multiple different OAM values 4904 on each wavelength. Thus, beam 4902 includes OAM values, OAM1 and OAM4. Beam 4906 includes OAM value 2 and OAM value 5. Finally, beam 4908 includes OAM3 value and OAM6 value. Referring now to FIG. 48B, there is illustrated a single beam wavelength 4910 using a first group of OAM values 4912 having both a positive OAM value 4912 and a negative OAM value 4914. Similarly, OAM2 value may have a positive value 4916 and a negative value 4918 on the same wavelength 4910.

Figure 49A:
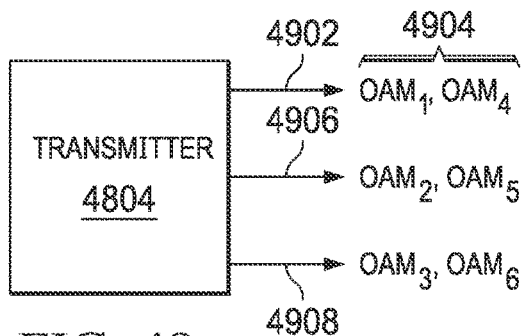
FIGS. 49A-49C illustrate the manner for multiplexing multiple data channels into optical links to achieve higher data capacity.
Figure 49B:
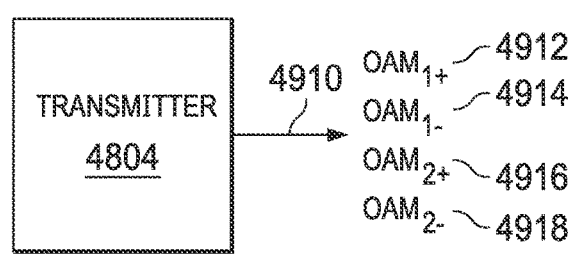
Figure 49C:
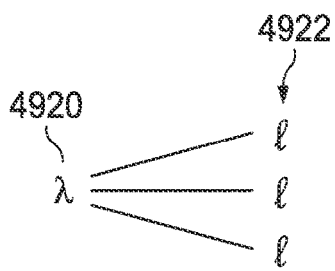
Figure 49D:
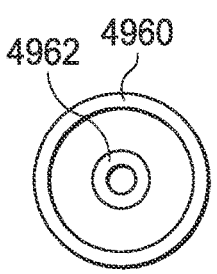
FIG. 49D illustrates groups of concentric rings for a wavelength having multiple OAM valves.

FIG. 49C illustrates the use of a wavelength 4920 having polarization multiplexing of OAM value. The wavelength 4920 can have multiple OAM values 4922 multiplexed thereon. The number of available channels can be further increased by applying left or right handed polarization to the OAM values. Finally, FIG. 49D illustrates two groups of concentric rings 4960, 4962 for a wavelength having multiple OAM values.

Figure 50:
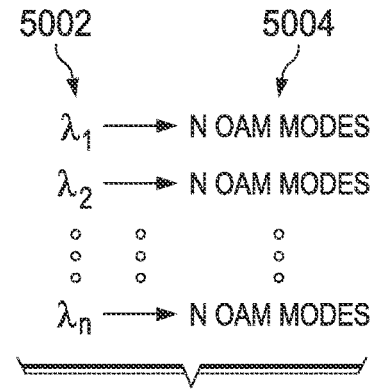
FIG. 50 illustrates a WDM channel containing many orthogonal OAM beams.

Wavelength distribution multiplexing (WDM) has been widely used to improve the optical communication capacity within both fiber-optic systems and free-space communication system. OAM mode multiplexing and WDM are mutually orthogonal such that they can be combined to achieve a dramatic increase in system capacity. Referring now to FIG. 50, there is illustrated a scenario where each WDM channel 5002 contains many orthogonal OAM beam 5004. Thus, using a combination of orbital angular momentum with wave division multiplexing, a significant enhancement in communication link to capacity may be achieved.

Current optical communication architectures have considerable routing challenges. A routing protocol for use with free-space optic system must take into account the line of sight requirements for optical communications within a free-space optics system. Thus, a free-space optics network must be modeled as a directed hierarchical random sector geometric graph in which sensors route their data via multi-hop paths to a base station through a cluster head. This is a new efficient routing algorithm for local neighborhood discovery and a base station uplink and downlink discovery algorithm. The routing protocol requires order Olog(n) storage at each node versus order O(n) used within current techniques and architectures.

Current routing protocols are based on link state, distance vectors, path vectors, or source routing, and they differ from the new routing technique in significant manners. First, current techniques assume that a fraction of the links are bidirectional. This is not true within a free-space optic network in which all links are unidirectional. Second, many current protocols are designed for ad hoc networks in which the routing protocol is designed to support multi-hop communications between any pair of nodes. The goal of the sensor network is to route sensor readings to the base station. Therefore, the dominant traffic patterns are different from those in an ad hoc network. In a sensor network, node to base stations, base station to nodes, and local neighborhood communication are mostly used.

Figure 51:
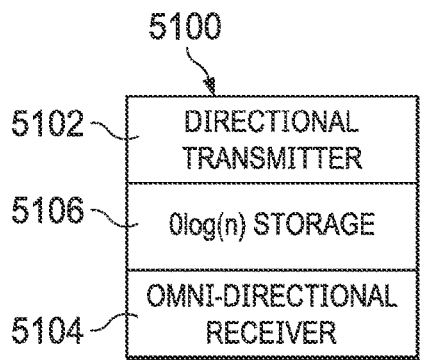
FIG. 51 illustrates a node of a free-space optical system.

Recent studies have considered the effect of unidirectional links and report that as many as 5 percent to 10 percent of links and wireless ad hoc networks are unidirectional due to various factors. Routing protocols such as DSDV and AODV use a reverse path technique, implicitly ignoring such unidirectional links and are therefore not relevant in this scenario. Other protocols such as DSR, ZRP, or ZRL have been designed or modified to accommodate unidirectionality by detecting unidirectional links and then providing bidirectional abstraction for such links. Referring now to FIG. 51, the simplest and most efficient solution for dealing with unidirectionality is tunneling, in which bidirectionality is emulated for a unidirectional link by using bidirectional links on a reverse back channel to establish the tunnel. Tunneling also prevents implosion of acknowledgement packets and looping by simply pressing link layer acknowledgements for tunneled packets received on a unidirectional link. Tunneling, however, works well in mostly bidirectional networks with few unidirectional links.

Figure 52:
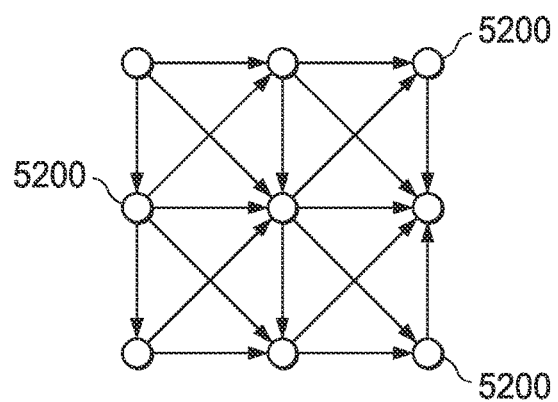
FIG. 52 illustrates a network of nodes within a free-space optical system.

Within a network using only unidirectional links such as a free-space optical network, systems such as that illustrated in FIGS. 51 and 52 would be more applicable. Nodes within a unidirectional network utilize a directional transmit 5102 transmitting from the node 5100 in a single, defined direction. Additionally, each node 5100 includes an omnidirectional receiver 5004 which can receive a signal coming to the node in any direction. Also, as discussed here and above, the node 5000 would also include a 0 log(n) storage 5106. Thus, each node 5100 provide only unidirectional communications links. Thus, a series of nodes 5200 as illustrated in FIG. 52 may unidirectionally communicate with any other node 5200 and forward communication from one desk location to another through a sequence of interconnected nodes.

Topological charge may be multiplexed to the wave length for either linear or circular polarization. In the case of linear polarizations, topological charge would be multiplexed on vertical and horizontal polarization. In case of circular polarization, topological charge would be multiplexed on left hand and right hand circular polarizations.

The topological charges can be created using Spiral Phase Plates (SPPs) such as that illustrated in FIG. 17E, phase mask holograms or a Spatial Light Modulator (SLM) by adjusting the voltages on SLM which creates properly varying index of refraction resulting in twisting of the beam with a specific topological charge. Different topological charges can be created and muxed together and de-muxed to separate charges.

As Spiral Phase plates can transform a plane wave ($\ell$ =0) to a twisted wave of a specific helicity (i.e. $\ell$ =+1), Quarter Wave Plates (QWP) can transform a linear polarization (s=0) to circular polarization (i.e. s=+1).

Cross talk and multipath interference can be reduced using Multiple-Input-Multiple-Output (MIMO).

Most of the channel impairments can be detected using a control or pilot channel and be corrected using algorithmic techniques (closed loop control system).

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Figure 53:
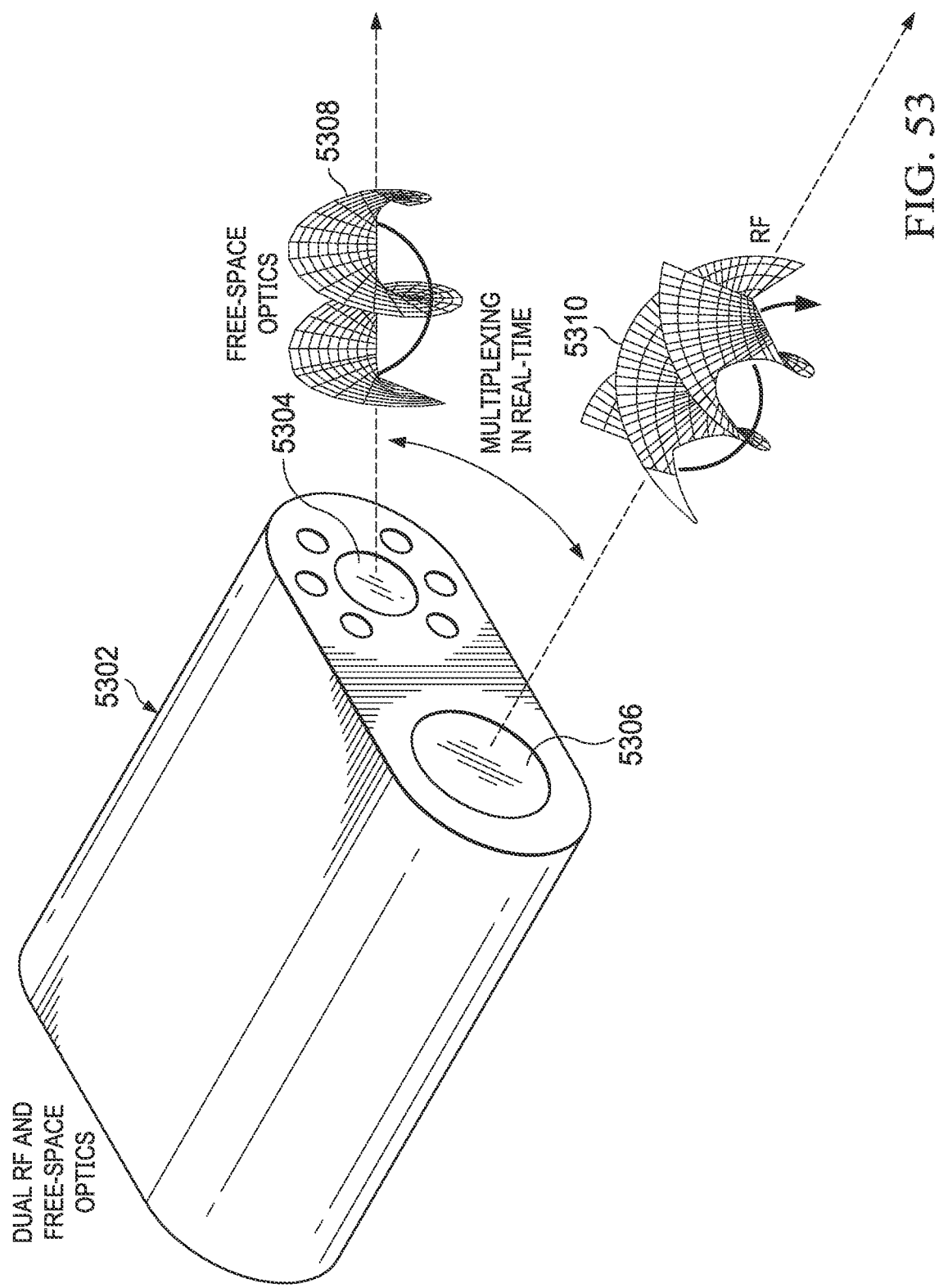
FIG. 53 illustrates a system for multiplexing between a free space signal and an RF signal.

In a further embodiment illustrated in FIG. 53, both RF signals and free space optics may be implemented within a dual RF and free space optics mechanism 5302. The dual RF and free space optics mechanism 5302 include a free space optics projection portion 5304 that transmits a light wave having an orbital angular momentum applied thereto with multilevel overlay modulation and a RF portion 5306 including circuitry necessary for transmitting information with orbital angular momentum and multilayer overlay on an RF signal 5310. The dual RF and free space optics mechanism 5302 may be multiplexed in real time between the free space optics signal 5308 and the RF signal 5310 depending upon operating conditions. In some situations, the free space optics signal 5308 would be most appropriate for transmitting the data. In other situations, the free space optics signal 5308 would not be available and the RF signal 5310 would be most appropriate for transmitting data. The dual RF and free space optics mechanism 5302 may multiplex in real time between these two signals based upon the available operating conditions.

Multiplexing of the topological charge to the RF as well as free space optics in real time provides redundancy and better capacity. When channel impairments from atmospheric disturbances or scintillation impact the information signals, it is possible to toggle between free space optics to RF and back in real time. This approach still uses twisted waves on both the free space optics as well as the RF signal. Most of the channel impairments can be detected using a control or pilot channel and be corrected using algorithmic techniques (closed loop control system) or by toggling between the RF and free space optics.

Figure 54:
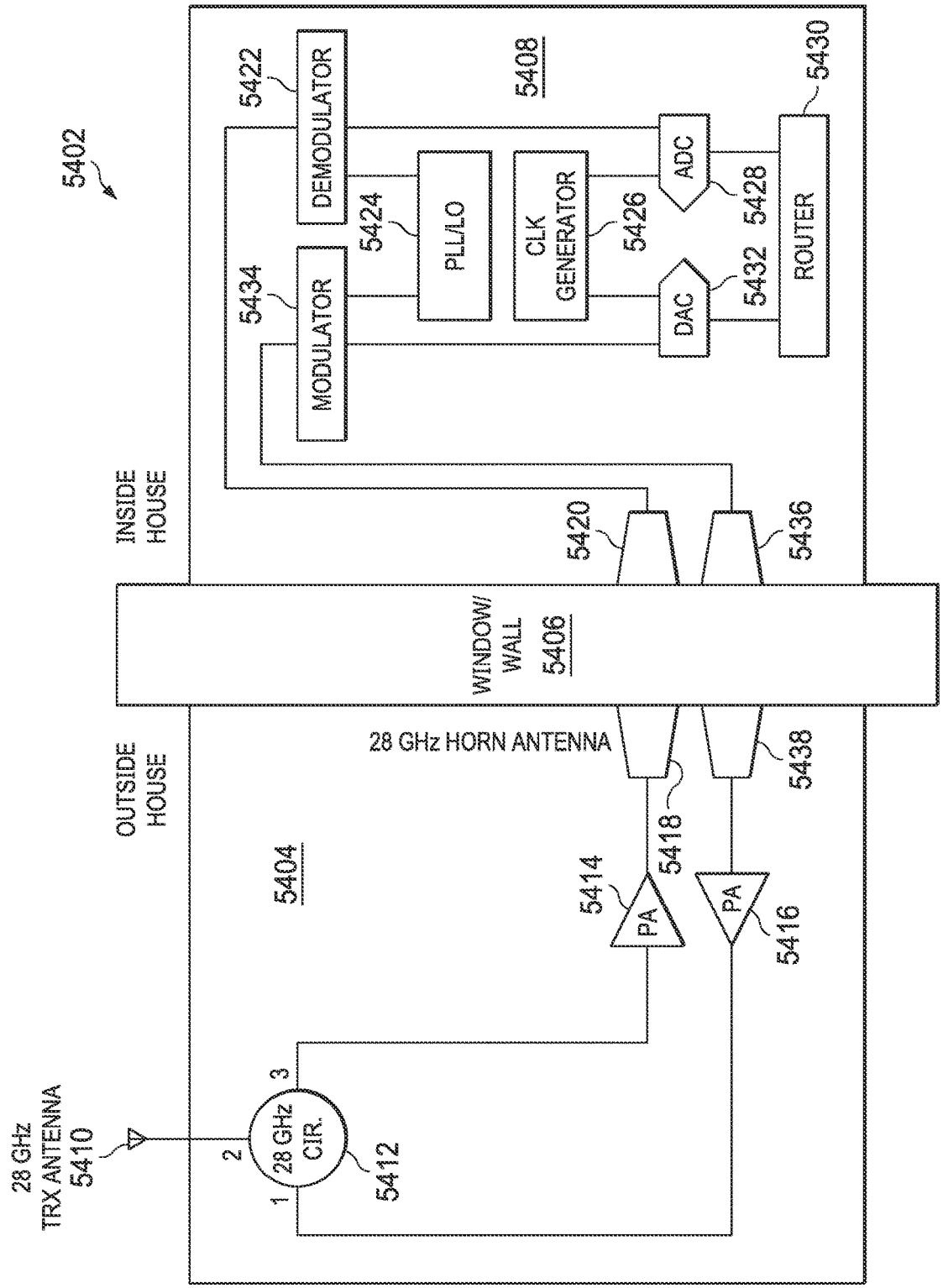
FIG. 54 illustrates an embodiment using horn antennas for transmitting data through a window or wall.

Referring now to FIG. 54, there is illustrated an alternative embodiment wherein rather than using a VCSEL for transmission of the signal through a window or wall, a horn or conical antenna is used for the transmission of signals through the window or wall. The signals transmitted via the horn antennas are amplified for transmission in order to overcome the losses caused by transmission of the signals through the window/wall. The device provides an optical or RF tunnel through the window or wall without requiring the drilling of any holes. The millimeter wave transmission system 5402 includes an exterior portion 5404 located on an exterior of a window or wall 5406 and an interior portion 5408 located on the interior of the wall or window. The exterior portion 5404 includes an antenna 5410 for transmitting and receiving signals to an exterior source. In a preferred embodiment, the antenna comprises a 28 GHz antenna. However, it will be realized by one skilled in the art that other antenna operating bandwidths may be utilized.

The transmitted and received signals are processed at a 28 GHz circulator 5412. The circulator 5412 comprises an RF switch for switching between three ports within the exterior portion 5404 and has good isolation. Within the circulator 5412 signals input at port 2 are output at port 3 and signals input at port 1 are output to port 2. Thus, the signals received by the antenna 5410 are provided to port 2 of the circulator 5412 and output to port 3. The port 3 signals are provided to the input of a power amplifier 5414. Similarly, the output of a power amplifier 5416 is connected to input port 1 such that signals to be transmitted are provided to port 2 of the circulator 5412 for transmission by antenna 5410.

The power amplifier 5412 boosts the signal strength for transmission through the window or wall. The signals output from the power amplifier 5414 are provided to a horn antenna 5418. The horn antenna 5418 transmits to the RF signals provided from the power amplifier 5414 through the window or wall 5406 to a receiving horn antenna 5420. The horn antennas may transmit/receive over a wide frequency band from 24 GHz up to e-band. Within this range a particular band of operation for the horn antennas is utilized. These bands include but are not limited to 24 GHz band; 28 GHz A1 band; 28 GHz B1, A3 and B2 bands; 31 GHz band and 39 GHz band. The horn antennas may also be of different sizes to provide for example 10 db or 20 dB of gain.

The received signals are output from the horn antenna 5420 to demodulator circuit 5422 for demodulation. The demodulator 5422, in addition to receiving the receive signal from for an antenna 5420, receives a signal output from a phase locked loop/local oscillator 5424. The phase locked loop/local oscillator 5424 is controlled responsive to a clock generation circuit 5426. The demodulated signal is provided from the demodulator 5422 to analog-to-digital converter

5428 to generate a digital output. The digital signal is routed via a router 5432 to the appropriate receiving party within the structure.

Signals to be transmitted are received from inside the building at the router 5430. The router 5430 provides digital signals to a digital to analog converter 5432 that converts the digital data signals into an analog format. The analog signals are next modulated by a modulator 5434. The modulator 5434 modulates the signals responsive to input from the phase locked loop/local oscillator 5424 under control of the clock generation circuit 5426. The modulated signals from modulator 5434 are transmitted through the window/wall 5406 using a horn antenna 5436. The signals transmitted by horn antenna 5436 are received by a receiving horn antenna 5438 located on the outside. The output of the horn antenna 5438 is provided to the input of power amplifier 5416 that amplifies the signal for transmission from the antenna 5410 after passing through circulator 5412. While the above discussion has been made with respect to the use of horn antennas for transmission through the window/wall, conical antennas may also be used for the transmissions through the window or wall.

Figure 55:
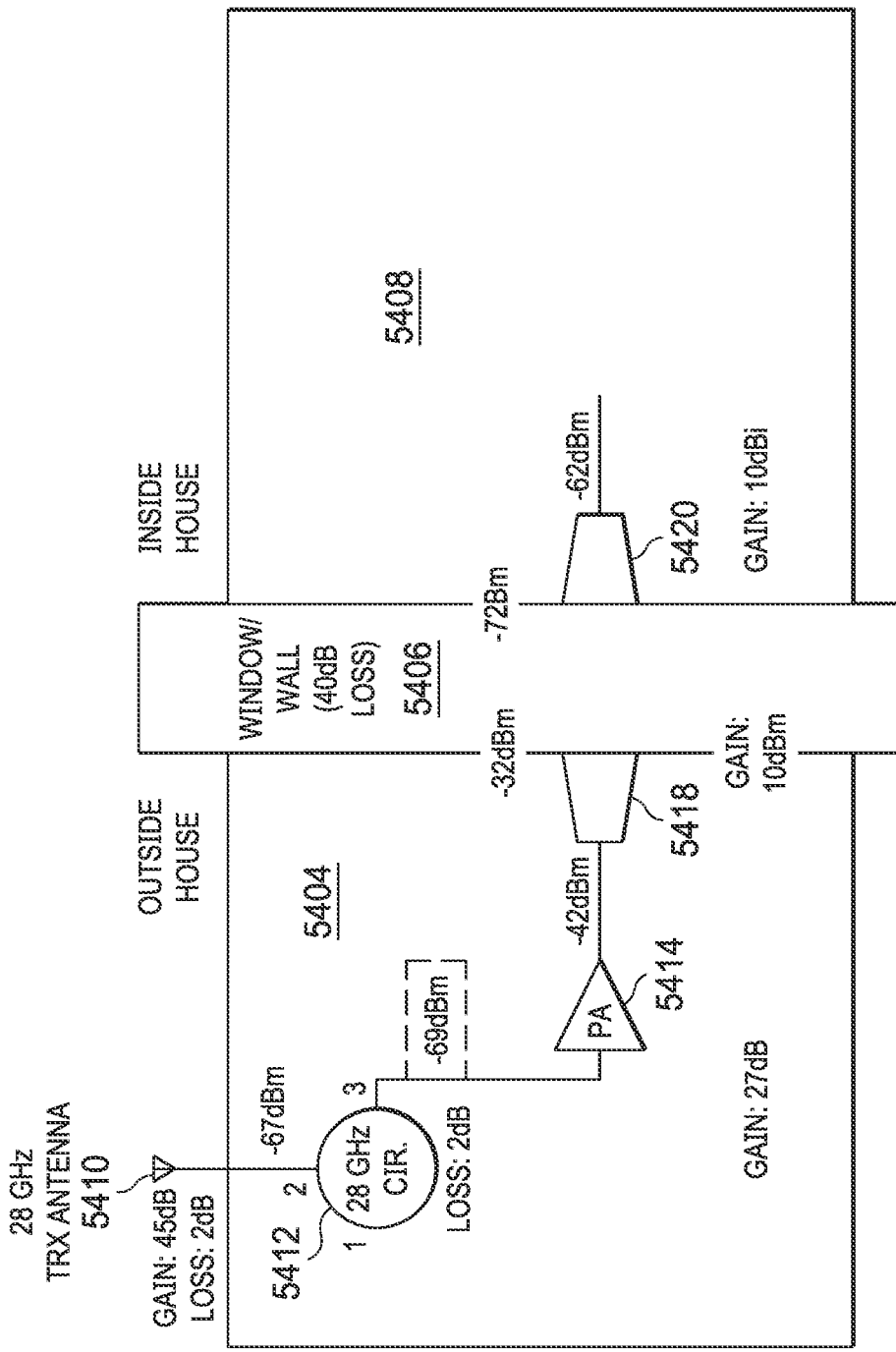
FIG. 55 illustrates a downlink losses in the embodiment of FIG. 54.

Referring now to FIG. 55, there is illustrated the downlink losses between the transmitting antenna 5410 and the receiving circuitry within the inside portion 5408. The signal is received at −110 dBm. The receiving antenna has a gain of 45 dB and a loss of 2 dB. Thus, the signal output from the receiving antenna 5410 has a strength of −67 dBm. The circulator 5412 has a 2 dB loss, and the signal from the circulator 5412 has a strength of −69 dBm. The power amplifier 5414 provides a 27 dB to boost the signal to −42 dBm for transmission across the window/wall. The horn antenna 5418 provides a gain of 10 dBi to transmit the signal at 32 dBm. The window/wall provides an approximately 40 dB loss. The receive horn antenna 5420 receives the signal at −72 dBm and provides a gain of 10 dBi to output the received signal at −62 dBm to the interior circuit components.

Figure 56:
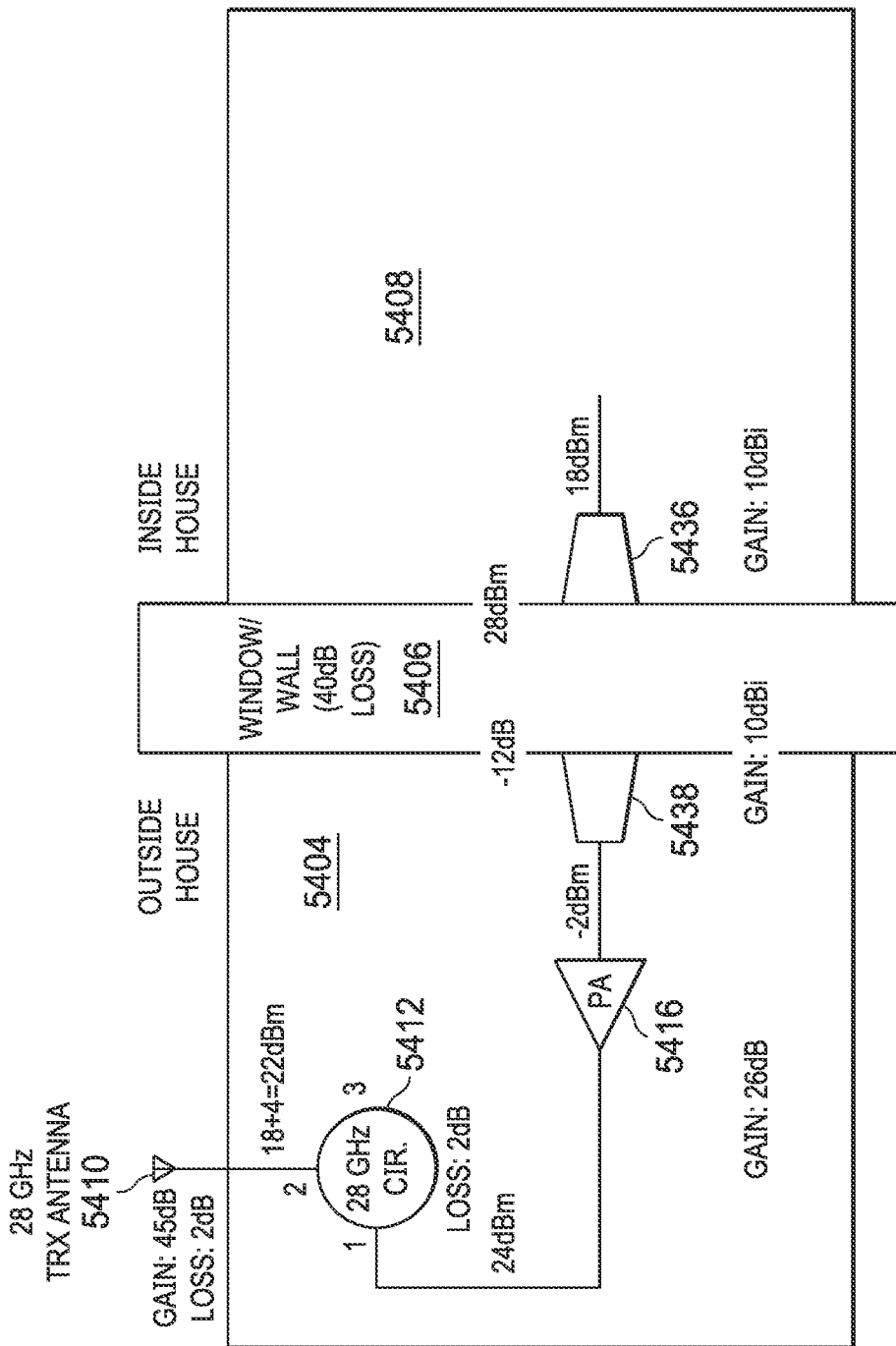
FIG. 56 illustrates up link signal strengths in the embodiment of FIG. 54.

Referring now to FIG. 56, there is illustrated the uplink signal strengths when a power amplifier is located outside the window/wall 5406. The transmitted signal has a strength of 18 dBm prior to reaching the input of the horn antenna 5436. The antenna 5436 provides a gain of 10 dBi to transmit the signal at 28 dBm. The window/wall 5406 causes an approximately 40 dB total loss dropping the signal strength to −12 dB. The horn antenna 5438 provides a 10 dBi gain to the signal and outputs the signal at −2 dBm. The power amplifier 5416 provides a 26 dB gain to output the signal at 24 dBm to the port 1 input of the circulator 5412. The power circulator 5412 provides a further 2 dB loss to output the signal to the antenna 5410 at 22 dBm. The signal is transmitted from the antenna 5410 having a gain of 45 dB and a loss of 2 dB to provide a transmitted signal strength of 65 dBm.

Figure 57:
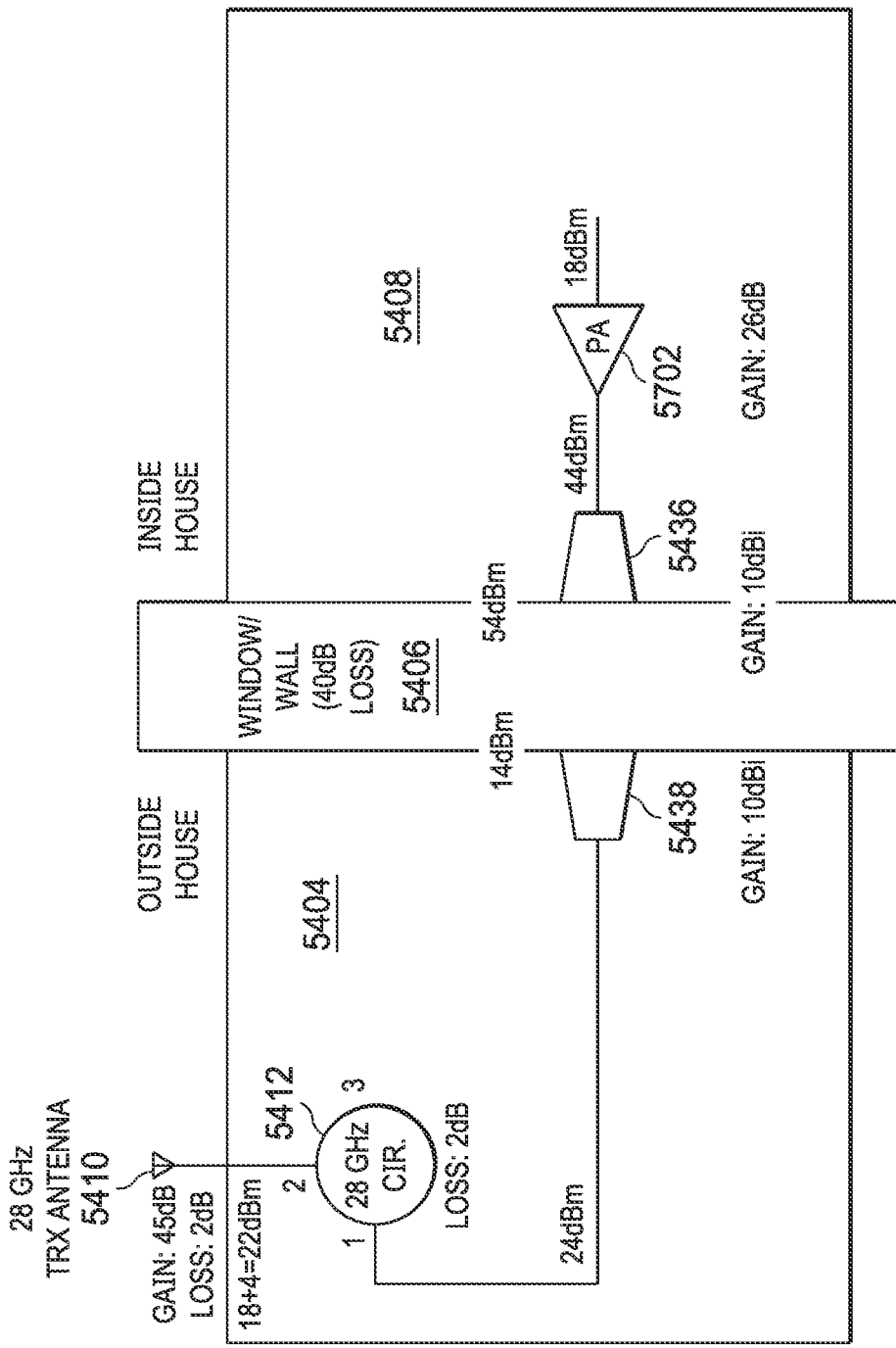
FIG. 57 illustrates up link signal strengths when a power amplifier is located inside of the building in the embodiment of FIG. 54.

Referring now to FIG. 57, there is illustrated the uplink signal strengths when the power amplifier 5702 is located inside of the building. The internal power amplifier 5702 is used when one needs more power to be transmitted from the inside terminal. Prior to input to the power amplifier 5702 the signal has a strength of 18 dBm within the building. The power amplifier 5902 provides a 26 dB gain to transmit the signal at 44 dBm to the input of the horn antenna 5436. The horn antenna 5436 provides a 10 dBi gain and the transmitted RF signal is at 54 dBm. The transmitted signal experiences an approximately 40 dB loss through the window/wall 5404 that drops the signal strength to 14 dBm on the outside portion of the window/wall 5404. The receiving horn antenna 5438 provides a gain of 10 dBi to increase the signal strength to 24 dBm at the output of the horn antenna 5438 that is provided to port 1 of the circulator 5412. The circulator 5412 causes a 2 dB loss to drop the signal strength to 22 dBm. The transmitting antenna 5410 provides a further gain of 45 dB and loss off 2 dB to provide a transmitted output signal strength of 65 dBm.

Figure 58:
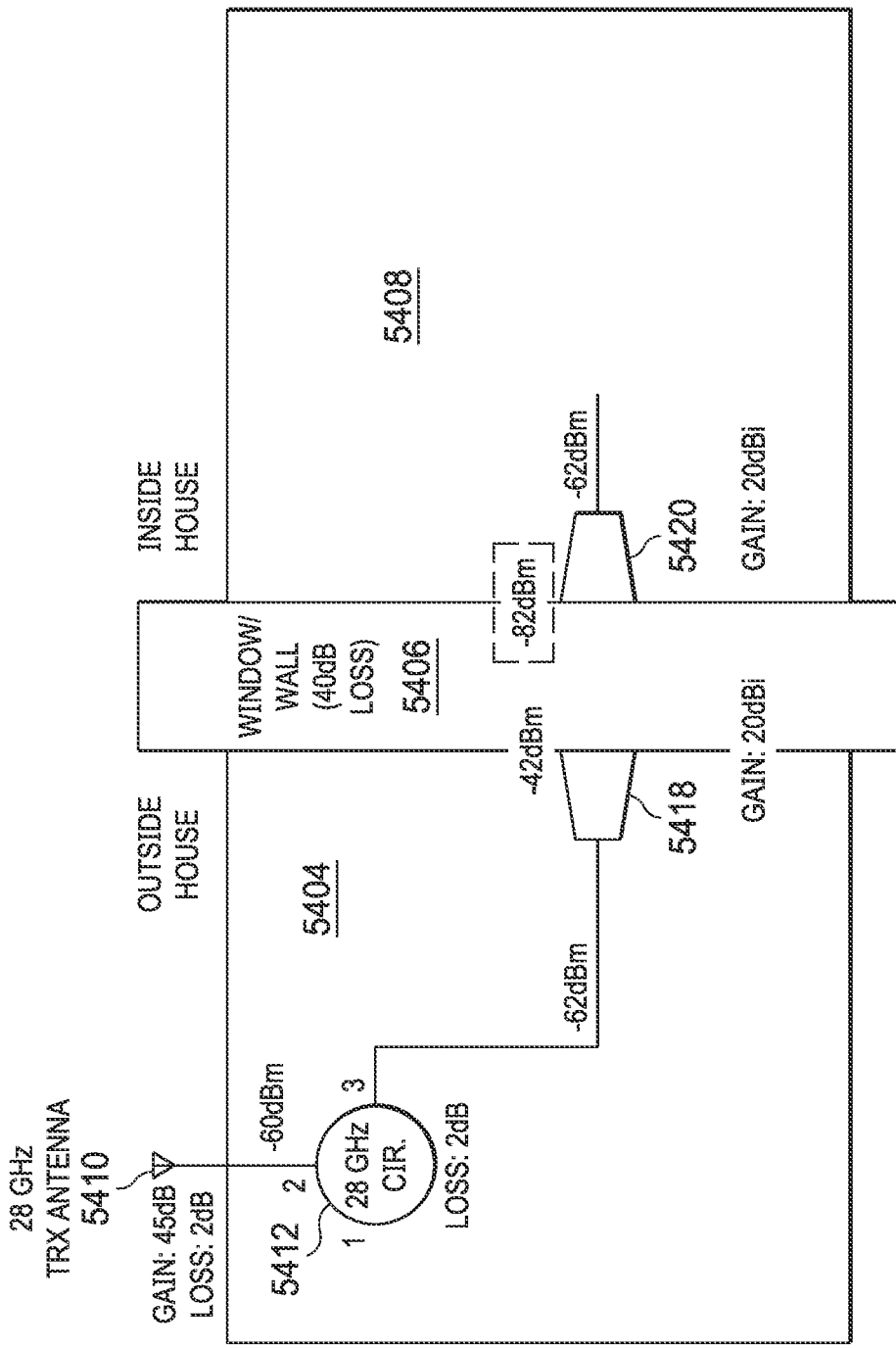
FIG. 58 illustrates gains and losses on a downlink of the embodiment of FIG. 59 when no power amplifier is incorporated.

Referring now to FIG. 58, there is illustrated the gains and losses on the downlink when no power amplifier is included. A signal having a −103 dBm strength is received by the antenna 5410. The antenna 5410 provides a gain of 45 dB and a loss of 2 dB. This provides a 60 DBM signal at the output of the antenna 5410 that is input to port 2 of the circulator 5412. The circulator 5412 provides a further 2 dB loss to the signal providing a −62 dBm signal from port 3 that is provided to the input of the horn antenna 5418 that provides a gain of the 20 dBi. A signal having a value of −42 dBm is transmitted from the horn antenna 5418 through the window/wall 5406. The window/wall 5406 provides an approximately 40 dB loss to the transmitted signal providing a −82 dBm signal at the receiving horn antenna 5420. The horn antenna 5420 provides a further 20 dBi gain to the signal that is output at −62 dBm to the remaining circuitry of the inside portion 5408 of the device.

Figure 59:
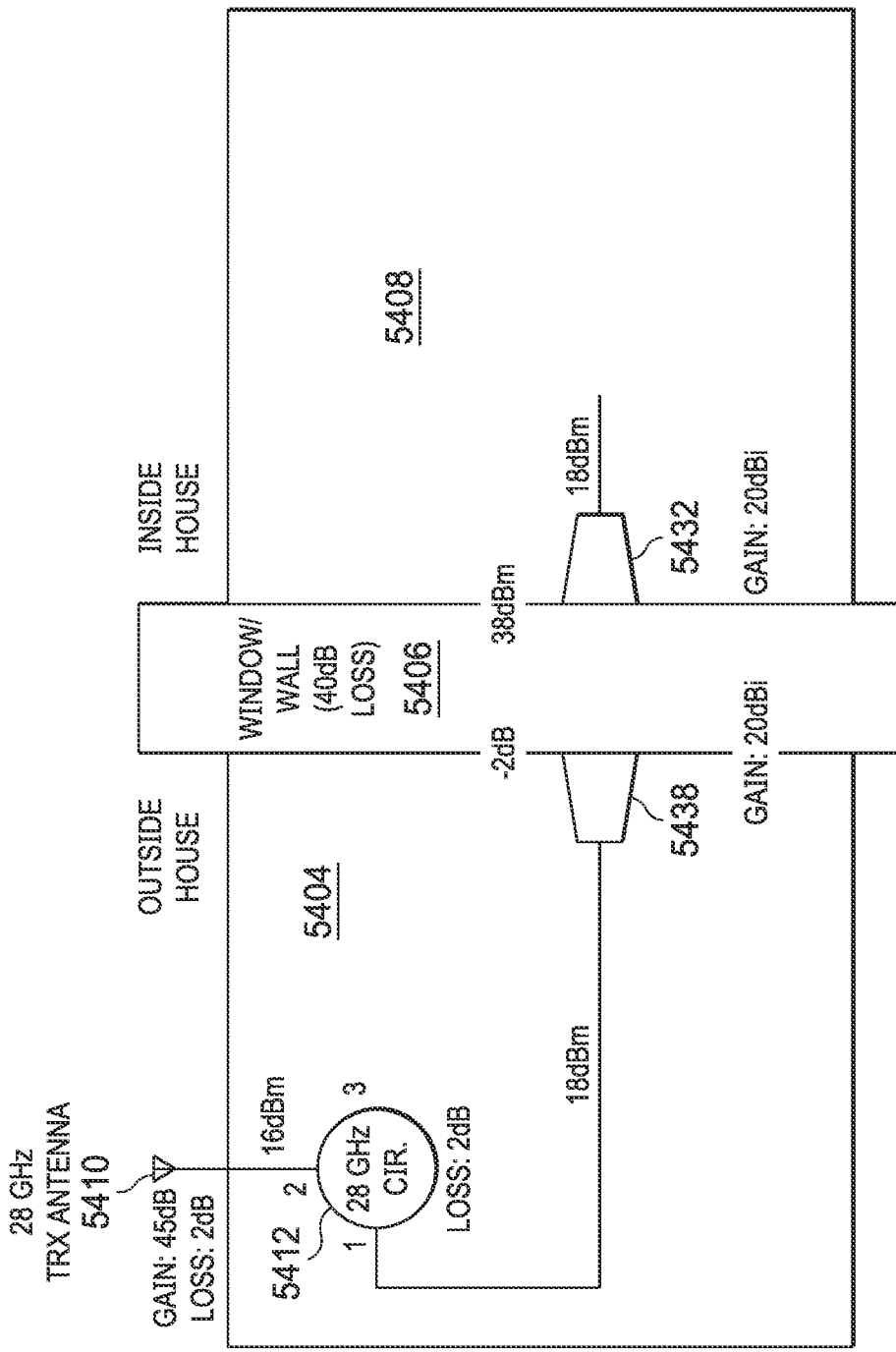
FIG. 59 illustrates signal strengths at various points of the uplink when no power amplifier is provided in the embodiment of FIG. 54.

Referring now to FIG. 59, there is illustrated the signal strengths at various points of an uplink when no power amplifier is provided. The transmitted signals are provided at a strength of 18 dBm to the input of the horn antenna 5432. The horn antenna 5432 provides a gain of 20 dBi to output a signal at 38 dBm through the window/wall 5406. The window/wall 5406 causes an approximately 40 dB loss to the signal such that the receiving horn antenna 5438 receives a signal at −2 dB. The receiving horn antenna 5438 boosts the signal to 18 dBm with a gain of 20 dBi. The 18 dBm signal is input to port 1 of the circulator 5412. The circulator 5412 causes a 2 dB loss to the signal which is output through port 2 at 60 dBm. The transmitting antenna has a gain of 45 dB and a loss of two dB to cause a transmitted signal from the antenna at 59 dBm.

The above described dB losses with respect to the window/wall and various system components are all approximate values. System including other dB loss values and gain may also be used with respect to the embodiments described herein. It would be known to one skilled in the art of the manner for determining the dB losses that would be associated with a particular wall or window and the associated system components. One example of the manner in which the dB values may be determined is illustrated in U.S. Provisional Application No. 62/369,393, filed Aug. 1, 2016, entitled REGENERATION, RETRANSMISSION OF MILLIMETER WAVES FOR INDOOR PENETRATION, and U.S. Provisional Application No. 62/425,432, filed Nov. 22, 2016, entitled REGENERATION, RETRANSMISSION OF MILLIMETER WAVES FOR BUILDING PENETRATION USING HORN ANTENNAS, each of which is incorporated herein by reference.

Horn Antennas

Figure 60:
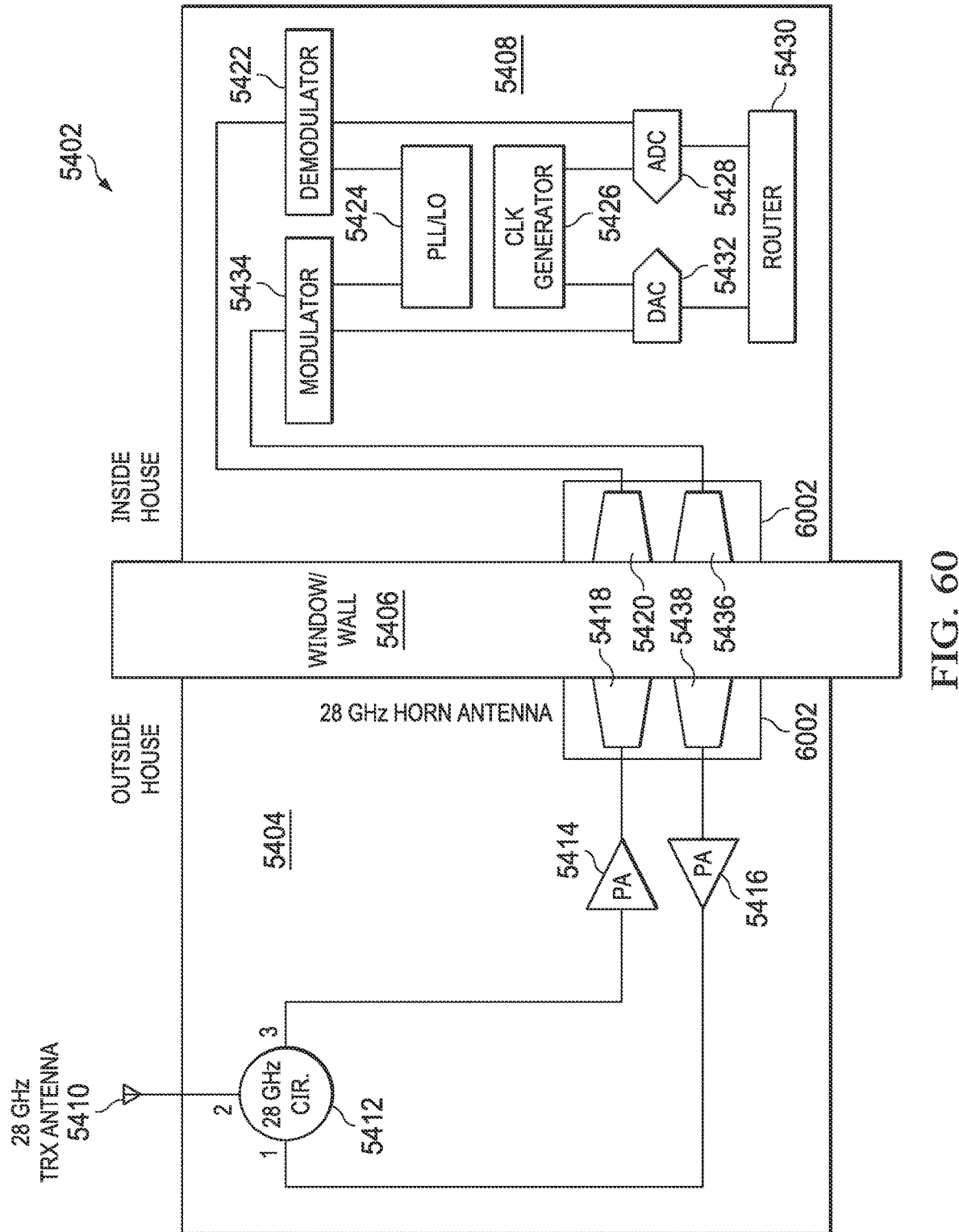
FIG. 60 illustrates shielding used incorporation with the embodiment of FIG. 56.

Referring now to FIG. 60, there is illustrated a further alternative embodiment using a horn antenna is used for the transmission of signals through the window or wall. As before, the millimeter wave transmission system 5402 includes an exterior portion 5404 located on an exterior of a window or wall 5406 and interior portion 5408 located on the interior of the wall or window. The exterior portion 5404 includes an antenna 5410 for transmitting and receiving signals to an exterior source.

The transmitted and received signals are processed at a 28 GHz circulator 5412. The port 3 signals are provided to the input of a power amplifier 5414. Similarly, the output of a power amplifier 5416 is connected to input port 1 such that signals to be transmitted are provided to port 2 of the circulator 5412 for transmission by antenna 5410. The signals output from the power amplifier 5414 are provided to a 28 GHz horn antenna 5418. The horn antenna 5418 transmitted to the RF signals provided from the power amplifier 5414 through the window or wall 5406 to a receiving horn antenna 5420. The receive signals are output from the horn antenna 5420 to a modulator circuit 5422 for demodulation. The demodulator 5422 in addition to receiving the receive signal from for an antenna 5420 receives a signal output from a phase locked loop/local oscillator 5424. The phase locked loop/local oscillator 5424 is controlled responsive to a clock generation circuit 5426. The demodulated signal is provided from the demodulator 5422 to analog-to-digital converter 5428. The digital signal is routed via a router 5432 the appropriate receiving party.

Signals to be transmitted are received from inside the building at the router 5430. In a one embodiment this will comprise a Wi-Fi router. The router 5430 provides digital signals to a digital to analog converter 5432 converts the signals into an analogue format. The analog signals are then modulated by a modulator 5434. The modulator 5434 modulates the signals responsive to input from the phase locked loop/local oscillator 5424 under control of the clock generation circuit 5426. The modulated signals from modulator 5434 are output through the window/wall 5406 through a horn antenna 5436. The signals transmitted by horn antenna 5436 or received by a receiving horn antenna 5438 located on the outside. The output of the horn antenna 5438 is provided to the input power amplifier 5416 that amplifies the signal for transmission from the antenna 5410 after passing through circulator 5412.

The horn antennas 5418, 5420, 5436 and 5438 can have high gains of up to 20 dB. The antenna patterns of these antennas will have side lobes and front lobes. The front lobes are projected toward a receiving antenna. In in order to shield the surrounding environment from emissions from the side lobes of the horn antennas 5418, 5420, 5436 and 5438, shielding 6202 may be added over the horn antennas to provide adequate protection to the environment in the vicinity of the device. The shielding 6002 act as absorbers to block the signals from the surrounding environment and may comprise any material required to contain and absorb the emissions of the horn antennas to a localized area contained within the shielding enclosure 6002.

Patch Antennas

Figure 61:
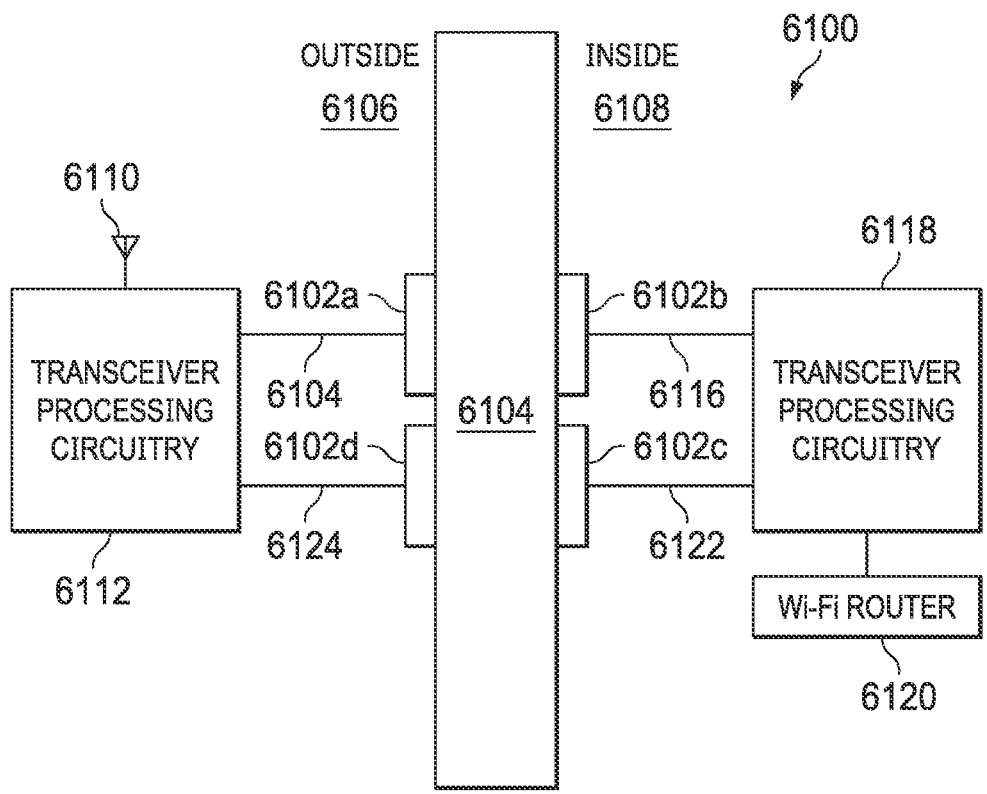
FIG. 61 illustrates an embodiment using patch antennas for transmitting data through a window or wall.

Referring now to FIG. 61, there is illustrated an alternative embodiment using patch antennas 6102 for transmissions of signals through a window or wall 6104. The signals transmitted via the patch antennas 6102 are processed in one of the manners described herein above for transmitting signals through a window or wall 6104. The patch antennas 6102 generate directional radio wave beams to tunnel through low-e glass or walls. The device provides an optical or RF tunnel through the window or wall 6104 without requiring the drilling of any holes or the creation of some type of signal permeable portal. The millimeter wave transmission system 6100 includes an exterior portion 6106 located on an exterior of a window or wall 6104 and interior portion 6108 located on the interior of the window or wall 6104. The exterior portion 6106 includes an antenna 6110 for transmitting and receiving signals to an exterior source, such as a base station. Link budgets between the base station and the antenna must be satisfied. In a preferred embodiment, the antenna comprises a 28 Hz antenna. However, it will be realized by one skilled in the art that other antenna operating bandwidths such as 24 GHz, 39 GHz, 60 GHz and other bandwidths may be utilized.

The transmitted and received signals that are received at the antenna 6110 are provided from the interior 6108 are processed by transceiver processing circuitry 6112. The transceiver processing circuitry 6112 may comprise any of the circuitries described herein above for placing the received signals at the antenna 6110 or signals received from the inside 6108 of the building in order to enable their transmission through a window or wall 6104 or convert from the format capable of passing through the window or wall 6104 for external transmission via antenna 6110. The transceiver processing circuitry 6112 can down converted frequencies to lower frequency EM waves that can penetrate through glass and walls and also be amplified using antenna array. Components within the transceiver processing circuitry 6112 may comprise things such as, but are not limited to, an RF circulator, power amplifiers, up down converters, RF transmission circuitries, optical transmission circuitries, etc.

The transceiver processing circuitry 6112 places the signals in a format for transmission through the window or wall 6104. The signals output from the transceiver processing circuitry 6112 on line 6114 are provided to patch antenna 6102*a*. The patch antenna 6102*a* transmits the RF or optical signals provided from the transceiver processing circuitry 6112 through the window or wall 6104 to a receiving patch antenna 6102*b*. The patch antennas 6102 may transmit/receive over a wide frequency band from 24 GHz up to e-band. Within this range a particular band of operations for the patch antennas 6102 is utilized. These bands include, but are not limited to, 24 GHz band; 28 GHz A1 band; 28 GHz B-1, A3 and B2 bands; 31 GHz band; 39 GHz band; and 60 GHz band. The patch antennas 6102 may be of different configurations to provide varying levels of gain therefrom. In one embodiment the antennas may be configured to provide 18 dB of gain.

The received signals are output from the patch antenna 6102*b* on line 6116 to transceiver processing circuitry 6118 for demodulation and further processing. The transceiver processing circuitry 6118 may include any of the various configurations described herein above with respect to the interior transceiver circuit. The demodulated and processed signal is provided from the transceiver processing circuitry 6118 to a Wi-Fi router 6120 to be transmitted to receiving devices within the structure.

Signals to be transmitted to an exterior receiver are received from inside the building at the Wi-Fi router 6120. The Wi-Fi router 6120 provides signals to transceiver processing circuitry 6118 that converts the Wi-Fi data signals into an RF format that will transmit across the wall or window 6104 as discussed above. The RF signals are output from the transceiver processing circuitry on line 6120 to patch antenna 6102*c*. The modulated signals from patch antenna 6102*c* are transmitted through the window/wall 6104. The signals transmitted by patch antenna 6102*c* are received by a receiving patch antenna 6102*d* located on the exterior of the building. The output of the patch antenna 6102*d* is provided on line 6124 to the transceiver processing circuitry 6112. The signals are converted into the format that is needed to enable transmissions of the signals from the antenna 6110. This format may comprise 24 GHz, 28 GHz, 39 GHz, 60 GHz; current cellular LTE frequencies; 3.5 GHz CBRS; 5 GHz; 24, 28, 39, 60, 70, 80 GHz mm-bands or any other frequency band suffering from signal loss issues when transmitted through a window or wall.

Figure 62:
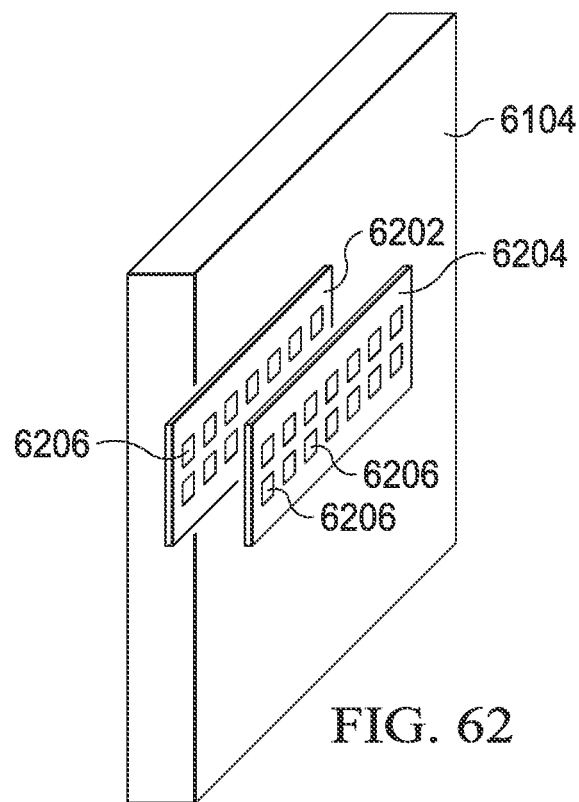
FIG. 62 illustrates a patch antenna array used in the embodiment of FIG. 61.

Referring now to FIG. 62, there is provided an illustration of the patch antenna array 6202. The patch antenna array 6202 comprises a first layer 6202 and a second layer 6204 located above the first layer 6202. The first layer 6202 is connected directly to the window or wall 6104. Each layer 6202/6204 contains multiple patch antennas 6206. Each of the first and second layers 6202/6204 transmit signals across the window or wall 6104. The patch antenna array 6202 may transmit on all millimeter wave bands such as 24 GHz, 28 GHz, 39 GHz, 60 GHz, etc. The multiple patch antennas 6206 can be configured in rectangular, circular or elliptical configurations to generate a directional beam for carrying a traffic payload.

Figure 63:
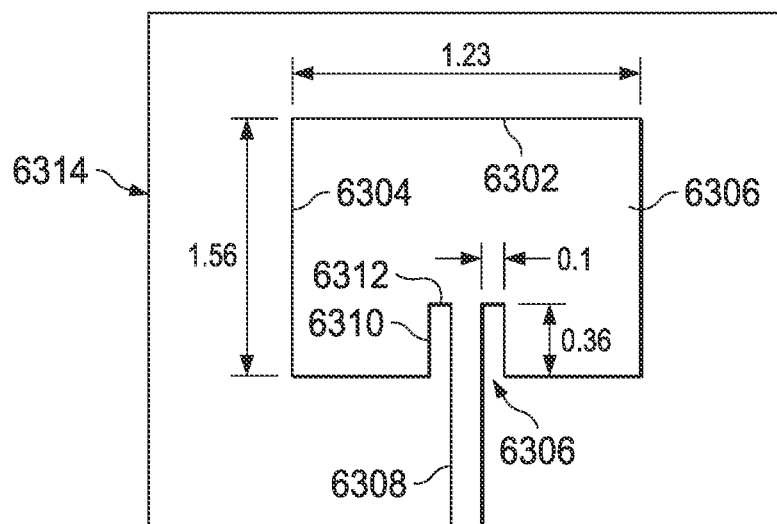
FIG. 63 illustrates a patch antenna of a patch antenna array.

Referring now to FIG. 63, there is illustrated one of the patch antennas 6206 of the patch antenna array 6202 of FIG. 62. The patch antenna 6206 has an overall width along a first edge 6302 of 1.23 mm, and a length of 1.56 mm on a second edge 6304. The patch antenna 6206 defines a slot 6306 to which a transmission line 6308 connects to the patch antenna 6206. The slot 6306 has a length of 0.36 mm along a first edge 6310 and a width of 0.1 mm on each side 6312 of the transmission line 6308. The patch antenna 6206 is generated on a substrate 6314 made of FR408. The patch antenna 6206 has a relative permittivity of 3.75, a loss tangent of 0.018 and a thickness of 0.127 mm.

Figure 64:
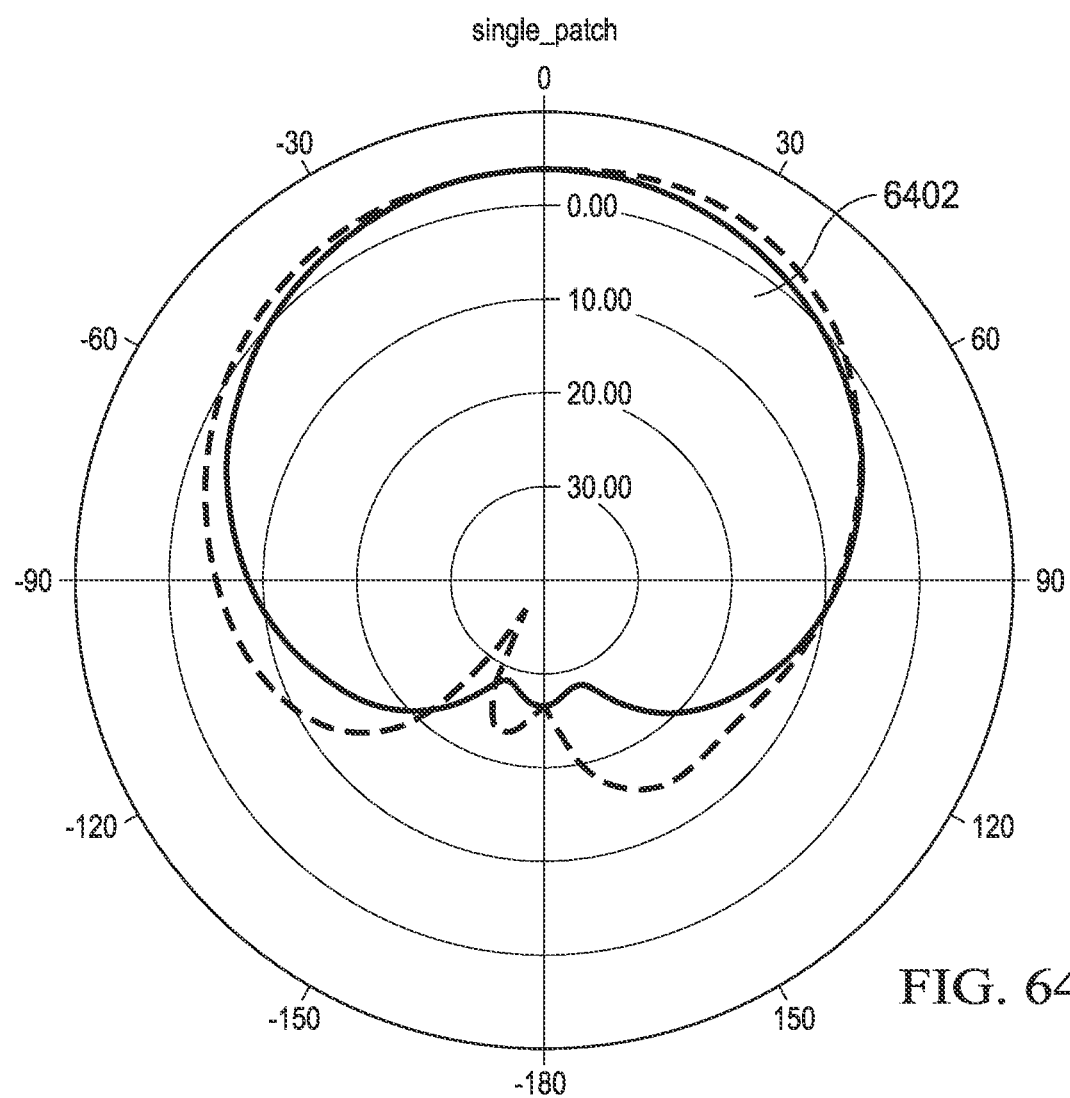
FIG. 64 illustrates an antenna gain simulation for a patch antenna.

Referring now to FIG. 64, there is illustrated a transmission beam simulation for the antenna of FIG. 63 using HFSS (high-frequency structure simulator). The single patch antenna generates a transmission beam 6402 as illustrated in FIG. 64 that has a peak gain of 3.8 dB and a 3 dB beam width of 80°. Design and simulations of the patch antenna are performed using ANSYS HFSS with microstrip feed structure to prepare for manufacturing. The sidelobe radiation can be absorbed with absorbing material and the main lobe is directed towards the receiving unit.

Figure 65:
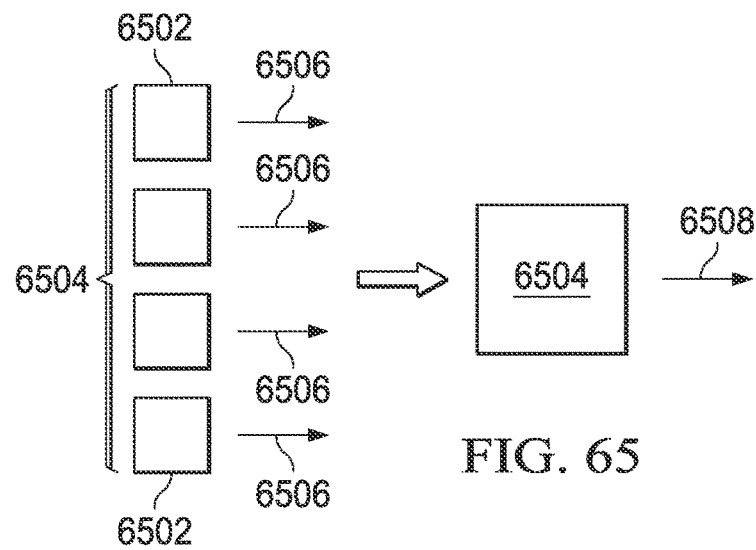
FIG. 65 illustrates the generation of a highly directional, high gain beam using a patch antenna array.

By using a patch antenna array as illustrated in FIG. 62, a highly directional, high gain beam may be generated as generally illustrated in FIG. 65. A plurality of patch antennas 6502 within a patch antenna array 6504 may each transmit an individual beam 6506. Each of the individual beams 6506 have an associated directionality and gain. The output of the patch antenna array 6504 will combine each of the individual patch antenna beams 6506 to create a combined array transmission beam 6508. The combined transmission beam 6508 will have a better directionality and larger gain than each of the individual beam 6506 generated by the individual patch antennas 6502. Thus, by generating the transmission beam using the patch antenna array 6504, a beam 6508 having sufficient gain and directionality to pass through a window or wall to a receiver and overcome associated signal losses will be possible.

Figure 66:
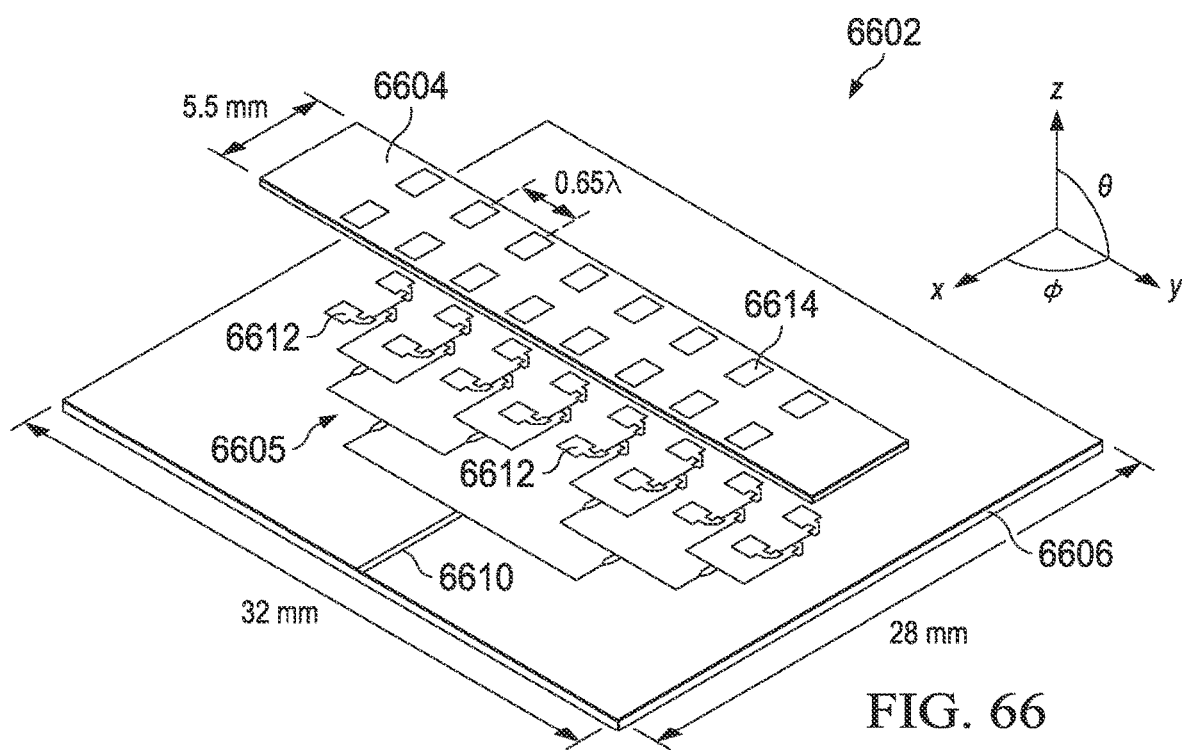
FIG. 66 illustrates a further embodiment of a microstrip patch antenna array.

Referring now to FIG. 66, there is illustrated a further embodiment of a microstrip patch antenna array 6602 utilizing a microstrip antenna array for 60 GHz bandwidth applications. The microstrip patch antenna array 6602 comprises a 2×8 microstrip patch antenna array 6604 using a conductor-backed coplanar waveguide (CB-CPW) loop feed 6605. The patch antenna array 6604 consist of an upper substrate layer 6604 and a lower substrate layer 6606. The conductor backed coplanar waveguide 6605 is located on the lower substrate layer 6606 comprising a 32 mm×28 mm plane made of quartz having a dielectric constant of 3.9, a loss tangent of 0.0002 and a thickness of 0.525 mm. The plane 6606 defines an input 6610 connecting to transmission lines that provides inputs to patch antennas 6612 of a 2×8 patch antenna array defined on the plane 6606 that define the CPW-fed loop. The upper substrate layer 6604 defines multiple patch antennas 6614 thereon on a Rogers RO3003 substrate having a thickness of approximately 0.254 mm, a dielectric constant of 3.00 and the loss tangent of 0.001. This type of antenna provides a gain of 18 dB board side at 61 GHz and has a bandwidth of approximately 57 GHz to 64 GHz.

Figure 67:
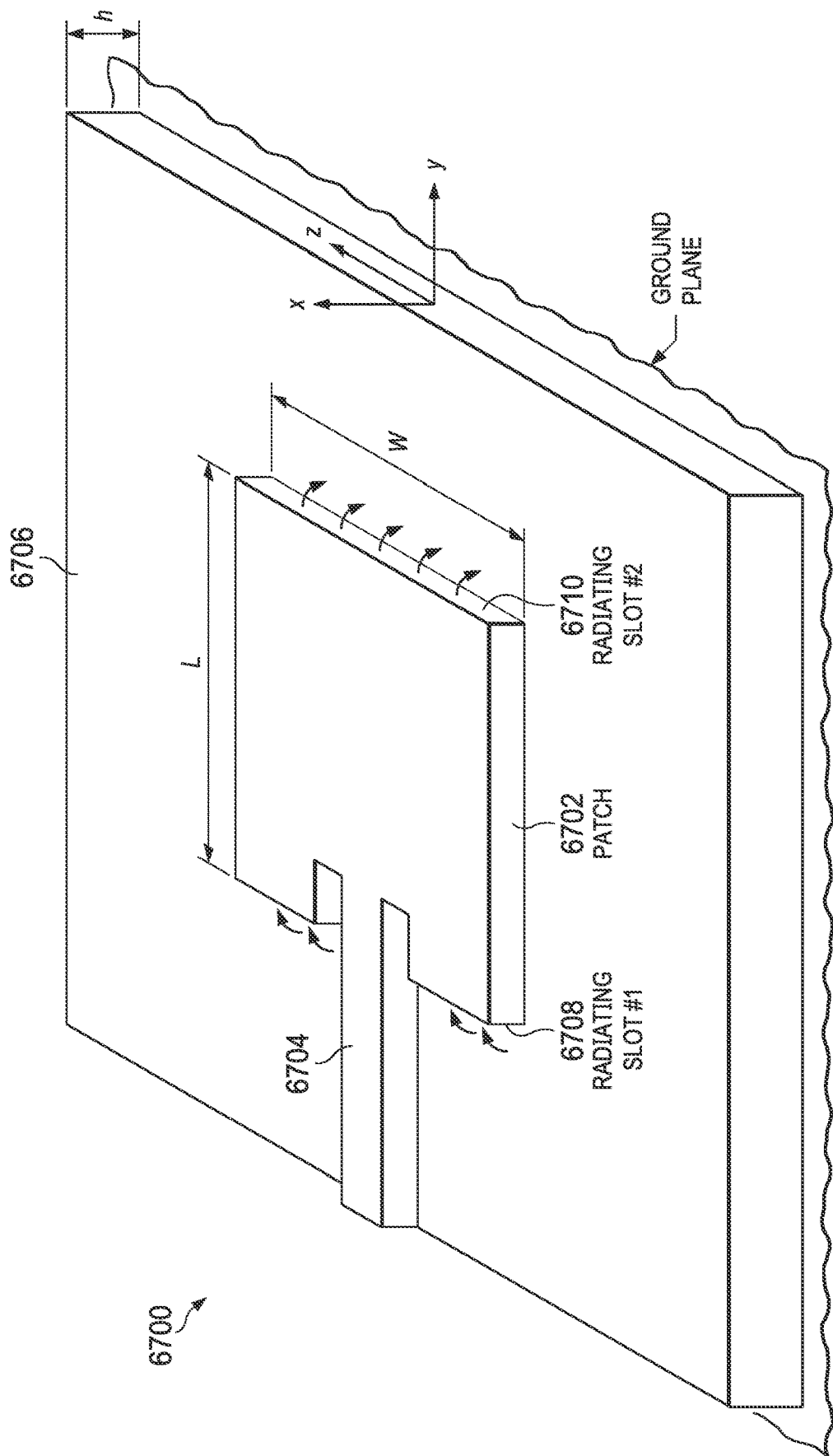
FIG. 67 illustrates a patch antenna element.
Figure 68:
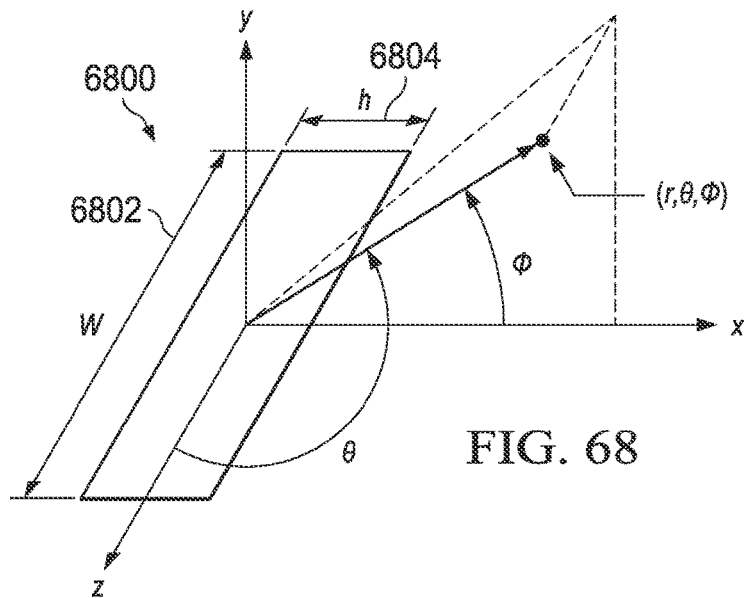
FIG. 68 illustrates the electronic radiating fields of a patch antenna.

Referring now more particularly to FIG. 67, there is illustrated a patch antenna element 6700. Multiple ones of these patch antenna elements 6700 are located upon the multilayer patch antenna array as discussed hereinabove. The antenna element 6700 includes a patch 6702 having a length L and a width W. The patch 6702 is fed from an input transmission line 6704 that is connected with a feed network and is resting upon a substrate 6706 having a height h. The microstrip patch antenna includes a first radiating slot 6708 along a first edge of the patch 6702 and a second radiating slot 6710 along a second edge of the patch 6702. The electronic field at the aperture of each slot can be decomposed into X and Y components as illustrated in FIG. 68. The Y components are out of phase and cancel out because of the half wavelength transmission line 6704. The radiating fields can be determined by treating the antenna as an aperture 6800 as shown in FIG. 68 having a width W 6802 and a height h 6804.

The transmission line model can be further analyzed in the following manner. Gr is the slot conductance and Br is the slot susceptance. They may be determined according to the equations:

$$G_r = \begin{cases} \dfrac{W^2}{90\lambda_0^2} & \text{for } W < \lambda_0 \\ \dfrac{W}{120\lambda_0} & \text{for } W > \lambda_0 \end{cases}$$

$$B_r = \dfrac{2\pi\Delta\ell\sqrt{\varepsilon_{\mathit{eff}}}}{\lambda_0 Z_0}$$

The input admittance of the patch antenna 6700 can be approximated as:

$$Y_{in} = Y_{slot} + Y_0 \dfrac{Y_{slot} + jY_0 \tan(\beta(L + 2\Delta\ell))}{Y_0 + jY_{slot}\tan(\beta(L + 2\Delta\ell))}$$

where $\Delta l$ is the end effect of the microstrip.

The rectangular patch antenna 6700 will resonate when the imaginary part of the input admittance goes to zero.

The end effect may be calculated according to the equation:

$$\Delta\ell = 0.412h\left(\dfrac{\varepsilon_{\mathit{eff}} + 0.3}{\varepsilon_{\mathit{eff}} - 0.258}\right)\dfrac{(W/h) + 0.264}{(W/h) + 0.8}$$

$$L + 2\Delta\ell = \dfrac{\lambda_g}{2} = \dfrac{\lambda_0}{2\sqrt{\varepsilon_{\mathit{eff}}}}$$

$$\varepsilon_{\mathit{eff}} = \dfrac{\varepsilon_r + 1}{2} + \dfrac{\varepsilon_r - 1}{2}\left(1 + \dfrac{10h}{W}\right)^{-0.5}$$

The resonant frequency of the patch antenna 6700 is given by:

$$f_r = \frac{C}{2\sqrt{\varepsilon_{\mathit{eff}}}\,(L+2\Delta\ell)}$$

Typically the width W of the aperture is given by:

$$W = \frac{c}{2f_r}\left(\frac{\varepsilon_r+1}{2}\right)^{-1/2}$$

Figure 69:
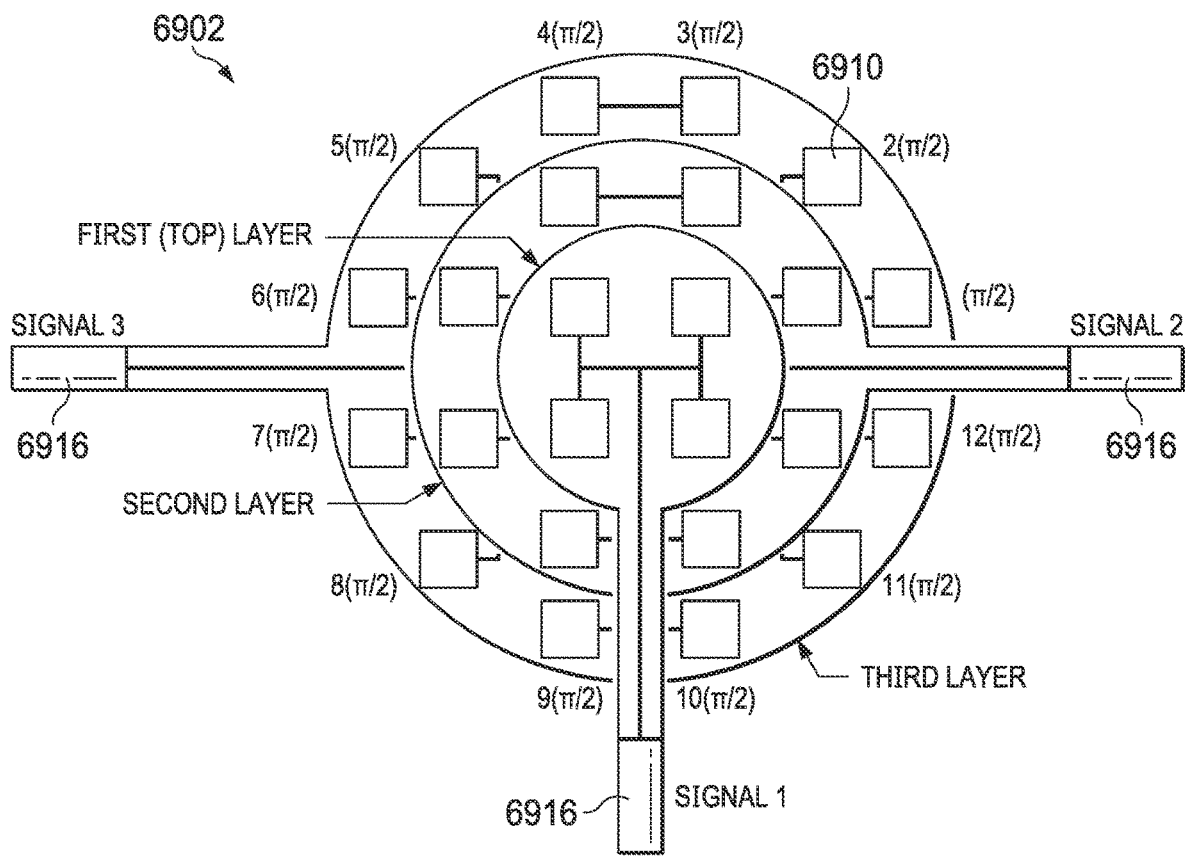
FIG. 69 illustrates a top view of a multilayer patch antenna array.

In addition to using patch antennas for generating highly directional and highly gained beams for the transmission of signals through a window or wall, patch antennas may be utilized using the application of orbital angular momentum (OAM) to signals transmitted therethrough in order to increased bandwidth on communication links between patch antennas through a window or wall. This is more fully illustrated in the following descriptions beginning with FIG. 69.

FIG. 69-76 illustrates a multilayer patch antenna array 6902 that may be utilized for transmitting Laguerre-Gaussian (LG), Hermite-Gaussian (HG), Ince-Gaussian (IG), or orbital angular momentum (OAM) signals such as those signals described in U.S. patent application Ser. No. 15/398,5611, filed on Jan. 4, 2017, entitled MODULATION AND MULTIPLE ACCESS TECHNIQUE USING ORBITAL ANGULAR MOMENTUM, which is incorporated herein by reference in its entirety. The multilayer patch antenna array 6902 includes a first antenna layer 6904 for transmitting a first ordered beam, a second antenna layer 6906 for transmitting a second ordered beam and a third layer 6908 for transmitting a third ordered beam. Each of the layers 6904, 6906 and 6908 are stacked on a same center. While the present embodiment is illustrated with respect to a multilayer patch antenna array 6902 including only three layers, it should be realized that either more or less layers may be implemented in a similar fashion as described herein. On the surface of each of the layers 6904, 6906 and 6908 are placed patch antennas 6910. Each of the patch antennas are placed such that they are not obscured by the above layer. The layers 6904, 6906 and 6908 are separated from each other by layer separator members 6912 that provide spacing between each of the layers 6904, 6906 and 6908. The configuration of the layers of the patch antenna may be in rectangular, circular or elliptical configurations to generate Hermite-Gaussian, Laguerre-Gaussian or Ince-Gaussian beams.

The patch antennas 6910 used within the multilayer patch antenna array 6902 are made from FR408 (flame retardant 408) laminate that is manufactured by Isola Global, of Chandler Arizona and has a relative permittivity of approximately 3.75. The antenna has an overall height of 125 μm. The metal of the antenna is copper having a thickness of approximately 12 μm. The patch antenna is designed to have an operating frequency of 73 GHz and a free space wavelength of 4.1 mm. The dimensions of the input 50 Ohm line of the antenna is 280 μm while the input dimensions of the 100 Ohm line are 66 μm.

Figure 71:
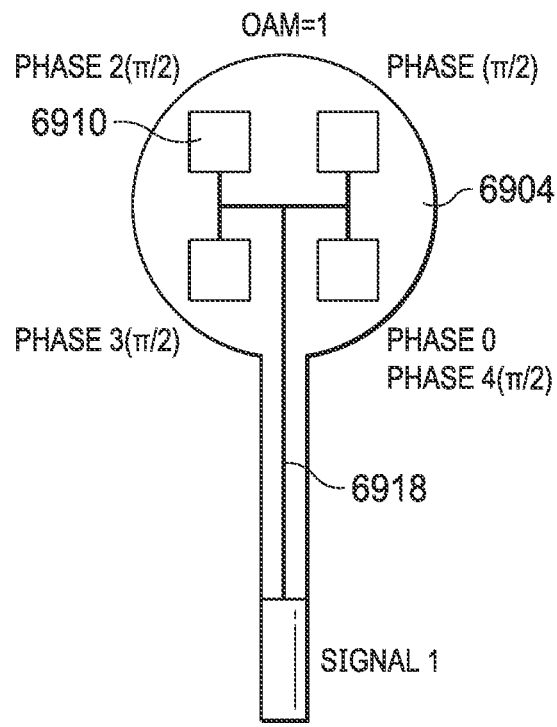
FIG. 71 illustrates a first layer of a multilayer patch antenna array.
Figure 72:
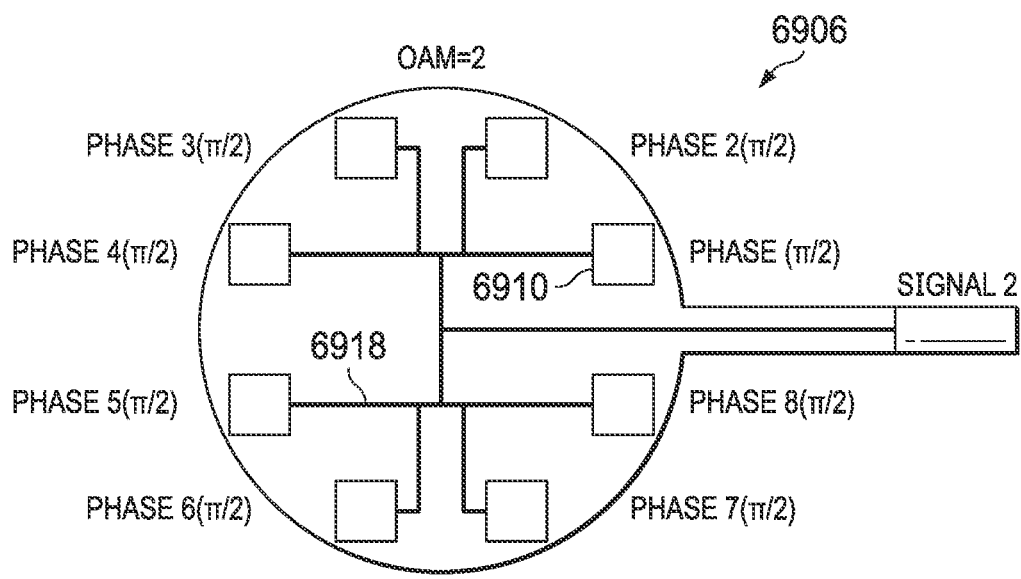
FIG. 72 illustrates a second layer of a multilayer patch antenna array.

Each of the patch antennas 6910 are configured to transmit signals at a predetermined phase that is different from the phase of each of the other patch antenna 6910 on a same layer. Thus, as further illustrated in FIG. 71, there are four patch antenna elements 6910 included on a layer 6904. Each of the antenna elements 7504 have a separate phase associated there with as indicated in FIG. 71. These phases include π/2, 2(π/2), 3(π/2) and 4(π/2). Similarly, as illustrated in FIG. 72 layer 6906 includes eight different patch antenna elements 6910 including the phases π/2, 2(π/2), 3(π/2), 4(π/2), 5(π/2), 6(π/2), 7(π/2) and 8(π/2) as indicated. Finally, referring back to FIG. 69, there are included 12 patch antenna elements 6910 on layer 6908. Each of these patch antenna elements 6910 have a phase assigned thereto in the manner indicated in FIG. 69. These phases include π/2, 2(π/2), 3(π/2), 4(π/2), 5(π/2), 6(π/2), 7(π/2), 8(π/2), 9(π/2), 10(π/2), 11(π/2) and 12(π/2).

Figure 70:
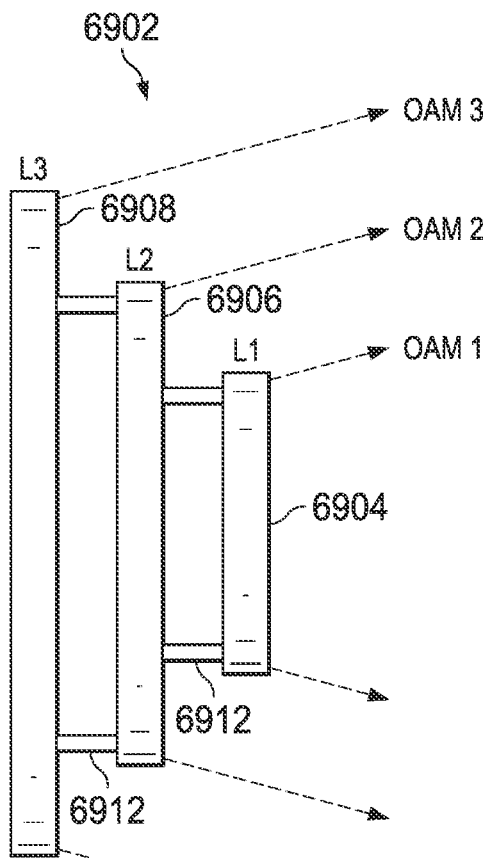
FIG. 70 illustrates a side view of a multilayer patch antenna array.

Each of the antenna layers 6904, 6906 and 6908 are connected to a coaxial end-launch connector 6916 to feed each layer of the multilayer patch antenna array 6902. Each of the connectors 6916 are connected to receive a separate signal that allows the transmission of a separate ordered antenna beam in a manner similar to that illustrated in FIG. 70. The emitted beams are multiplexed together by the multilayered patch antenna array 6902. The orthogonal wavefronts transmitted from each layer of the multilayered patch antenna array 6902 in a spatial manner to increase capacity as each wavefront will act as an independent Eigen channel. The signals are multiplexed onto a single frequency and propagate without interference or crosstalk between the multiplexed signals. While the illustration with respect to FIG. 70 illustrates the transmission of OAM beams at OAM 1, OAM 2 and OAM 3 ordered levels.

It should be understood that other types of Hermite Gaussian and Laguerre Gaussian beams can be transmitted using the multilayer patch antenna array 6902 illustrated. Hermite-Gaussian polynomials and Laguerre-Gaussian polynomials are examples of classical orthogonal polynomial sequences, which are the Eigenstates of a quantum harmonic oscillator. However, it should be understood that other signals may also be used, for example orthogonal polynomials or functions such as Jacobi polynomials, Gegenbauer polynomials, Legendre polynomials and Chebyshev polynomials. Legendre functions, Bessel functions, prolate spheroidal functions and Ince-Gaussian functions may also be used. Q-functions are another class of functions that can be employed as a basis for orthogonal functions.

The feeding network 6918 illustrated on each of the layers 6904, 6906, 6908 uses delay lines of differing lengths in order to establish the phase of each patch antenna element 6910. By configuring the phases as illustrated in FIGS. 69-72 the OAM beams of different orders are generated and multiplexed together.

Figure 73:
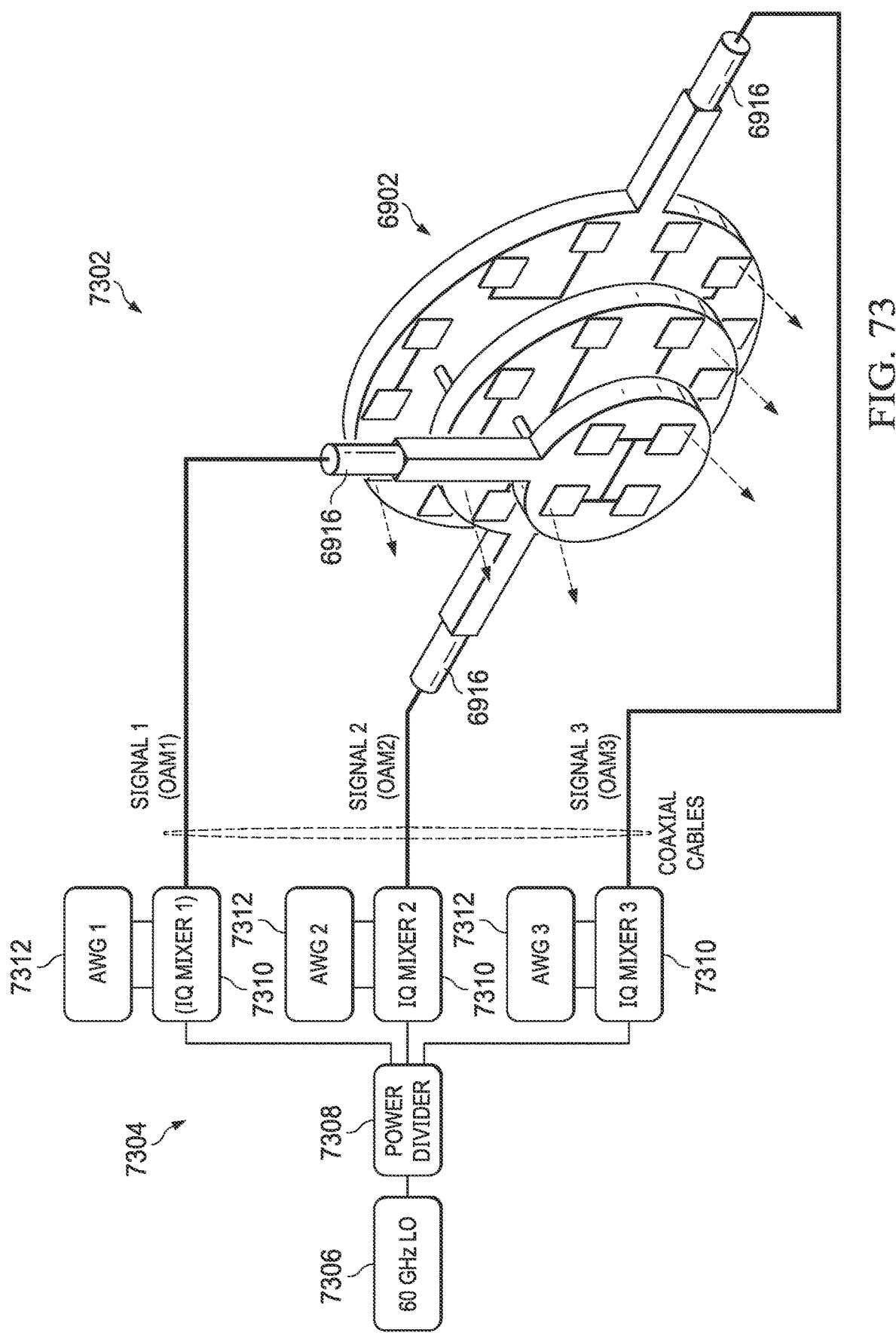
FIG. 73 illustrates a transmitter for use with a multilayer patch antenna array.

Referring now to FIG. 73, there is illustrated a transmitter 7302 for generating a multiplexed beam for transmission. As discussed previously, the multilayered patch antenna array 6902 includes a connector 6916 associated with each layer 6904, 6906, 6908 of the multilayer patch antenna array 6902. Each of these connectors 6916 are connected with signal generation circuitry 7304. The signal generation circuitry 7304 includes, in one embodiment, a 60 GHz local oscillator 7306 for generating a 60 GHz carrier signal. The signal generation circuit 7304 may also work with other frequencies, such as 70/80 GHz. The 60 GHz signal is output from the local oscillator 7306 to a power divider circuit 7308 which separates the 60 GHz signal into three separate transmission signals. Each of these separated transmission signals are provided to an IQ mixer 7310 that are each connected to one of the layer input connectors 6916. The IQ mixer circuits 7310 are connected to an associated additive white gaussian noise circuit 7312 for inserting a noise element into the generated transmission signal. The AWG circuit 7312 may also generate SuperQAM signals for insertion in to the transmission signals. The IQ mixer 7310 generates HG, LG, IG, OAM signals in a manner such as that described in U.S. patent application Ser. No. 14/323,082, filed on Jul. 3, 2014, now U.S. Pat. No. 9,331,875, issued on May 3, 2016, entitled SYSTEM AND METHOD FOR COMMUNICATION USING ORBITAL ANGULAR MOMENTUM WITH MULTIPLE LAYER OVERLAY MODULATION, which is incorporated herein by reference in its entirety.

Figure 74:
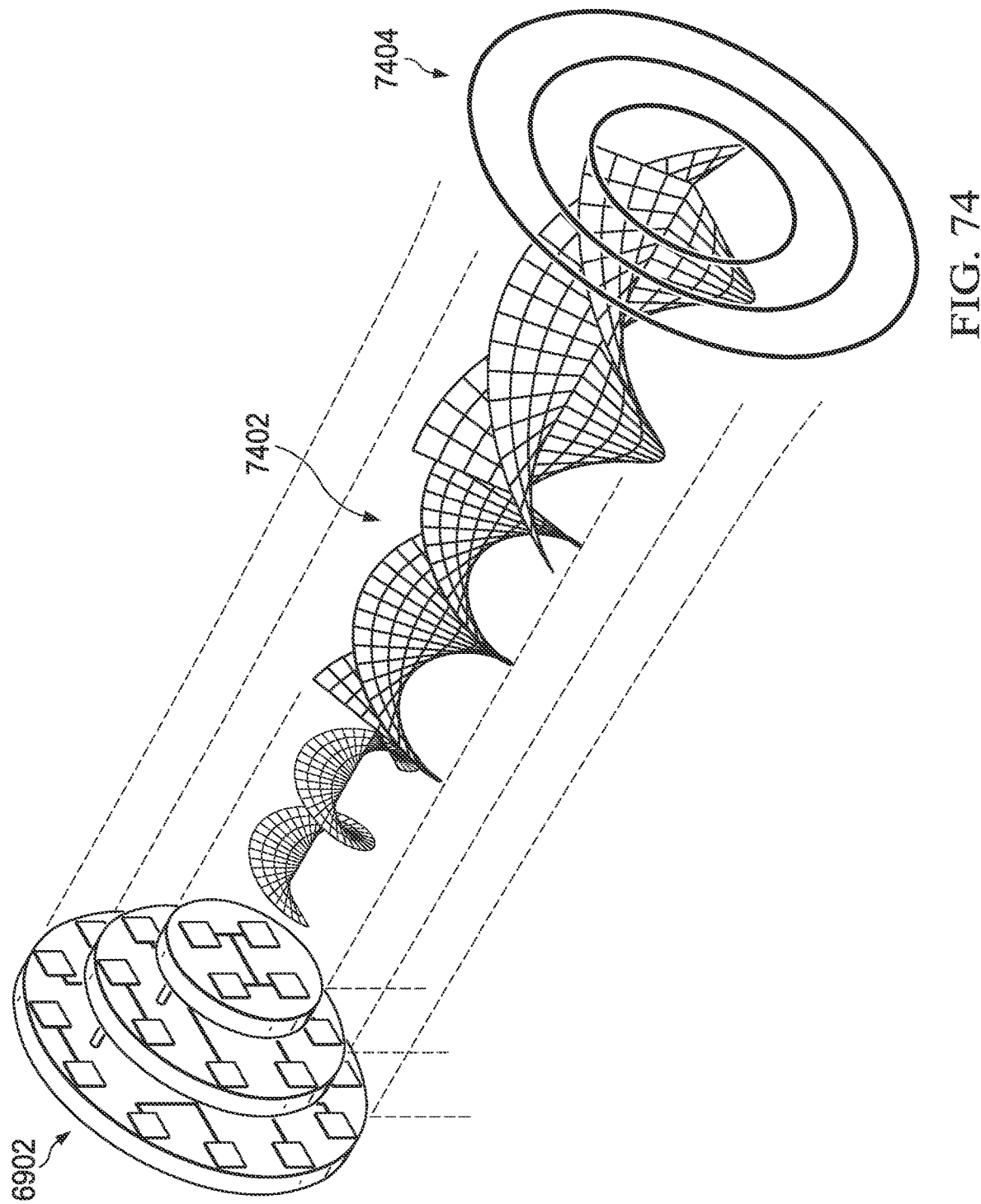
FIG. 74 illustrates a multiplexed OAM signal transmitted from a multilayer patch antenna array.

Using the transmitter 7302 illustrated in FIG. 73. A multiplexed beam (Hermite Gaussian, Laguerre Gaussian, Ince Gaussian, etc.) can be generated as illustrated in FIG. 74 at a specific frequency for high speed tunneling. This type of mode division multiplexing (MDM) achieves higher throughput with one frequency and multiple LG, HG or IG beams. As illustrated, the multilayered patch antenna array 6902 will generate a multiplexed beam 7402 for transmission. In the present example, there is illustrated a multiplex OAM beam that has twists for various order OAM signals in a manner similar to that disclosed in U.S. patent application Ser. No. 14/323,082. An associated receiver detector would detect the various OAM rings 7404 as illustrated each of the rings associated with a separate OAM processed signal.

When signals are transmitted in free space (vacuum), the signals are transmitted as plane waves. They may be represented as described herein below. Free space comprises a nonconducting medium ($\sigma=0$) and thus $J=\sigma E=0$.

From experimental results Ampere's law and Faraday's law are represented as:

$$\vec{B} = \mu \vec{H}$$

$$\nabla \times H = \frac{\partial D}{\partial t} + J \text{ Ampere's}$$

$$\vec{D} = \epsilon \vec{E}$$

$$\vec{J} = \sigma \vec{E}$$

$$\nabla \times E = \frac{-\partial B}{\partial t} \text{ Faraday's}$$

If there is propagation in the z direction and therefore E and H are in the xy plane.

Without the loss of any generality E may be oriented in the x-direction and H may be oriented in the y-direction thus providing propagation in the z-direction. From Ampere's-Maxwell equation, the following equations are provided:

$$\nabla \times H = \frac{\partial D}{\partial t}$$

$$\nabla \times H = \begin{vmatrix} \hat{x} & \hat{y} & \hat{z} \\ \frac{\partial}{\partial x} & \frac{\partial}{\partial y} & \frac{\partial}{\partial z} \\ H_x & H_y & H_z \end{vmatrix}$$

$$\left(\frac{\partial H_z}{\partial y} - \frac{\partial H_y}{\partial z}\right)\hat{x} + \left(\frac{\partial H_z}{\partial z} - \frac{\partial H_z}{\partial x}\right)\hat{y} + \left(\frac{\partial H_y}{\partial x} - \frac{\partial H_x}{\partial y}\right)\hat{z} = \frac{\partial}{\partial t}\epsilon E$$

Next, the vectorial wave equations may be represented as:

$$\nabla \times H = \frac{\partial D}{\partial t} + J$$

$$\nabla \times H = \epsilon \frac{\partial E}{\partial t}$$

$$\nabla \times E = \frac{-\partial B}{\partial t}$$

$$\nabla \times E = -\mu \frac{\partial H}{\partial t}$$

$$\nabla \times B = 0$$

$$\nabla \times E = S$$

$$\nabla \times \nabla \times H = \nabla(\nabla H) - \nabla^2 H = -\nabla^2 H$$

$$\nabla \times \nabla \times E = \nabla(\nabla E) - \nabla^2 E = -\nabla^2 E$$

$$\nabla \times (\nabla \times H) = \nabla \times \left(\epsilon \frac{\partial E}{\partial t}\right) = \epsilon \frac{\partial}{\partial t}(\nabla \times E) = -\epsilon \mu \frac{\partial}{\partial t}\left(\frac{\partial}{\partial t}H\right)$$

$$\nabla^2 H = +\epsilon \mu \frac{\partial^2}{\partial t^2}H$$

$$\nabla^2 H - \epsilon \mu \frac{\partial^2}{\partial t^2}H = 0$$

$$\nabla \times (\nabla \times E) = \nabla \times \left(-\mu \frac{\partial}{\partial t}H\right)$$

$$= -\mu \frac{\partial}{\partial t}(\nabla \times H)$$

$$= -\mu \frac{\partial}{\partial t}\left(\epsilon \frac{\partial E}{\partial t}\right) + \nabla^2 E$$

$$= +\mu \epsilon \frac{\partial^2}{\partial t^2}E$$

$$\nabla^2 E - \mu \epsilon \frac{\partial^2}{\partial t^2}E = 0$$

Therefore in General:

$$\vec{\nabla}^2 \vec{E} + \vec{K}^2 \vec{E} = 0 \; E(\vec{r}, t)$$

$$\vec{E}(r,t) = \vec{E}(\vec{r})e^{-jwt}e^{jkz} \text{ Propagating in z-direction}$$

Therefore:

$$\left(\frac{\partial^2}{\partial x^2} + \frac{\partial^2}{\partial y^2} + \frac{\partial^2}{\partial z^2}\right)\vec{E}(\vec{r})e^{-jwt}e^{jkz} + \frac{W^2}{y^2}\vec{E}(\vec{r})e^{-jwt}e^{jkz} = 0$$

In free space $$w = \frac{1}{\sqrt{\mu\epsilon}} = \to c = \frac{1}{\sqrt{\mu\epsilon_o}}$$

$$k^2 = \frac{w^2}{c^2}$$

Now:

$$\frac{\partial}{\partial z}\vec{E}(\vec{r})e^{jkz} = e^{jkz}\left[\frac{\partial \vec{E}(\vec{r})}{\partial z} + jk\vec{E}(\vec{r})\right]$$

$$\frac{\partial}{\partial z^2}\vec{E}(\vec{r})e^{jkz} = e^{jkz}\left[\frac{\partial \vec{E}(\vec{r})}{\partial z} + jk\vec{E}(\vec{r})\right] + e^{jkz}\left[\frac{\partial^2 \vec{E}(\vec{r})}{\partial z^2} + jk\frac{\partial \vec{E}(\vec{r})}{\partial z}\right]$$

$$= e^{jkz}\left[jk\frac{\partial \vec{E}}{\partial z} - k^2\vec{E}(\vec{r})\right] + e^{jkz}\left[\frac{\partial^2 \vec{E}}{\partial z^2} + jk\frac{\partial \vec{E}}{\partial z}\right]$$

Because $$\left|2k\frac{\partial E}{\partial z}\right| \gg \left|\frac{\partial^2 E(r)}{\partial z^2}\right|$$

Paraxial assumption $$\frac{\partial^2 \vec{E}(\vec{r})e^{jkz}}{\partial z^2} = e^{jkz}\left[2jk\frac{\partial^2 \vec{E}(\vec{r})}{\partial z} - k^2\vec{E}(\vec{r})\right]$$

Then:

$$\left(\frac{\partial^2}{\partial x^2} + \frac{\partial^2}{\partial y^2} + 2jk\frac{\partial^2}{\partial z}\right)E(x, y, z) = 0$$

Which may be represented in cylindrical coordinates as:

$$\frac{\partial^2}{\partial x^2} + \frac{\partial^2}{\partial y^2} = \frac{1}{q}\frac{\partial}{\partial q}\left(q\frac{\partial}{\partial q}\right) + \frac{1}{q^2}\frac{\partial^2}{\partial \Phi^2}$$

This provides a paraxial wave equation in cylindrical coordinates:

$$\frac{1}{q}\frac{\partial}{\partial q}\left(q\frac{\partial}{\partial q}\right)E(q, \Phi, z) + \frac{1}{q^2}\frac{\partial^2}{\partial \Phi^2}E(q, \Phi, z) + 2jk\frac{\partial E}{\partial z}(q, \Phi, z) = o$$

$P(z), q(z)$

Then:

$$E_0 \sim e^{-j\left[p + \frac{k}{2q}(x^2+y^2)\right]}$$

In general $E_o$ can rotate on the xy-plane and the wave still propagates in the z-direction.

$$\frac{\partial q}{\partial z} = 1$$

$$\frac{\partial P}{\partial z} = -\frac{j}{q}$$

q~Curvature of the phase front near the optical axis.
$q_2 = q_1 + z$
where $q_2$ is the output plane and $q_1$ is the input plane.∞∞

$$\frac{1}{q} = \frac{1}{R} - j\frac{\lambda}{\pi W^2}$$

where $$\frac{1}{R}$$

is the curvature or the wavefront intersecting the z-axis.

Thus for a complete plane wave R=∞, the equation becomes:

$$\frac{1}{q} = \frac{1}{R \to \infty} - j\frac{\lambda}{\pi W^2}$$

$$q_0 = \frac{\pi W^2}{-j\lambda} = \frac{j\pi W_0^2}{\lambda}$$

where $W_o$ is the beam waist.

$$q = q_0 + z = \frac{j\pi W_0^2}{\lambda} + z$$

$$w(z) = w_0\sqrt{1 + \left(\frac{z}{z_r}\right)^2}$$

$$W^2(z) = W_0^2\left[1 + \left(\frac{\lambda z}{\pi W_0^2}\right)^2\right]$$

$$R(z) = z\left[1 + \left(\frac{\pi W_0^2}{\lambda z}\right)^2\right]$$

$$R(z) = z\left[1 + \left(\frac{z_R}{z}\right)^2\right]$$

$$\Phi(z) = \tan^{-1}\left(\frac{z}{z_R}\right)$$

$$\theta = \frac{\lambda}{\pi w_0}$$

$$z = z_R$$

$$w(z) = \sqrt{2}\, w_0$$

The Rayleigh length is:

$$z_R = \frac{\pi n}{\lambda_0}$$

where n is the index of refraction.

$$w_0^2 = \frac{w^2}{1 + \left(\frac{\pi w^2}{\lambda R}\right)^2}$$

$$z = \frac{R}{1 + \left(\frac{\lambda R}{\pi w^2}\right)^2}$$

The complex phase shift is represented by:

$$jP(z) = \text{Ln}\left[1 - j\left(\frac{\lambda z}{\pi w_0^2}\right)\right] = \text{Ln}\sqrt{1 + \left(\frac{\lambda z}{\pi w_0^2}\right)^2} - j\tan^{-1}\frac{\lambda z}{\pi w_0^2}$$

The real part of P(z) represents a phase shift difference between the Gaussian beam and an ideal plane wave. Thus the fundamental mode is provided:

$$E_0(x, y, z) = E_0(r, z)\frac{w_0}{w}e^{-j(jz-\phi)}e^{-r^2\left(\frac{1}{w^2} + \frac{jk}{2R}\right)}$$

where:

$$\phi = \tan^{-1}\frac{\lambda z}{\pi w_0^2}$$

Higher order modes may also provide other solutions. The solution of rectangular equation:

$$\left(\frac{\partial^2}{\partial x^2} + \frac{\partial^2}{\partial y^2} + 2jk\frac{\partial}{\partial z}\right)E(x, y, z) = 0$$

Can be determined in rectangular coordinates to be:

$$E(x, y, z) = \Sigma_{mn}\, C_{nm}\, E_0 \frac{w_0}{w(z)} H_m\!\left[\frac{\sqrt{2}\,x}{w(z)}\right]$$

$$H_n\!\left[\frac{\sqrt{2}\,y}{w(z)}\right] e^{\frac{-(x^2+y^2)}{w(t)^2}}\, e^{-j(m+n+1)\tan^{-1}\frac{z}{z_0}}\, e^{j\frac{k(x^2+y^2)}{2R(z)}}$$

$$z_0 = \frac{kw_0^2}{2}$$

$$w(z) = w_0\sqrt{1 + \frac{z_0}{z_0^2}}$$

$$C_{60} \Rightarrow TEM_{OD}$$

$$R(z) = z + \frac{z_0^2}{z} = \frac{z_0^2}{z}\left(1 + \frac{z^2}{z_0^2}\right) = \frac{z_0^2}{zw_0^2}w^2(z) = \frac{kz_0}{2z}w^2(z)$$

The solution of cylindrical coordinates of equation:

$$\frac{1}{\rho}\frac{\partial}{\partial \rho}\left(\rho\frac{\partial}{\partial \rho}\right)E(\rho, \phi, z) + \frac{1}{\rho^2}\frac{\partial^2 E(\rho, \phi, z)}{\delta\phi^2} + 2jk\frac{\partial E(\rho, \phi, z)}{\partial z} = 0$$

Can be determined in cylindrical coordinates to be:

$$E(\rho, \phi, z) =$$

$$\sum_{\ell_\rho} C_{\ell_\rho} E_0 \frac{w_0}{w(z)}\left(\frac{\sqrt{2}\,\rho}{w(z)}\right)^\ell L_\ell^\rho\!\left(\frac{\sqrt{2}\,\rho}{w(z)}\right) e^{-\frac{\rho^2}{w(t)^2}} e^{-j(2\rho+\ell+1)\tan^{-1}\frac{z}{z_0}} e^{j\ell\phi} e^{j\frac{k\rho^2}{2R(z)}}$$

The Equation $$L_\ell^\rho\!\left(\frac{\sqrt{2}\,\rho}{w(z)}\right)$$

may also be shown as $$L_\ell^\rho\!\left[\frac{2\rho^2}{w^2(t)}\right].$$

The lowest mode is the most important mode and in fact this transverse mode is identical for both rectangular and cylindrical coordinates.

$$\varphi(\ell, P; z) = (2P + \ell + 1)\tan^{-1}\frac{z}{z_0}$$

$$TEM_{00}^{rect} = TEM_{00}^{Cyl}$$

$$C_{00} = 1$$

$$H_0 = 1$$

$$L_0^0 = 1$$

then $$TEM_{00} \Rightarrow E(\rho, z) \sim E_0 \frac{w_0}{w(z)} e^{-\frac{\rho^2}{w^2(t)}} e^{-j\tan^{-1}\frac{z}{z_0}} e^{jk\frac{\rho^2}{2R(z)}}$$

Figure 75:
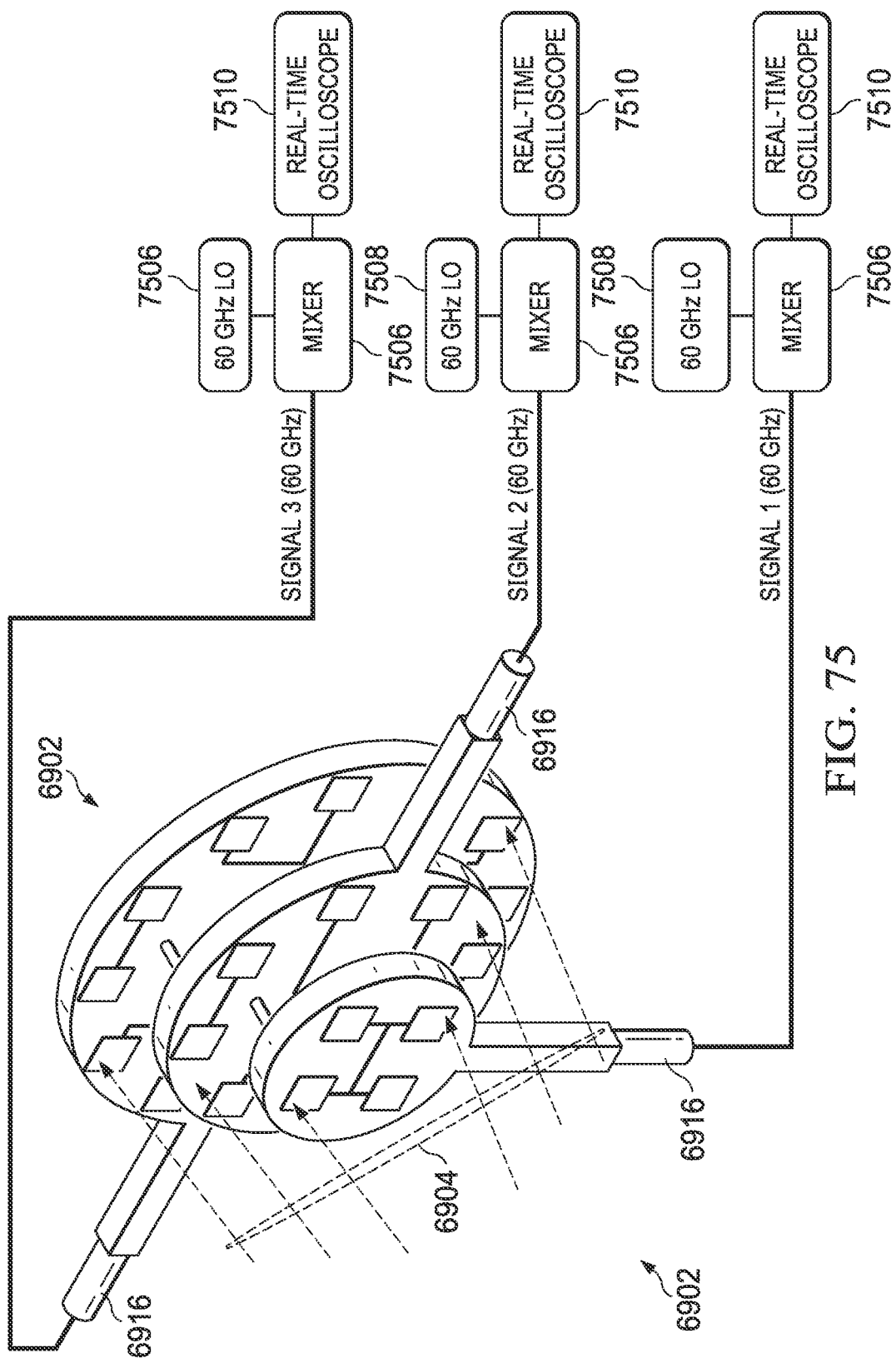
FIG. 75 illustrates a receiver for use with a multilayer patch antenna array.

Referring now to FIG. 75, there is illustrated a receiver 7502 for demultiplexing signals received from a multiplexed signal generated using the transmitter 7302 of FIG. 73. The receiver 7502 includes a multilayer patch antenna array 7502 such as that described herein above. The multilayer patch antenna array 7502 receives the incoming multiplexed signal 7504 and each layer 7504, 7506, 7508 of the antenna array 7502 will extract a particular order of the received multiplexed signal from each of the connector outputs 7516 of a particular layer. The signals from each of the connectors 7516 are applied to a mixer circuit 7506 that demultiplexes the received signal in a manner similar to that discussed with respect to U.S. patent application Ser. No. 14/323,082 using a 60 GHz local oscillator signal from oscillator 7508. The demultiplexed signal may then be read using, for example, a real-time oscilloscope 7510 or other signal reading device. Each of the three transmitted signals is thus decoded at the receiver 7502 that were transmitted in each of the ordered OAM signals received from the transmitters 602. In a further embodiment, a demultiplexing approach using SPP (spiral phase plate) may also be applied to detect OAM channels.

The signals transmitted by the transmitter 7302 or the receiver 7502 may be used for the transmission of information between two locations in a variety of matters. These include there use in both front haul communications and back haul communications within a telecommunications or data network.

The multilayered patch antenna array 7502 may transmit both Hermite Gaussian beams using the processing discussed with respect to U.S. patent application Ser. No. 14/323,082 or Laguerre Gaussian beams. When transmitting Laguerre Gaussian beams information may be transmitted in a number of fashions. A spiral phase plate and beam splitter approach may be used, a dual OAM mode antenna approach may be used or the patched antenna described herein may be utilized. These implementations would be beneficial in both fronthaul and backhaul applications.

In order to transmit several OAM modes of order 1 and amplitude $a_1^{OAM}$, the antenna elements must be fed by an input signal according to the equation:

$$a_n^{feed} \frac{1}{\sqrt{N}} \sum_{l=0}^{N-1} a_l^{OAM}\, e^{-j2\pi\frac{ln}{N}}, n \in \{0, \ldots, N-1\},$$

Note that the number of elements in the multilayer patch antenna array 7502 limits the number of possible OAM modes due to sampling. Due to aliasing, modes of order greater than N/2 are actually modes of negative orders.

$$b_l^{OAM} = \frac{1}{\sqrt{N}} \sum_{p=0}^{N-1} b_p^{feed} e^{j2\pi \frac{pl'}{N}}, \quad p \in \{0, \ldots, N-1\},$$

$$h_{pn} = \beta e^{-jkr_{np}} \frac{\lambda}{4\pi r_{np}},$$

$$r_{pn} = \sqrt{D^2 + R_t^2 + R_r^2 - 2R_t R_r \cos(\theta_{np})},$$

$$\theta_{pn} = 2\pi \left(\frac{n-P}{N}\right),$$

$$\beta = \sqrt{g_t g_r}$$

Single Mode Link Budget $$H_{tot} = U^H H U$$

$$b^{OAM} = H_{tot} a^{OAM}$$

$$\frac{P_r}{P_t}(l) = \left|\frac{b_l^{OAM}}{a_l^{OAM}}\right|^2 = \left|\sum_{p=0}^{N-1}\sum_{n=0}^{N-1} \frac{\beta}{N} e^{-jl\theta_{np}} e^{-jkr_{np}} \frac{\lambda}{4\pi r_{np}}\right|^2$$

Asymptotic Formulation

The object is to determine an asymptotic formulation of the Link budget at large distances, i.e. when D→+(∞), we seek the leading term for each value of l Link budget −1 are the same.

The link budget is asymptotically given by:

$$\frac{P_r}{P_t}(|l|) = \left|\frac{\lambda\beta}{4\pi|l|!}\left(\frac{kR_t R_r}{2}\right)^{|l|}\frac{1}{D^{|l|+1}}\right|^2$$

From the Fraunhofer distance 2 (2 max(R$_t$, R$_r$))²/λ=200λ, the link budget asymptotically tends to straight lines of slope −20 (|l|+1) dB per decade, which is consistent with an attenuation in $1/D^{2|l|+2}$.

Asymptotic Expressions with Gains and Free Space Losses

Gains and free space losses may be determined by:

$$\frac{P_r}{P_t}(|l|) = \frac{N}{|l|!}\frac{g_t}{}\left(\frac{4\pi(\pi R_t^2)}{\lambda^2}\right)^{|l|}\frac{N}{|l|!}\frac{g_r}{}\left(\frac{4\pi(\pi R_r^2)}{\lambda^2}\right)^{|l|}\left(\frac{\lambda}{4\pi D}\right)^{2|l|+2}$$

$$L_{FS_{eq}}(l) = \left(\frac{4\pi D}{\lambda}\right)^{2|l|+2}$$

$$G_{eq}(l) = \frac{N\,g}{|l|!}\left(\frac{4\pi(\pi R^2)}{\lambda^2}\right)^{|l|}$$

For a fixed value of |l|, each equivalent gain increases $R^{2|l|}$ So that the link budget improves by a factor of $R^{4|l|}$. On the contrary, for a fixed value of R, when increases, the link budget decreases since asymptotically the effect of D is greater than those of R$_t$ and R$_r$.

Figure 76:
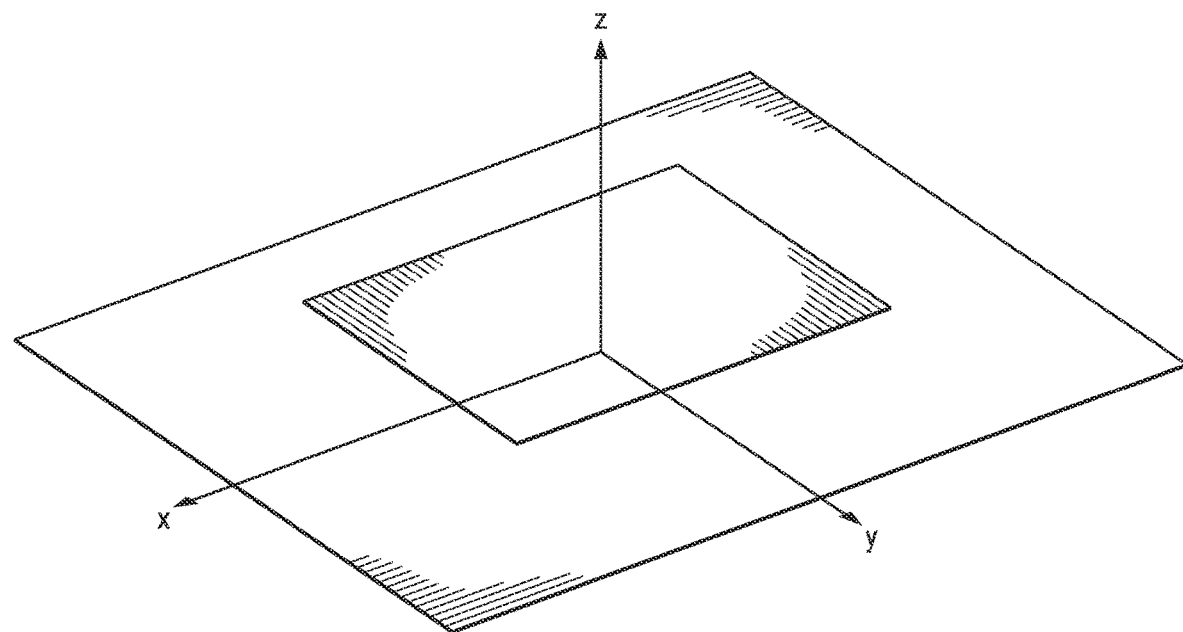
FIG. 76 illustrates a 3-D model of a single rectangular patch antenna.
Figure 77:
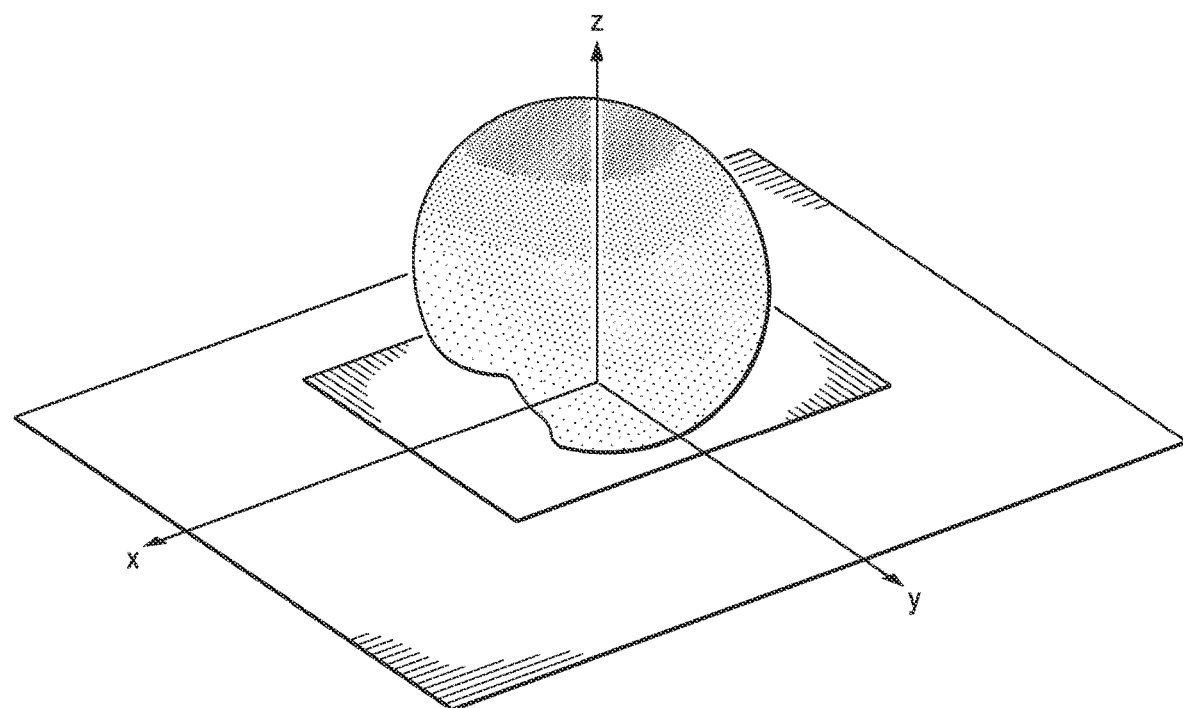
FIG. 77 illustrates the radiation pattern of the patch antenna of FIG. 10.

Referring now to FIG. 76, there is illustrated a 3-D model of a single rectangular patch antenna designed for 2.42 GHz and only one linear polarization. The radiation pattern for this antenna is illustrated in FIG. 77.

Figure 78A:
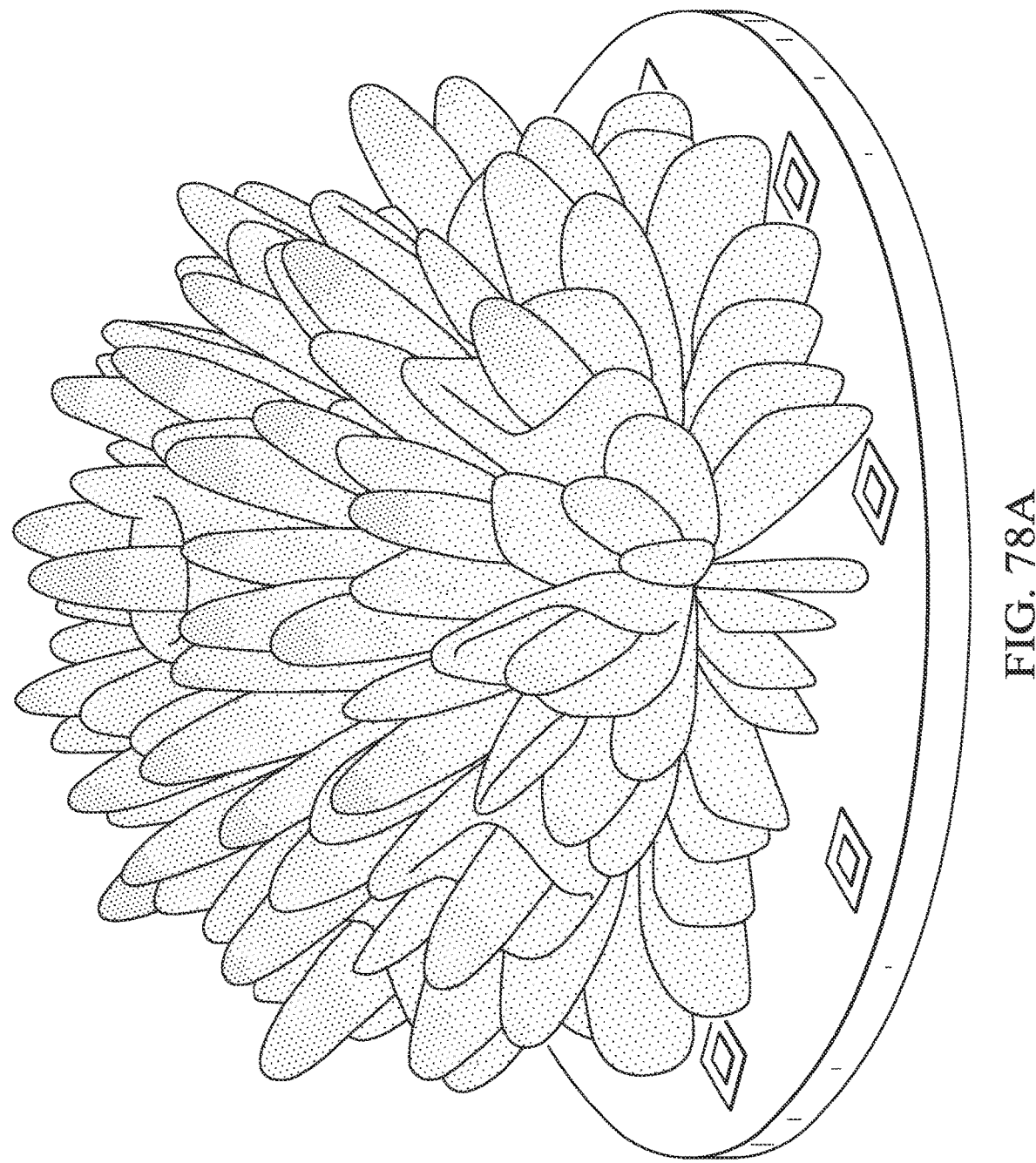
FIG. 78a illustrates the radiation pattern of a circular array for an OAM mode order 1=0.
Figure 78B:
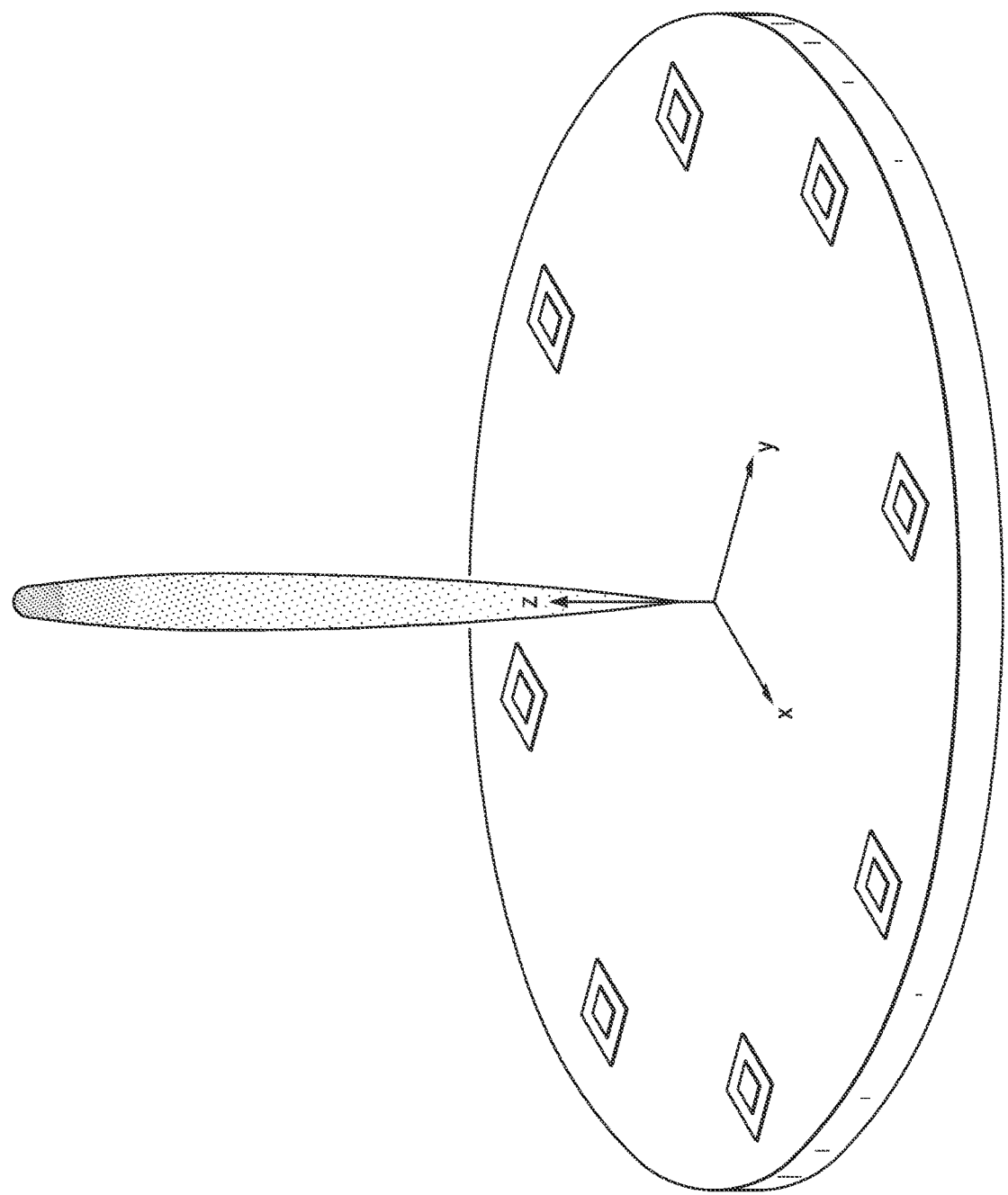
FIG. 78b illustrates the radiation pattern for an OAM mode order l=0 in the vicinity of the array axis.
Figure 78C:
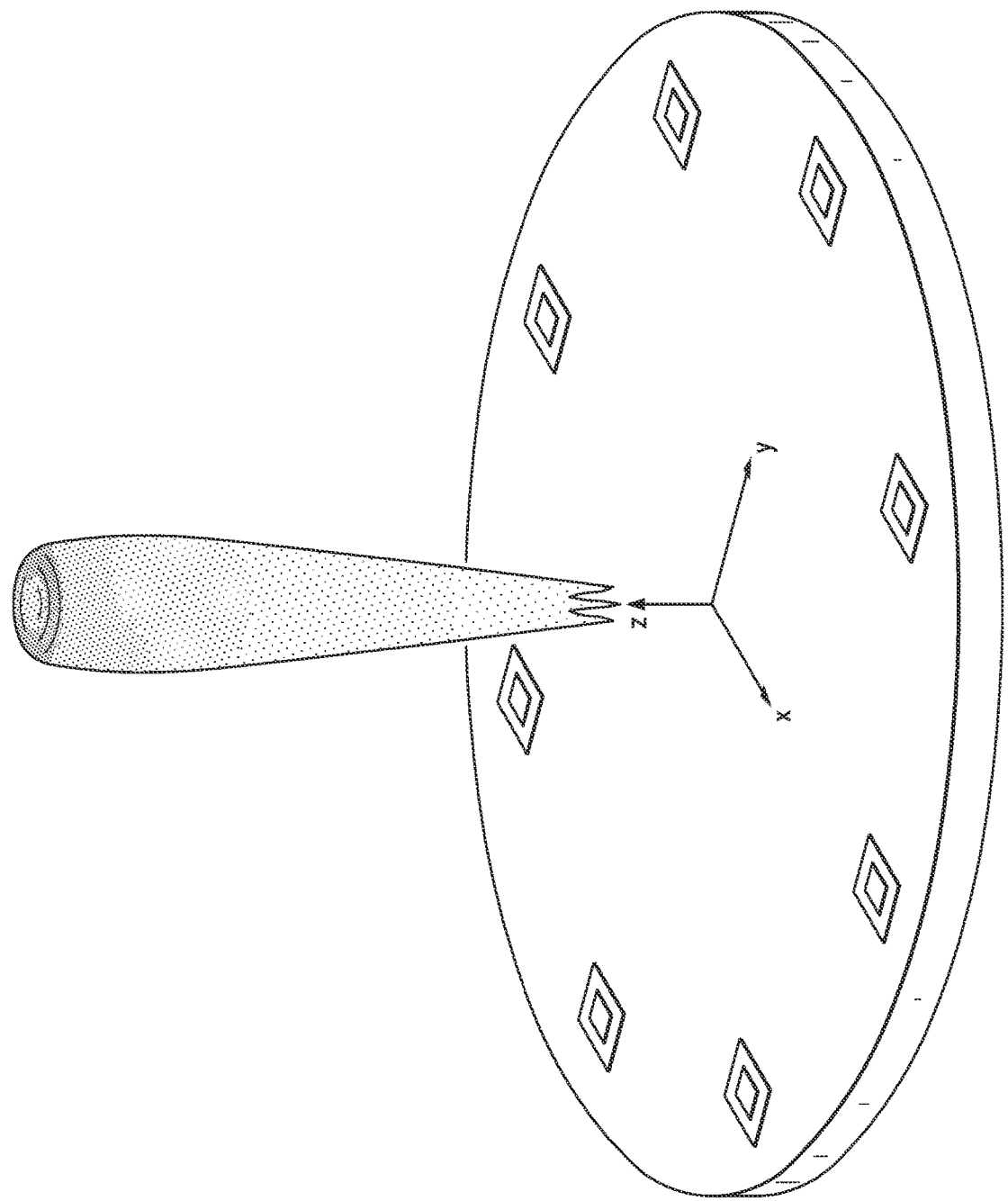
FIG. 78c illustrates the radiation pattern for an OAM mode order l=1 in the vicinity of the array axis.
Figure 78D:
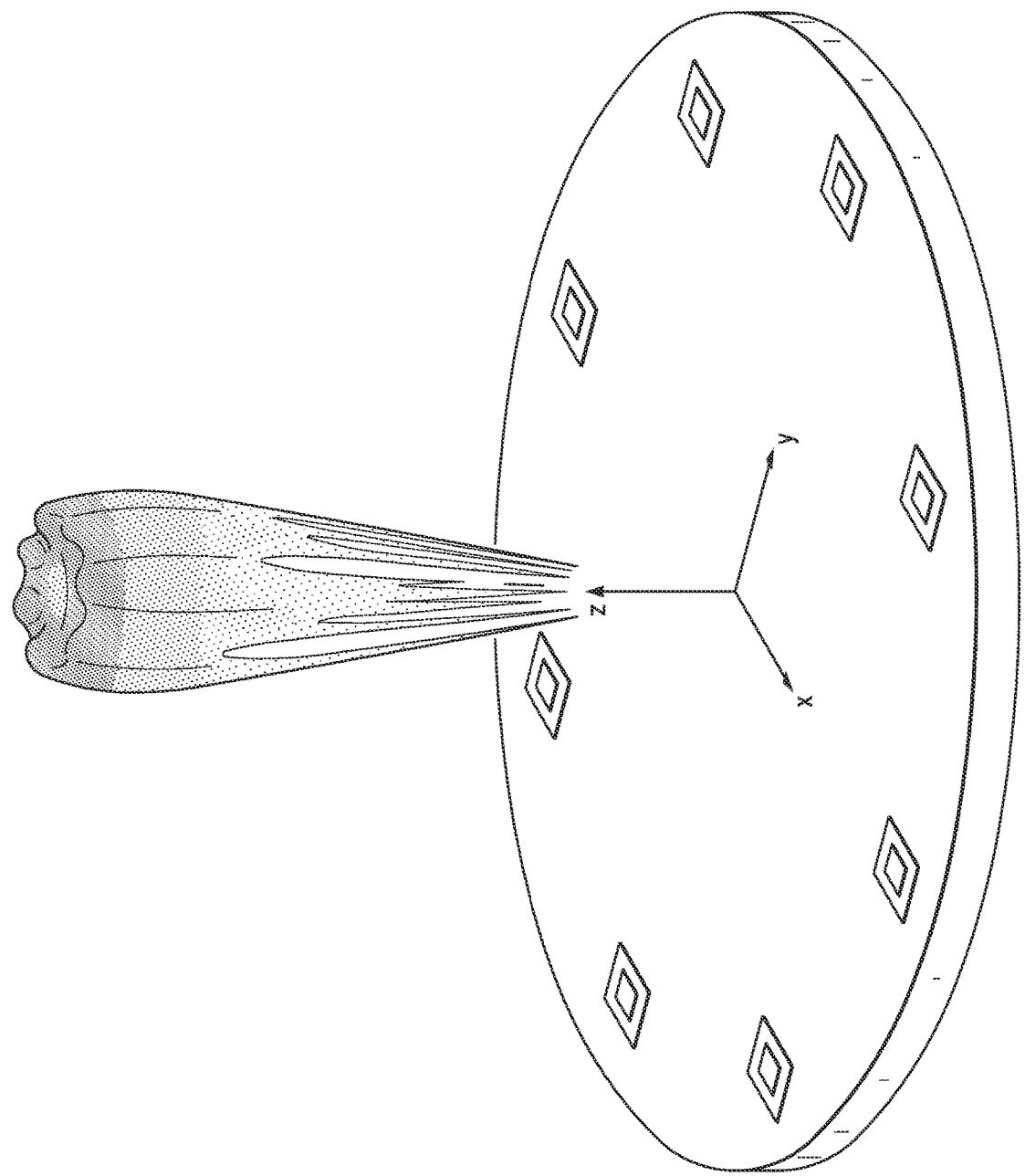
FIG. 78d illustrates the radiation pattern for an OAM mode order l=2 in the vicinity of the array axis.

FIG. 78a illustrates the radiation patterns of the circular array for an OAM mode order l=0 due to the higher grating lobes. FIGS. 78b, 78c and 78d illustrate the radiation patterns for the OAM mode orders in l=0 (FIG. 78b), l=1 (FIG. 78c), and l=2 (FIG. 78d) in the vicinity of the array axis.

Asymptotic OAM path loss is illustrated by:

$$\frac{P_r}{P_t}(|l|) = \frac{N\,g_t}{|l|!}\left(\frac{4\pi(\pi R_t^2)}{\lambda^2}\right)^{|l|}\frac{N\,g_r}{|l|!}\left(\frac{4\pi(\pi R_r^2)}{\lambda^2}\right)^{|l|}\left(\frac{\lambda}{4\pi D}\right)^{2|l|+2}$$

When assuming e-band frequencies, a distance of 1000 m and a reasonable patch antenna element gains, other parameters may be calculated including the diameter for the transmitter and receiver array rings, number of antennas, etc.

Figure 79:
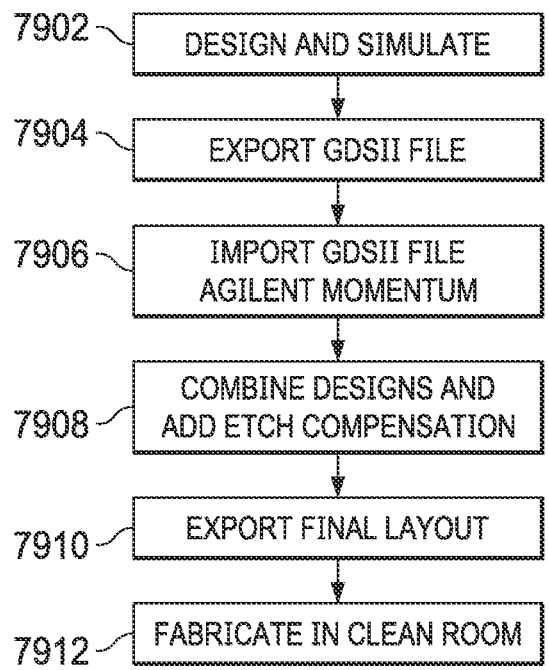
FIG. 79 is a flow diagram illustrating the design and layout process of a patch antenna.
Figure 81:
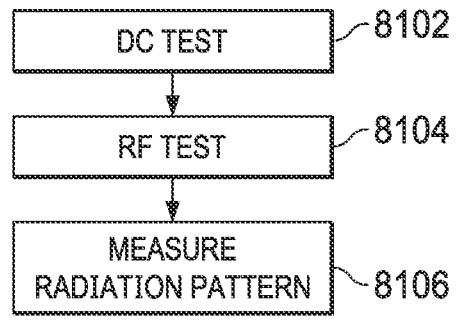
FIG. 81 is a flow diagram illustrating a testing process for a manufactured patch antenna.
Figure 80:
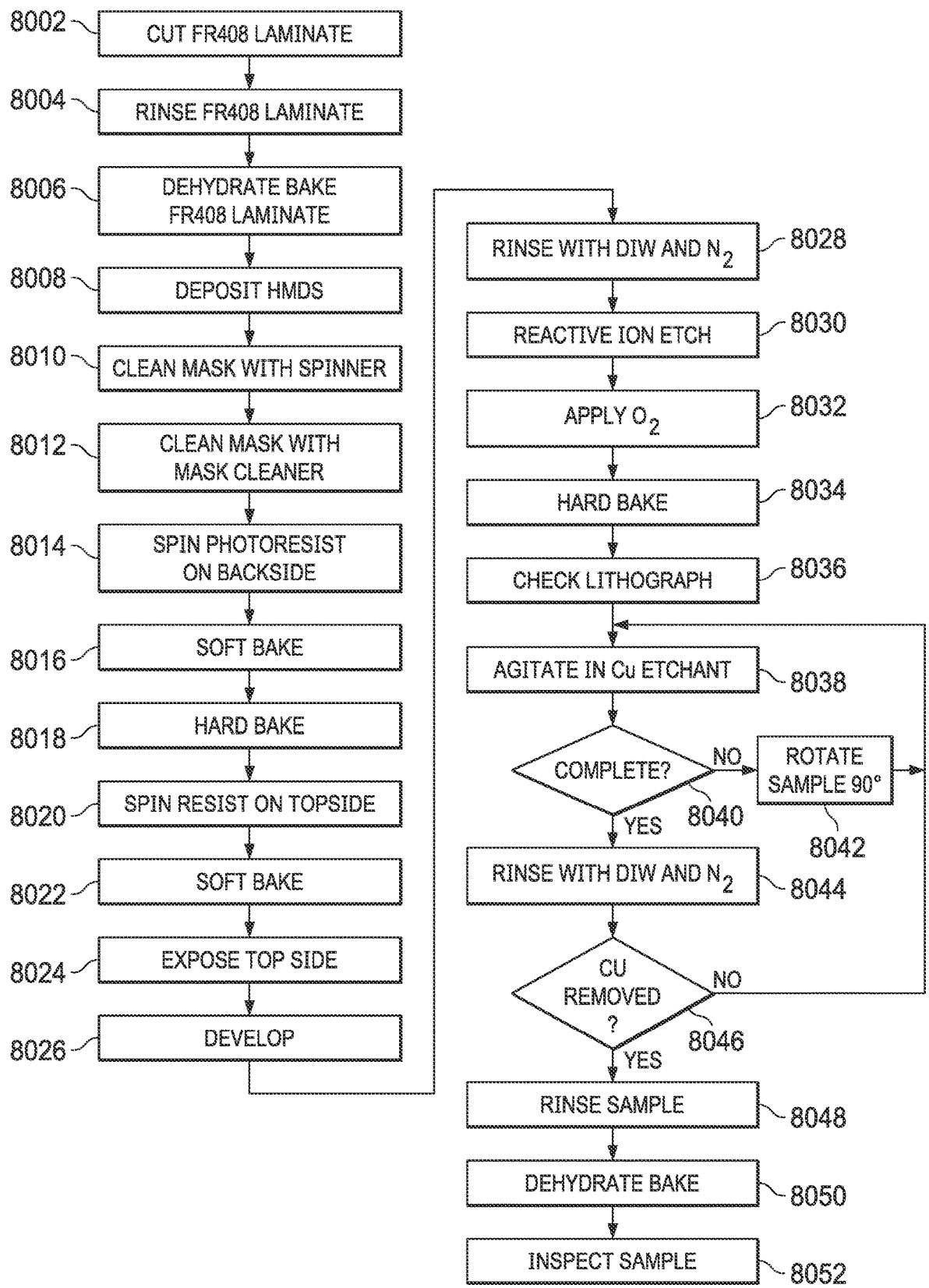
FIG. 80 is a flow diagram illustrating the process for patterning a copper layer on a laminate for a patch antenna.

The production of the patch antennas 7510 are carried out through a design and layout process as generally illustrated in FIG. 79, a clean room and lithography procedure for production of the antenna as generally illustrated in FIG. 80 and a final testing process as illustrated in FIG. 81. Referring now to FIG. 79, the design and layout process is more particularly described. Initially, the patch antenna is designed and simulated at step 7902 using ANSYS HFSS with a microstrip feed structure. ANSYS HFSS comprises a high-frequency structural simulator. The software within the device stimulates 3-D full wave electromagnetic field. The ANSYS HFSS creates a GDSII file (graphic database system file used to control integrated circuit photomask plotting) from the HFSS simulation and exports the GDSII file to an AWR (Applied Wave Research Corporation) Microwave Office (MWO) layout at step 7904. In order to measure the antenna with ground signal ground probe feeding, a previously design conductor backed coplanar waveguide to microstrip transition design that has been fabricated using Agilent Momentum is also imported at step 7906 as a GDSII Agilent Momentum file into the AWR MWO Layout. The two designs are brought together at step 7908 and a weight and etch compensation of 12 μm is added to the lateral dimensions to account for isotropic wet etch used in the fabrication process. The final GDSII file for the layout is exported at step 7910 and provided to a clean room for fabrication at step 1912.

Referring now to FIG. 80, there is illustrated the clean room process for patterning a copper layer on the FR408 laminate. Initially, the double-sided Cu FR408 laminate is cut using scissors at step 8002 to an appropriate size (typically 1.5"×1.5"). The FR408 laminate is cleaned by rinsing the laminate at step 8004 with acetone, isopropanol (IPA) and nitrogen (N$_2$) and dried in a solvent hood or using program 2 of a CPK Solvent Spinner with the appropriate chuck. The laminate is dehydrate baked at 130° C. for two minutes on a hot plate (for example, a Cole Parmer digital hotplate) at step 8006. Next, at step 8008, hexamethyldisilizane (HMDS) is deposited on the laminate by a rain method using a Yield Engineering YES—310 vacuum hood oven. The laminate samples are placed in the HMDS oven for 20 minutes to improve resist adhesion. Next, at step 8010, the mask is cleaned using program 2 of a CPK Solvent Spinner with the appropriate chuck. The mask is further cleaned using an automated mask cleaner (Ultratech Mask Cleaner) using program 0 DIW only at step 8012.

The lithography process is performed at steps 8014-8034. First, Shipley S1813 photoresist is spun on to the backside of the laminate at step 8014 to protect the ground layer using for example a Brewer Science Cee Spin Coater System. In one embodiment, the spin coater system will operate at 3000 rpm with 3000 rpm/s for 60 seconds. The sample is soft baked at step 8016 at 115° C. for 90 seconds on a hot plate and hard baked at step 8018 at 130° C. for 60 seconds on the hotplate. S1813 resist is spun onto the top side pattern copper layer at step 8022. In one embodiment, this is carried out at 3000 rpm with 3000 rpm/s for 60 seconds. The sample is soft baked at 115° C. for 90 seconds on a hot plate at step 8022. The top side of the sample is exposed at step 8024 with 110 mJ/cm2 using Karl Suss MA6 BA6 Contact Aligner/Printer. Next, the circuit is developed at step 8026 with Microposit MF-319 for 60 seconds in a beaker. The sample is rinsed with deionized water (DIW) and $N_2$ in a base hood. A reactive ion etching process is performed at step 8032 to remove excess photoresist using Techniques Series 85 RIE. This is achieved by applying $O_2$ only at 180 mTorr with 50 W for 15 seconds. The sample is hard baked at step 8034 at 130° C. for 60 seconds on a hot plate. The lithography is checked at step 8036 under a Leica lnm Optical microscope to make sure the lithography is correct and that the gaps are defined and not overdeveloped.

The 12 μm copper layer is etched at steps 8038-8046. The copper is etched in one minute intervals at step 8038 by agitating the sample in a Cu etchant. Inquiry step 8040 determines if the Cu etching process is complete, and if not, the sample is rotated at step 8042 by 90° and returns to agitate the sample within the Cu etchant at step 8038. When inquiry step 8040 determines that the Cu etching process is completed control passes to step 8044 wherein the sample is rinsed with DIW and $N_2$ and dried within a base hood. The sample is checked at inquiry step 8046 using a microscope to determine if the Cu has been completely removed. If not, control passes back to step 8038 for further agitation within the Cu etchant. If all of the Cu has been removed control passes to the stripping of the photoresist process.

The stripping of the photoresist occurs by first rinsing the sample with acetone, IPA, DIW and $N_2$ and drying within a solvent hood or using program 2 in CPK Solvent Spinner with the appropriate chuck. The sample is dehydrate baked at step 8050 at 130° C. for five minutes on a hot plate. The etched laminate samples are examined at step 8052 under a microscope to make sure that gaps are etched with no over etching of areas within the sample.

The created patch antenna may be tested as illustrated in FIG. 81 to confirm operation of the antenna. Initially, at step 8102, a DC test is performed upon the antenna to make sure that the G-S-G feed is not shorted. An RF test is performed at step 8104 to measure the $S_{11}$-Return Loss across the frequency bands using Agilent VNA on Cascade M150 probe station. The radiation pattern of the antenna may then be measured at step 8106 at the appropriate frequencies using a NSI spherical near field scanner.

In a further configuration patch antennas can be used in conjunction with horn antennas to overcome the 40 dB losses occurring through a window or wall. The above describe embodiments would also be configured to meet FCC and OSHA requirements. In addition to the techniques described herein above, other near field techniques can be used for transmitting the information through the window or wall.

Transceiver Chipsets

Figure 82:
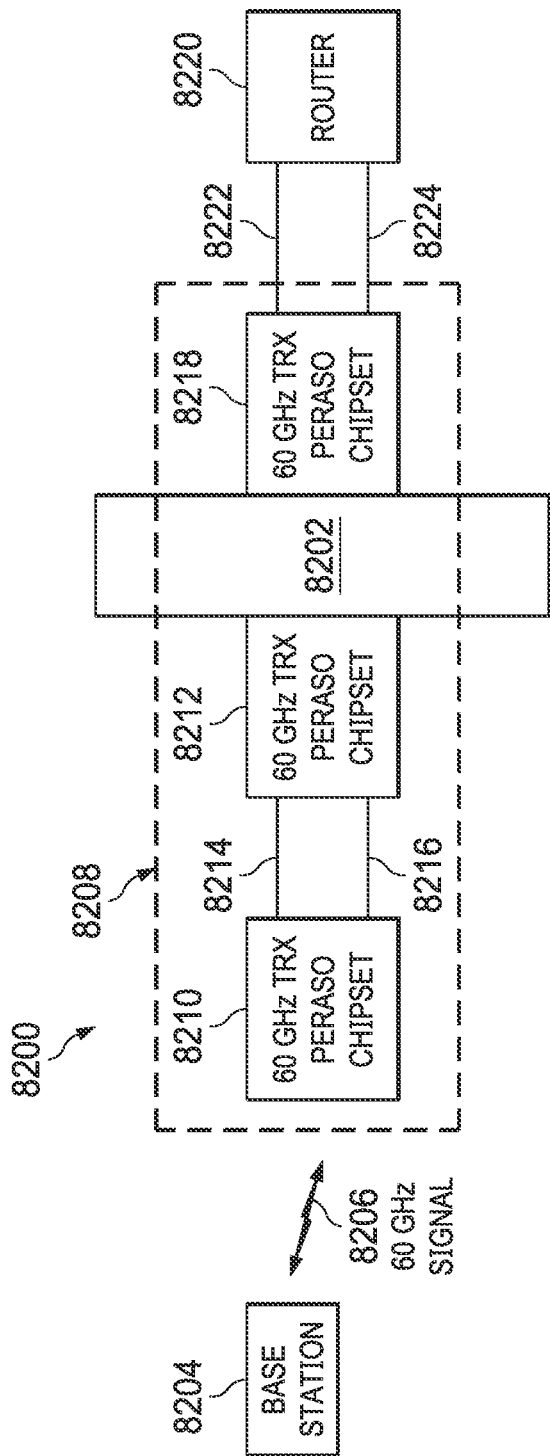
FIG. 82 illustrates an embodiment of a system for transmitting wireless signals through a window or wall using a Peraso chipset.

Referring now to FIG. 82A there is illustrated an embodiment for transmitting RF signals through a window or wall 8202 using an RF transceiver chipset that transmits a frequency that will receive signals from a base station 8204 at a frequency that will not penetrate the window/wall 8202 without significant signal losses. The base station 8204 transmits wireless signals 8206 to a building transmission penetration system 8230. The building transmission penetration system 8230 includes a first transceiver 8232 implementing a transmission chipset for receiving the signals 8206 from the base station 8204. The first transceiver 8232 is linked with a second transceiver 8212 implementing the transmission chipset over the bidirectional transmission links 3236 for signals being transmitted into a structure and a transmission link 8238 for signals being transmitted to the exterior of the structure to a base station 8204.

The second transceiver 8234 located on the interior of a structure communicates with a Wi-Fi router 8220 over transmission line 8222 and reception line 8224. The Wi-Fi router 8220 communicates with wireless devices located within the structure. Transmission lines 8222 and 8224 allow bidirectional communications between the Wi-Fi router 8220 and second transceiver 8218 in a similar manner that lines 8214 and 8216 allow bidirectional communications between second transceiver 8234. The chipsets implementing in the first transceiver 8232 and the second transceiver 8234 may receive any number of frequencies including, but not limited to, 3.5 GHz, 24 GHz, 28 GHz, 39 GHz, 60 GHz, 71 GHz, and 81 GHz from the base station for conversion to a format that will penetrate the window/wall 8202 into the interior of the building and from the exterior of the building. The signals may use any protocol including, but not limited to, 2G, 3G, 4G-LTE, 5G, 5G NR (New Radio) and WiGi.

Referring now to FIG. 82B, there is illustrated a more particular embodiment of the system of FIG. 82A for a system 8200 for transmitting 60 GHz or other bandwidth wireless signals through a window or wall 8202. In this embodiment, a Peraso chipset is used for enabling transmissions within the system 8200. A base station 8204 transmits 60 GHz wireless signals 8206 to a millimeter wave system 8208. The millimeter wave system 8208 includes a first 60 GHz transceiver 8210 implementing the Peraso chipset for receiving the 60 GHz signals 8206 from the base station 8204. The first Peraso transceiver 8210 is linked with a second 60 GHz transceiver 8212 implementing the Peraso chipset over the transmission connection 8214 for signals being transmitted into a structure and a transmission line 8216 for signals being transmitted to the exterior of the structure to a base station 8204.

The second Peraso transceiver 8212 is located on an outside of a window or wall 8202 and transmits wireless signals to a third 60 GHz transceiver 8218 implementing the Peraso chipset on the interior of the window or wall 8202. The third Peraso transceiver 8218 located on the interior of a structure communicates with a Wi-Fi router 8220 over transmission line 8222 and reception line 8224. The Wi-Fi router 8220 communicates with wireless devices located within the structure. Transmission lines 8222 and 8224 allow bidirectional communications between the Wi-Fi router 8220 and third Peraso transceiver 8218 in a similar manner that lines 8214 and 8216 allow bidirectional communications between second Peraso transceiver 8212 and first Peraso transceiver 8210. For TDD, typically 3 time slots would be assigned for TX and 1 time slot for RX, and therefore the slots would not collide as they would be separated in time. Therefore, for two way communications, there are no issues in terms of interference at the same frequency. For situations where the same frequency and time are used, Full Duplex isolation using OAM twisted beams can be used where the TX is done with +1 helicity and RX is done with −1 helicity.

Figure 83:
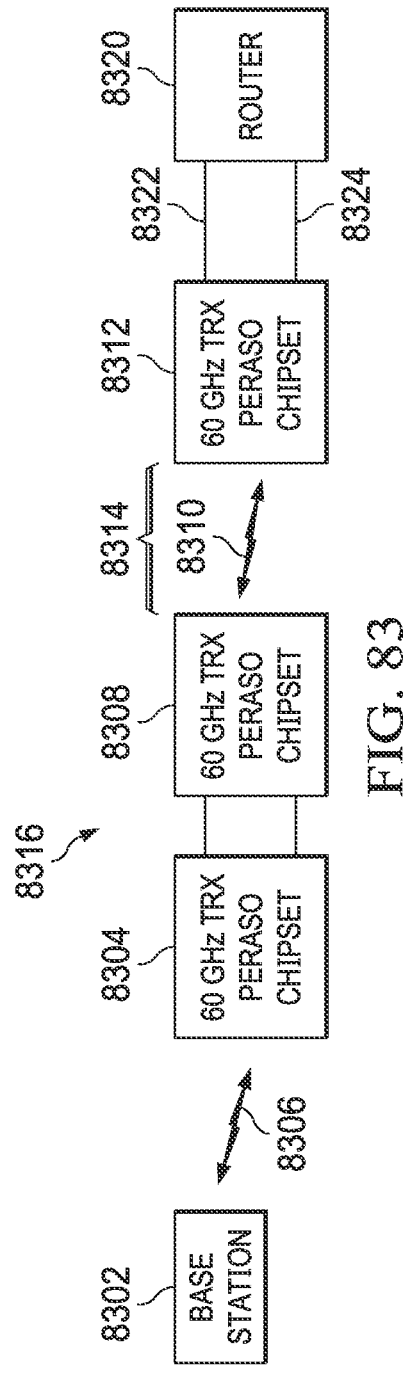
FIG. 83 illustrates the implementation of a repeater using a Peraso chipset.

Referring now to FIG. 83, there is illustrated a further Peraso chipset implementation. FIG. 83 illustrates a repeater configuration wherein a base station 8302 communicates with a 60 GHz transceiver 8304 implementing the Peraso chipset over a 60 GHz wireless communications link 8306 signals are bidirectionally transmitted between the Peraso transceiver 8304 to a second 60 GHz transceiver 8308 implementing the Peraso chipset. The second Peraso transceiver 2908 has a wireless 60 GHz communications link 8310 with a third 60 GHz transceiver 8312 that also implements the Peraso chipset over a distance indicated generally by 8314. The repeater 8316 consisting of Peraso transceiver 8304 and Peraso transceiver 8308 enable signals from the base station 8302 to be boosted and transmitted over larger distances to the Peraso transceiver 8312. The Peraso transceiver 8312 bidirectionally communicates with the router 8318 over the communications lines 8322 and 8324. The repeater configuration such as that described herein above can be used to extend the range of transmission of the 60 GHz signal transmitted from the base station 8302.

Figure 84A:
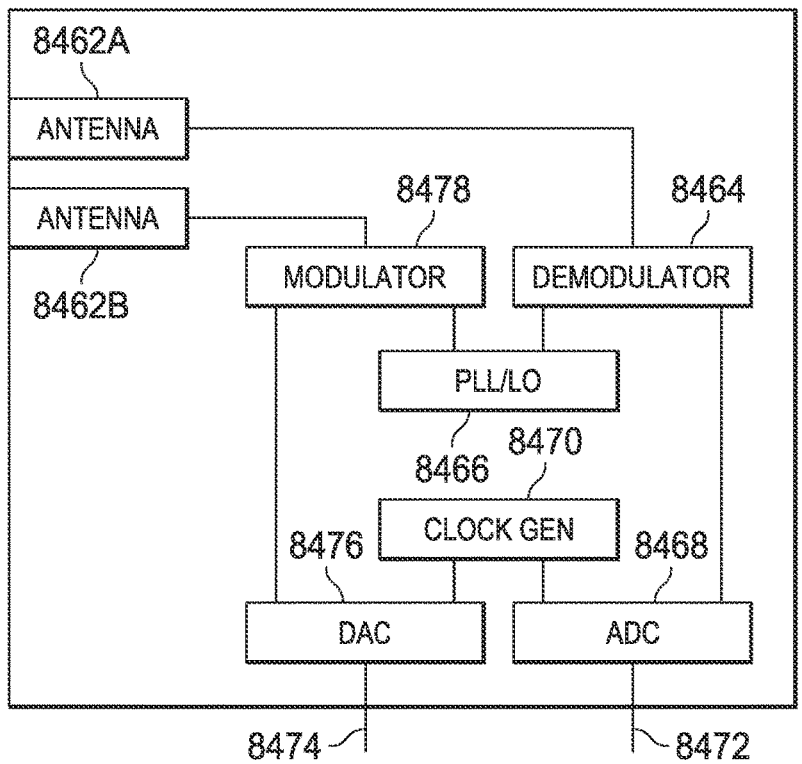
FIG. 84A is a top-level block diagram of a Peraso transceiver.

FIG. 84A illustrates a top level block diagram of a Peraso transceiver 8460 that may be used for transmissions as described hereinabove. A pair of antennas 8462 are used for transmitting (8460B) and receiving (8462A) 60 GHz signals. Received signals according to one of the embodiments described hereinabove are passed from antenna 8462A to a demodulator 8464 wherein the signals received from the antenna 8462A are demodulated responsive to signals provided from the phase locked loop/local oscillator block 8466. The demodulated signals are passed to an analog to digital converter 8468 for the analog signals to be converted to a digital format responsive to the demodulated signal and a clock signal provided by clock generator 8470. The digital signal is provided at an output 8472.

Signals to be transmitted are provided at input 8474 in a digital format and converted from digital to analog format at the digital to analogue converter 8476 responsive to a clock signal from clock generator 8470. The analog signal is modulated within modulator 8478 responsive to the analog signal and control signals from the phase locked loop/local oscillator block 8466. The modulated signals are transmitted from antenna 8462B in one of the configurations described hereinabove from the Peraso transceiver 8460. The Peraso chipset is more particularly described in the Peraso W110 WiGig Chipset Product Brief dated Dec. 18, 2015 which is incorporated herein by reference.

Figure 84B:
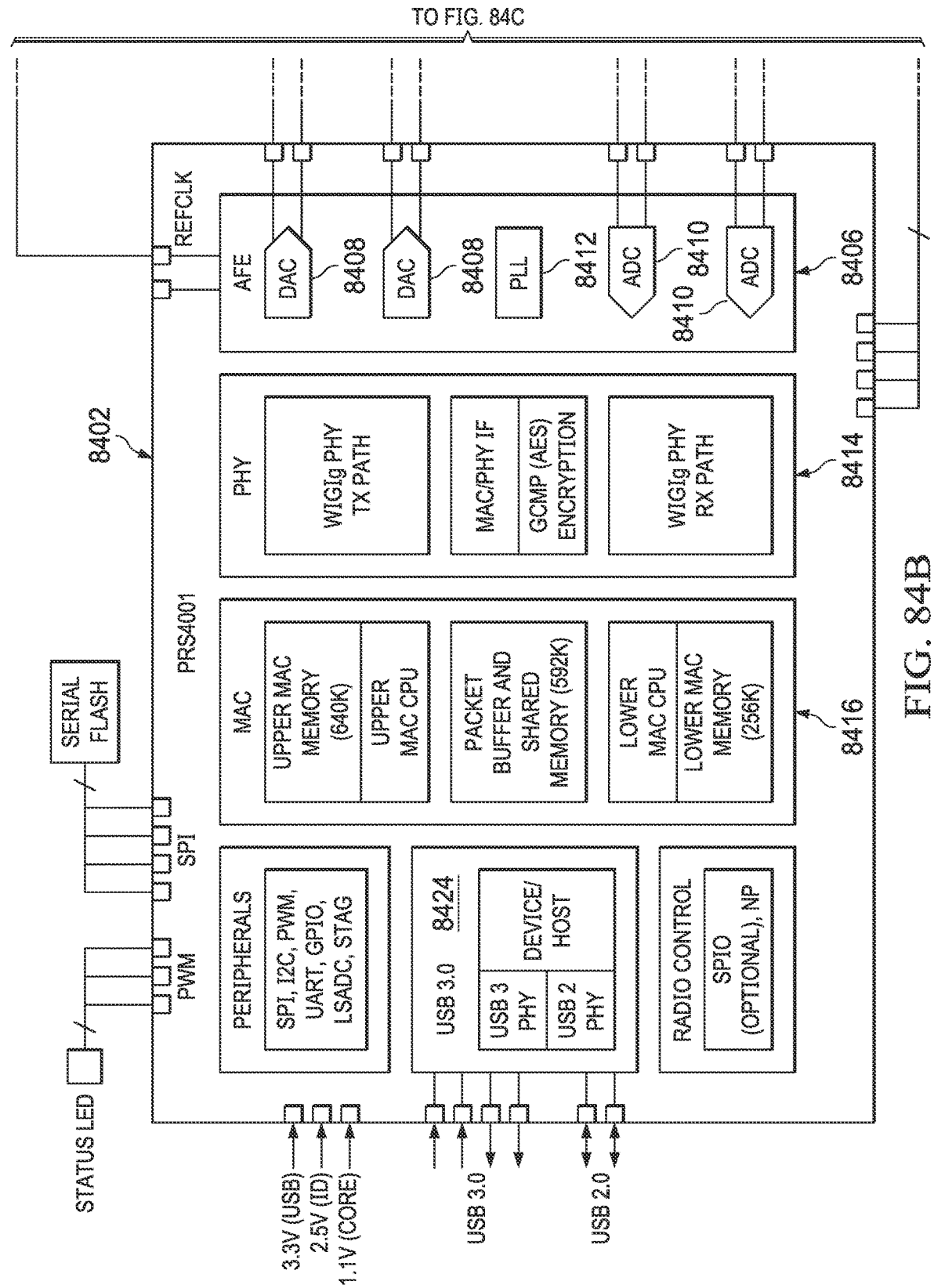
FIGS. 84B and 84C illustrate a detailed application diagram of a Peraso chipset.
Figure 84C:
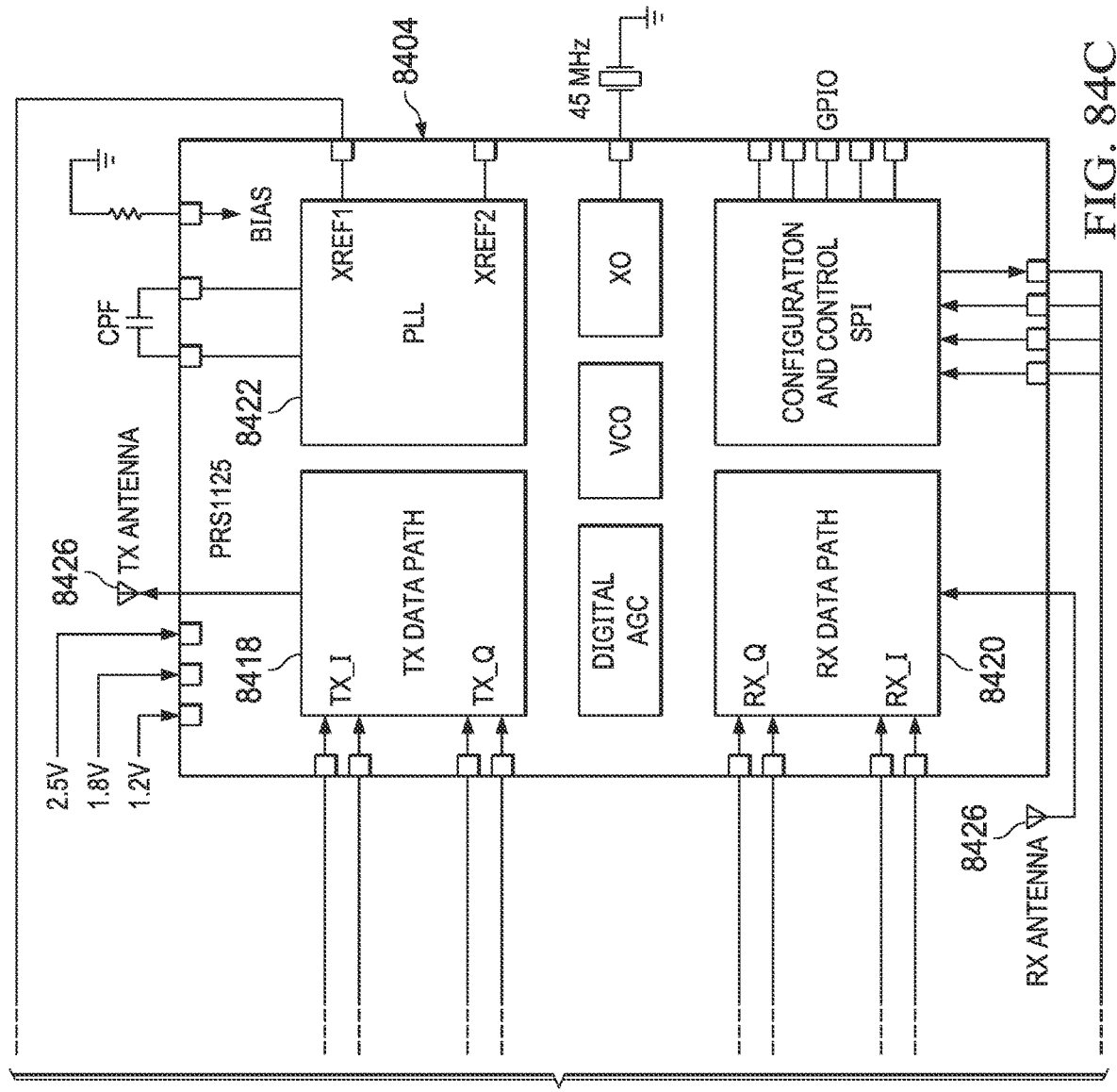

Referring now to FIG. 84B, there is illustrated a more detailed application diagram of the Peraso chipset. While the Peraso chipset in the 60 GHz band has been described, it will be realized by one skilled in the art that the chipset may utilize any frequency where the repeater enables extension of signal transmission capabilities. Examples include, but are not limited to, millimeter bands, 28 GHz band, 39 GHz band, 2.5 GHz band, CBRS band (3.5 GHz) and Wi-Fi band (5 GHz). The Peraso chipset comprises the W110 chipset that is targeted for use with WiGig applications. The Peraso chipset employs a PRS1125 integrated circuit 8402 and PRS4001 integrated circuit 8404 to implement the IEEE 802.11ad functionality. The Peraso chipset implements a complete superspeed USB 3.0 to WiGig solution. The PRS4001 low power WiGig baseband integrated circuit 8402 incorporates the analog front end 8406 including digital to analogue converters 8408, analog-to-digital converters 8410 and a phase locked loop 8412. The PRS 4001 circuit 8402 further includes the baseband physical layer 8414, Mac layer 8416 and two RISC CPU cores. The PRS4001 circuit 8402 is IEEE 802.11ad compliant. A USB 2.0 and 3.0 interfaces 8424 enable USB communications. The PRS4001 circuit 8402 supports seamless connection to all Peraso 60 GHz radios.

The PRS1125 integrated circuit 8404 is a single chip direct conversion RF transceiver providing 60 GHz single ended receiver and transmit interfaces. The PRS1125 circuit 8404 provides a transmit output power of up to 14 dBm, better than −21 dB transmit EVM (16-QAM), receiver noise less than 5 dB and a receiver conversion gain of greater than 70 dB. Integrated single ended 60 GHz antenna interfaces include a transmit data path 8418 and a received data path 8420. A phase locked loop 8422 tunes to all channels of IEEE 802.11ad using an integrated controller. The Peraso chipset provides for wireless storage, wireless display and multi-gigabyte mobile wireless applications. The antennas 8426 comprise NA graded patch antennas with 8.5 dBi gain across the entire 60 GHz band.

Figure 85:
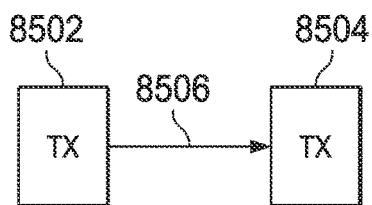
FIG. 85 illustrates serial transmissions between Peraso transceivers.
Figure 86:
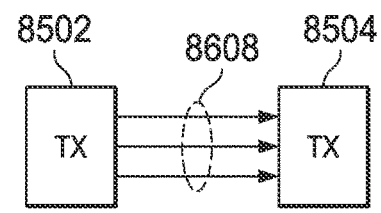
FIG. 86 illustrates parallel transmissions between Peraso transceivers.

Communications between Peraso chipset transceivers may be carried out in a number of fashions in order to control throughput therebetween. As illustrated in FIG. 85, communications between the first Peraso transceiver 8502 and a second Peraso transceiver 8504 may be carried out in series over a single communications channel 8506. In this case, the data is transmitted serially one item after the other over the single communications channel 8506. FIG. 86 illustrates a parallel transmission configuration. In this configuration, transmissions between transceiver 8502 and transceiver 8504 occur over multiple channels 8608 operating in parallel. In this configuration, different data streams may be transmitted at the same time over the parallel communication channels 8508 in order to increase data throughput. In the parallel configuration, a data stream is petitioned in two multiple sub streams and sent on the separate parallel channels 8508. The results may then be combined together at the receiver 8504.

Figure 87:
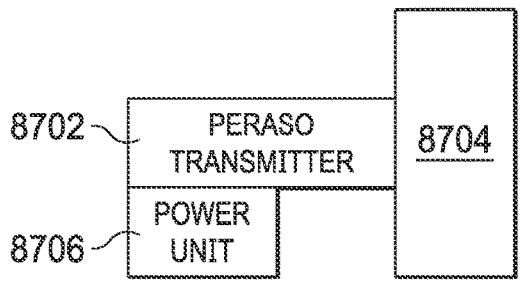
FIG. 87 is a functional block diagram of a Peraso transceiver located on an exterior window.

FIG. 87 illustrates a functional block diagram of a Peraso transmitter 8702 located on an exterior side of a window or wall 8704. Since the Peraso transceiver 8702 is located on the exterior of the window or wall 8704 some manner for providing power to the Peraso transceiver 8702 is needed. A power unit 8706 located on the external side of the wall 8704 may power the Peraso transceiver 8702 in a number of fashions. In one implementation, the power unit may comprise solar cells and solar generation circuits for generating power. In one embodiment, the maximum power consumption for the Peraso transmitter located on the external wall or window is 15 W. In order for the transceiver to provide a transmit power of 14 dBm or approximately 25 mW, 15 W of consumed power is created. If the 15 W of consumed power is required for 20 hours a day, approximately 300 Whrs of energy are needed to support the transceiver each day. A power unit having an efficiency of 1.25 operating for 24 hours can provide approximately 375 Whrs of energy. The 375 Whrs are divided by 3.5 (the approximate number of sun hours in the winter) to provide a needed solar capacity for the transceiver of 100 W.

Figure 88:
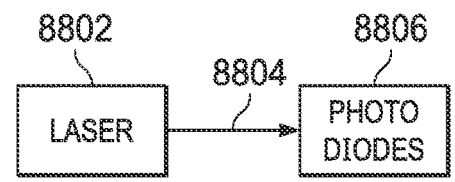
FIG. 88 illustrates a method for providing power to an external Peraso transmitter using a laser.

Another method for providing power to an exterior Peraso transmitter is illustrated in FIG. 88. A laser 8802 located on the interior is used to transmit energy within a laser beam 8804 to photodiodes 8806 located on the external Peraso transmitter. The laser beam 8804 would be transmitted through a window since a wall would block the beam. The required power for the transmitted laser beam is defined by:

$$P_{Optic} = \frac{P_{Electric}}{Eff_{Optics} \times Eff_{PV\ Cells}(\eta)}$$

$$QE(Eff_{PV-Cell}), \eta = \frac{R_\lambda}{\lambda} \times \frac{hc}{e} \approx \frac{R_\lambda}{\lambda_{\mu m}} \times 1.24$$

$$\eta = R\frac{1.24}{\lambda_{\mu m}}$$

The efficiency of the optics $\text{Eff}_{Optics}$ varies depending upon the type of glass that is being transmitted through. Window glass may be of a commercial or residential nature. For residential window glasses such as ClimaGuard 70/36, the optics efficiency is 0.68 at a transmission wavelength of 445 nm. For commercial window glass such as SunGuard SN 68 the optics efficiency is 0.64 at a transmission wavelength of 445 nm.

The efficiency of the silicon photodiodes $\text{Eff}_{PV\ Cells}$ is defined by:

$$\eta(\text{Eff}_{PV-Cell}) = R\frac{1.24}{\lambda_{\mu m}} = 0.69$$

Thus, the optical power needed to be transmitted at 450 nm can be determined using the optics and photodiode efficiencies in the following manner:

$$P_{Optic} = \frac{P_{Electric}}{\text{Eff}_{Optics} \times \text{Eff}_{PV\ Cells}(\eta)} = \frac{15}{0.64 \times 0.69} = 34W$$

Therefore, the number of laser diodes needed to provide 34 W of power with 450 nm, 4.5 W blue diodes would be $$\frac{45W}{4.5W}$$

or approximately 8 diodes.

VCSEL Alignment and Power

Figure 89:
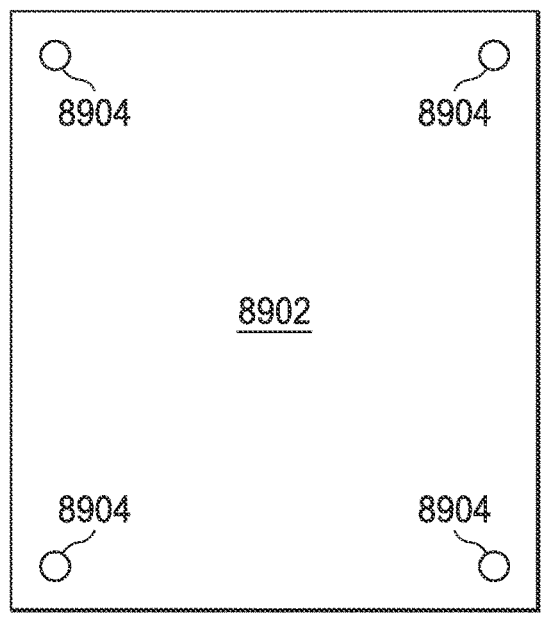
FIG. 89 illustrates alignment holes within a VCSEL.
Figure 90:
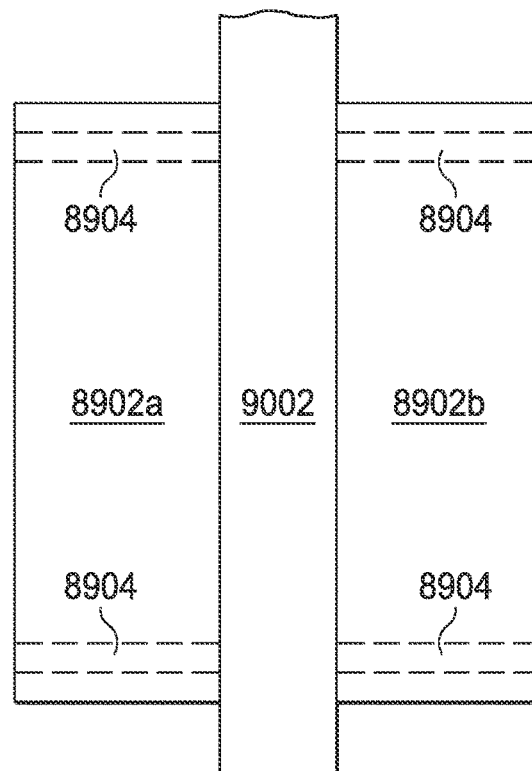
FIG. 90 illustrates the use of alignment holes for aligning optical circuits of VCSELs.

Referring now to FIG. 89, there is illustrated a VCSEL 8902. Since one VCSEL is located on the outside of a window and a second VCSEL is located on the inside of the window, there must be some manner for aligning the optical transmission links that are provided from one VCSEL to the other. One manner in which this alignment may be achieved is by having alignment holes 8904 located at multiple positions on the VCSEL 8902. In the embodiment illustrated in FIG. 89, the alignment holes 8904 are located at each corner of the VCSEL 8902. These alignment holes 8904 are used in the manner illustrated in FIG. 90 to align a first VCSEL 8902a with a second VCSEL 8902b. Thus, by visually aligning each of the alignment holes 8904 located at each corner of the VCSEL 8902a and VCSEL 8902b, the optical transmission circuitry within the VCSELs may be aligned through the window 9002.

Figure 91:
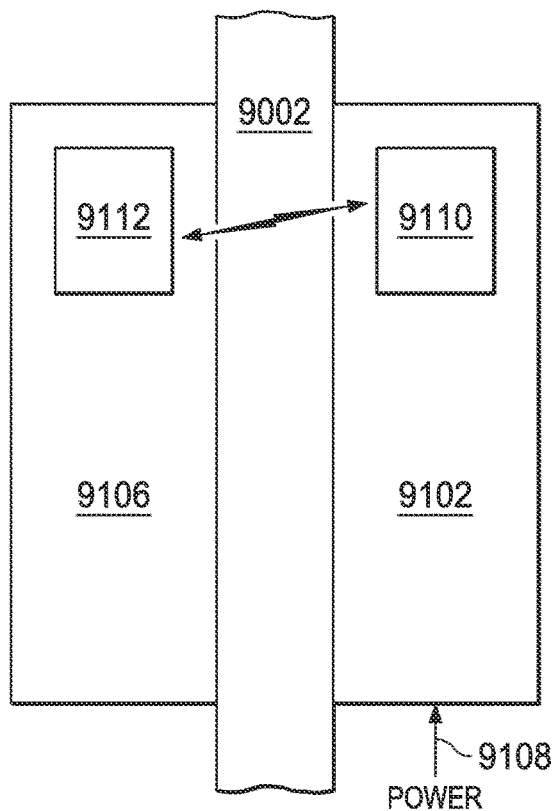
FIG. 91 illustrates optical power coupling between VCSELs.

Rather than using the external power inputs, the VCSEL 8902 located on a window may be powered using other methods as illustrated in FIG. 91, FIG. 91 illustrates a VCSEL 9102 on an interior of a window or wall 9002 and a VCSEL 9106 located on an exterior of a window or wall. Power 9108 is provided directly to the internal VCSEL 9102 via some type of input connection. A power coupling device 9110 within the internal VCSEL 9102 couples with a similar power coupling device 9112 within the external VCSEL 9106. If the VCSEL's 9102 and 9106 are located on a transparent window, a photo inductor or other type of optical power coupler may be utilized for power coupling devices 9110 and 9112. If the VCSEL's 9102 and 9106 are located on opposite sides of an opaque wall, or window blocking optical signals inductive coupling devices such as coil and doctors may be used for power coupling devices 9110, 9112.

In this manner, the power coupling devices 9110 provides power to the power coupling device 9112 to power the external VCSEL 9106.

System Power

Figure 92:
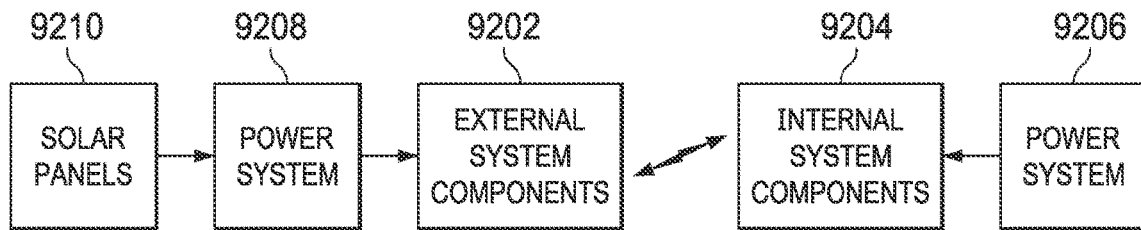
FIG. 92 illustrates a manner for powering external system components using solar panels.

Referring now to FIG. 92, there is illustrated the manner in which power may be provided to the external system component 9202 located within the external portion of the system and the internal system components 9204 located within the internal portion 5608. The internal system component 9204 comprises the antennas, modulator, demodulator and other components discussed herein above for generating signals for transmission and determining signals that have been received. The external system components 9202 consist of the circulator, power amplifiers and horn antennas described above. The internal system component 9204 is connected to an internal power system 9206 that may plug into the electrical power system located within the building. Since the internal system component 9204 and external system component 9202 are separated by a window/wall 9002, there must be some manner for transmitting or providing power to the external system components. One manner for doing so involves the use of a power system 9208 that is powered by a number of solar panels 9210 that are located on the exterior of the building to which the external system component 9202 are connected.

The power required from the power system 9208 to the external system components 9202 is approximately 0.76 W. One manner for providing this 0.76 W power is through the use of solar panels 9210. Solar panels providing 0.76 W or 1 W may be utilized for the solar panels 9210. With respect to a 0.76 W power provision system, 0.76 W for 24 hours would require 18.24 W hours of power. If 18.24 W hours are provided at an efficiency of 1.25%, this will require 22.8 W hours. If an efficiency of 22.8 W hours is divided by 3.5 hours (# number of daylight hours in winter), a total result of 6.52 W is provided. Similarly for a 1 W system, 1 W provided for 1 day requires 24 W hours. 24 W hours at a 1.25% efficiency requires 30 W hours. 30 W hours divided by 3.5 hours of sun available in the winter provides 8.57 W hours. The solar panels 9210 used for providing power may be similar to those solar panels used for charging smart phones and tablets. These type of panels include both 7 W charging panels and 9 W charging panels that meet the 0.76 W and 1 W energy levels requirements.

7 W portable solar chargers having high efficiency solar charging panels normally have a weight of 0.8 pounds. These devices have general dimensions of 12.8×7.5×1.4 inches (32.5×19×3.5 cm). Other 7 W amorphous solar power battery charger panels have a size of 15.8×12.5×0.8 inches (40×31.75×2 cm) and a weight of 3 pounds. Alternative 9 W charging panels with monocrystalline cells have dimensions ranging from 8.7×10×0.2 inches (22×25.5×0.5 cm) and flexible solar panels have a size of 12×40 inches (30.5×100 cm). Other 9 W high-efficiency solar panels have sizes from 8.8×12.2×0.2 inches (22.35×31×0.5 cm).

Figure 93:
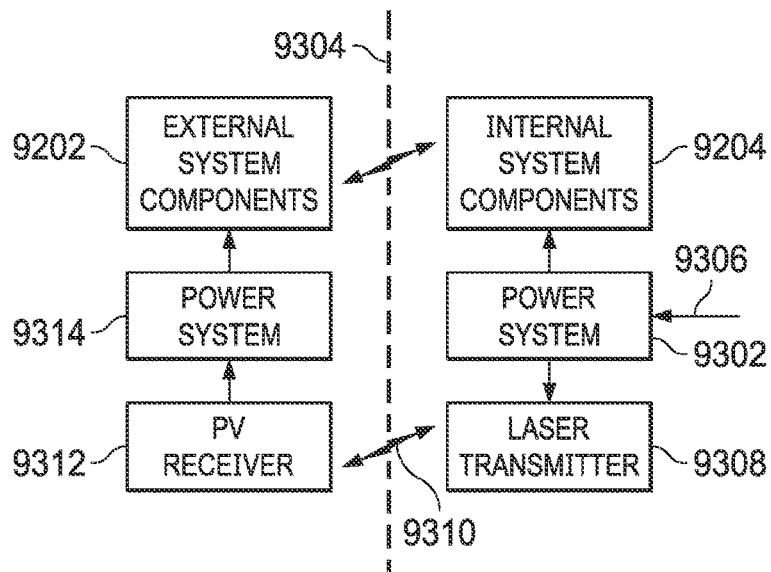
FIG. 93 illustrates a manner for powering external system components using lasers.

Referring now to FIG. 93, rather than utilizing solar panels, the external system components 9202 may utilize transmitted laser power for powering the external system components rather than utilizing a solar powered system. The internal system components 9204 have a power system 9302 that provides power for all components on the interior portion of a window or wall 9304. The power system 9302 has an internal power connection 9306 to for example, a power outlet located within the building. The power system 9302 provides system power to the internal system components 9204 in a known manner. Additionally, the power system 9302 provides power to a laser transmitter 9308. The laser transmitter may in one embodiment comprise laser diodes. The laser transmitter 9308 generates a laser beam 9910 that is transmitted through a window 9304 to a photovoltaic receiver (PV receiver) 9312 located on the outside of the window 9304. The laser transmitter 9308 includes a set of optics to define the beam size that is to be transmitted to the PV receiver 9312. The generated laser power may be defined according to the following equations:

$$P_{Optic} = \frac{P_{Electric}}{Eff_{Optics} \times Eff_{PV\ Cells}(\eta)}$$

$$QE(Eff_{PV-Cell}), \eta = \frac{R_\lambda}{\lambda} \times \frac{hc}{e} \approx \frac{R_\lambda}{\lambda_{\mu m}} \times 1.24$$

$$\eta = R\frac{1.24}{\lambda_{\mu m}}$$

The optical power needed by the PV receiver that detects energy at 445 nm may be defined in the following manner:

$\lambda$=445 nm

This is the wavelength of the receiver laser.

$R$=0.25(Hamamatsu Si—photodiode)

$$\eta = R\frac{1.24}{\lambda_{\mu m}} = 0.69$$

$Eff_{Optics}$=0.64 (Efficiency of Optics)

$$P_{Optic} = \frac{P_{Electric}}{Eff_{Optics} \times Eff_{PV\ Cells}(\eta)_{Optic}} = \frac{0.76}{0.64 \times 0.69} = 1.72W$$

Thus, in order to provide power at 445 nm a 2 W laser diode is needed. The PV receiver 9312 converts received laser light energy back into electricity. Power generated by the PV receiver 9312 responsive to the received laser beam 9310 is provided to the power system 9314. The power system 9314 and provides power to the external system component 9202 to enable their operation.

Figure 94:
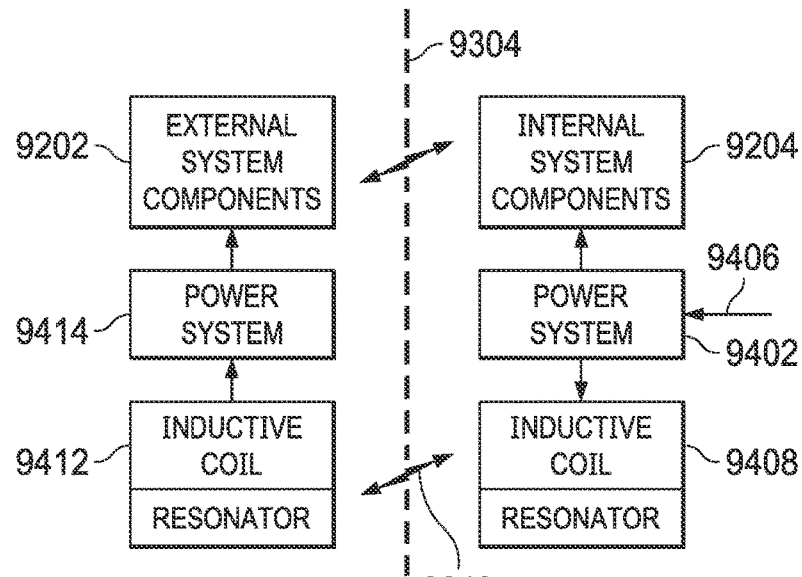
FIG. 94 illustrates a manner for powering exterior components from an interior power source using inductive coupling.

Referring now to FIG. 94, there is illustrated a further manner for powering exterior components from an interior power source using inductive coupling rather than utilizing solar panels or a laser source, the external system components 9202 may utilize power provided by magnetic inductive or magnetic resonance coupling to the internal power source through the window/wall 9404 for powering the external system components. The internal system components 9204 have a power system 9402 that provides power for all components on the interior portion of a window or wall 9404. The power system 9402 has an internal power connection 9406 to for example, a power outlet located within the building. The power system 9402 provides system power to the internal system components 9204 in a known manner. Additionally, the power system 9402 provides power to an inductive coil or magnetic resonator 9408. The inductive coil or magnetic resonator 9408 enables a magnetic connection with a second inductive coil or magnetic resonator 9412 located on the exterior of the window/wall 9404. The inductive coils or magnetic resonators 9408 and 9412 enable the inductive or resonate coupling of power from the internal power system 9402 to the external power system 9414. Power received at the inductive coil or magnetic resonator 9412 responsive to the received electromagnetic energy 9410 is provided to the power system 9414. The power system 9414 and provides power to the external system component 9202 to enable their operation to transmit signals through the window/wall 9404.

Also, in addition to the actively powered devices illustrated in FIGS. 92, 93 and 94, a passively powered device may be used that provides no powering to the exterior components but provides a shorter distance or higher power from the internal components within the building.

Figures 95, 96:
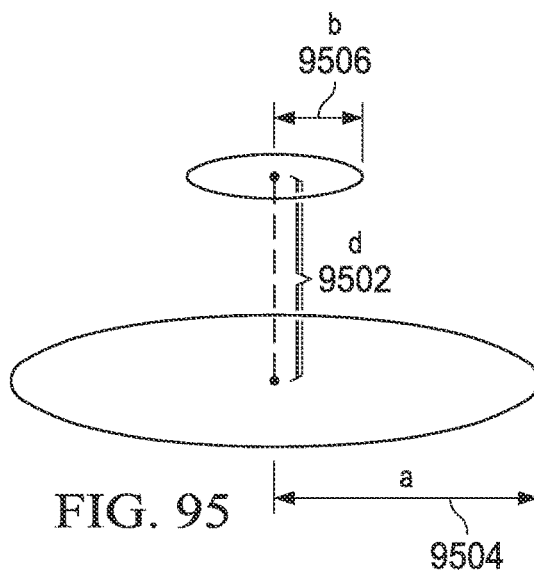
FIG. 95 illustrates a pair of circular loop's linked by mutual inductance.
FIG. 96 illustrates a table providing information relating to efficiencies of a coil.

The inductive coils 9408/9412 provide for inductive coupling of power between the internal and external circuitries while the magnetic resonators 9408/9412 use magnetic resonance coupling to transfer the power between the circuitries. With respect to the inductive coils, the coupling coefficient between the coils can be calculated in the following manner. Referring now to FIG. 95, the mutual inductance between two circular loops separated by a distance d 9502 each with a radii of a 9504 and b 9506 can be calculated using Neumann's equation:

$$M = \frac{\mu}{4\pi} \int \int \frac{\cos \epsilon}{r} ds ds'$$

where ds and ds' the incremental sections of the circular filaments and r is the distance between the two sections, which are defined as:

$$r = \sqrt{a^2+b^2+d^2-2a\cos(\phi-\phi')},$$

$$\epsilon = \phi-\phi', ds=ad\phi, ds=bd\phi'$$

The substitution of the above into Neumann's equation results in:

$$M = \frac{\mu}{4\pi} \int_0^{2\pi} \int \frac{ab\cos(\phi-\phi')}{a^2+b^2+d^2-2a\cos(\phi-\phi')} d\phi d\phi'$$

The integral of the above equation can be rewritten using elliptical integrals, yielding:

$$M(m) = \frac{2\mu\sqrt{ab}}{m}\left[\left(1-\frac{m^2}{2}\right) K(m) - E(m)\right]$$

where K(m) and E(m) are the elliptical integrals of first and second kind, respectively, and m is defined as:

$$m = \sqrt{\frac{4ab}{(a+b)^2+d^2}}$$

assuming values between 0 and 1.

The solutions of the elliptical integrals of the first and second kind can be approximated using the following equations:

$$K(m) = \frac{\pi}{2} + \frac{\pi}{8}\frac{m^2}{1-m^2}$$

$$E(m) = \frac{\pi}{2} - \frac{\pi}{8}m^2$$

For low values of m, the power series representation shows reasonable accuracy. However, as m increases both ellipticals diverge from the numeric integration values. For the lip to inner goal of the first kind, as in approaches the unity, the solution asymptotically tends to infinity much faster than a solution calculated by numeric integration.

The substitution of equation of K(m) and E(m) into the equation for M(m) yields:

$$M(m) = \frac{\mu \pi \sqrt{ab}}{8} \frac{m^3}{1-m^2}$$

Next, substituting the equation for m into the expression above results in the expression for the mutual inductance as a function of distance between two circular coaxial loops:

$$M = \frac{\mu \pi a^2 b^2}{\sqrt{(a+b)^2 + d^2 [(a-b)^2 + d^2]}}$$

For two coils with $n_{1,2}$ turns, the expression can be adjusted, yielding:

$$M = \frac{\mu \pi n_1 n_2 a^2 b^2}{\sqrt{(a+b)^2 + d^2 [(a-b)^2 + d^2]}}$$

which expresses the mutual inductance of two coils with $n_{1,2}$ as a function of distance d, the magnetic permeability of the material surrounding the coils μ and the inner radius of the two coils.

Figure-of-Merit (U) can be described in terms of the Q factor, which describes the ratio between the energy stored by loops of an inductor and the power dissipated in a given cycle. The Figure-of-Merit is dependent upon different coil parameters such as wire radius Ra, loop radius a, permeability of free space $\mu_0$ (since the core of the loop is air), conductivity of the core material and d distance between primary and secondary loops according to the equation:

$$U = \frac{\sqrt{2\mu_0 \omega \sigma} \, \pi \, n \, a^3 \, R_a}{d^2 \sqrt{4a^2 + d^2}}$$

In one embodiment, the transmission coil would have the characteristics of a loop radius of 6.25 cm, a wire radius of 10.25×10⁻³, 4 coil turns, a distance between the primary and secondary loops of 46 mm and an operating frequency of 6.78 MHz.

Referring now to FIG. 96, there is illustrated a table providing information relating to the efficiencies of a coil over various coil radius, various number of turns within the coil and differing coil heights.

Figure 97:
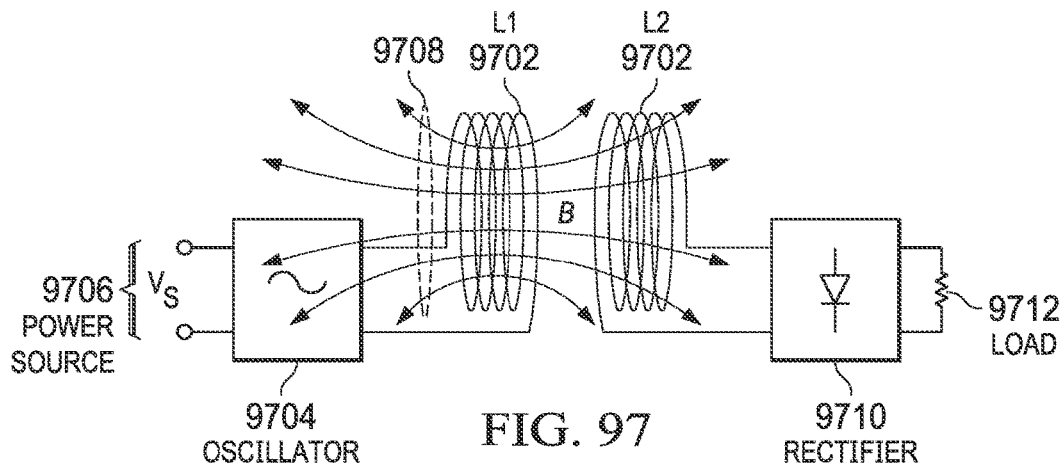
FIG. 97 is a schematic diagram for coils coupled via inductive coupling.
Figure 98:
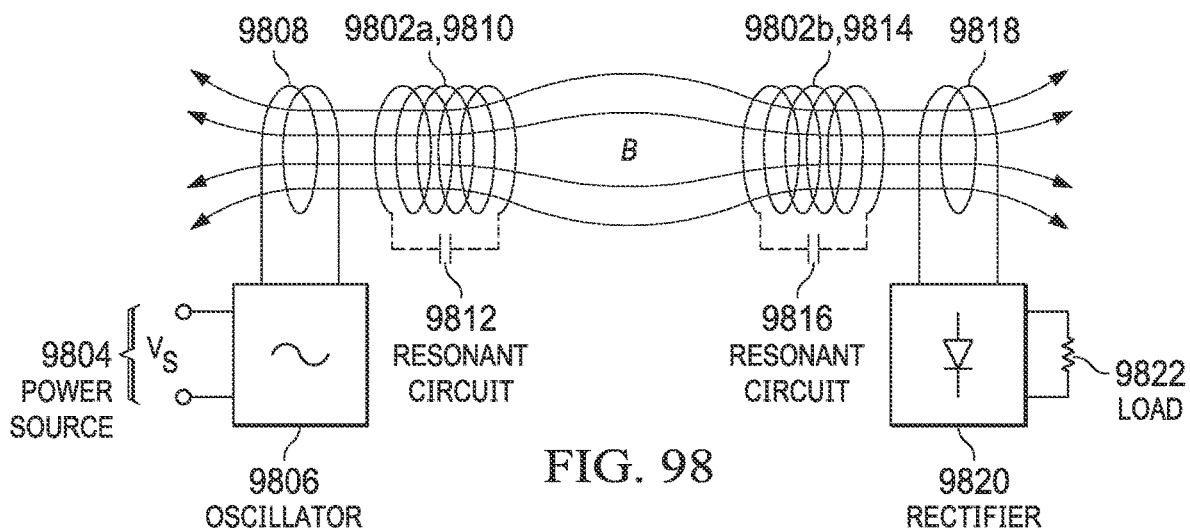
FIG. 98 is a schematic diagram for coils coupled via magnetic resonance.

Referring now to FIGS. 97 and 98, there are illustrated the manner in which coils 9702 inductively coupled with each other and in which resonator circuits 9802 inductively resonate with each other. FIG. 97 illustrates how alternating current is provided from an oscillator 9704 responsive to an input voltage 9706 to the L1 coil 9702. The alternating current within the L1 coil 9702 generates an alternating magnetic field 9708 which in turn induces an alternating current in the secondary coil L2. This causes a current to be provided to rectifier 9710 that is provided to a load 9712. The magnetic field generated by the primary coil 9702 radiates approximately equally in all directions. The fluxes created by the magnetic field drop rapidly with distance in accordance with the inverse square law. Therefore, the secondary coil L2 9702 must be placed as close as possible to the primary coil L1 9702 to intercept the most magnetic flux.

Referring now to FIG. 98, in order to overcome the major drawback of inductive wireless charging caused by the requirement to closely couple the coils thus demanding precise alignment and close proximity between the coils, magnetic resonance wireless charging may be utilized. Magnetic resonance may be used for charging any active component from inside a building to the outside of the building by using different sized coils. The basic concept behind magnetic resonance power transfer is to tunnel energy from one coil to another in a directed fashion across the window or wall instead of spreading energy omni-directionally from the main coil. The magnetic resonance wireless charging circuit receives an input voltage $V_S$ across inputs 9804 that applies the voltage $V_S$ to oscillator 9806. The output of the oscillator 9806 is passed through a drive coil 9808. The drive coil 9808 generates a current in the primary resonator circuit 9802 that includes a coil 9810 having a capacitor 9812 connected across the coil 9810. The resonator circuit 9802a couples with resonator circuit 9802b to provide magnetic resonance wireless charging. Resonator circuit 9802b includes a coil 9814 having a capacitor 9816 connected across the coil. The resonator circuit 9802b couples with a drive coil 9818 connected to rectifier 9820 this is used for driving a load 9822. The basic concept behind magnetic resonator power transfer is that the energy from resonator circuit 9802a is tunneled to resonator circuit 9802b instead of spreading omnidirectional from the primary coil 9802a.

In order to use inductive coupling and magnetic resonance coupling to provide for wireless power transfer from an interior of a building to an exterior of a building through a window or wall using the above described millimeter wave transmission system, differing design considerations must be dealt with depending upon whether inductive coupling or magnetic resonance coupling is utilized. In order to provide wireless power transfer using inductive coupling, a high magnetic coupling is required necessitating the distance between the transmitting power unit and the receiving power unit being very small. Standards available for inductive coupling wireless power transfer include Qi and PMA. Using the standards between 5 W and 15 W may be transmitted over small distances of 5-10 mm.

Wireless power transfer using magnetic resonance coupling, also referred to as highly resonant wireless power transfer (HR-WPA), uses a loosely coupled magnetic resonance for power transfer. High-quality factor magnetic resonators enable efficient energy transfer at lower coupling rates enabling power transfer over greater distances between the transmitting and receiving power units while providing more positional freedom. Existing standards include Rezence (WiTricity) and WiPower (Qualcom).

Figure 99:
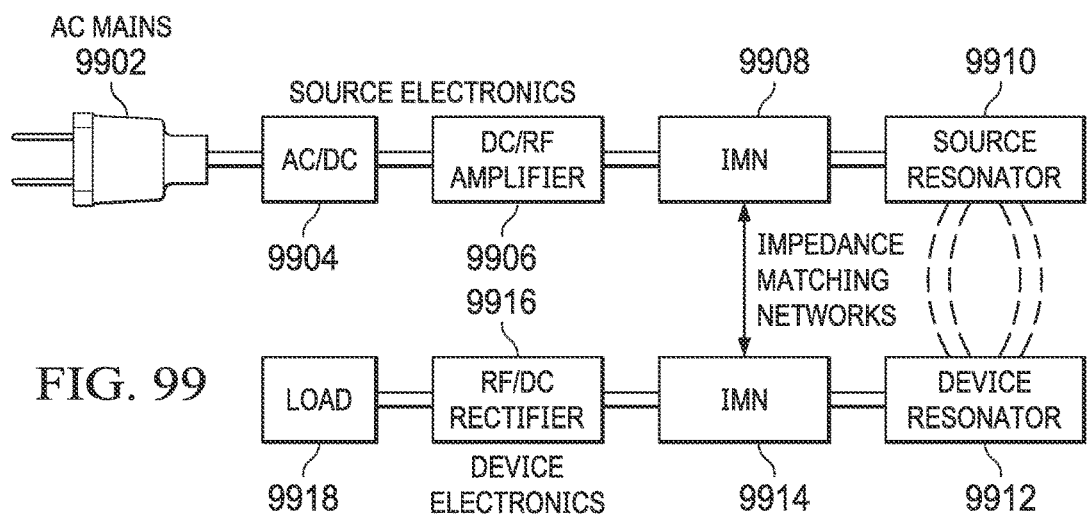
FIG. 99 is a functional block diagram of a magnetic resonance wireless power transfer system.

Referring now to FIG. 99, there is illustrated a functional block diagram of a magnetic resonance wireless power transfer system which may be utilized to power the millimeter wave system of the present disclosure. An AC voltage signal is provided at an AC input 9902. The AC voltage signal is applied to an AC/DC converter 9904 that converts the alternating current signal into a direct-current signal. The direct-current signal from the AC to DC converter 9904 is applied to a DC/RF amplifier 9906. The DC/RF amplifier 9906 is a high-efficiency switching amplifier that converts the DC voltage into an RF voltage waveform used for driving the source resonator. The RF voltage waveform from the DC/RF amplifier 9906 is applied to add impedance matching network 9908. The impedance matching network 9908 provides impedance matching and improves system efficiency. The signal from the impedance matching network 9908 is provided to the transmission side source resonator 9910 which links the signal to the receiver side device resonator 9912. The source resonator 9910 and the device resonator 9912 are highly quality factor resonators that enable efficient energy transfer at lower coupling rates (greater distance and/or positional freedom) between the transmission side and receiver side located on opposite sides of a window or wall. This energy coupling is referred to as highly resonant wireless power transfer (HR-WPT). The power transferred to the device resonator 9912 goes to a second impedance matching network 9914 and to a RF/DC rectifier 9916. The rectifier 9916 is used for loads 9918 requiring a DC voltage and converts the received AC power back into a DC signal.

The source resonator 9910 and device resonator 9912 have characteristics that can be described by two fundamental parameters, namely, a resonant frequency, $\omega_0$, and an intrinsic loss rate, $\Gamma$. The ratio of these two parameters defines the quality factor (Q) of the resonator, ($Q=\omega_0/2\Gamma$) a measure of how well the resonator stores energy. A resonator energy oscillates at the resonant frequency between the inductor (energy stored in the magnetic field) and the capacitor (energy stored in the electric field) and is dissipated in the resistor. The resonant frequency and the quality factor of the resonator are defined as:

$$\omega_0 = \frac{1}{\sqrt{LC}}$$

$$Q = \frac{\omega_0}{2\Gamma} = \sqrt{\frac{L}{C}}\frac{1}{R} = \frac{\omega_0 L}{R}$$

The expression for Q shows that decreasing the loss in the circuit, i.e., reducing R, increases the quality factor of the system. High-Q electromagnetic resonators are typically made from conductors and components with low absorption and as a result have relatively narrow resonant frequency widths.

By locating the source resonator 9910 in close proximity to the device resonator 9912 coupling may be achieved between the devices enabling the resonators to exchange energy. A schematic representation of coupled resonators is illustrated generally in FIG. 100. The source voltage is a sinusoidal voltage source 10002 with an amplitude $V_g$ at frequency $\omega$ with equivalent generator resistance $R_g$ 10004. The source and device resonator coils are represented by the inductors $L_S$ 10006 and $L_D$ 10008 which couple through the mutual inductance M where $M=k\sqrt{L_S L_D}$. Each coil has a capacitor to form a resonator ($C_S$ 10010 and $C_D$ 10012). The resistances $R_S$ 10014 and $R_D$ 10016 are parasitic resistances that include both ohmic and radiative losses of the coils 10006, 10008 and resonant capacitors 10010 and 10012 of the respective resonators. The load is represented by $R_L$ 10018.

Figure 100:
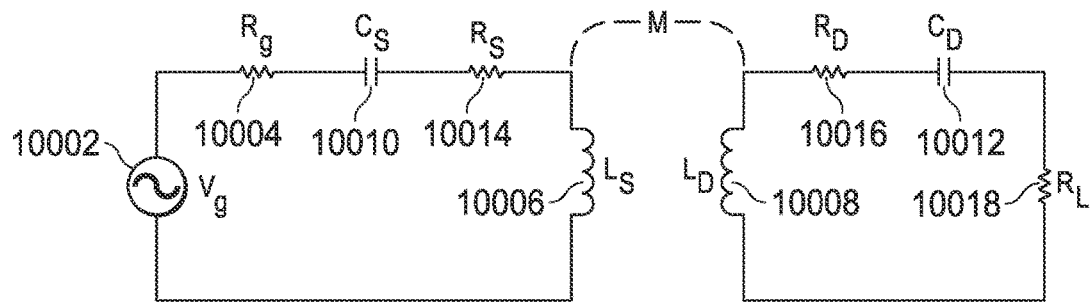
FIG. 100 is a schematic diagram of magnetically coupled resonators.

Analysis of the circuit of FIG. 100 provides the power delivered to the load resistor 10018 divided by the maximum power available from the source in both the source and device are resonant at $\omega$ according to the equation:

$$\frac{P_L}{P_{g,max}} = \frac{4 \cdot U^2 \frac{R_g}{R_s}\frac{R_L}{R_d}}{\left(\left(1+\frac{R_g}{R_s}\right)\left(1+\frac{R_L}{R_d}\right)+U^2\right)^2}$$

$$U = \frac{\omega M}{\sqrt{R_s R_d}} = \frac{k}{\sqrt{\Gamma_s \Gamma_d}}$$

where U is the figure-of-merit for the system.

The generator resistances 10014, 10016 and load resistance 10018 are chosen to provide the best system performance (done by the impedance matching network) in accordance with:

$$\frac{R_g}{R_s} = \frac{R_L}{R_d} = \sqrt{1+U^2}$$

The efficiency of the power transmission as defined above is then maximized in accordance with:

$$\eta_{opt} = \frac{U^2}{\left(1+\sqrt{1+U^2}\right)^2}$$

The best possible efficiency of a wireless power transfer system depends on the system figure-of-merit, which can be written in terms of the magnetic coupling coefficient between the resonators, k, and the unloaded resonator quality factors, $Q_S$ and $Q_D$.

$$U = \frac{\omega M}{\sqrt{R_s R_d}} = k\sqrt{Q_s Q_d}$$

Magnetic coupling coefficient (k) is a function of the relative sizes of the resonators, the distance between the resonators and the relative orientation of the resonators. The above equation illustrates that using high quality factor resonators allows for efficient operation even at lower coupling rates. This eliminates the need for precise positioning between the source and device resonators and provides for a greater distance between coils and more positional freedom and freedom of movement. The elimination of the need for precise positioning allows for a consumer to install the internal and external transceivers located on the interior and the exterior of the window or wall.

The Figure-of-Merit U depends on different coil parameters such as wire radius Ra, loop radius a, permeability of free space $\mu_o$, the distance d between the primary and secondary loop and conductivity of the core material. Figure-of-Merit U can be expressed in terms of the Q-factor, which describes the ratio between the energy stored by loops and the power dissipated in a given cycle.

$$U = kQ = \frac{\omega_0 M}{R}$$

$$U(\omega_0, a, d, R_a, \sigma) = \frac{\omega_0 M(a,d)}{R(a, \omega_0, R_a, \sigma)}$$

$$M = \frac{\mu_o a}{m}((2-m^2)K(m) - 2E(m))$$

-continued $$m = 4a^2/(4a^2 + d^2)$$

$$K(m) = \frac{\pi}{2} + \frac{\pi}{8}\frac{m^2}{1-m^2}$$

$$E(m) = \frac{\pi}{2} - \frac{\pi}{8}m^2.$$

$$R_{rad} = \frac{\mu_0(\omega_0 a)^4 \pi}{12(c^3)}$$

$$R_{atm} = \sqrt{\frac{\mu_0 \omega_0}{2\sigma}}\frac{a}{R_a}$$

$$R = R_T = R_R = R_{rad} + R_{atm}$$

where δ denotes the kind of committee of the material and c is the speed of light.

Figure 101:
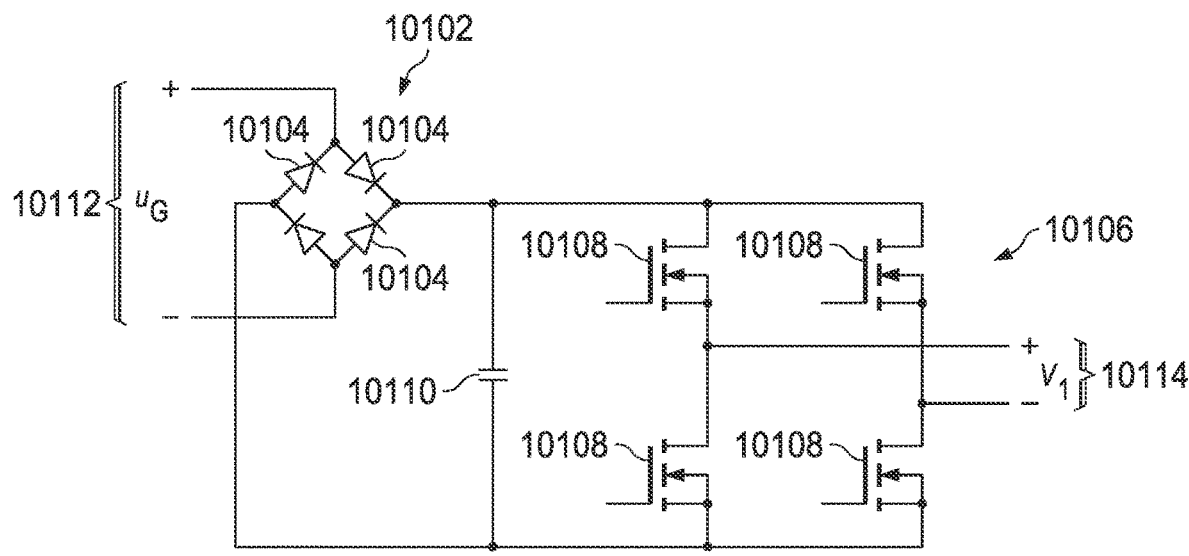
FIG. 101 is a schematic diagram of a simple power generation circuit.

Referring now to FIG. 101, there is provided a circuit diagram of a power generator for converting 50 Hz grid AC to kHz such as the DC/RF amplifier 9906 of FIG. 99. This illustrates a potential power source for the wireless energy transfer system that utilizes a rectifying and switching network to convert the power grid AC to the frequency of operation of the energy transfer system. FIG. 101 illustrates a simple example of a power source including a rectifier 10102 including four diodes 10104 and a switching network 10104 including four power MOSFET transistors 10108. A capacitor 10110 is connected between the rectifier 10102 and the switching network 10106. The resistance of the power source is in the range of 250 m to 400 m. An input to the power source is provided across the rectifier 10102 across terminals 10112. The output $v_1$ 10114 from the switching network 10106 is approximately a square voltage. The Fourier components of a normalized Square signal f(t) is:

$$f(t) = \frac{4}{\pi}\sum_{n=1,3,5,\ldots}^{\infty}\frac{1}{n}\sin\left(\frac{2n\pi i}{T}\right),$$

Figure 102:
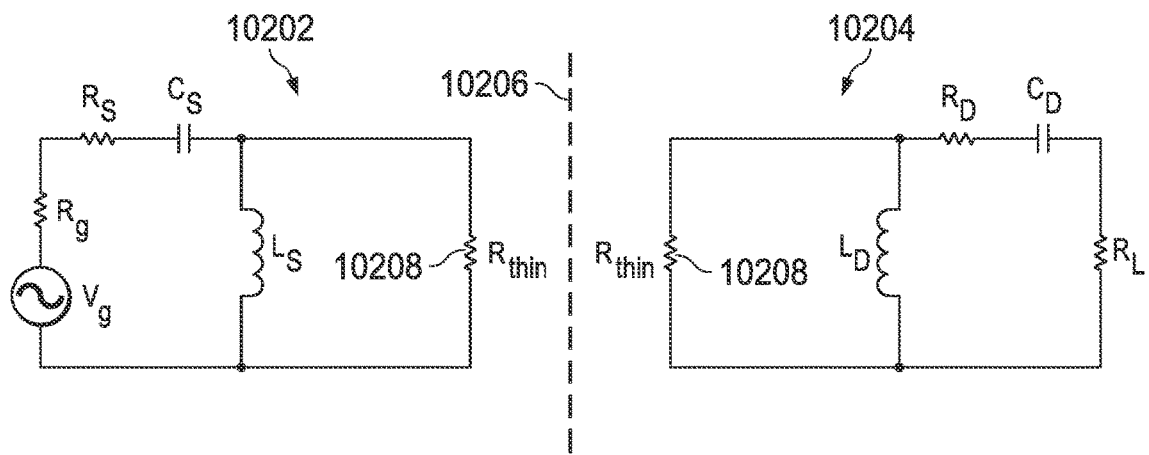
FIG. 102 schematically illustrates the use of impedance matching to overcome Eddy current losses.

Referring now to FIG. 102, there is illustrated the manner in which Impedance matching may be utilized to overcome losses between resonators 10202 and 10204. A schematic representation of the resonators 10202 and 10204 are provided in the manner described previously for transmission through a window 10206. Two resistors $R_{thin}$ 10208 are inserted across the inductors $L_S$ and $L_D$ respectively to mimic and model the Eddy current losses due to the thin silver layer in Low-e class. With proper impedance matching through the resistors and/or matching control using the previously describe impedance matching network, coils and resistor, the losses may be overcome by modifying the turns in the coil, the area of the coils, the permeability (material type) of the coil, as well as the frequency of the resonant frequency.

Figure 104:
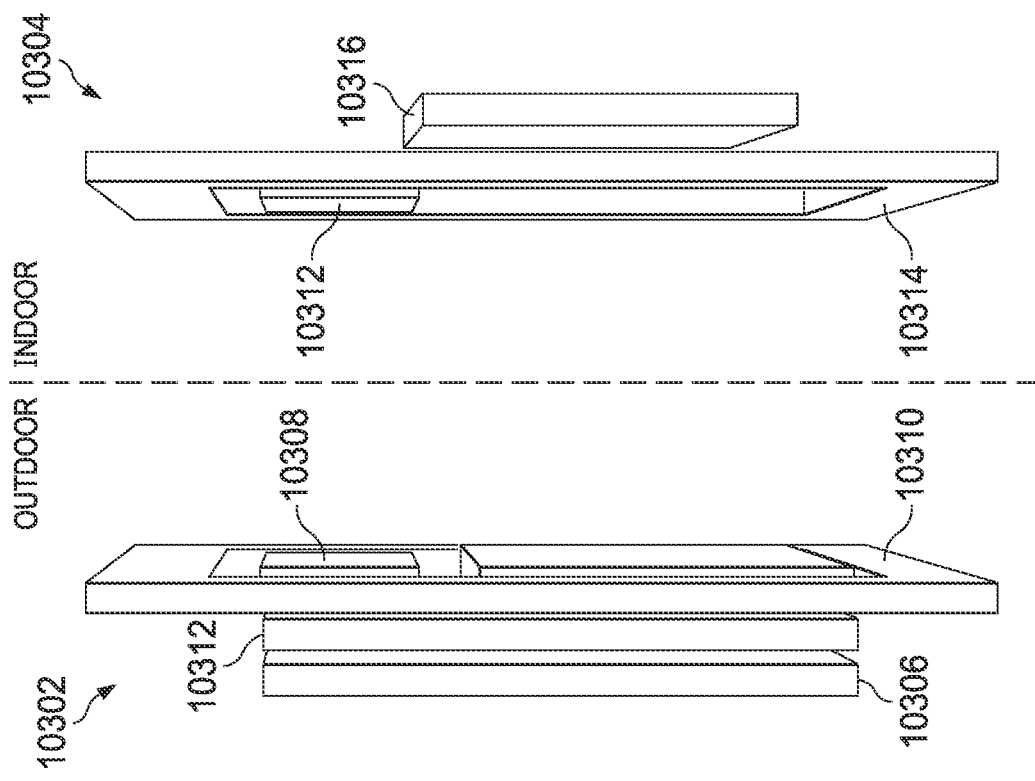
FIG. 104 illustrates a side view of Peraso transceiver circuitries located on an exterior and interior of a structure.
Figure 103:
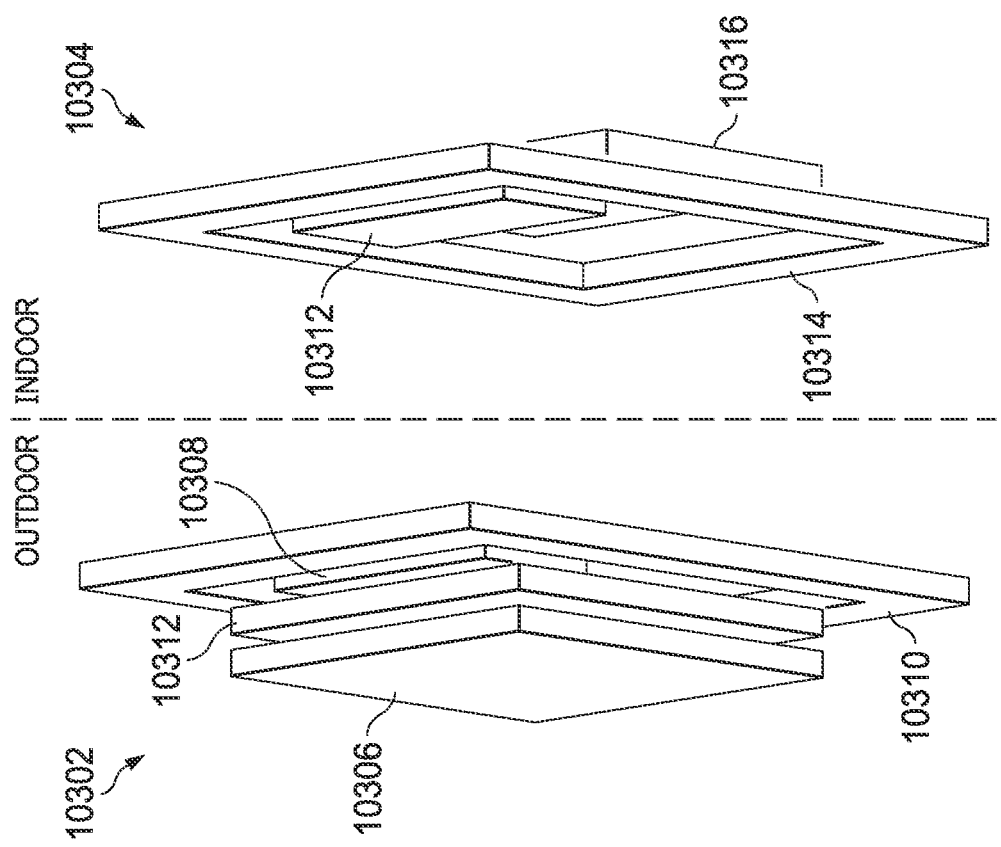
FIG. 103 illustrates a perspective view of Peraso transceiver circuitries located on the exterior and interior of a structure.

FIGS. 103 and 104 illustrate a perspective view and a side view of the outside transmission circuitry 10302 and inside transmission circuitry 10304 using the Peraso chipset and inductive or resonant coupling for transmitting power from the inside transmission circuitry to the outside transmission circuitry. Outside transmission circuitry 10302 consists of the antenna 10306 that receives millimeter wave transmissions from a base station or other external transmission source. In an alternative embodiment, the antenna 10306 may also comprise a Peraso transceiver to enable direct reception of transmissions from another Peraso transceiver.

A Peraso transceiver 10308 is used for transmitting signals through a window or wall separating the outside transmission circuitry 10302 from the inside transmission circuitry 10304. A coil 10310 is used for inductive power transmission or magnetic resonance power transmission from the interior of the building in the manner described hereinabove. A circuit board 10312 is used for interconnecting the electronic components of the antenna 10306, Peraso transceiver 10308 and the coil 10310.

The inside transmission circuitry 10304 includes a Peraso transceiver 10312 for transmitting and receiving signals with the Peraso transceiver 10308 in the outside transmission circuitry 10302. An interior coil 10314 enables inductive or magnetic resonance power coupling with the outside transmission circuitry 10302. Additionally, a circuit board 10316 enables interconnection between the Peraso transceiver 10312, the coil 10314 and any other interior electronic circuitries.

With respect to window glass through which signals or power must be transmitted, the relative permittivity, power transmission, phase and reflection may be calculated according to the Drude model as shown by the following:

$$\epsilon_r = 1 - \frac{\omega_p^2}{\omega(\omega + i\gamma)}$$

$\omega_p$: Bulk plasma frequency
γ: intraband damping term
For silver: $\omega_p$=9.6 ev, γ=0.0228 ev $$\epsilon_r = (n+ik)^2$$

k ∝ amount of loss due to absorption
Absorbed power:

$$1 - \left(e^{k\,2\pi\,f\frac{x}{c}}\right)^{\wedge}2$$

Phase:

$$\frac{2\pi n x}{c}$$

The values of $\epsilon_r$, n, k, absorb power and absorption loss are illustrated in FIG. 105.

The reflection loss for one layer may be defined as −10 log (1−$R^2$) while the reflection loss for two layers may be defined as −10 log (1−$2R^2$−$R^4$−$2R^3$). The absorption loss is defined as −20 log $e^{-\alpha x}$. Values for these are more particularly illustrated in FIGS. 106 107. These values may be determined based upon the reflectivity R:

$$R = \left|\frac{1-\sqrt{\epsilon_r}}{1+\sqrt{\epsilon_r}}\right|^2$$

And the absorption coefficient:

$$\alpha = \frac{2\omega}{c}k$$

Application with Residential IP Network System

Current broadband systems use wired broadband with fiber connections to transmit information from the network provider to consumers. For example, AT&T U-verse has fiber to the node and copper to premises or in some cases provide fiber all the way to the premises. Fiber to the premises systems are expensive and require a great deal of time to deploy. Other solutions are DirecTV, DLS modem from Frontier, and a cable box of Charter or Comcast. Another solution has been the implementation of a wireless delivery of broadband. However, when delivering broadband using wireless, high-frequency RF waves, issues arise with respect to signals that cannot penetrate through window glass and walls of homes and buildings.

In traditional cable TV or satellite networks using broadcast RF video technology, all content constantly flows downstream to each customer, and the customer switches the content at the set-top box. The customer can select from among many choices provided by the cable or satellite provider, that are provided via the pipe flowing into the home/business. The broadcast network is only one way of transmitting data from the provider to the consumer. Thus far, the approach has been to place antennas on the roof to receive the signals from a hub and then drilling through different floors to enable the signals to penetrate into the building. This approach of delivery from the roof of the building to individual units within the building is very costly and time-consuming for operators. Another approach is to direct beams from the hub to individual units but this may cause the signal to hit a window or wall of the building. The losses are introduced by the wall or window when the radio beams try to penetrate into the building. These losses are huge for millimeter wave radio signals and therefore methods for providing broadband delivery utilizing the above described techniques would be greatly beneficial.

Figure 108:
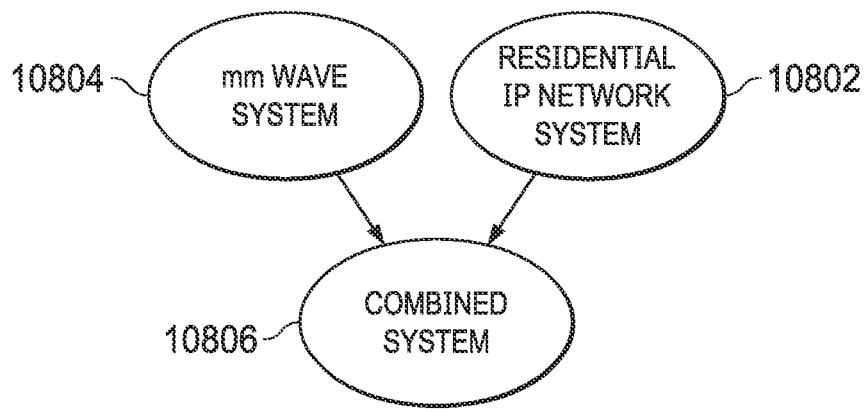

One manner for overcoming the above-noted issues with respect to wireless broadband transmissions is illustrated in FIG. 108. By combining existing residential IP network systems 10802 with millimeter wave transmission systems 10804 an improved combined residential IP network system 10806 may be provided. The millimeter wave transmission system 10804 has the advantage of higher bit rates, more precise beam forming and steering and smaller footprint components. Residential ITP network systems 10802 comprise combination services consisting of Internet, TV, and VoIP phone services. These services can be ordered in a bundle or separately and not all combination of services may be available. The TV services are based on IPTV (Internet protocol television) used to deliver TV services. A network systems 10802 also utilize IP technology (Internet protocol technology) such that TV, computer, home phone and wireless devices are integrated to work together using the Internet protocol. This provides many useful features, more control over devices in the manner of delivery of the services. The use of IP technology also provides for more personalization such that services may be tailored toward the exact needs of the consumer. An example of this type of service is AT&T U-verse, DirecTV, DSL modem from Frontier, cable box of Charter or Comcast. The residential IP network system 10802 and video backbone delivers high-quality video, advanced functionality and other applications. The residential IP network system 10802 is a two-way IP network provided to the customer's home via fiber to the premises or fiber to the node technology.

The millimeter wave system 10804 enables the transmission of signals through a window or wall as was more fully described hereinabove. By combining the millimeter wave system 10804 with the residential IP network system 10802, wireless broadband transmissions may be provided from a network provider to user devices located on the interior of the building without losses occurring by transmissions of the signals through a window or wall degrading system performance. Within the combined residential IP system 10806, content will remain in the network and only be provided to the customer when requested. Within the combined residential IP system 10806, the IP network is two-way. Switched video delivery is not limited by the size of the "pipe" into the home/business. The network allows for delivery of more content and functionality. The network creates the potential to provide customers more choices, including niche programming of interest to diverse audiences and more high definition (HD) programming.

Compared to "traditional" cable or satellite TV, a combined system 10806 providing IPTV is a different, improved configuration enabling more flexibility and creativity within the network. A combined system 10806 using IPTV enables two-way interactivity versus a traditional one-way cable or satellite broadcast network. The two-way residential IP network enables viewers to have more options to interact, personalize and control their viewing experience. IP technology also allows for more flexibility within a home network. With the combined system residential IP network, all system receivers with any home or business are connected on the same high-speed network. This enables one to connect gaming consoles, laptops and other devices to the premises residential IP network.

Watching IPTV on a combined system 10806 is different than streaming videos over the public Internet. With IPTV, program is carried over a network providers residential IP network which allows the network provider to control video quality and the reliability of the service. Best effort Internet video can be subjected to delays due to a lower bandwidth, high-traffic or poor connection quality. Since IPTV enables TVs to communicate with other services, integrated high-speed Internet-based content and features may be brought to the TV screen. For example, online photos uploaded to the public or personal clouds can be seen directly from the TV.

Figure 109:
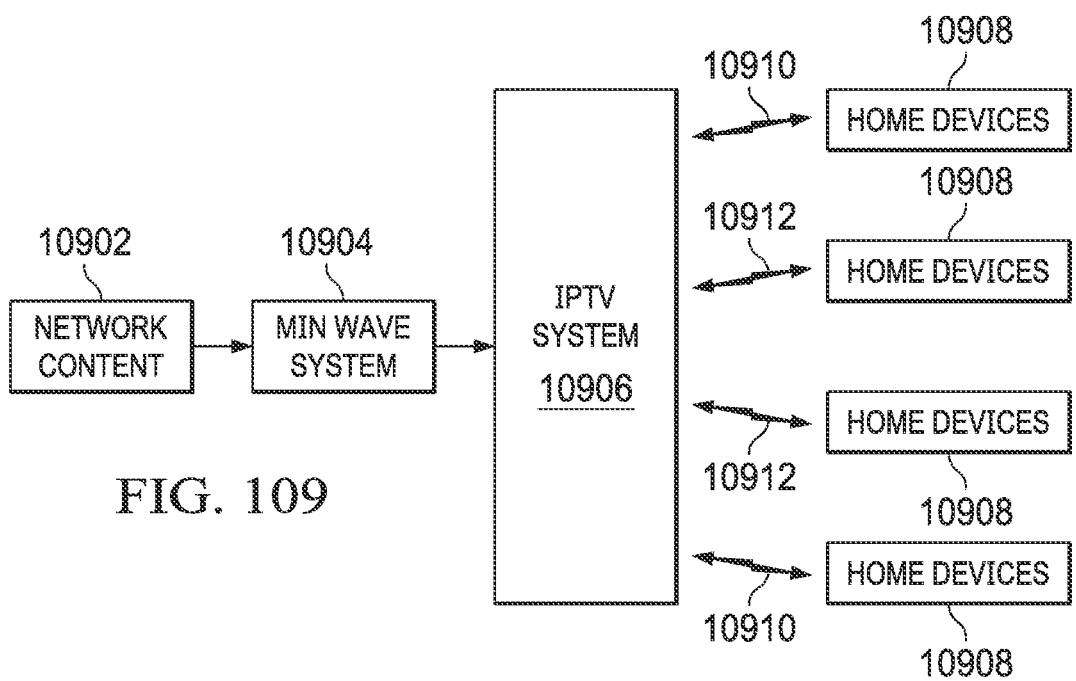

Referring now to FIG. 109, there is more particularly illustrated a functional block diagram of the residential IP combined system 10806 of FIG. 108. Network content 10902 is provided from a service provider to a millimeter wave transmission system 10904. The network content 10902 may comprise video, audio, Internet web pages or any other network based material. The millimeter wave system 10904 may operate at a number of wavelengths in accordance with the systems described hereinabove with respect to the transmission of signals from an exterior of the building to an interior of a building and from an interior of the building to an exterior of the building. The millimeter wave system 10904 would include all of the various systems for transmitting bidirectionally between the inside and outside of the building described hereinabove. The millimeter wave system 10904 transmits broadband data to a residential IP system 10906 located on the interior of a building. The millimeter wave system 10904 can be on both sides of the glass or wall, allowing tunneling of radio waves either via optics or RF. The millimeter wave system 10904 is connected to a residential gateway 10906 directly via electronic integration at the window unit. In an alternative embodiment, the millimeter wave system 10904 is wirelessly connected to a residential gateway 10906 either on licensed band or unlicensed Wifi with beam forming. The residential IP system 1106 provides the broadband content to a number of home devices 10908 located on the interior of the building via wireline connections 10910 and wireless connections 10912.

Figure 110:
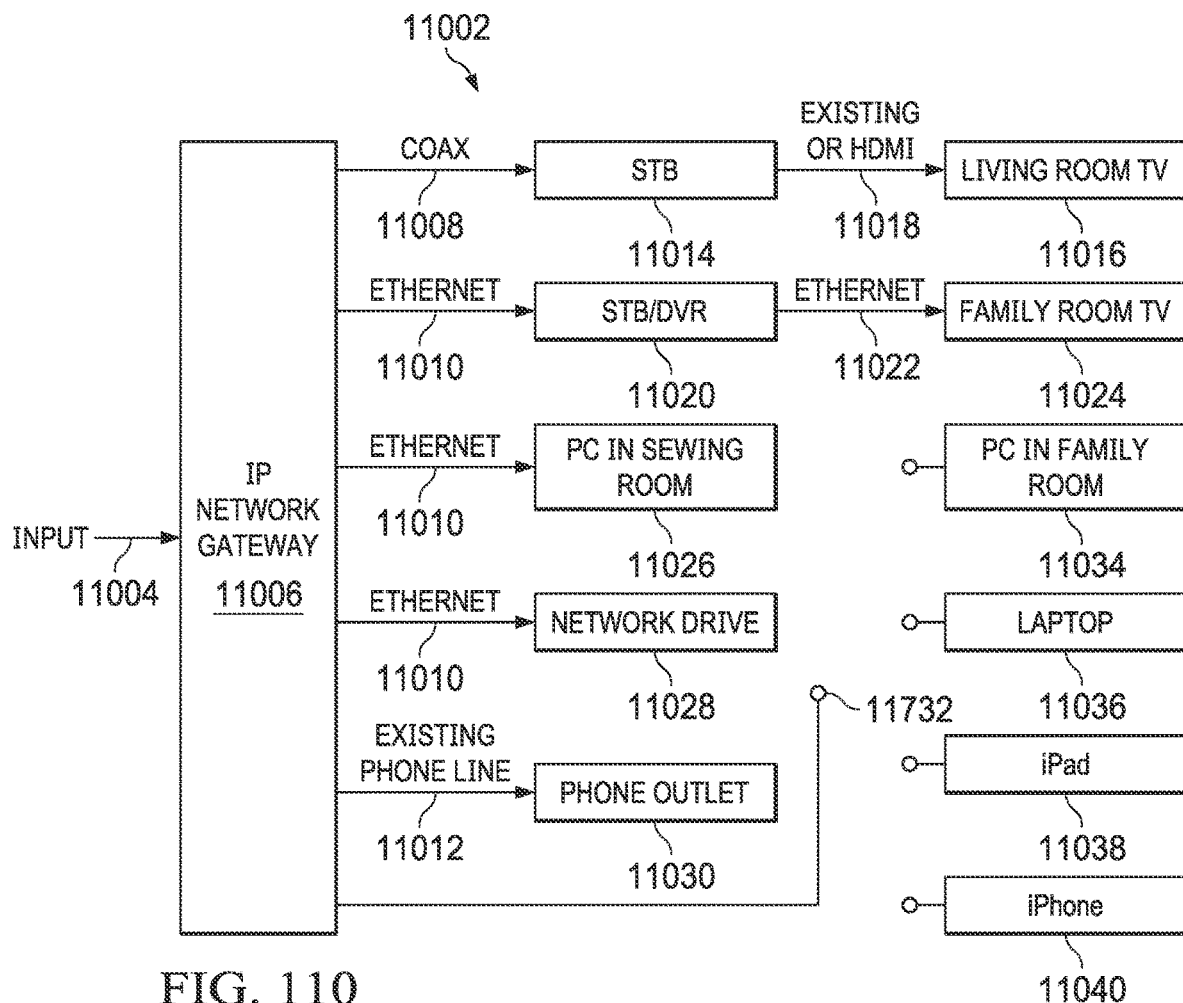

FIG. 110 illustrates a functional block diagram of a residential IP network system 11002. An input 11004 from a millimeter wave transmission system that enables the transmission of millimeter waves from an exterior transmission unit to the interior of the structure provides broadband signals to a residential IP network gateway 11006. The residential IP network gateway 11006 determines where the signal coming from the input 11004 needs to be routed and provides the output on one of a plurality of possible outputs to the appropriate destination IP address associated with the device requesting the broadband information. The output lines may comprise a coaxial cable 11008, an ethernet cable 11010 or existing phone line 11012. The coaxial cables 11008 may provide inputs to a set top box 11014 that then provides an output to a living room TV 11016 through for example an HDMI connection 11018. A first ethernet connection 11010 may connect to a set top box/DVR 11020. A further ethernet connection 11022 provides data to a second television 11024. Ethernet connections 11010 may also provide data to a PC 11026 or a network drive 11028. The existing phone line connection 11012 would be provided to a phone outlet 11030 for connection of a telephone. Finally, a Wi-Fi antenna 11032 provides the ability for the residential IP network Gateway 110062 to provide a Wi-Fi network connection within a structure. The Wi-Fi network connection enables devices such as a PC 11034, laptop 11036, iPad 11038 or iPhone 11040 to wirelessly connect to the residential IP network Gateway 11006 to receive broadband data.

Figure 111:
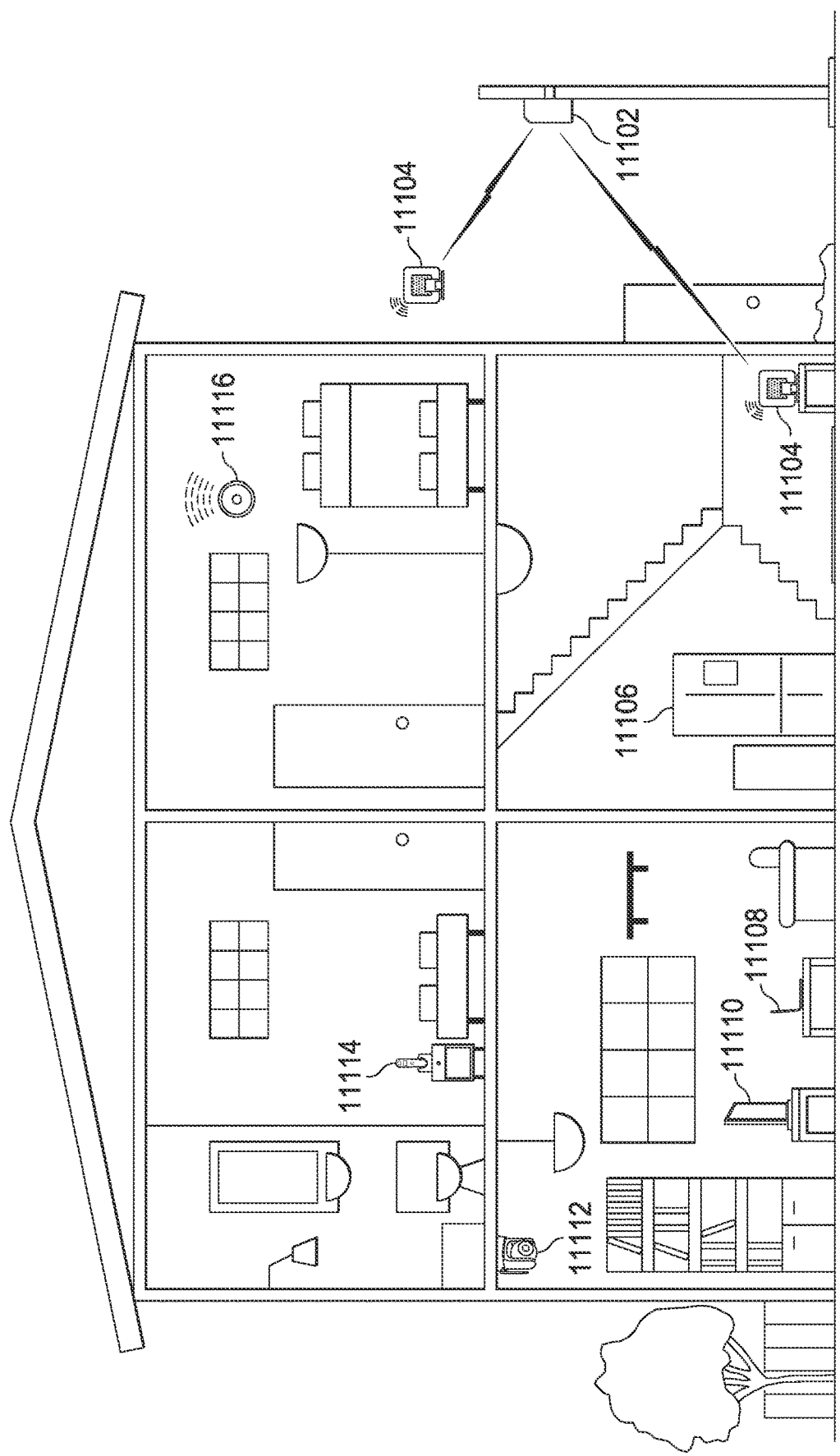

FIG. 111 illustrates the manner in which a millimeter wave system may be utilized to transmit information to a residential IP network system. An access unit 11102 located on the outside of a structure wirelessly transmits broadband data to CPE (customer premises equipment) units 11104 located within one or more structures associated with the residential IP network system. The access unit 11102 may receive the broadband data for transmission to the CPE units 11104 via wireless transmissions or a hardwired connection. The wireless access provided between the access unit 11102 and the CPE units 11104 may be provided in any of a number of frequency bands including, but not limited to millimeter bands 24 GHz, 28 GHz, 39 GHz, 60 GHz as well as 2.5 GHz, the CBRS band 3.5 GHz, Wi-Fi bands at 2.4 and 5 GHz. The signals are transmitted from outside the structure to inside the structure using any of the above described transmission techniques for transmitting signals through a wall or window. Within the structure the CPE unit 11104 uses Wi-Fi or other unlicensed bands within the premises to transmit signals to Internet of things (TOT) devices 11106, PCs 11108, IP TVs 11110, closed circuit televisions 11112, IP telephones 11114 and Wi-Fi extenders 11116. These are only some examples of IP-based devices and any type of Wi-Fi connectable device may be utilized within the structure for communications with the CPE 11104. The manner in which broadband data may be transmitted from the exterior of the structure to the interior of the structure may be configured utilizing the above described millimeter wave transmission systems in a number of fashions.

Figure 112:
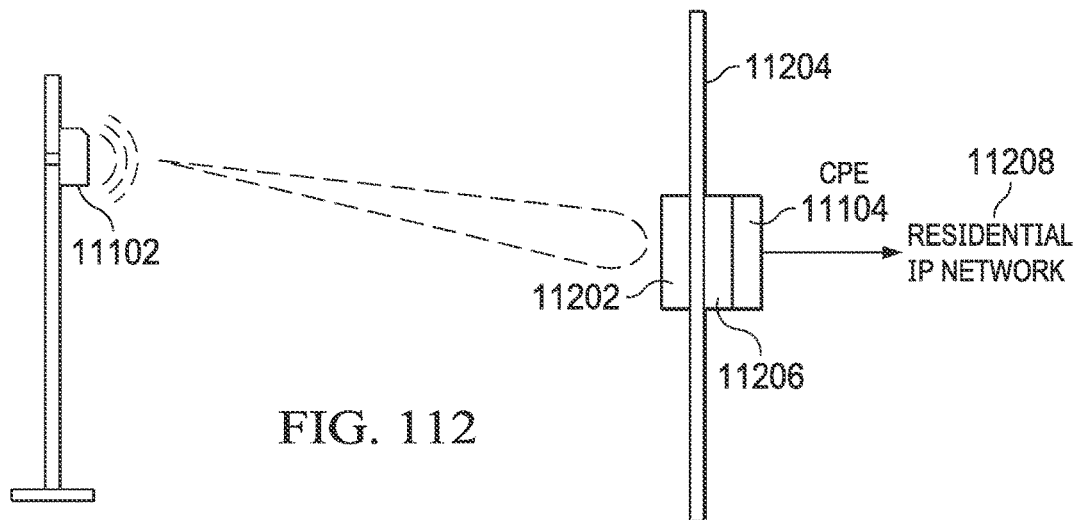

FIG. 112 illustrates a first embodiment wherein the access unit 11102 wirelessly transmits the broadband data to a millimeter wave system transceiver 11202 located on an external side of a window or wall 11204. The system is consumer installed with the repeater (transceiver 11202) outside of the building and a transceiver 11206 on the inside of the building. This configuration uses millimeter wave transmitters on both sides of the glass or wall enabling tunneling of radio waves using either optical signals or RF signals. The broadband signals are connected directly to the CPE device 11104 via electronic integration at an integrated window unit to provide access to the residential IP network 11208. The wireless transmissions to the millimeter wave transceiver 11202 may be within any frequency band including, but not limited to, millimeter wave bands such as to 24 GHz, 28 GHz, 39 GHz, 60 GHz and 2.5 GHz; CBRS bands such as 3.5 GHz; and Wi-Fi bands such as 2.4 and 5 GHz. Millimeter wave transceiver 11202 transmits the signals through the window or wall 11204 to a second millimeter wave transceiver 11206 located on the interior of the structure. The composition of the millimeter wave transceivers 11202 and 11206 may be any of those discussed herein above with respect to systems for transmitting signals through a window or wall 11204. The interior millimeter wave transceiver 11206 outputs received data to (or receives data from) a customer premises equipment 11104 associated with the residential network IP 11208. The millimeter wave transceiver 11206 and CPE 11104 may comprise integrated equipment within a same box or device for receiving the signals from the millimeter wave transceiver 11202 located on the external of the structure and providing the data to the residential IP network 11208 and associated devices.

Figure 113:
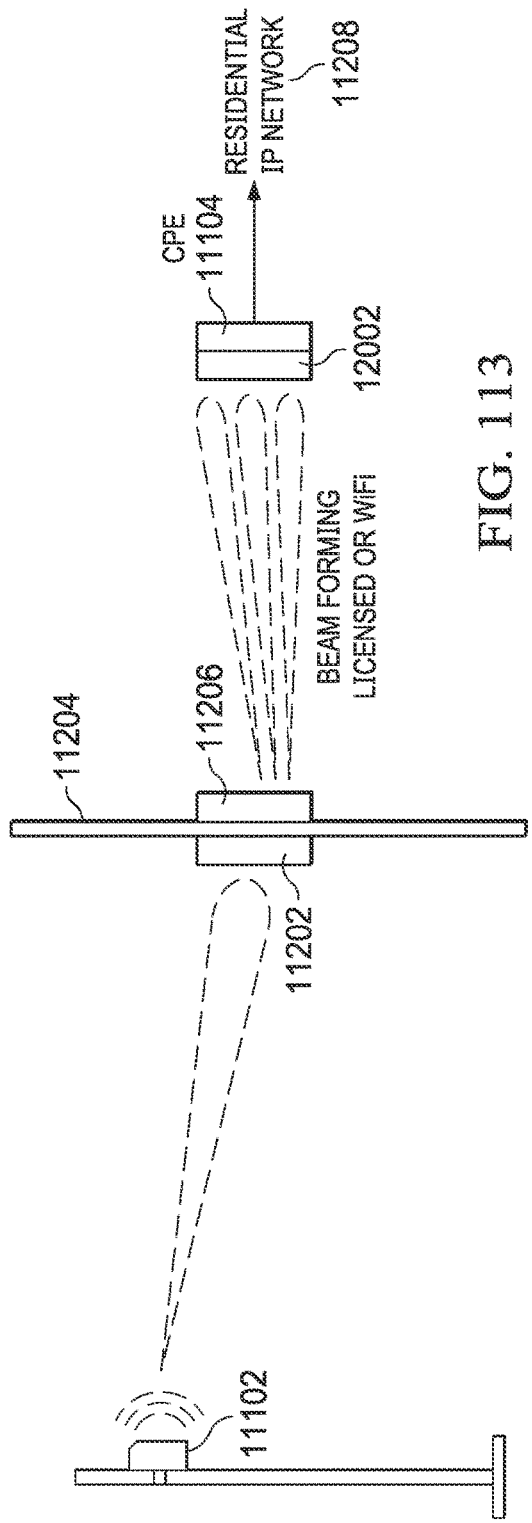

FIG. 113 illustrates an alternative embodiment wherein the access unit 11102 wirelessly transmits the broadband data signals to the external millimeter wave transceiver 11202 as described previously with respect to FIG. 112. In this embodiment, millimeter wave transceivers are provided on sides of the window or wall 11204 enabling tunneling of radio waves using either optical signals or RF signals. The signals transmitted through the window or wall 11204 are then wirelessly connected to the CPE 11104 using either an unlicensed band or unlicensed Wi-Fi with beamforming. The external millimeter wave transceiver 11202 transmits the data through the window or wall 11204 as described herein to an internal millimeter wave transceiver 11206. The internal millimeter wave transceiver 11206 incorporates a beamforming device or Wi-Fi router that allows for transmission of the received signals using beam forming license or Wi-Fi to an integrated millimeter wave transceiver 12002 and CPE 11104. The CPE 11104 transmits the data to the residential IP network 11208 and associated devices.

Figure 114:
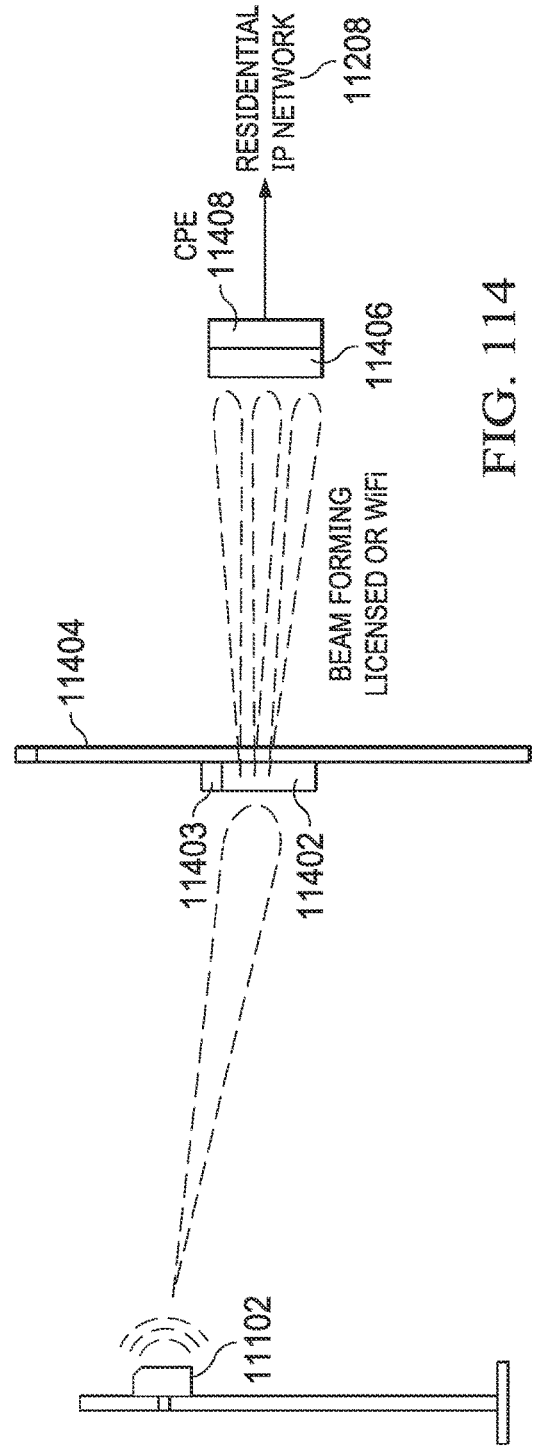

Referring now to FIG. 114 there is illustrated a further embodiment of a system for transmitting the broadband signals to a residential IP network 11208 wherein the access unit 11102 wirelessly transmits the signals to a millimeter wave transceiver 11402 located on an external side of a window 11404 of a building or structure. A millimeter wave transceiver 11402 is located on the outside of a window glass and uses high power phased array and beamforming circuitry 11403 to enable tunneling of radio waves to wirelessly connect to the CPE 11408 located a distance from the window 11404 using either a licensed band or unlicensed Wi-Fi. The millimeter wave transceiver 11402 includes a high-powered phased array 11403 providing beamforming or Wi-Fi router capabilities for transmitting signals wirelessly through the window 11404 to a millimeter wave transceiver 11406 located on an interior of the structure but placed at a location that is not directly on the opposite side of the window 11404. The millimeter wave transceiver 11406 is integrated with the CPE 11408 that transmits the broadband data to the residential IP network 11208 and associated devices.

The described system provides an optical or RF tunnel that allows signals to be transmitted from outside a building to devices within the building. Once the broadband access is delivered into the premises (residential or commercial), other unlicensed bands can be used inside the premises. The optical or RF tunnel can also be used to allow signals from the Internet of Things devices located within the building to go from inside to outside. In addition to the techniques described herein above, other near field techniques can be used for transmitting the information through the window or wall.

Millimeter Wave with Optical Networks

Figure 115:
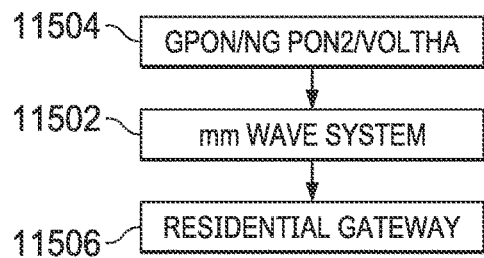

One of the challenges faced in the next generation broadband access at gigabyte rates is the need for running fiber to a home or business. With fixed millimeter wave 5G wireless access technology existing optical network units (ONU) which are passive optical network (PON) end points may be used for the aggregation of self-installed fixed wireless access points. FIG. 115 illustrates a combination of a millimeter wave system 11502 with optical data transfer systems 11504 such as GPON/NG PON2/vOLTHA. This combined system enables the control of bandwidth allocation from OLT to millimeter wave RUs as will be more fully described herein below. Each of these optical data transfer systems 11504 provide a manner for transmitting data from a central network location to the millimeter wave system 115022 that enables transmission of the data in an RF format over the last drop (last 100 m) to a user premises such as a home or business. The millimeter wave system 11502 may use millimeter wave beamforming and beam steering technologies to ensure quality of service to home applications in response to dynamically changing network conditions. The millimeter wave system 11502 provides connection to a residential gateway 11506 (such as the IP network Gateway described hereinabove) to provide services to a user located within a home or business. The millimeter wave system 11502 greatly increases the number of enterprise and residential buildings where 5G millimeter waves can be used to deliver Gigabit Ethernet. Thus, the millimeter wave system 11502 uses TDMA and SDN-controlled beam steering for wireless last drop access to the millimeter wave system at a structure that transmits to a residential gateway 11506.

Figure 116:
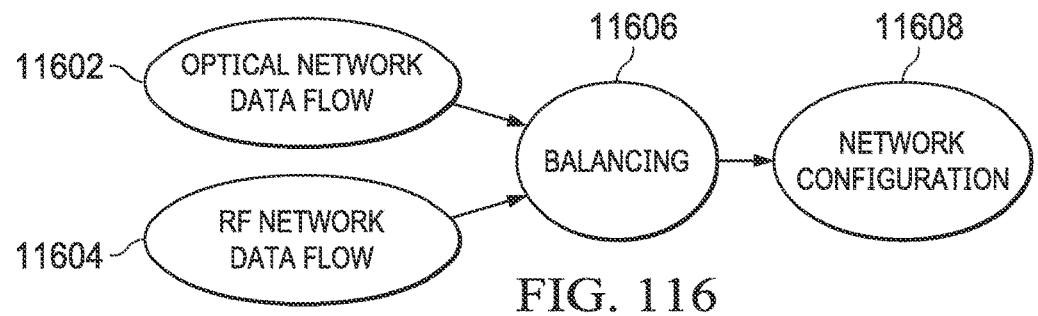

Since the residential gateway 11506 does not have the ability to dynamically trigger or adjust dataflow operations between the millimeter wave system 11502 and the optical data transfer system 11504 based on network conditions, the hybrid ONU and millimeter wave remote units as described hereinbelow may implement innovative SDN enabled beam steering mechanisms to achieve high quality experience with dynamic network slicing mechanisms and optimized OLT-ONU signaling frameworks. Thus, as more particularly illustrated in FIG. 116, the optical network dataflow 11602 within the GPON/NG PON2/vOLTHA network 11504 and the dataflow 11604 of the RF network 11502 may be balanced by the control system 11606 such that the RF network 11502 provides sufficient resources to support the required optical network data flow 11602, and the optical network 11504 provides sufficient resources to support the RF network dataflow 11604. The configuration involves configuring network devices within the optical network 11504 and RF network 11502. Thus, the optical network 11504 and RF network 11502 are comprised of components which may be remotely reconfigured by a central controller in order to enable balancing of loads being transmitted by the networks. If sufficient resources are not present on either of the networks, network configuration 11608 may be altered such that the network dataflow between the optical network 11504 and the RF network 11502 are balanced to prevent any bottleneck at the interface between the two networks. The network reconfiguration may utilize the network configuration control techniques described in U.S. patent application Ser. No. 15/664,764, entitled ULTRA-BROADBAND VIRTUALIZED TELECOM AND INTERNET, filed on Jul. 31, 2017, which is incorporated herein by reference.

Figure 117:
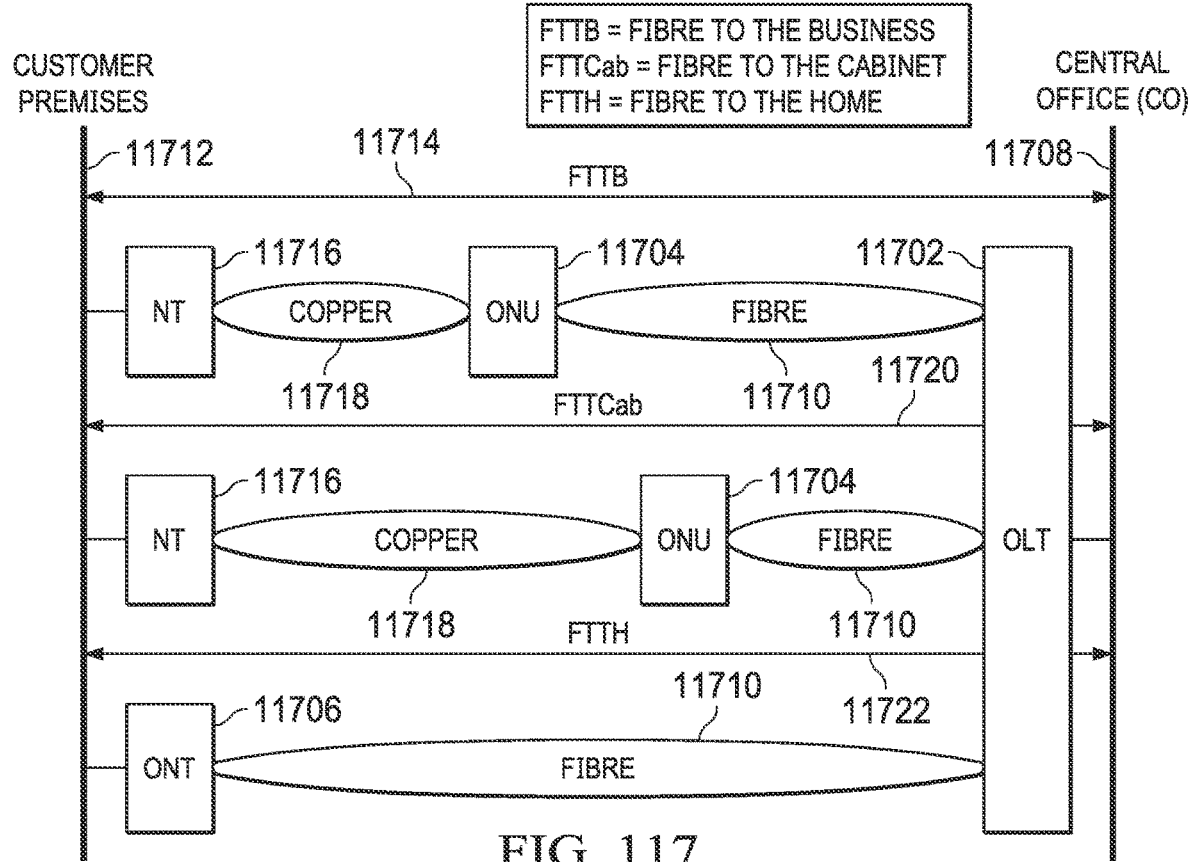

The optical data transfer systems 11504 (FIG. 15) include GPON, NG PON2, vOLTHA or similar types of systems. Referring now to FIG. 117, within GPON (gigabyte passive optical network) there are two main active types of transmission equipment that are used, OLT (Optical Line Terminal) 11702 and ONU (Optical Network Unit) 11704 or ONT(Optical Network Terminal) 11706. The Optical Line Terminal 11702 is in a central office 11708 and controls the information going both directions across the Optical Distribution Network. The OLT 11702 contains CSM (Control and Switch Module), ELM (EPON Link Module, PON card), and redundancy protection. The Optical Network Unit 11704 converts the optical signals transmitted through fiber 11710 from the OLT 11702 to electrical signals that are sent to individual subscribers at the customer premises 11712. The ONU 11704 can also send data coming from the subscriber to the OLT 11702. The Optical Network Terminal 11706 is essentially the same as the ONU 11704. ONT 11706 is an ITU-T (ITU Telecommunication Standardization Sector) term and ONU 11704 is an IEEE term. Both refer to the user side equipment in a GPON system. GPON supports high-bandwidth, triple-play services, and distances up to 20 km.

Within a fiber to the business configuration 11714, the OLT 11702 is connected to the ONU 11704 through an optical fiber 11710. The ONU 11704 connects with a PON termination point 11716 via copper wire 11718. Within a fiber to the cabinet configuration 11720, the OLT 11702 is connected to the ONU 11704 through an optical fiber 11710. The ONU 11704 connects with a PON termination point 11716 via copper wire 11718. Finally, within the fiber to the home connection 11722, the OLT 11702 connects with the ONT 11706 through a fiber 11710.

Figure 118:
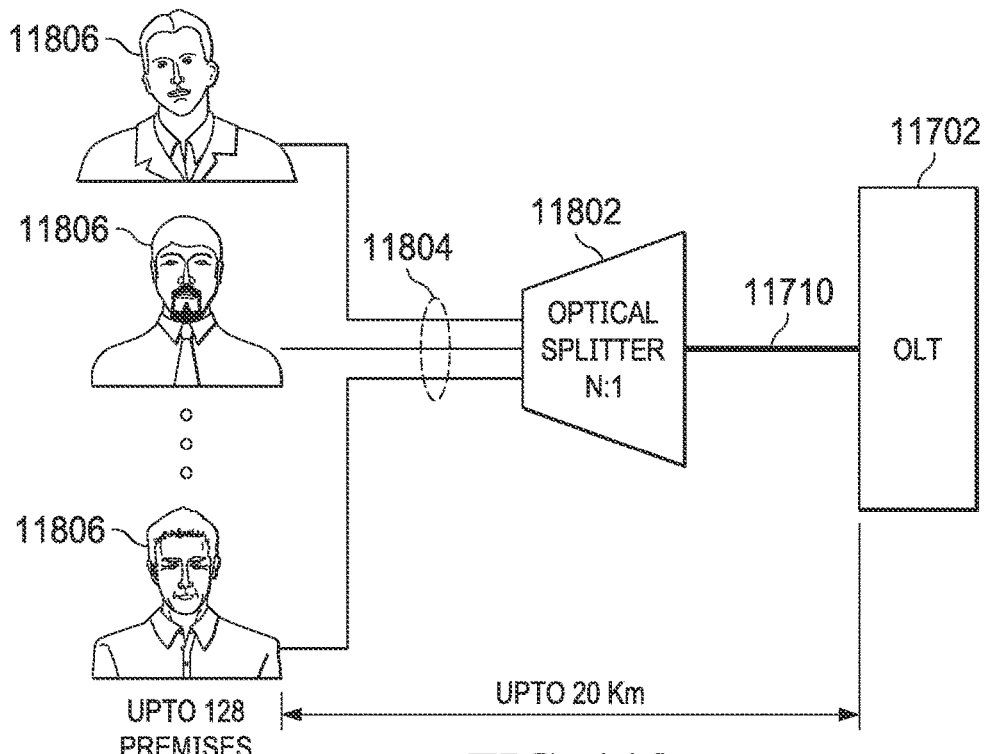

Referring now to FIG. 118, a single fiber 11710 from the OLT 11702 runs to a passive optical splitter 11802. The splitter 11802 divides the power into separate paths 11804 to the users 11806. There can be anywhere between 2 and 128 user paths 11804. GPON has two multiplexing mechanisms. In the downstream direction (OLT to users), data packets are encrypted and broadcast to the users. In the upstream direction (users to OLT), data packets are transmitted using TDMA.

ONU-ID is an 8-bit identifier that an OLT 11702 assigns to an ONU 11704 during ONU activation via PLOAM messages. The ONU-ID is unique across the PON and remains until the ONU 11704 is powered off or deactivated by the OLT 11702. The OLT 11702 also assigns a 12-bit allocation identifier (ALLOC_ID) to an ONU 11704 to identify a traffic-bearing entity that is a recipient of upstream bandwidth within that ONU.

A transmission container (T-CONT) is a group of logical connections that appear as a single entity for upstream bandwidth assignment for the ONU 11704. The number of supported T-CONTs is fixed for a given ONU 11704. The ONU 11704 autonomously creates all the supported T-CONT instances during ONU activation and the OLT 11702 discovers the number of T-CONT instances supported by a given ONU. There are 5 types of T-CONTs. Type 1 is of fixed bandwidth and used for services sensitive to delay and high priority. Type 2 and 3 are of guaranteed bandwidth types and mainly used for video services and data services of high priority. Type 4 is of best-effort type and mainly used for data services such as Internet and low priority. Type 5 is of mixed type involving all bandwidth types.

ONUs 11704 can be located at varying distances from the OLT 11702 which means the transmission delay from each ONU is unique. Ranging is performed by the OLT 11702 to measure delay and set a register in each ONU 11704 to equalize its delay. The OLT 11702 will transmit a grant to each ONU 11704 to set a defined interval of time for transmission. The grant map is dynamically re-calculated every few milliseconds, and is used to allocate bandwidth to all ONUs for such needs.

Dynamic Bandwidth Allocation (DBA) allows quick adoption of users' bandwidth allocation based on current traffic requirements. GPON uses TDMA for managing upstream access by ONUs 11704, and TDMA provides unshared timeslots to each ONU for upstream transmission. DBA allows upstream timeslots to shrink and grow based on the distribution of upstream traffic loads. Without DBA support on the OLT 11702, upstream bandwidth is statically assigned to T-CONTs which cannot be shared and can be changed only though a management system.

There are two forms of DBA, Status Reporting DBA (SR-DBA) and Non-Status Reporting DBA (NSR-DBA). In SR-DBA the OLT 11702 solicits T-CONT buffer status and the ONUs 11704 respond with a separate report for each T-CONT. The OLT 11702 re-calculates bandwidth allocation once it receives the report and sends the new map to the ONUs 11704. The ONUs 11704 send data in the specified time slots. An ONU 11704 sends idle cell upstream to the OLT 11702 to inform that the ONU has no information to send. The OLT 11702 can then assign grants to other T-CONTs.

In NSR-DBA an OLT 11702 constantly allocates a small amount of extra bandwidth to each ONU 11704. If the OLT 11702 observes that an ONU 11704 is not sending idle frames, it increases the bandwidth allocation for that ONU. If an ONU 11704 is sending idle frames then the OLT reduces its allocation accordingly. NSR-DBA has the advantage that the ONUs 11704 need not be aware of DBA, however the disadvantage is that there is no way for the OLT 11702 to know how to allocate bandwidth to several ONUs 11704 in the most efficient way.

Figure 119:
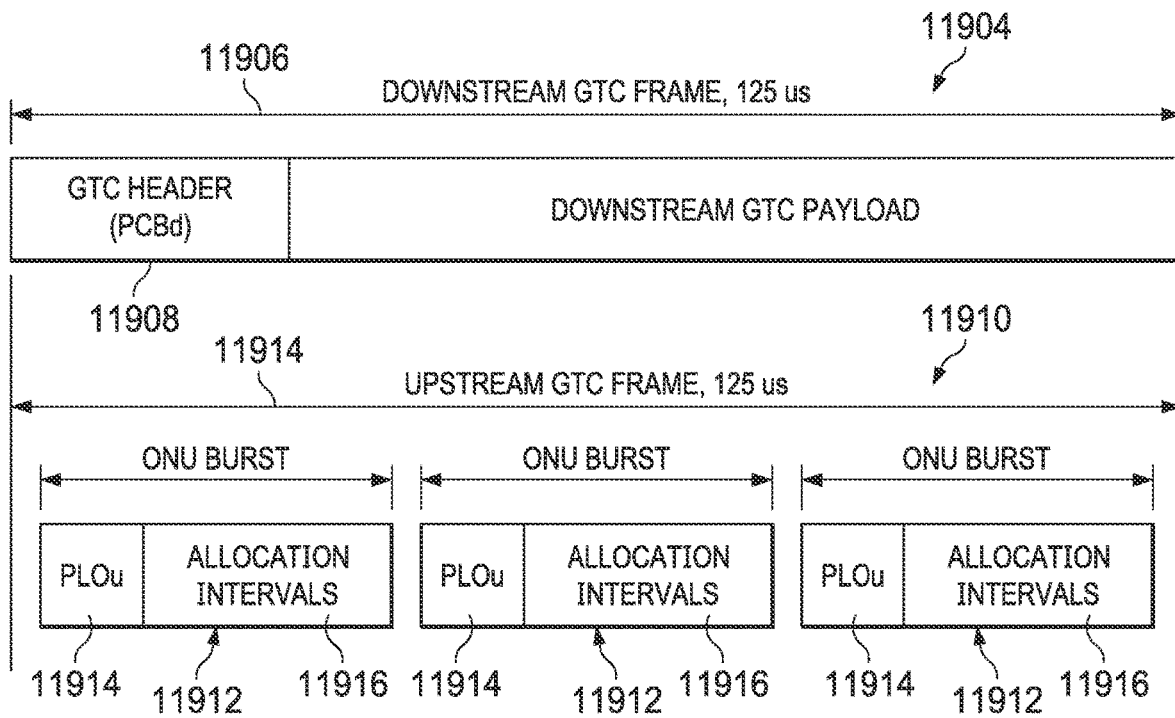

Referring now to FIG. 119 there are illustrated an Upstream GTS frame 11902 and a Downstream GTS frame 11904. FIG. 120 shows a more detailed view of the downstream GTC frame 11904. A downstream GTC frame 11904 has a duration 11906 of 125 us and is 38880 bytes long which corresponds to a downstream data rate of 2.48832 Gbps. The OLT 11702 broadcasts the PCBd (GTC header) 11908 to every ONU 11704, and the ONUs act upon the relevant information. The PCBd includes the Psync field 12002 that indicates a beginning of the frame for the ONUs 1704. The Ident field 12004 contains an 8-KHz Superframe Counter field. The PLOAMd field 12006 handles functions such as OAM-related alarms or threshold-crossing alerts. BIP field 12008 is Bit Interleaved Parity used to estimate bit error rate. The downstream Payload Length indicator (Plend) 12010 gives the length of the upstream bandwidth (US BW) map. Each entry in the Upstream Bandwidth (US BW) map field 12012 represents a single bandwidth allocation to a particular T-CONT.

The Allocation ID field 12014 indicates the recipient of the bandwidth allocation and uses the lowest 254 allocation ID values to address the ONU 11704 directly. The Flag field 12016 allows the upstream transmission of physical layer overhead blocks for a designated ONU 11704. The Slot Start field 12018 and Stop field 12020 indicates the beginning and ending of upstream transmission window. The CRC field 125022 provides error detection and correction on bandwidth allocation field.

The GTC payload field 12024 contains a series of GEM (GPON Encapsulation Method) frames 12026. The downstream GEM frame stream is filtered at the ONU 11704. Each ONU 11704 is configured to recognize which Port-IDs belong to it, and the Port-ID uniquely identifies a GEM Frame 12026.

Referring now back to FIG. 119. The Upstream GTS frame duration 11914 is 125 us and is 19440 Bytes long which gives an upstream data rate of 1.24416 Gbps. Each frame 11910 contains a number of ONU transmission bursts 11912 from ONUs 11704 and each burst contains a physical layer overhead (PLOu) section 11914 and one or more bandwidth allocation intervals 11916. The BW map dictates the arrangement of the bursts within the frame and the allocation intervals within each burst.

Referring now also to FIG. 121, there is more particularly illustrated an Upstream GTS frame 11910. The PLOu burst 12102 contains the preamble which ensures proper physical layer operation. The PLOu field 12102 also contains the ONU-ID field 12104 which indicates the unique ONU-ID of that ONU 11704. The upstream physical layer OAM (PLOAMu) field 12106 is responsible for management functions like ranging, activation of an ONT 11706, and alarm notifications. The upstream power leveling sequence (PLSu) field 12108 contains information about the laser power levels at the ONUs 11704 as seen by the OLT 11702.

GEM frames 12026 are transmitted from the OLT 11702 to the ONUs 11704 using the GTC frame payload section 12112. The OLT 11702 may allocate up to all of the downstream frame to meet its downstream needs. The ONU filters the incoming frames based on Port-ID. Frames are transmitted from ONU 11704 to OLT 11702 using the configured GEM allocation time. The ONU 11704 buffers the frames and sends them in bursts when allocated time by the OLT 11702. The OLT 11702 multiplexes the received frames from the ONUs 11704.

Another system that may be used for the optical data transfer systems 11504 (FIG. 115) is a NG-PON2 (Next-Generation Passive Optical Network) system. NG-PON2 is a 40 Gbps capable multi-wavelength PON system that can grow up to 80 Gbps. An NG-PON2 system has three types of channel rates: basic rate 10/2.5 Gbps or optionally 10/10 Gbps and 2.5/2.5 Gbps.

The main target requirements for NG-PON2 are the increase in aggregate capacity per Optical Line Terminal (OLT) PON port, a sustainable bandwidth on any Optical Network Unit (ONU) at downstream of 1 Gbps and upstream of 0.5 to 1 Gbps, support of 64 or more ONUs per port, compatibility with legacy PON infrastructure, a 40 km differential reach and a smooth migration, support for multiple applications on the same Optical Distribution Network (ODN), embedded test and diagnostics capabilities and PON resilience.

There are many applications driving the demand for next generation PONs, including FTTB, Enterprises, Mobile Backhaul, Fronthaul, and Cloud-RAN. Content is the main driver nowadays for the high access bitrate requirements. Content service providers need to prepare the access network for the future, and it can be concluded that future access networks will be a truly multi-service solution.

Currently, software packages and personal data is downloaded and stored from data centers. This requires very high upload and download speeds as well as symmetry and low latencies. This means the "cloud opportunity" gained from NG-PON2 is also a very important reason to evolve to the new network.

NG-PON2 is compatible with legacy loss budget classes. NG-PON2 requires a minimum optical path loss of 14 dB and allows a differential reach of 40 km. There are 3 classes defined by NG-PON2 of Tx/Rx wavelength channel tuning time. Class 1 components may include switched laser on arrays, class 2 components could be based on electronically tuned lasers (DBR), and class 3 components could be thermally tuned DFBs.

NG-PON2 transmission convergence layer has new capabilities supported by the protocol, as multiple wavelengths, TWDM and point-to-point channels. Communication starts with a single channel adding more channels later and distributed OLT Channel Terminations (CTs) which can drive a single fiber. The new protocol functions allow multiple wavelengths so protocol supports tuning, new identities to distinguish system and wavelength channel, new managements protocol for PtP, WDM and TWDM activation, Dealing with ONUs with uncalibrated lasers that must not be allowed to transmit in the wrong wavelength channel, inter-channel messaging for some procedures over distributed OLT channel terminations, and new rogue scenarios that can be detected and mitigated.

NG-PON2 has an inter-channel termination protocol. The OLT CTs (channel termination) are distributed so that some procedures require messages to be passed between OLT CTs such as synchronizing OLT CT quiet windows, ONU tuning, ONU activation, parking orphaned ONUs, ONUs connected to the wrong ODN, guided hand-off of ONUs between OLT CTs, and rogue ONU isolation.

NG-PON2 also covers different protection scenarios and rogue behaviors of the ONU such as when the ONU transmitter hops to the wrong upstream channel, ONU transmitter starts transmitting at the wrong upstream wavelength, OLT CT transmits in the wrong downstream wavelength channel, and when interference from coexisting devices.

The current NG-PON2 OLT optics are based on Bi-directional Optical Subassemblies (BOSAs) integrated on XFP form factor. These optics are suitable for TWDM PON, 10 Gbps downstream, 2.5 Gbps or 10 Gbps upstream. The XFP integrates an electro-absorption integrated laser diode with a semiconductor optical amplifier (SOA) in order to reach the type A N1 class NG-PON2 optical requirements. A high sensitivity burst mode avalanche photodiode (APD), a pre-amplifier and a limiting amplifier as receiver components are mounted into a package integrated in single mode fiber-stub with a sensitivity equal to −28.5 dBm at 10 Gbps and −32 dBm at 2.5 Gbps.

The NG-PON2 ONU optics are based on BOSA (Bi-directional Optical Sub Assembly) on board. The BOSA integrates a burst mode tunable distributed feedback lasers (DFB) at 10 Gbps or 2.5 Gbps emitting high optical power in a N1 type A link, +4~9 dBm capable of doing 4 upstream channels. On the receiver side, a high sensitivity 4 channel tunable APD, a pre amplifier and a limiting amplifier are able to operate at a sensitivity of −28 dBm at 10 Gbps.

Another implementation that may be used for the optical data transfer systems 11504 (FIG. 115) is a Virtual Optical Line Termination Hardware Abstraction (vOLTHA) that may be used within one of the above described systems. As illustrated in FIG. 122, vOLTHA is a layer of abstraction atop legacy and next generation network equipment. It is initially for PON (G-PON, E-PON, XGS-PON) and ultimately for G.Fast, NG-PON2 DOC SIS, and Ethernet. vOLTHA makes an access network act as an abstract programmable switch and works with legacy and virtualized devices. vOLTHA can run on the device or on general purpose servers.

Each access technology brings its own protocols and concepts which means control and management of legacy access devices can be a problem. vOLTHA confines the differences of access technology to the locality of access and hides them from the upper layers of the OSS stack. Referring now to FIG. 123 there is illustrated the implementation of vOLTHA with an OLT 12302 and ONU 12304 link. The OLT 12302 communicates with multiple ONUs 12304 through a splitter 12305. vOLTHA containers communicate over gRPC. The main container publishes events to Kafka and persists data in Consul for service discovery. Southbound OLT adapters 12306 and ONU adapters 12308 will be their own containers as well. OLT adapter 12306 and ONU adapter 12308 enables OLT-ONU interoperability through the vOLTHA core 123310. The ONU adapter 12308 sends OMCI (ONT management control interface) to the OLT 12302 through the OLT adapter 12306.

Using vOLTHA to create hardware abstraction layers for Wave Agility enables integration to a residential network IP gateway over mmWave Fixed Wireless Access (gigabit rate access with Dynamic QoS-Application & Network slicing support). One of the challenges faced in the next generation broadband access at gigabit rates is the need for running fiber to the home or business. Referring now to FIG. 124, with fixed mmWave 5G wireless access technology ONUs 12402 (PON end points) can be utilized for the aggregation of self-installed fixed wireless access points.

Almost all recent FTTH (fiber to the home) deployments, as well as those currently being planned, use passive optical networking. The concept of a Passive Optical Network (PON) 12412, involves the use of passive fiber splitters which allow multiple customers (typically 32-128) to share a single fiber pair. GPON has also seen trials and initial deployments by several large Telco's, but these are largely used as a basis for transmitting Ethernet via encapsulation within GEM frames (GPON Encapsulation Method) 12026 (FIG. 120). GPON was designed with very strict timing requirements. Both EPON and GPON therefore use Time Division Multiple Access (TDMA), informally known as "time-sharing." Time is divided into slots, of either fixed or variable length or long enough to contain one or more data frames (usually around 100-1000 msec). During a given slot, one ONU 12402 is permitted to transmit and all others must have turned off their lasers. The OLT 12410 is responsible for determining a transmission schedule and sending that to the ONUs 12402 (this is sometimes considered to be a form of batch polling by the OLT) and the ONUs must maintain an accurate clock which is synchronized to that of the OLT in order to transmit at exactly the right time.

The number of time slots allocated to each ONU 12402 need not remain fixed. Both EPON and GPON provide flexible mechanisms to allow the OLT 12410 to dynamically allocate bandwidth to ONUs according to demand and the network operator's policy. These mechanisms are nonspecific as to the algorithms employed, particularly in the case of EPON where the extremely simple request-based protocol leaves a lot of scope for interesting dynamic bandwidth allocation algorithms. Extending bandwidth assignments to the mmWave technology is desirable with PON technology, a channel is broadcast to all ONUs 12402, and each frame is labelled with the address of its target ONU. That ONU 12402 will forward the frame onto its end user's LAN through the home gateway 12406, and all other ONUs will discard the frame. This is a form of TDMA, with the OLT 12410 determining its own transmission schedule and each time slot lasting the duration of a frame.

A mmWave system 12004 can also take advantage of mmWave beam forming and beam steering technologies to ensure QoS to the home applications accessed via a home gateway 12406 in the dynamically changing network conditions. Given the current Residential Gateway (RGW) devices 12406 do not have the ability to directly and dynamically trigger or adjust the service flow operations based on the network conditions, the hybrid ONU 12404 and mmWave Remote Units (RUs) 12408 can be designed with innovative SDN enabled beam steering mechanisms to achieve high quality user experience with dynamic network slicing mechanisms and optimized OLT-ONU (gPON) signaling frameworks. Millimeter wave frequencies implemented by the mmWave system 12404 are roughly defined as bands in 24, 28, 39 and 60 GHz. However, such an approach is also applicable to 3.5 GHz CBRS. The mmWave system 12404 provides much potential for use as wireless broadband services with beam steering under control of SDN towards the self-installed mmWave home modems. As mentioned previously, the SDN beam steering mechanisms and dynamic network slicing mechanisms may use those techniques describe in U.S. patent application Ser. No. 15/664,764, which is incorporated herein by reference.

In the vOLTHA scenario, home gateways 12406 can connect to ONUs 12402 via mmWave technologies within the mmWave System 12404 in the last drop (100s of meters) where wireless access points are directly connected to ONUs 12402 via mmWave RUs 12408. Hybrid virtual OLT (vOLTHA) 12410 and mmWave Fixed Broadband Wireless technology through the mmWave system 12404 can provide self-installed access opportunities to homes and businesses. In addition, the synchronous nature of vOLTHA based on gPON can extend itself to map to beam steering control technology for mapping/distribution of ONU traffic among multiple mmWave modems 12408 with support for slicing control at home networks. In this scenario, a single PON 12412 will be seen by an Ethernet switch as a collection of point-to-point links, one per Hybrid ONU 12402+mmWave Radio Unit 12408. The PON 12412 will typically connect up to 128 ONUs 12402 to each OLT 12410, and hybrid ONU-RU will connect to multiple mm-wave modems utilizing beam steering control plans. The mmWave Modems 12408 are self-installed and reduce the need for a fiber connection to the home/apartments as well as further provide for additional statistical gain and aggregation points at the ONU+RU at the Ethernet layer, customers served by these PONs 12412 will be on a single large Ethernet. Furthermore, if delay and cost is not a factor, the ONU+RU's are integrated and can be treated as IP routers with load balancing and slicing capabilities, provide statistical gain and an aggregation point.

Thus, from the operator's perspective, by bridging together all of a central office's PONs 12412 and serving ONU+RU 12402/12408 at the Ethernet layer, customers served by these PONs 12412 will be on a single large Ethernet. Furthermore, if delay and cost is not a factor we can threat the ONU+RUs 12402/12408 as IP routers with opportunities for load balancing and additional slicing capabilities. The system may also be designed wherein where transmit is done at higher 60 GHz band channel from outside to inside and a and lower 60 GHz band channel from inside to outside.

The current ONUs 12402 in vOLTHA will be complemented with mmWave RUs 12408 which will perform beam steering functions with modems installed at each home. In practical scenarios, small cells deployed with each ONU 12402 in urban outdoor environments are regularly affected by trees and passing objects. In millimeter wave beamforming systems, the environmental issues such as wind-induced movement, blockage by trees, may be resolved by beam steering technologies under control of SDN where each wavelength uses a very narrow beam pattern. The practical impairments of a lamppost deployment scenario need be incorporated into the beamforming system and system design.

Almost all modern PONs 12412 run on Ethernet at some level either used as the native protocol on an EPON, or encapsulated in GEM on a GPON, with physical and logical topology of a simple Ethernet PON deployment shown as follows. Ethernet is now predominantly used as a basis for the data link layer and Internet Protocol (IP) as ubiquitous network layer protocol. Some networks still use separate fibers for transmission in each direction (1310 nm and 1490 nm—for bidirectional use). The Ethernet PHY is responsible for providing a serialized bit stream facility (only) to the Medium Access Control (MAC) layer. The MAC is responsible for dividing the bit stream into frames. Frames are labelled with a header containing, source and destination MAC addresses. This enables the statistical multiplexing of multiple hosts' frames on a single link.

FIG. 125 illustrates the interface between the ONU 12402 and the plurality of home gateways 12406. A single optical fiber pair 12502 provides data to and from the ONU 12402. The ONU 12402 interfaces with a millimeter wave remote unit 12408, having the ability to generate RF beams 12504 that may be directed toward one or more millimeter wave radio units 12408B associated with a home or business. The interface between the millimeter wave remote units 12408A and 12408B may include one or more of the building penetration techniques described herein. The millimeter wave radio units 12408 provide beam steering techniques and slice control techniques enabling the control of the transmission of data bidirectionally between the ONU 12402 and home gateways 12406. The millimeter wave remote units 12408B associated with the home or business interface with the home gateways 12406 to provide broadband data connections to the associated home or business structure.

Referring now to FIGS. 126 and 127, there are more particularly illustrated embodiments for broadband data communications between an OLT 12410 and devices located within a structure. With respect to FIG. 126, the OLT 12410 is located at a central office/MEC 12602 that may be part of a virtual base band unit (VBBU). The OLT 12410 schedules transmissions over the fiber 12604 to the ONU's 12402. The OLT 12410 connects to a number of ONU's 12402 through optical fiber pairs 12604. The ONU 12402 maintains an accurate clock to sync with the OLT 12410. Associated with the ONU 12402 is a remote unit 12408. The remote unit 12408 is part of the millimeter wave system 12404 described hereinabove. The combined ONU/RV is treated as an IP router providing load-balancing and slicing and further providing statistical gain for signal transmission and acts as an aggregation point for received data. The combined ONV/RV also provides for wireless communications with remote units associated with structures. The remote unit 12408 is located on a light pole or tower located near a structure and provides the wireless last drop connection to a home or business that replaces fiber DSL and cable.

The remote unit 12408 utilizes controlled beamforming and slice control techniques to generate radio beams 12606 that are transmitted to an exterior millimeter wave transceiver 12608 located on an exterior of the structure. The exterior millimeter wave transceiver 12608 repeats signals receive from the exterior hub and allows the signal to penetrate through the glass or building. The exterior millimeter wave transceiver 12608 transmits the broadband data signals through a window or wall 126102 and internal millimeter wave transceiver 12612 using one of the above described techniques for transmitting through a wall or window. The interior millimeter wave transceiver 12612 also utilizes beamforming and slicing techniques as described herein to transmit wireless beams 12614 within the structure to a residential gateway 12616. The residential gateway 12616 comprises a self-installed home modem that provides an interconnection between the broadband data received from the interior millimeter wave transceiver 12612 and devices located within the structure that communicate with the residential gateway 12616 via wired or wireless connections. The OLT 12410, ONU 12402, RU 12408, millimeter wave transceivers 12608/12612 and residential gateway 12616 all include a hardware abstraction layer from vOLTHA as previously described enable a SDN to control the entire end-to-end configuration of the components to access the last drop connection.

FIG. 127 illustrates the same structure described with respect to FIG. 126 for broadband data transmissions between the OLT 12410 and the interior millimeter wave transceiver 12612. Rather than illustrating a connection to a residential gateway 12616, which the system may still do, a 60 GHz wireless connection to a pair of virtual reality (VR) goggles 12702 is illustrated. A 60 GHz transceiver dongle 12704, as will be more fully described herein below, is inserted into a USB port of the interior millimeter wave transceiver 12612. This provides the ability for the interior millimeter wave transceiver 12612 to bidirectionally communicate through the 60 GHz transceiver dongle 12704 with the VR goggles 12702 located on the interior of the structure. The VR goggles 12702 may then be used wirelessly with any interior computer or with a central office without the need for a local computer. While FIG. 127 illustrates a 60 GHz wireless link to VR goggles 12702, other types of devices may also wirelessly connected to the 60 GHz transceiver dongle 12704 in order to enable broadband data transmissions thereto. The control of data transmissions between the optical data transmission portions and that the RF data transmission portions using SDN slicing as mentioned hereinabove are applicable to each of the embodiments in FIGS. 126 and 127. The OLT 12410, ONU 12402, RU 12408, millimeter wave transceivers 12608/12612 and VR goggles 12702 all include a hardware abstraction layer from vOLTHA as previously described enable a SDN to control the entire end-to-end configuration of the components to access the last drop connection.

Referring now to FIG. 128, there is illustrated a functional block diagram of the 60 GHz transceiver dongle 12704. The 60 GHz transceiver dongle 12704 implements a 60 GHz chipset using for example a Peraso transceiver such as that described hereinabove with respect to FIG. 84B. The chipset implements a low cost, low power, high performance SuperSpeed USB 3.0 to WiGig device. The chipset includes a USB 2.0 and 3.0 device/host system interface 12802. The interface 12802 supports link speeds up to 2.0 Gbps at 10 m and 1 Gbps at 20 m and it is possible to configure the chipset as a multi-gigabit WiGig USB adaptor or as the 60 GHz wireless connection for a peripheral device through a control interface 12804.

The 60 GHz transceiver dongle 12704 incorporates two processors 12806 to provide the highest flexibility in supporting 801.11ad MAC functionality. CPU code boot loading is supported from the USB interface 12802 or external serial flash 12808. The MAC includes sufficient internal memory 12810 to buffer data transfers to and from the PHY as well as receiving/transmitting packets to the host interfaces. No additional RAM is required.

The physical layer is capable of modulating/demodulating all control and single carrier π/2-BPSK, 7c/2-QPSK and 16-QAM WiGig coding schemes up to a maximum rate of 4.62 Gbps to a high throughput. LDPC (low density parity check) forward error correction maximizes performance in unreliable or noisy communication channels. A highly configurable programmable IO subsystem is included in the baseband, consisting of GPIO, UART, SPI, TWI, PWM and JTAG. The firmware incorporates multiple layers of debug functionality such logging and extensive statistic and event counters.

The 60 GHz transceiver dongle 12704 may be utilized for many different applications including mobile multi-gigabyte wireless connectivity, high quality, low latency wireless UHD 4k displays, wireless docking stations, I/oh and mobile "sync and go," small cell backhaul and Wi-Fi infrastructure and other multi-gigabyte links. The system can be built to have transmit at a higher band channel from outside to inside and from a lower band channel from inside to outside at any center frequency (3.5, 24, 28, 39, 60 GHz).

As shown in FIG. 129, every Ethernet interface is assigned a unique, 6-byte MAC address 12902 at the time of manufacture to indicate a locally administered address. This MAC address 12902 includes three bytes 12904 identifying the device's manufacturer using an Organizationally Unique Identifier (OUI) assigned by the IEEE Society with the remainder assigned by the manufacturer. It is also possible to override the manufacturer-assigned MAC address according to some local scheme. One bit 12906 in the first byte acts as a flag to indicate such a locally administered address. This bit 12906 is set to zero in every manufacturer-assigned address. This provides the opportunity to map the ONU 12410 to mmWave Radio beams and maintain a table that plays the glue-logic between fixed wireless and OLT/ONU assignment slots Referring now to FIG. 130, switches 13002 within the optical networks (which may be OLTs, ONVs or ONTs) make use of MAC addresses to bridge together multiple point-to-point or shared-medium Ethernet segments 13006. When a frame passes through a switch 13002, the switch learns the location of the sender. The source address of the frame is stored in a forwarding database 13004 in the switch's memory together with the interface on which the frame arrived. This is used to direct subsequent frames. The switch 13002 looks for frames' destination addresses in the database 13004 to determine the interface to which the frame should be forwarded. If the switch 13002 has no record of the location of an address, the frame can be flooded to all interfaces. This is very wasteful of link capacity and the intention is to prevent this.

MAC addresses can also refer to groups of multiple hosts using another flag bit 13008. Currently Ethernet does not natively provide multicast routing, generally using broadcast for all group addresses, but some switches 13002 can use a technique known as IGMP (Internet Group Management Protocol) snooping to hook into IP multicast and infer Ethernet multicast groups.

In summary, the goal is to utilize 5G fixed wireless mmWave and 5G core with slicing, transport it over vOLTHA and provide similar speeds as Gig power fiber service (e.g., 1 Gbps) to the home with self-installed modems. This enables a balancing of data flows between the optical networks associated with the PON 12412 and the RF networks using in one example the mmWave System 12404. Assumptions are that our neighborhood street poles are populated with ONUs 12402 plus mmWave Remote Units 12408.

It will be appreciated by those skilled in the art having the benefit of this disclosure that this regeneration and retransmission of millimeter waves for building penetration provides a manner for providing millimeter wave signals inside of a building where the signals do not effectively penetrate. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A system for providing a residential IP network comprising:
    a plurality of transceiver circuitries, each associated with a building, for transmitting signals to/from the associated building;
    a remote network element for transmitting and receiving wireless signals at a first frequency using beam forming and beam steering to provide the wireless signals to at least one of the plurality of transceiver circuitries;
    wherein each of the plurality of transceiver circuitries further comprises:
        first circuitry, located on an exterior of the building, for transmitting and receiving wireless signals at the first frequency, wherein the wireless signals at the first frequency experience losses when penetrating into an interior of the building, converting received wireless signals at the first frequency into a first format that overcome losses caused by penetrating into the interior of the building over a wireless communications link and converting received signals in the first format into the wireless signals in the first frequency;
        a first antenna associated with the first circuitry for transmitting the signals in the first format into the interior of the building via a wireless communications link and for receiving signals from the interior of the building in the first format via the wireless communications link;
        second circuitry, located on the interior of the building and communicatively linked with the first circuitry via the wireless communications link, for receiving and transmitting the converted received signals in the first format that counteracts the losses caused by penetrating into the interior of the building from/to the first circuitry; and
        a second antenna associated with the second circuitry for transmitting the signals in the first format to the exterior of the building via the wireless communications link and for receiving signals from the exterior of the building in the first format via the wireless communications link.

2. The system of claim 1, wherein the remote network element comprises:
    an optical network unit for providing interconnection with an optical network; and
    a remote unit integrated with the optical network unit for providing interconnection with a network transmitting the wireless signals at the first frequency; and
    wherein the optical network unit and the remote unit provide load balancing and slicing capabilities for transmissions to the plurality of transceiver circuitries.

3. The system of claim 2 further comprising an optical line terminal for controlling communications from the optical network to the optical network unit.

4. The system of claim 1, wherein the second circuitry further uses beam forming for transmitting signals from the second circuitry to a home gateway located within the building.

5. The system of claim 1 further including a transceiver dongle for connecting with the second circuitry for providing wireless communications with wireless capable devices located within the building.

6. The system of claim 1, wherein each of the remote network element, the first circuitry and the second circuitry include a hardware abstraction layer from vOLTHA to enable a software defined network to control end-to-end configuration of the remote network element, the first circuitry and the second circuitry.

7. The system of claim 1, wherein the beam steering is controlled using SDN (software defined networking).

8. A system for providing a residential IP network comprising:
    a plurality of transceiver circuitries, each associated with a building, for transmitting signals to/from the associated building;
    an optical network unit for transmitting and receiving signals at a first frequency with an optical network;
    a remote unit integrated with the optical network unit for converting the received signals at the first frequency into a first format that overcome losses caused by penetrating into an interior of the building over a wireless communications link and for transmitting the signals in the first format using beam forming and beam steering to provide the signals to at least one of the plurality of transceiver circuitries;
    wherein each of the plurality of transceiver circuitries further comprises:
        first circuitry, located on an exterior of the building, for transmitting and receiving the signals in the first format;
        a first antenna associated with the first circuitry for transmitting the signals in the first format into the interior of the building via a wireless communications link and for receiving signals from the interior of the building in the first format via the wireless communications link;
        second circuitry, located on the interior of the building and communicatively linked with the first circuitry via the wireless communications link, for receiving and transmitting the converted received signals in the first format that counteracts the losses caused by penetrating into the interior of the building from/to the first circuitry; and
        a second antenna associated with the second circuitry for transmitting the signals in the first format to the exterior of the building via the wireless communications link and for receiving signals from the exterior of the building in the first format via the wireless communications link.

9. The system of claim 8, wherein the optical network unit and the remote unit provide load balancing and slicing capabilities for transmissions to the plurality of transceiver circuitries.

10. The system of claim 8 further comprising an optical line terminal for controlling communications from the optical network to the optical network unit.

11. The system of claim 8, wherein the second circuitry further uses beam forming for transmitting signals from the second circuitry to a home gateway located within the building.

12. The system of claim 8 further including a transceiver dongle for connecting with the second circuitry for providing wireless communications with wireless capable devices located within the building.

13. The system of claim 8, wherein each of the remote unit, the first circuitry and the second circuitry include a hardware abstraction layer from vOLTHA to enable a software defined network to control end-to-end configuration of the remote unit, the first circuitry and the second circuitry.

14. The system of claim 8, wherein the beam steering is controlled using SDN (software defined networking).

15. A method for providing a residential IP network comprising:

a plurality of transceiver circuitries, each associated with a building, for transmitting signals to/from the associated building;

receiving signals at a first frequency at a remote network element;

transmitting the received signals at the first frequency using beam forming and beam steering to at least one transceiver circuitry;

converting the received signals at the first frequency into a first format that overcome losses caused by penetrating into an interior of the building over a wireless communications link;

transmitting the signals in the first format from an exterior of the building from a first circuitry on an exterior of the building into the interior of the building via a wireless communications link; and receiving the converted received signals in the first format that counteracts the losses caused by penetrating into the interior of the building at second circuitry located on the interior of the building that is communicatively linked with the first circuitry via a wireless communications link.

16. The method of claim 15, wherein the step of transmitting the received signals at the first frequency further comprises load balancing and providing slicing capabilities for transmissions to the at least one transceiver circuitry.

17. The method of claim 15, further including transmitting signals from the received signals using beam forming to a home gateway located within the building.

18. The method of claim 15 further including connecting with the second circuitry for providing wireless communications with wireless capable devices located within the building using a transceiver dongle.

19. The method of claim 15 further comprising controlling end-to-end configuration of the remote network element, the first circuitry and the second circuitry using a hardware abstraction layer from vOLTHA to enable a software defined network to control.

20. The method of claim 15, wherein the step of transmitting the received signals at the first frequency further comprises controlling the beam steering using SDN (software defined networking).

\* \* \* \* \*